United States Patent
Brown

(10) Patent No.: US 7,107,112 B2
(45) Date of Patent: Sep. 12, 2006

(54) METHOD AND SYSTEM FOR SIMULATING AND MODELING A BATCH MANUFACTURING FACILITY

(76) Inventor: Peter G. Brown, 1653 Commonwealth Ave., Suite 3, Brighton, MA (US) 02135

( * ) Notice: Subject to any disclaimer, the term of this patent is extended or adjusted under 35 U.S.C. 154(b) by 0 days.

(21) Appl. No.: 11/131,480

(22) Filed: May 17, 2005

(65) Prior Publication Data

US 2006/0100728 A1 May 11, 2006

Related U.S. Application Data

(60) Provisional application No. 60/573,033, filed on May 19, 2004, provisional application No. 60/572,305, filed on May 17, 2004.

(51) Int. Cl.
*G06F 19/00* (2006.01)

(52) U.S. Cl. ............................ 700/100; 700/117; 703/6

(58) Field of Classification Search ................. 700/97, 700/99, 100, 102, 117; 702/184; 703/6
See application file for complete search history.

(56) References Cited

U.S. PATENT DOCUMENTS

| | | | | |
|---|---|---|---|---|
| 5,351,195 A | * | 9/1994 | Sherman | 700/100 |
| 6,311,093 B1 | * | 10/2001 | Brown | 700/95 |
| 6,311,095 B1 | * | 10/2001 | Brown | 700/117 |
| 6,591,287 B1 | * | 7/2003 | More et al. | 718/102 |
| 6,662,061 B1 | * | 12/2003 | Brown | 700/97 |
| 6,738,682 B1 | * | 5/2004 | Pasadyn | 700/100 |
| 6,865,432 B1 | * | 3/2005 | Brown | 700/99 |
| 6,983,229 B1 | * | 1/2006 | Brown | 703/6 |
| 2001/0018643 A1 | * | 8/2001 | Brown | 703/6 |
| 2001/0044710 A1 | * | 11/2001 | Brown | 703/6 |
| 2002/0035457 A1 | * | 3/2002 | Brown | 703/6 |
| 2004/0098159 A1 | * | 5/2004 | Brown | 700/117 |
| 2005/0113950 A1 | * | 5/2005 | Brown | 700/97 |

* cited by examiner

*Primary Examiner*—Leo Picard
*Assistant Examiner*—Douglas S. Lee
(74) *Attorney, Agent, or Firm*—R.D. Johnson & Associates, P.C.; Rodney D. Johnson, Esq.

(57) ABSTRACT

A system and method for the simulation and modeling of biopharmaceutical batch process manufacturing facilities using process time lines is described herein. The system employs an eleven-field delimited string code which specifies the unit identifier code and the iteration value for each of the ten levels of nested scheduling cycles of the biopharmaceutical drug production process being modeled. The method includes generating a process time line using operational parameters, a block flow diagram, and a set of scheduling cycles for each of a sequence of unit operations. The process time line is used as a tool for batch processing and facility design.

4 Claims, 91 Drawing Sheets

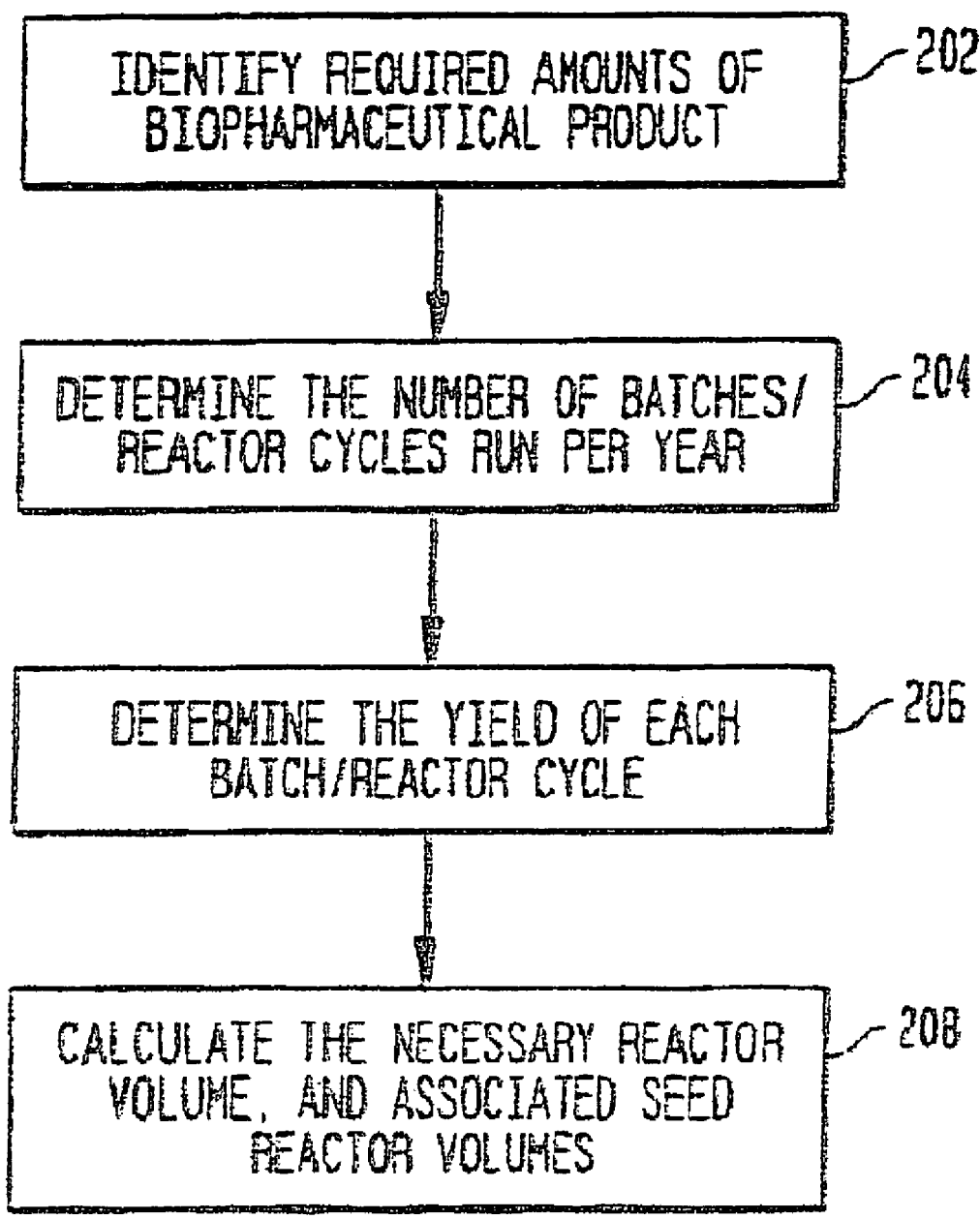

FIG. 3
UNIT OPERATIONS LIST

MICROBIAL FERMENTATION PROCESS

| UOP SEQ. NO. | CODE | UNIT OPERATION TYPE | CYCLES PER UOP OFFSET (HRS) | BATCH UOp START | BATCH UOp END | BATCH OFFSET (HRS) | PROCESS UOp START | PROCESS UOp END | PROCESS OFFSET (HRS) | RECOVERY PRODUCT SM1 | RECOVERY PRODUCT DM1 | TOTAL PROTEIN SM1 | TOTAL PROTEIN DM1 |
|---|---|---|---|---|---|---|---|---|---|---|---|---|---|
| 1 | 1 | INOCULUM PREP | 1 | 3 | 1 | 5 | | 1 | | 100% | 100% | 100% | 100% |
| 2 | 2 | FLASK GROWTH | 1 | 3 | 1 | 5 | | 1 | | 100% | 100% | 100% | 100% |
| 3 | 53 | SEED FERMENTATION | 1 | 3 | 1 | 5 | | 1 | | 95% | 95% | 95% | 95% |
| 4 | 3 | PRODUCTION FERMENTATION | 1 | 3 | 1 | 5 | | 1 | | 100% | 95% | 100% | 95% |
| 5 | 51 | HEAT EXCHANGE | 1 | 3 | 1 | 5 | | 1 | | 95% | 95% | 90% | 95% |
| 6 | 28 | CONT. CENTRIFUGATION/WHOLE CELL HARVEST | 1 | 3 | 1 | 5 | | 1 | | 90% | 76% | 100% | 86% |
| 7 | 40 | RESUSPEND CELL PASTE | 1 | 3 | 1 | 5 | | 1 | | 100% | 76% | 95% | 86% |
| 8 | 51 | HEAT EXCHANGE | 1 | 3 | 1 | 5 | | 1 | | 100% | 73% | 95% | 81% |
| 9 | 31 | CELL DISRUPTION/HIGH PRESSURE | 1 | 3 | 1 | 5 | | 1 | | 95% | 72% | 32% | 26% |
| 10 | 51 | HEAT EXCHANGE | 1 | 3 | 1 | 10 | | 1 | | 100% | 72% | 95% | 24% |
| 11 | 40 | RESUSPENSION/SURFACTANT | 1 | 3 | 1 | 10 | | 1 | | 100% | 69% | 95% | 23% |
| 12 | 29 | CONT. CENTRIFUGATION/PRECIPITATE HARVEST | 2 | 2 | 11 | 12 | | 1 | | 95% | 61% | 95% | 22% |
| 13 | 40 | RESUSPENSION/BUFFER | 1 | 2 | 11 | 12 | | 1 | | 85% | 51% | 33% | 7% |
| 14 | 23 | ULTRAFILTRATION/CONCENTRATION/DILUTION | 1 | 1 | | | | 1 | | 85% | 49% | 40% | 3% |
| 15 | 40 | MICROFILTRATION/TANGENTIAL FLOW | 1 | 1 | | | | 1 | | 90% | 45% | 95% | 3% |
| 16 | 36 | PRODUCT ADSORPTION HPLC | 1 | 1 | | | | 1 | | 85% | 39% | 55% | 2% |
| 17 | 31 | PRODUCT ADSORPTION HPLC | 1 | 1 | | | | 1 | | 90% | 35% | 95% | 1% |
| 18 | 39 | ULTRAFILTRATION/FLOW DIALYSIS | 1 | 1 | | | | 1 | | 85% | 32% | 80% | 1% |
| 19 | 39 | PRODUCT ADSORPTION HPLC | 1 | 1 | | | | 1 | | 90% | 30% | 95% | 1% |
| 20 | 37 | ULTRAFILTRATION/FLOW DIALYSIS | 1 | 1 | | | | 1 | | | | | |
| 21 | 39 | PRODUCT ADSORPTION HPLC | 1 | 1 | | | | 1 | | | | | |
| 22 | 37 | MICROFILTRATION/DEAD END | 1 | 1 | | | | 1 | | | | | |
| 23 | 99 | END | | | | | | | | | | | |

FIG. 4
UNIT OPERATIONS LIST

MAMMALIAN CELL CULTURE PROCESS

| UOP SEQ. NO. | CODE | UNIT OPERATION TYPE | CYCLES PER UOp OFFSET (HRS) | BATCH UOp START | BATCH UOp END | BATCH OFFSET (HRS) | PROCESS | PROCESS UOp START | PROCESS UOp END | PROCESS OFFSET (HRS) | RECOVERY PRODUCT SMI | RECOVERY PRODUCT QNT | TOTAL PROTEIN SMI | TOTAL PROTEIN QNT |
|---|---|---|---|---|---|---|---|---|---|---|---|---|---|---|
| 1 | 4 | INITIAL SEEDING | 1 | | | | 1 | | | | | | | |
| 2 | 5 | CULTURE VESSEL SPLIT | 1 | | | | 1 | | | | | | | |
| 3 | 5 | CULTURE VESSEL SPLIT | 1 | | | | 1 | | | | | | | |
| 4 | 5 | CULTURE VESSEL SPLIT | 1 | | | | 1 | | | | | | | |
| 5 | 6 | SPINNER FLASK SPLIT | 1 | | | | 1 | | | | | | | |
| 6 | 54 | SPINNER FLASK SPLIT | 1 | | | | 1 | | | | | | | |
| 7 | 13 | STIRRED TANK REACTOR | 7 | 24 | | | 1 | 0 | 10 | 160 | | | | |
| 8 | 61 | HARVEST/FEED | 1 | | | | 0 | 0 | 10 | 160 | | | | |
| 9 | 62 | HARVEST POOL | 1 | | | | 0 | 0 | 10 | 160 | | | | |
| 10 | 34 | AFFTANGENTIAL FLOW | 1 | | | | 0 | 0 | 10 | 160 | | | | |
| 11 | 36 | UF/CONCENTRATION | 1 | | | | 0 | 0 | 10 | 160 | | | | |
| 12 | 39 | PAC/HPLC | 1 | | | | 0 | 0 | 10 | 160 | | | | |
| 13 | 39 | PAC/HPLC | 1 | | | | 0 | 0 | 10 | 160 | | | | |
| 14 | 36 | UF/CONCENTRATION | 1 | | | | 0 | 0 | 10 | 160 | | | | |
| 15 | 39 | PAC/HPLC | 1 | | | | 0 | 0 | 10 | 160 | | | | |
| 16 | 37 | UF/FLOW DIALYSIS | 1 | | | | 0 | 0 | 10 | 160 | | | | |
| 17 | 39 | PAC/HPLC | 1 | | | | 0 | 0 | 10 | 160 | | | | |
| 18 | 35 | UF/DEAD END | 1 | | | | 0 | 0 | 10 | 160 | | | | |
| 19 | 99 | END | 1 | | | | 0 | 0 | 10 | 160 | | | | |

FIG. 6A

| UNIT OPERATION ID CODE | UNIT OPERATION TYPE | PARAMETERS |
|---|---|---|
| 1 | INOCULUM PREP | # OF FLASKS, VOLUME OF FLASKS, TEMPERATURE, AGITATION, DURATION, FINAL OD |
| 2 | FLASK GROWTH | SCALE UP RATIO, MEDIA VOLUME, TEMPERATURE, AGITATION, DURATION, FINAL OD |
| 3 | FERMENTATION SEED | SCALE UP RATIO, FERMENTOR WORKING VOLUME, ANTIFOAM, BASE, ACID, GROW TEMPERATURE, AGITATION, SPARGE RATE, BACK PRESSURE, TOTAL DURATION |
| 4 | FERMENTATION PRODUCTION | SCALE UP RATIO, FERMENTOR WORKING VOLUME, ANTIFOAM A, ANTIFOAM B, BASE, ACID, GROW TEMPERATURE, AGITATION, SPARGE RATE, BACK PRESSURE, TOTAL DURATION, FINAL OD, DRY CELL MASS, PRODUCT CONCENTRATION, CIP, SIP |
| 5 | HEAT EXCHANGE | PROCESS INITIAL & FINAL TEMP; UTILITY INITIAL & FINAL TEMP; PROCESS SPECIFIC HEAT; DESIGN TYPE, STEP RECOVERY OF PRODUCT, STEP RECOVERY OF T.P., TEMPERATURE REGULATION, CIP, SIP |
| 6 | BATCH CENTRIFUGATION | SYSTEM VOID VOLUME, RCF, TIME, VOLUME REDUCTION, WASH VOLUME, CLEAN, RINSE |
| 7 | RESOLUBILIZATION RESUSPENSION | REAGENT/PRODUCT RATIO, TITRATION SOLUTION, RESOLUBILIZATION, AGITATION, SOLUTION NAME, STEP RECOVERY OF THE PRODUCT, STEP RECOVERY OF T.P., TEMPERATURE REGULATION, CIP, SIP |
| 8 | CELL DISRUPTION HIGH PRESS. HOMOGENIZATION | PRODUCT TEMPERATURE, UTILITY TEMPERATURE, VOID VOLUME, NUMBER OF PASSES, PRESSURE, FLOW RATE, TEMPERATURE INCREASE, WASH, RINSE, STEP RECOVERY OF PRODUCT, STEP RECOVERY OF T.P., TEMPERATURE REGULATION, CIP |
| 9 | DILUTE WITH SURFACTANT | REAGENT PRODUCT RATIO, TITRATION SOLUTION, DILUTION TIME, AGITATION, SOLUTION NAME, STEP RECOVERY OF PRODUCT, STEP RECOVERY OF T.P., TEMPERATURE REGULATION, CIP, SIP |
| 10 | BATCH CENTRIFUGATION PRECIPITATE HARVEST | SYSTEM VOID VOLUME, RCF, TIME, VOLUME REDUCTION, WASH VOLUME, CLEAN, RINSE, STEP RECOVERY OF PRODUCT, STEP RECOVERY OF T.P., TEMPERATURE REGULATION, CIP, SIP |
| 11 | RESUSPEND WITH CHAOTROPE | REAGENT/PRODUCT RATIO, TITRATION SOLUTION, RESOLUBILIZATION, AGITATION, SOLUTION NAME, STEP RECOVERY OF PRODUCT, STEP RECOVERY TO TP, TEMPERATURE REGULATION, CIP, SIP |
| ... | ... | ... |

FIG. 6B

| SOLUTION TYPE | TASKS | TASK DURATION |
|---|---|---|
| S-101 | SETUP, PREINCUBATION, INCUBATION, CLEAN UP | 3, 3, 23, .3, HRS |
| S-101 | SETUP, PREINCUBATION, INCUBATION, CLEAN UP | 1, 1, 23, .3, HRS |
| S-101, 102, 103, 104, 105 | SETUP, PREINCUBATION, FERMENTATION, HARVEST, CIP, SIP, CLEAN UP | 1, 1, 21, .5, 1, 1, 3 HRS |
| S-101, 102, 103, 104, 105 | SETUP, PREINCUBATION, FERMENTATION, CIP, SIP, CLEAN UP | . |
|  | SETUP, TRANSFER, CIP, SIP, CLEAN UP | . |
| S-106 | SETUP, CENTRIFUGATION, WASH, CIP, SIP, CLEANUP | . |
| S-107 | SETUP, DILUTION, AGITATE, CIP, SIP, CLEAN UP | . |
| S-107 | SETUP, LYSIS, CIP, SIP, CLEAN UP | . |
| S-108 | SETUP, DILUTION, AGITATE, CIP, SIP, CLEAN UP | . |
| S-108 | SETUP, CENTRIFUGATION, WASH, CIP, SIP, CLEAN UP | . |
| S-109 | SETUP, FLUSH, PRIME, CONCENTRATION, DILUTION, WASH, FLUSH, STORE, CIP, SIP, CLEANUP | . |
| . | . | . |

SAMPLE APPLICATION OF PROCESS DESIGN CYCLES IN PROCESS SCHEDULING

MICROBIAL FERMENTATION PROCESS (SEE UNIT OPERATION LIST)

|  |  | FIRST PROCESS CYCLE | | SECOND PROCESS CYCLE | |
|---|---|---|---|---|---|
|  | DURATION | WEEK | DAY | WEEK | DAY |

NOTE: NONE OF THE UNIT OPERATIONS IN THIS PROCESS HAVE MORE THAT 1 CYCLE PER UNIT OPERATION
(SEE UNIT OPERATION 8 IN THE MAMMALIAN CELL CULTURE PROCESS FOR AN EXAMPLE OF MULTIPLE CYCLES PER UNIT OPERATION)

UNIT OPERATIONS 1-6 UNDERGO THREE REPETATIVE CYCLES PER BATCH AS A SET BEFORE CONTINUING WITH UNIT OP 7
THIS TRANSLATES TO THREE RUNS ON A FERMENTOR WITH EACH HARVEST (UNIT OP 5 & 6) BEING STORED FOR POOLING AT UNIT OP 7
ASSOCIATED WITH EACH FERMENTOR RUN (UNIT OP 4) ARE THE PREVIOUS STEPS FOR INOCULATION PREP (UNIT OPS 1-3)

1/3 FERMENTATION CYCLES PER BATCH
| # | Operation | Duration | Week | Day | Week | Day |
|---|---|---|---|---|---|---|
| 1 | INOCULUM PREP | 24 HRS | 1 | FRI - SAT | 2 | FRI - SAT |
| 2 | FLASK GROWTH | 24 HRS | 2 | SAT - SUN | 3 | SAT - SUN |
| 3 | SEED FERMENTAION | 24 HRS | 2 | SUN - MON | 3 | SUN - MON |
| 4 | PRODUCTION FERMENTATION | 24 HRS | 2 | MON - TUE | 3 | MON - TUE |
| 5 | HEAT EXCHANGE | 1 HR | 2 | TUE | 3 | TUE |
| 6 | CENTRIFUGATION | 1 HR | 2 | TUE | 3 | TUE |

2/3 FERMENTATION CYCLES PER BATCH
| # | Operation | Duration | Week | Day | Week | Day |
|---|---|---|---|---|---|---|
| 1 | INOCULUM PREP | 24 HRS | 2 | SUN - MON | 3 | SUN - MON |
| 2 | FLASK GROWTH | 24 HRS | 2 | MON - TUE | 3 | MON - TUE |
| 3 | SEED FERMENTAION | 24 HRS | 2 | TUE - WED | 3 | TUE - WED |
| 4 | PRODUCTION FERMENTATION | 24 HRS | 2 | WED - THU | 3 | WED - THU |
| 5 | HEAT EXCHANGE | 1 HR | 2 | THU | 3 | THU |
| 6 | CENTRIFUGATION | 1 HR | 2 | THU | 3 | THU |

3/3 FERMENTATION CYCLES PER BATCH
| # | Operation | Duration | Week | Day | Week | Day |
|---|---|---|---|---|---|---|
| 1 | INOCULUM PREP | 24 HRS | 2 | TUE - WED | 3 | TUE - WED |
| 2 | FLASK GROWTH | 24 HRS | 2 | WED - THU | 3 | WED - THU |
| 3 | SEED FERMENTAION | 24 HRS | 2 | THU - FRI | 3 | THU - FRI |
| 4 | PRODUCTION FERMENTATION | 24 HRS | 2 | FRI - SAT | 3 | FRI - SAT |
| 5 | HEAT EXCHANGE | 1 HR | 2 | SAT | 3 | SAT |
| 6 | CENTRIFUGATION | 1 HR | 2 | SAT | 3 | SAT |

UNIT OPERATION 7 POOLS THE HARVESTS FROM THE THREE FERMENTATION CYCLES ABOVE
| 7 | POOL HARVESTS | 3 HR | 3 | MON | 4 | MON |

UNIT OPERATIONS 8-9 UNDERGO THREE REPETATIVE CYCLES PER BATCH AS SET BEFORE CONTINUING WITH UNIT OPERATION 11
THIS TRANSLATES TO THREE CONSECUTIVE PASSES THROUGH CELL DISRUPTOR (UNIT OP 9) WITH ITS ASSOCIATED HEAT EXCHANGERS
(UNIT OP 8 & 10) AT THE INLET AND THE OUTLET OF THE CELL DISRUPTOR

1/3 DISRUPTION CYCLES PER BATCH
| # | Operation | Duration | Week | Day | Week | Day |
|---|---|---|---|---|---|---|
| 8 | HEAT EXCHANGE |  |  |  |  |  |
| 9 | CELL DISRUPTION |  |  |  |  |  |
| 10 | HEAT EXCHANGE | 0.5 HR | 3 | MON | 4 | MON |

2/3 DISRUPTION CYCLES PER BATCH
| # | Operation | Duration | Week | Day | Week | Day |
|---|---|---|---|---|---|---|
| 8 | HEAT EXCHANGE |  |  |  |  |  |
| 9 | CELL DISRUPTION |  |  |  |  |  |
| 10 | HEAT EXCHANGE | 0.5 HR | 3 | MON | 4 | MON |

3/3 DISRUPTION CYCLES PER BATCH
| # | Operation | Duration | Week | Day | Week | Day |
|---|---|---|---|---|---|---|
| 8 | HEAT EXCHANGE |  |  |  |  |  |
| 9 | CELL DISRUPTION |  |  |  |  |  |
| 10 | HEAT EXCHANGE | 0.5 HR | 3 | MON | 4 | MON |

FIG. 11

SAMPLE APPLICATION OF PROCESS DESIGN CYCLES IN PROCESS SCHEDULING

MICROBIAL FERMENTATION PROCESS (SEE UNIT OPERATION LIST)

|  |  | DURATION | FIRST PROCESS CYCLE | | SECOND PROCESS CYCLE | |
|---|---|---|---|---|---|---|
|  |  |  | WEEK | DAY | WEEK | DAY |

UNIT OPS 11-12 UNDERGO TWO REPETATIVE CYCLES PER BATCH AS A SET BEFORE CONTINUING WITH UNIT OP 13
THIS TRANSLATES TO TWO CYCLES OF RESUSPENDING THE CELL LYSATE FROM THE CELL DISRUPTOR IN A MILD
SURFACTANT AND RECONCENTRATING THE INSOLUBLE PRODUCT TO A PASTE BY CENTRIFUGATION

|  |  | | | | | |
|---|---|---|---|---|---|---|
| 1/2 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |
| 2/3 PRODUCT WASHING CYCLES PER BATCH | | | | | | |
| 11 | RESUSPENSION | 0.5 HR | 3 | MON | 4 | MON |
| 12 | CENTRIFUGATION | 1 HR | 3 | MON | 4 | MON |

UNIT OPS 13-22 UNDERGO ONLY ONE CYCLE PER UNIT OPERATION EACH TO THE END OF THE PROCESS

|  |  | | | | | |
|---|---|---|---|---|---|---|
| 13 | RESUSPENSION | 0.5 HR | 3 | MON | 4 | MON |
| 14 | BUFFER EXCHANGE | 2 HR | 3 | MON | 4 | MON |
| 15 | FILTRATION | 2 HR | 3 | MON | 4 | MON |
| 16 | LIQUID CHROMATOGRAPHY | 16 HRS | 3 | MON - TUE | 4 | MON - TUE |
| 17 | LIQUID CHROMATOGRAPHY | 4 HRS | 3 | TUE | 4 | TUE |
| 18 | BUFFER EXCHANGE | 2 HRS | 3 | TUE | 4 | TUE |
| 19 | LIQUID CHROMATOGRAPHY | 2 HRS | 3 | WED | 4 | WED |
| 20 | BUFFER EXCHANGE | 2 HRS | 3 | WED | 4 | WED |
| 21 | LIQUID CHROMATOGRAPHY | 2 HRS | 3 | WED | 4 | WED |
| 22 | FILTRATION | 2 HRS | 3 | WED | 4 | WED |

FIG. 12A-1

| | PROCESS TIME LINE | | | | | | | | | | | |
|---|---|---|---|---|---|---|---|---|---|---|---|---|
| | DURATION (HRS.) | | | REL. TIME SCALE (HRS) | | | ABS. DAYS | | START | | FINISH | |
| OPERATION | CALC. | A/O | ADJ. | PREP | EXEC. | COMPL. | START | END | DATE | TIME | DATE | TIME | CALCULATIONS |
| 1 | 1 A INOCULUM PREP | | | | | | | | | | | | |
| 2 | | | | | | | | | 06/03/96 | 08:00 AM | | | |
| 3 | SET UP | 3.0 | 0.0 | 3.0 HRS | 12.5 | 15.5 | | 0.49 | 0.52 | 06/03/96 | 09:30 AM | 06/03/96 | 12:30 PM | |
| 4 | PREINCUBATION | 3.0 | 0.0 | 3.0 HRS | 15.5 | | | 0.52 | 0.65 | 06/03/96 | 12:30 PM | 06/03/96 | 03:30 PM | |
| 5 | INCUBATION | 23.0 | 0.0 | 23.0 HRS | | 38.5 | 38.0 | 0.65 | 1.60 | 06/03/96 | 03:30 PM | 06/04/96 | 02:30 PM | |
| 6 | CLEAN UP | 0.3 | 0.0 | 0.3 HRS | | 39.5 | | 1.60 | 1.61 | 06/04/96 | 02:30 PM | 06/04/96 | 02:45 PM | |
| 7 | SUBTOTAL | 29.0 | | 29.0 HRS | | | | | | | | | | |
| 8 | 2 A FLASK GROWTH | | | | | | | | | | | | |
| 9 | | | | | | | | | | | | | |
| 10 | SET UP | 1.0 | 0.0 | 1.0 HRS | 37.5 | | | 1.52 | 1.56 | 06/04/96 | 12:30 PM | 06/04/96 | 01:30 PM | |
| 11 | PREINCUBATION | 1.0 | 0.0 | 1.0 HRS | 38.5 | | | 1.56 | 1.60 | 06/04/96 | 01:30 PM | 06/04/96 | 02:30 PM | |
| 12 | INCUBATION | 23.0 | 0.0 | 23.0 HRS | | 61.5 | 61.0 | 1.60 | 2.56 | 06/04/96 | 02:30 PM | 06/05/96 | 01:30 PM | |
| 13 | CLEAN UP | 0.3 | 0.0 | 0.3 HRS | | 61.5 | | 2.56 | 2.57 | 06/05/96 | 01:30 PM | 06/05/96 | 01:45 PM | |
| 14 | SUBTOTAL | 25.0 | | 25.0 HRS | | | | | | | | | | |
| 15 | 3 A SEED FERMENTATION | | | | | | | | | | | | |
| 16 | | | | | | | | | | | | | |
| 17 | SET UP | 1.0 | 0.0 | 1.0 HRS | 60.5 | | | 2.48 | 2.52 | 06/05/96 | 11:30 AM | 06/05/96 | 12:30 PM | 50.0 L |
| 18 | PREINCUBATION | 1.0 | 0.0 | 1.0 HRS | 61.5 | | | 2.52 | 2.56 | 06/05/96 | 12:30 PM | 06/05/96 | 01:30 PM | |
| 19 | FERMENTATION | 21.0 | 0.0 | 21.0 HRS | | 82.5 | 83.5 | 2.56 | 3.44 | 06/05/96 | 01:30 PM | 06/06/96 | 10:30 AM | 1.7 LPH = 0.50 HRS |
| 20 | HARVEST | 0.5 | 0.0 | 0.5 HRS | | 83.0 | 83.5 | 3.44 | 3.46 | 06/06/96 | 10:30 AM | 06/06/96 | 11:00 AM | |
| 21 | CIP | 1.0 | 0.0 | 1.0 HRS | | | 87.5 | 3.46 | 3.48 | 06/06/96 | 10:15 AM | 06/06/96 | 10:30 AM | |
| 22 | SIP | 1.0 | 0.0 | 1.0 HRS | | | 87.5 | 3.48 | 3.52 | 06/06/96 | 11:30 AM | 06/06/96 | 12:30 PM | |
| 23 | CLEAN UP | 3.0 | 0.0 | 3.0 HRS | | 83.0 | | 3.52 | 3.65 | 06/06/96 | 12:30 PM | 06/06/96 | 03:30 PM | |
| 24 | SUBTOTAL | 28.5 | | 28.5 HRS | | | | | | | | | | |
| 25 | | | | | | | | | | | | | | |

| | OPERATION | PROCESS TIME LINE | | | REL. TIME SCALE (HRS) | | | ABS. DAYS | | START | | FINISH | | CALCULATIONS |
|---|---|---|---|---|---|---|---|---|---|---|---|---|---|---|
| | | DURATION (HRS.) | | | PREP | EXEC. | CMPL. | START | END | DATE | TIME | DATE | TIME | |
| | | CALC. | ADD | ADJ. | | | | | | | | | | |
| 59 | INCUBATION | 23.0 | 0.0 | 23.0 HRS | | 15.5 | | 0.65 | 1.50 | 06/03/95 | 08:00 AM | 06/01/95 | 02:30 PM | |
| 60 | CLEAN UP | 0.3 | 0.0 | 0.3 HRS | | 30.5 | 30.5 | 1.50 | 1.61 | 06/01/95 | 03:30 PM | 06/04/95 | 02:15 PM | |
| | SUBTOTAL | 25.0 | | 25.0 | | 30.5 | | | | | | | | |
| 61 | | | | | | | | | | | | | | |
| 62 | 2.0 FLASK GROWTH | | | | | | | | | | | | | |
| 63 | SET UP | 1.0 | 0.0 | 1.0 HRS | 37.5 | | | 1.52 | 1.56 | 06/01/95 | 12:30 PM | 06/04/95 | 01:30 PM | |
| 64 | PREINCUBATION | 1.0 | 0.0 | 1.0 HRS | 38.5 | | | 1.56 | 1.60 | 06/01/95 | 01:30 PM | 06/04/95 | 02:30 PM | |
| 65 | INCUBATION | 23.0 | 0.0 | 23.0 HRS | | 61.5 | | 1.60 | 2.56 | 06/04/95 | 02:30 PM | 06/05/95 | 01:30 PM | |
| 66 | CLEAN UP | 0.3 | 0.0 | 0.3 HRS | | 61.5 | | 2.56 | 2.57 | 06/05/95 | 01:30 PM | 06/05/95 | 01:45 PM | |
| 67 | SUBTOTAL | 25.0 | | 25.0 | | 61.5 | | | | | | | | |
| 68 | | | | | | | | | | | | | | |
| 69 | 3.0 SEED FERMENTATION | | | | | | | | | | | | | |
| 70 | SET UP | 1.0 | 0.0 | 1.0 HRS | 60.5 | | | 2.40 | 2.52 | 06/05/95 | 11:30 AM | 06/05/95 | 12:30 PM | |
| 71 | PREINCUBATION | 1.0 | 0.0 | 1.0 HRS | 61.5 | | | 2.52 | 2.56 | 06/05/95 | 12:30 PM | 06/05/95 | 01:30 PM | |
| 72 | FERMENTATION | 21.0 | 0.0 | 21.0 HRS | | 82.5 | 83.5 | 2.56 | 3.41 | 06/05/95 | 01:30 PM | 06/06/95 | 10:30 AM | |
| 73 | HARVEST | 0.5 | 0.0 | 0.5 HRS | | 83.0 | 83.5 | 3.41 | 3.46 | 06/06/95 | 10:30 AM | 06/06/95 | 11:00 AM | |
| 74 | CIP | 1.0 | 0.0 | 1.0 HRS | | | 84.5 | 3.46 | 3.48 | 06/06/95 | 11:00 AM | 06/06/95 | 11:30 AM | 50.0 L  1.7 LPH = 0.50 HRS |
| 75 | SIP | 1.0 | 0.0 | 1.0 HRS | | | 85.5 | 3.48 | 3.52 | 06/06/95 | 11:30 AM | 06/06/95 | 12:30 PM | |
| 76 | CLEAN UP | 3.0 | 0.0 | 3.0 HRS | | | 87.5 | 3.52 | 3.65 | 06/06/95 | 12:30 PM | 06/06/95 | 03:30 PM | |
| 77 | SUBTOTAL | 28.5 | | 28.5 | | | | | | | | | | |
| 78 | | | | | | | | | | | | | | |
| 79 | 4.0 PRODUCTION FERMENTATION | | | | | | | | | | | | | |
| 80 | SET UP | 1.0 | 0.0 | 1.0 HRS | 82.0 | | | 3.38 | 3.42 | 06/06/95 | 09:00 AM | 06/06/95 | 10:00 AM | |
| 81 | PREINCUBATION | 1.0 | 0.0 | 1.0 HRS | 83.0 | | | 3.42 | 3.46 | 06/06/95 | 10:00 AM | 06/06/95 | 11:00 AM | |
| 82 | FERMENTATION | 21.0 | 0.0 | 21.0 HRS | | 104.0 | | 3.46 | 4.33 | 06/06/95 | 11:00 AM | 06/07/95 | 08:00 AM | |

FIG. 12B-2

| | | | | | | | | | | | |
|---|---|---|---|---|---|---|---|---|---|---|---|
| 85 | CIP | 1.0 | 0.0 | 1.0 HRS | | 105.0 | 4.39 | 4.39 | 06/07/96 | 08:00 AM | 06/07/96 | 09:00 AM | | |
| 86 | SIP | 1.0 | 0.0 | 1.0 HRS | | 106.0 | 4.20 | 4.20 | 06/07/96 | 09:00 AM | 06/07/96 | 10:00 AM | | |
| 87 | CLEAN UP | 2.0 | 0.0 | 2.0 HRS | | 108.0 | 4.42 | 4.50 | 06/07/96 | 10:00 AM | 06/07/96 | 12:00 PM | | |
| 88 | SUBTOTAL | 27.0 | | 27.0 HRS | 104.0 | | | | | | | | | |
| 89 | | | | | | | | | | | | | | |
| 90 | 5 D HEAT EXCHANGE | | | | | | | | | | | | | |
| 91 | SET UP | 0.50 | 0.0 | 0.5 HRS | 104.5 | | 4.35 | 4.38 | 06/07/96 | 08:00 AM | 06/07/96 | 08:30 AM | | |
| 92 | TRANSFER | 1.00 | 0.0 | 1.0 HRS | | 106.0 | 4.38 | 4.38 | 06/07/96 | 08:00 AM | 06/07/96 | 09:00 AM | 562.1 LB | 9.4 LPM - 1.00 HRS |
| 93 | CIP | 1.0 | 0.0 | 1.0 HRS | | 107.0 | 4.42 | 4.42 | 06/07/96 | 09:00 AM | 06/07/96 | 10:00 AM | | |
| 94 | SIP | 1.0 | 0.0 | 1.0 HRS | | 109.0 | 4.46 | 4.46 | 06/07/96 | 10:00 AM | 06/07/96 | 11:00 AM | | |
| 95 | CLEAN UP | 2.0 | 0.0 | 2.0 HRS | | | 4.51 | 4.51 | 06/07/96 | 11:00 AM | 06/07/96 | 01:00 PM | | |
| 96 | | | | | | | | | | | | | | |
| 97 | SUBTOTAL | 5.0 | | 5.0 HRS | 105.0 | | | | | | | | | |
| 98 | | | | | | | | | | | | | | |
| 99 | 6 D CONT. CENT./SOLIDS | | | | | | | | | | | | | |
| 100 | SET UP | 1.00 | 0.0 | 1.0 HRS | 105.0 | | 4.38 | 4.38 | 06/07/96 | 08:00 AM | 06/07/96 | 09:00 AM | | |
| 101 | CENTRIFUGATION | 1.00 | 0.0 | 1.0 HRS | | 106.1 | 4.38 | 4.38 | 06/07/96 | 09:00 AM | 06/07/96 | 10:00 AM | 562.1 LB | 9.4 LPM - 1.00 HRS |
| 102 | WASH | 0.10 | 0.0 | 0.1 HRS | | | 4.42 | 4.42 | 06/07/96 | 10:00 AM | 06/07/96 | 10:06 AM | 1.0 LB | 0.2 LPM - 0.10 HRS |
| 103 | CIP | 0.25 | 0.0 | 0.3 HRS | | | 4.43 | 4.43 | 06/07/96 | 10:06 AM | 06/07/96 | 10:21 AM | 20.0 LB | 1.3 LPM - 0.25 HRS |
| 104 | SIP | 1.00 | 0.0 | 1.0 HRS | | | 4.47 | 4.47 | 06/07/96 | 10:21 AM | 06/07/96 | 11:21 AM | | |
| 105 | CLEAN UP | 0.50 | 0.0 | 0.5 HRS | | | 4.49 | 4.49 | 06/07/96 | 11:21 AM | 06/07/96 | 11:51 AM | | |
| 106 | | | | | | | | | | | | | | |
| 107 | SUBTOTAL | 3.85 | | 3.85 HRS | 106.1 | | | | | | | | | |
| 108 | | | | | | | | | | | | | | |
| 109 | 1 C INOCULUM PREP | | | | | | | | | | | | | |
| 110 | SET UP | 1.0 | 0.0 | 1.0 HRS | 14.5 | | 0.50 | 0.50 | 06/03/96 | 03:30 PM | 06/03/96 | 03:30 PM | | |
| 111 | PREINCUBATION | 1.0 | 0.0 | 1.0 HRS | 15.5 | 38.0 | 0.50 | 0.50 | 06/03/96 | 03:30 PM | 06/03/96 | 02:30 PM | | |
| 112 | INCUBATION | 23.0 | 0.0 | 23.0 HRS | | | 1.00 | 1.00 | 06/03/96 | 02:30 PM | 06/04/96 | 02:30 PM | | |
| 113 | CLEAN UP | 0.3 | 0.0 | 0.3 HRS | | | 1.51 | 1.51 | 06/04/96 | 02:30 PM | 06/04/96 | 02:45 PM | | |
| 114 | | | | | | | | | | | | | | |
| 115 | SUBTOTAL | 25.0 | | 25.0 HRS | 38.5 | 38.5 | | | | | | | | |

FIG. 12C-1

| | OPERATION | PROCESS TIME LINE | | | REL. TIME SCALE (DAYS) | | | ABS. DAYS | | START | | FINISH | | CALCULATIONS |
|---|---|---|---|---|---|---|---|---|---|---|---|---|---|---|
| | | DURATION (HRS.) | | | STEP | EXEC. | COMPL. | START | END | DATE | TIME | DATE | TIME | |
| | | CALC. | A/D | ADJ. | | | | | | | | | | |
| 116 | 2 L FLASK GROWTH | | | | | | | | | 05/03/96 | 08:00 AM | | | |
| 117 | | | | | | | | | | | | | | |
| 118 | SET UP | 1.0 | 0.0 | 1.0 HRS | | | | 1.52 | 1.56 | 06/04/96 | 12:30 PM | 06/04/96 | 01:30 PM | |
| 119 | PREINCUBATION | 1.0 | 0.0 | 1.0 HRS | 37.5 | | | 1.56 | 1.60 | 06/04/96 | 01:30 PM | 06/04/96 | 02:30 PM | |
| 120 | INCUBATION | 23.0 | 0.0 | 23.0 HRS | 38.5 | 61.5 | | 1.60 | 2.56 | 06/04/96 | 02:30 PM | 06/05/96 | 01:30 PM | |
| 121 | CLEAN UP | 0.3 | 0.0 | 0.3 HRS | | | 61.8 | 2.56 | 2.57 | 06/05/96 | 01:30 PM | 06/05/96 | 01:45 PM | |
| 122 | SUBTOTAL | 25.0 | | 25.0 HRS | | 61.5 | | | | | | | | |
| 123 | 3-L SEED FERMENTATION | | | | | | | | | | | | | |
| 124 | SET UP | 1.0 | 0.0 | 1.0 HRS | 60.5 | | | 2.48 | 2.52 | 06/05/96 | 11:30 AM | 06/05/96 | 12:30 PM | |
| 125 | PREINCUBATION | 1.0 | 0.0 | 1.0 HRS | 61.5 | | | 2.52 | 2.56 | 06/05/96 | 12:30 PM | 06/05/96 | 01:30 PM | |
| 126 | FERMENTATION | 21.0 | 0.0 | 21.0 HRS | | 82.5 | 83.5 | 2.56 | 3.41 | 06/05/96 | 01:30 PM | 06/06/96 | 10:30 AM | |
| 127 | HARVEST | 0.5 | 0.0 | 0.5 HRS | | 83.0 | 84.5 | 3.41 | 3.44 | 06/06/96 | 10:30 AM | 06/06/96 | 11:00 AM | |
| 128 | CIP | 1.0 | 0.0 | 1.0 HRS | | | 87.5 | 3.44 | 3.48 | 06/06/96 | 10:30 AM | 06/06/96 | 11:30 AM | |
| 129 | SIP | 1.0 | 0.0 | 1.0 HRS | | | | 3.48 | 3.52 | 06/06/96 | 11:30 AM | 06/06/96 | 12:30 PM | |
| 130 | CLEAN UP | 3.0 | 0.0 | 3.0 HRS | | | | 3.52 | 3.65 | 06/06/96 | 12:30 PM | 06/06/96 | 03:30 PM | |
| 131 | SUBTOTAL | 28.5 | | 28.5 HRS | | 83.0 | | | | | | | | |
| 132 | 4 L PRODUCTION FERMENTATION | | | | | | | | | | | | | |
| 133 | | | | | | | | | | | | | | |
| 134 | SET UP | 1.0 | 0.0 | 1.0 HRS | 82.0 | | | 3.38 | 3.42 | 06/06/96 | 09:00 AM | 06/06/96 | 10:00 AM | SD.0 L   1.7 L/TH   0.50 IHS |
| 135 | PREINCUBATION | 1.0 | 0.0 | 1.0 HRS | 83.0 | | | 3.42 | 3.46 | 06/06/96 | 10:00 AM | 06/06/96 | 11:00 AM | |
| 136 | FERMENTATION | 21.0 | 0.0 | 21.0 HRS | | 101.0 | 105.0 | 3.46 | 4.33 | 06/06/96 | 11:00 AM | 06/07/96 | 08:00 AM | |
| 137 | CIP | 1.0 | 0.0 | 1.0 HRS | | | 106.0 | 4.33 | 4.38 | 06/07/96 | 08:00 AM | 06/07/96 | 09:00 AM | |
| 138 | SIP | 1.0 | 0.0 | 1.0 HRS | | | | 4.38 | 4.42 | 06/07/96 | 09:00 AM | 06/07/96 | 10:00 AM | |
| 139 | CLEAN UP | 2.0 | 0.0 | 2.0 HRS | | | 108.0 | 4.42 | 4.50 | 06/07/96 | 10:00 AM | 06/07/96 | 12:00 PM | |
| 140 | SUBTOTAL | 27.0 | | 27.0 HRS | | 101.0 | | | | | | | | |

FIG. 12C-2

| | | | | | | | | | | | |
|---|---|---|---|---|---|---|---|---|---|---|---|
| 143 | 5 C HEAT EXCHANGE | | | | | | | | | | |
| 144 | | | | | | | | | | | |
| 145 | SET UP | 0.50 | 0.0 | 0.5 HRS | 104.5 | | 4.33 | 4.35 | 06/07/96 | 08:00 AM | 06/07/96 08:30 AM | |
| 146 | TRANSFER | 1.00 | 0.0 | 1.0 HRS | | 105.0 | 4.33 | 4.38 | 06/07/96 | 08:30 AM | 06/07/96 09:00 AM | 562.1 LB  9.4 LPM  1.00 HRS |
| 147 | CIP | 1.0 | 0.0 | 1.0 HRS | | 106.0 | 4.38 | 4.42 | 06/07/96 | 09:00 AM | 06/07/96 10:00 AM | |
| 148 | SIP | 1.0 | 0.0 | 1.0 HRS | | 107.0 | 4.42 | 4.46 | 06/07/96 | 10:00 AM | 06/07/96 11:00 AM | |
| 149 | CLEAN UP | 2.0 | 0.0 | 2.0 HRS | | 108.0 | 4.46 | 4.54 | 06/07/96 | 11:00 AM | 06/07/96 01:00 PM | |
| 150 | | | | | | | | | | | | |
| 151 | SUBTOTAL | 5.0 | | 5.0 HRS | | | | | | | | |
| 152 | | | | | | | | | | | | |
| 153 | 6 G CONT. CENT./SOLIDS | | | | | | | | | | |
| 154 | | | | | | | | | | | | |
| 155 | SET UP | 1.00 | 0.0 | 1.0 HRS | 105.0 | | 4.33 | 4.35 | 06/07/96 | 08:00 AM | 06/07/96 09:00 AM | |
| 156 | CENTRIFUGATION | 1.00 | 0.0 | 1.0 HRS | | 106.0 | 4.38 | 4.42 | 06/07/96 | 09:00 AM | 06/07/96 10:00 AM | 562.1 LB  9.4 LPM  1.00 HRS |
| 157 | WASH | 0.10 | 0.0 | 0.1 HRS | | 106.1 | 4.42 | 4.42 | 06/07/96 | 10:00 AM | 06/07/96 10:06 AM | 1.0 LB  0.2 LPM  0.10 HRS |
| 158 | CIP | 0.25 | 0.0 | 0.25 HRS | | 106.4 | 4.42 | 4.43 | 06/07/96 | 10:06 AM | 06/07/96 10:21 AM | 20.0 LB  1.3 LPM  0.25 HRS |
| 159 | SIP | 1.00 | 0.0 | 1.0 HRS | | 107.4 | 4.43 | 4.47 | 06/07/96 | 10:21 AM | 06/07/96 11:21 AM | |
| 160 | CLEAN UP | 0.50 | 0.0 | 0.5 HRS | | 107.9 | 4.47 | 4.49 | 06/07/96 | 11:21 AM | 06/07/96 11:51 AM | |
| 161 | | | | | | | | | | | | |
| 162 | SUBTOTAL | 3.85 | | 3.85 HRS | | | | | | | | |
| 163 | | | | | | | | | | | | |
| 164 | 7 A RESOLUBILIZATION | | | | | | | | | | |
| 165 | | | | | | | | | | | | |
| 166 | SET UP | 1.00 | 0.0 | 1.0 HRS | 106.1 | | 4.38 | 4.42 | 06/07/96 | 09:06 AM | 06/07/96 10:06 AM | |
| 167 | DILUTION | 0.50 | 0.0 | 0.5 HRS | | 106.6 | 4.42 | 4.44 | 06/07/96 | 10:06 AM | 06/07/96 10:36 AM | 46.7 LB  1.6 LPM  0.50 HRS |
| 168 | AGITATE | 1.00 | 0.0 | 1.0 HRS | | 107.6 | 4.44 | 4.49 | 06/07/96 | 10:36 AM | 06/07/96 11:36 AM | |
| 169 | CIP | 1.00 | 0.0 | 1.0 HRS | | 108.6 | 4.49 | 4.53 | 06/07/96 | 11:36 AM | 06/07/96 12:36 PM | |
| 170 | SIP | 1.00 | 0.0 | 1.0 HRS | | 109.6 | 4.53 | 4.57 | 06/07/96 | 12:36 PM | 06/07/96 01:36 PM | |
| 171 | CLEAN UP | 1.00 | 0.0 | 1.0 HRS | | 110.6 | 4.57 | 4.61 | 06/07/96 | 01:36 PM | 06/07/96 02:36 PM | |
| 172 | | | | | | | | | | | | |
| 173 | SUBTOTAL | 5.50 | | 5.50 HRS | | 107.6 | | | | | | |
| 174 | 8 A HEAT EXCHANGE | | | | | | | | | | |

FIG. 12D-1

| | OPERATION | PROCESS TIME LINE | | | REL. TIME SCALE (HRS) | | | AVG. DAYS | | START | | FINISH | | CALCULATIONS |
|---|---|---|---|---|---|---|---|---|---|---|---|---|---|---|
| | | DURATION (HRS.) | | | PREP | EXEC. | COMPL. | START | END | DATE | TIME | DATE | TIME | |
| | | CALC. | AVG | ADJ. | | | | | | | | | | |
| 175 | SET UP | 0.50 | 0.0 | 0.5 HRS | 107.6 | | | 4.46 | 4.48 | 06/03/96 | 08:00 AM | | | |
| 176 | TRANSFER | 0.30 | 0.0 | 0.3 HRS | | 107.9 | | 4.48 | 4.50 | 06/07/96 | 11:06 AM | 06/07/96 | 11:36 AM | 66.5 L @ 3.7 LPH = 0.30 HRS |
| 177 | CIP | 0.0 | 0.0 | 0.0 HRS | | | 107.9 | 4.50 | 4.50 | 06/07/96 | 11:36 AM | 06/07/96 | 11:51 AM | |
| 178 | SIP | 0.0 | 0.0 | 0.0 HRS | | | 107.9 | 4.50 | 4.50 | 06/07/96 | 11:51 AM | 06/07/96 | 11:51 AM | |
| 179 | CLEAN UP | 0.0 | 0.0 | 0.0 HRS | | | 107.9 | 4.50 | 4.50 | 06/07/96 | 11:51 AM | 06/07/96 | 11:51 AM | |
| 180 | SUBTOTAL | 0.8 | | 0.8 HRS | | 107.9 | | | | | | | | |
| 181 | | | | | | | | | | | | | | |
| 182 | 9 A HOMOGENIZATION | | | | | | | | | | | | | |
| 183 | SET UP | 0.25 | 0.0 | 0.3 HRS | 107.9 | | | 4.49 | 4.50 | 06/07/96 | 11:39 AM | 06/07/96 | 11:54 AM | |
| 184 | LYSIS | 0.68 | 0.0 | 0.7 HRS | | 108.6 | | 4.50 | 4.52 | 06/07/96 | 11:54 AM | 06/07/96 | 12:34 PM | 66.5 L @ 1.6 LPH = 0.68 HRS |
| 185 | CIP | 0.0 | 0.0 | 0.0 HRS | | | 108.6 | 4.52 | 4.52 | 06/07/96 | 12:34 PM | 06/07/96 | 12:34 PM | |
| 186 | SIP | 0.0 | 0.0 | 0.0 HRS | | | 108.6 | 4.52 | 4.52 | 06/07/96 | 12:34 PM | 06/07/96 | 12:34 PM | |
| 187 | CLEAN UP | 0.0 | 0.0 | 0.0 HRS | | | 108.6 | 4.52 | 4.52 | 06/07/96 | 12:34 PM | 06/07/96 | 12:34 PM | |
| 188 | SUBTOTAL | 0.9 | | 0.9 HRS | | 108.6 | | | | | | | | |
| 189 | | | | | | | | | | | | | | |
| 190 | 10 A HEAT EXCHANGE | | | | | | | | | | | | | |
| 191 | SET UP | 0.50 | 0.0 | 0.5 HRS | 108.6 | | | 4.50 | 4.52 | 06/07/96 | 12:04 PM | 06/07/96 | 12:34 PM | |
| 192 | TRANSFER | 0.30 | 0.0 | 0.3 HRS | | 108.9 | | 4.52 | 4.52 | 06/07/96 | 12:34 PM | 06/07/96 | 12:52 PM | 69.0 L @ 3.0 LPH = 0.30 HRS |
| 193 | CIP | 0.0 | 0.0 | 0.0 HRS | | | 108.9 | 4.52 | 4.52 | 06/07/96 | 12:52 PM | 06/07/96 | 12:52 PM | |
| 194 | SIP | 0.0 | 0.0 | 0.0 HRS | | | 108.9 | 4.52 | 4.52 | 06/07/96 | 12:52 PM | 06/07/96 | 12:52 PM | |
| 195 | CLEAN UP | 0.0 | 0.0 | 0.0 HRS | | | 108.9 | 4.52 | 4.52 | 06/07/96 | 12:52 PM | 06/07/96 | 12:52 PM | |
| 196 | SUBTOTAL | 0.8 | | 0.8 HRS | | 108.9 | | | | | | | | |
| 197 | | | | | | | | | | | | | | |
| 198 | 8 B HEAT EXCHANGE | | | | | | | | | | | | | |
| 199 | SET UP | 0.00 | 0.0 | 0.0 HRS | 108.9 | | | 4.51 | 4.51 | 06/07/96 | 12:52 PM | 06/07/96 | 12:52 PM | |

FIG. 12D-2

| | | | | | | | | | | | | |
|---|---|---|---|---|---|---|---|---|---|---|---|---|
| 203 | TRANSFER | 0.30 | 0.0 | 0.3 HRS | | 109.2 | 4.51 | 4.55 | 06/07/96 | 12:52 PM | 06/07/96 | 01:10 PM | 66.5 LB | 3.7 LPM | 0.30 HRS |
| 204 | CIP | 0.00 | 0.0 | 0.0 HRS | | | 4.55 | 4.55 | 06/07/96 | 01:10 PM | 06/07/96 | 01:10 PM | | | |
| 205 | SIP | 0.00 | 0.0 | 0.0 HRS | | | 4.55 | 4.55 | 06/07/96 | 01:10 PM | 06/07/96 | 01:10 PM | | | |
| 206 | CLEAN UP | 0.00 | 0.0 | 0.0 HRS | | | 4.55 | 4.55 | 06/07/96 | 01:10 PM | 06/07/96 | 01:10 PM | | | |
| 207 | SUBTOTAL | 0.3 | 0.0 | 0.3 HRS | 109.2 | | | | | | | | | | |
| 208 | 9 B HOMOGENIZATION | | | | | | | | | | | | | | |
| 209 | SET UP | 0.00 | 0.0 | 0.0 HRS | | 109.9 | 1.55 | 1.55 | 06/07/96 | 01:10 PM | 06/07/96 | 01:10 PM | | | |
| 210 | LYSIS | 0.69 | 0.0 | 0.7 HRS | | | 1.55 | 1.55 | 06/07/96 | 01:10 PM | 06/07/96 | 01:51 PM | 66.5 LB | 1.6 LPM | 0.60 HRS |
| 211 | CIP | 0.00 | 0.0 | 0.0 HRS | | | 1.55 | 4.58 | 06/07/96 | 01:51 PM | 06/07/96 | 01:51 PM | | | |
| 212 | SIP | 0.00 | 0.0 | 0.0 HRS | | | 4.58 | 4.58 | 06/07/96 | 01:51 PM | 06/07/96 | 01:51 PM | | | |
| 213 | CLEAN UP | 0.00 | 0.0 | 0.0 HRS | | | 4.58 | 4.58 | 06/07/96 | 01:51 PM | 06/07/96 | 01:51 PM | | | |
| 214 | SUBTOTAL | 0.7 | 0.0 | 0.7 HRS | 109.9 | | | | | | | | | | |
| 215 | 10 B HEAT EXCHANGE | | | | | | | | | | | | | | |
| 216 | SET UP | 0.50 | 0.0 | 0.5 HRS | | 110.2 | 1.58 | 1.50 | 06/07/96 | 01:21 PM | 06/07/96 | 01:51 PM | | | |
| 217 | TRANSFER | 0.30 | 0.0 | 0.3 HRS | | | 4.58 | 4.58 | 06/07/96 | 01:51 PM | 06/07/96 | 02:09 PM | 69.0 LB | 3.8 LPM | 0.30 HRS |
| 218 | CIP | 0.00 | 0.0 | 0.0 HRS | | | 4.58 | 4.58 | 06/07/96 | 02:09 PM | 06/07/96 | 02:09 PM | | | |
| 219 | SIP | 0.00 | 0.0 | 0.0 HRS | | | 4.58 | 4.58 | 06/07/96 | 02:09 PM | 06/07/96 | 02:09 PM | | | |
| 220 | CLEAN UP | 0.00 | 0.0 | 0.0 HRS | | | 4.58 | 4.58 | 06/07/96 | 02:09 PM | 06/07/96 | 02:09 PM | | | |
| 221 | SUBTOTAL | 0.8 | 0.0 | 0.8 HRS | 110.2 | | | | | | | | | | |
| 222 | 8 C HEAT EXCHANGE | | | | | | | | | | | | | | |
| 223 | SET UP | 0.00 | 0.0 | 0.0 HRS | | 111.5 | 4.59 | 4.59 | 06/07/96 | 02:09 PM | 06/07/96 | 02:09 PM | | | |
| 224 | TRANSFER | 0.30 | 0.0 | 0.3 HRS | | 112.5 | 4.59 | 4.60 | 06/07/96 | 02:09 PM | 06/07/96 | 02:27 PM | 66.5 LB | 3.7 LPM | 0.30 HRS |
| 225 | CIP | 1.00 | 0.0 | 1.0 HRS | | 113.5 | 4.60 | 4.61 | 06/07/96 | 02:27 PM | 06/07/96 | 03:27 PM | | | |
| 226 | SIP | 1.00 | 0.0 | 1.0 HRS | | | 4.61 | 4.69 | 06/07/96 | 03:27 PM | 06/07/96 | 04:27 PM | | | |
| 227 | CLEAN UP | 1.00 | 0.0 | 1.0 HRS | | | 4.69 | 4.73 | 06/07/96 | 04:27 PM | 06/07/96 | 05:27 PM | | | |
| 228 | SUBTOTAL | 3.3 | 0.0 | 3.3 HRS | 110.5 | | | | | | | | | | |

FIG. 12E-1

| | PROCESS TIME LINE | | | REL. TIME SCALE (HRS) | | | AUS_DAYS | | START | | FINISH | | CALCULATIONS |
|---|---|---|---|---|---|---|---|---|---|---|---|---|---|
| OPERATION | DURATION (HRS.) | | | PREP | EXEC. | COMPL. | START | END | DATE | TIME | DATE | TIME | |
| | CALC. | A/D | ADJ. | | | | | | | | | | |
| 9 C HOMOGENIZATION | | | | | 15.5 | | | | 06/03/96 | 00:00 AM | | | |
| SET UP | 0.02 | 0.0 | 0.0 HRS | | | | 4.60 | 4.60 | 06/07/96 | 02:27 PM | 06/07/96 | 02:27 PM | |
| LYSIS | 0.69 | 0.0 | 0.7 HRS | 110.5 | | | 4.60 | 4.63 | 06/07/96 | 02:27 PM | 06/07/96 | 03:07 PM | 66.5 LJ / 1.6 LPM = 0.60 HRS |
| CIP | 1.0 | 0.0 | 1.0 HRS | | 111.1 | 112.1 | 4.63 | 4.67 | 06/07/96 | 03:07 PM | 06/07/96 | 04:07 PM | |
| SIP | 1.0 | 0.0 | 1.0 HRS | | | 113.1 | 4.67 | 4.71 | 06/07/96 | 04:07 PM | 06/07/96 | 05:07 PM | |
| CLEAN UP | 1.0 | 0.0 | 1.0 HRS | | | 114.1 | 4.71 | 4.75 | 06/07/96 | 05:07 PM | 06/07/96 | 06:07 PM | |
| SUBTOTAL | 3.7 | | 3.7 HRS | | | | | | | | | | |
| 10 C HEAT EXCHANGE | | | | | 111.1 | | | | | | | | |
| SET UP | 0.00 | 0.0 | 0.0 HRS | | | | 4.63 | 4.63 | 06/07/96 | 03:07 PM | 06/07/96 | 03:07 PM | |
| TRANSFER | 0.30 | 0.0 | 0.3 HRS | 111.1 | | | 4.63 | 4.64 | 06/07/96 | 03:07 PM | 06/07/96 | 03:25 PM | 69.0 LJ / 3.8 LPM = 0.30 HRS |
| CIP | 1.0 | 0.0 | 1.0 HRS | | 111.4 | 112.4 | 4.64 | 4.68 | 06/07/96 | 03:25 PM | 06/07/96 | 04:25 PM | |
| SIP | 1.0 | 0.0 | 1.0 HRS | | | 113.4 | 4.68 | 4.72 | 06/07/96 | 04:25 PM | 06/07/96 | 05:25 PM | |
| CLEAN UP | 1.0 | 0.0 | 1.0 HRS | | | 114.4 | 4.72 | 4.77 | 06/07/96 | 05:25 PM | 06/07/96 | 06:25 PM | |
| SUBTOTAL | 3.3 | | 3.3 HRS | | | | | | | | | | |
| 11 A RESOLUBILIZATION | | | | | 109.9 | | | | | | | | |
| SET UP | 1.00 | 0.0 | 1.0 HRS | 109.9 | | | 4.49 | 4.53 | 06/06/96 | 11:52 AM | 06/07/96 | 12:52 PM | |
| DILUTION | 0.50 | 0.0 | 0.5 HRS | | 109.4 | 109.9 | 4.53 | 4.55 | 06/06/96 | 12:52 PM | 06/07/96 | 01:22 PM | 206.9 LJ / 6.9 LPM = 0.50 HRS |
| AGITATE | 0.50 | 0.0 | 0.5 HRS | | 109.9 | 109.9 | 4.55 | 4.58 | 06/07/96 | 01:22 PM | 06/07/96 | 01:52 PM | 0.50 HRS |
| CIP | 0.0 | 0.0 | 0.0 HRS | | | | 4.58 | 4.58 | 06/07/96 | 01:52 PM | 06/07/96 | 01:52 PM | |
| SIP | 0.0 | 0.0 | 0.0 HRS | | | | 4.58 | 4.58 | 06/07/96 | 01:52 PM | 06/07/96 | 01:52 PM | |
| CLEAN UP | 0.0 | 0.0 | 0.0 HRS | | | | 4.58 | 4.58 | 06/07/96 | 01:52 PM | 06/07/96 | 01:52 PM | |
| SUBTOTAL | 2.0 | | 2.0 HRS | | 109.9 | | | | | | | | |

FIG. 12E-2

| | | | | | | | | | | | | |
|---|---|---|---|---|---|---|---|---|---|---|---|---|
| 263 | 12 A CONT. CENT/SOLIDS | | | | | | | | | | | |
| 264 | | | | | | | | | | | | |
| 265 | SET UP | 1.0 | 0.0 | 1.0 HRS | | | | | | | | |
| 266 | CENTRIFUGATION | 0.5 | 0.0 | 0.5 HRS | 109.9 | 110.4 | 110.5 | 4.51 | 4.59 | 06/07/96 | 12:52 PM | 06/07/96 01:52 PM | 275.9 LB | 9.2 LPH | 0.50 HRS |
| 267 | WASH | 0.1 | 0.0 | 0.1 HRS | | | | 4.58 | 4.60 | 06/07/96 | 01:52 PM | 06/07/96 02:22 PM | 3.0 LB | 0.5 LPH | 0.10 HRS |
| 268 | CIP | 0.0 | 0.0 | 0.0 HRS | | | | 4.60 | 4.60 | 06/07/96 | 02:22 PM | 06/07/96 02:28 PM | 8.0 LB | 0.5 LPH | 0.25 HRS |
| 269 | SIP | 0.0 | 0.0 | 0.0 HRS | | | | 4.60 | 4.60 | 06/07/96 | 02:28 PM | 06/07/96 02:28 PM | | " | " |
| 270 | | 0.0 | 0.0 | 0.0 HRS | | | | 4.60 | 4.60 | 06/07/96 | 02:28 PM | 06/07/96 02:28 PM | | " | " |
| 271 | CLEAN UP | 0.0 | 0.0 | 0.0 HRS | | | 110.5 | 4.60 | 4.60 | 06/07/96 | 02:28 PM | 06/07/96 02:28 PM | | | |
| 272 | SUBTOTAL | 1.6 | | 1.6 HRS | | 110.5 | | | | | | | | | |
| 273 | | | | | | | | | | | | | | | |
| 274 | 11 B RESOLUBILIZATION | | | | | | | | | | | | | | |
| 275 | SET UP | 0.0 | 0.0 | 0.0 HRS | 110.5 | 111.0 | 112.2 | 4.60 | 4.60 | 06/07/96 | 02:28 PM | 06/07/96 02:28 PM | | | |
| 276 | DILUTION | 0.5 | 0.0 | 0.5 HRS | | | 113.2 | 4.60 | 4.62 | 06/07/96 | 02:28 PM | 06/07/96 02:58 PM | | | |
| 277 | CENTRIFUGATION | 0.3 | 0.0 | 0.3 HRS | | 111.2 | 115.2 | 4.62 | 4.63 | 06/07/96 | 02:58 PM | 06/07/96 03:13 PM | 206.9 LB | 6.9 LPH | 0.50 HRS |
| 278 | AGITATE | 1.0 | 0.0 | 1.0 HRS | | | | 4.63 | 4.69 | 06/07/96 | 03:13 PM | 06/07/96 04:13 PM | | | |
| 279 | CIP | 1.0 | 0.0 | 1.0 HRS | | | | 4.69 | 4.72 | 06/07/96 | 04:13 PM | 06/07/96 05:13 PM | | | |
| 280 | SIP | 1.0 | 0.0 | 1.0 HRS | | | | 4.72 | 4.76 | 06/07/96 | 05:13 PM | 06/07/96 06:13 PM | | | |
| 281 | CLEAN UP | 0.5 | 0.0 | 0.5 HRS | | | | | | | | | | 0.50 HRS |
| 282 | SUBTOTAL | 3.8 | | 3.8 HRS | | 111.2 | | | | | | | | | |
| 283 | | | | | | | | | | | | | | | |
| 284 | 12 B CONT. CENT/SOLIDS | | | | | | | | | | | | | | |
| 285 | SET UP | 1.0 | 0.0 | 1.0 HRS | 111.2 | 111.7 | 112.1 | 4.59 | 4.63 | 06/07/96 | 02:13 PM | 06/07/96 03:13 PM | | | |
| 286 | CENTRIFUGATION | 0.5 | 0.0 | 0.5 HRS | | 111.0 | 113.1 | 4.63 | 4.66 | 06/07/96 | 03:13 PM | 06/07/96 03:43 PM | 275.9 LB | 9.2 LPH | 0.50 HRS |
| 287 | WASH | 0.1 | 0.0 | 0.1 HRS | | | 113.6 | 4.66 | 4.66 | 06/07/96 | 03:43 PM | 06/07/96 03:49 PM | 3.0 LB | 0.5 LPH | 0.10 HRS |
| 288 | CIP | 0.3 | 0.0 | 0.3 HRS | | | | 4.66 | 4.67 | 06/07/96 | 03:49 PM | 06/07/96 04:04 PM | 8.0 LB | 0.5 LPH | 0.25 HRS |
| 289 | SIP | 1.0 | 1.0 | 1.0 HRS | | | | 4.67 | 4.71 | 06/07/96 | 04:04 PM | 06/07/96 05:04 PM | | " | " |
| 290 | | 1.0 | 1.0 | 1.0 HRS | | | | 4.71 | 4.72 | 06/07/96 | 05:04 PM | 06/07/96 05:31 PM | | " | " |
| 291 | CLEAN UP | 0.5 | 0.0 | 0.5 HRS | | | | | | | | | | | |
| 292 | SUBTOTAL | 3.4 | | 3.4 HRS | | 112.0 | | | | | | | | | |
| 293 | | | | | | | | | | | | | | | |
| 294 | 13 A RESOLUBILIZATION | | | | | | | | | | | | | | |

Figure 126-1:
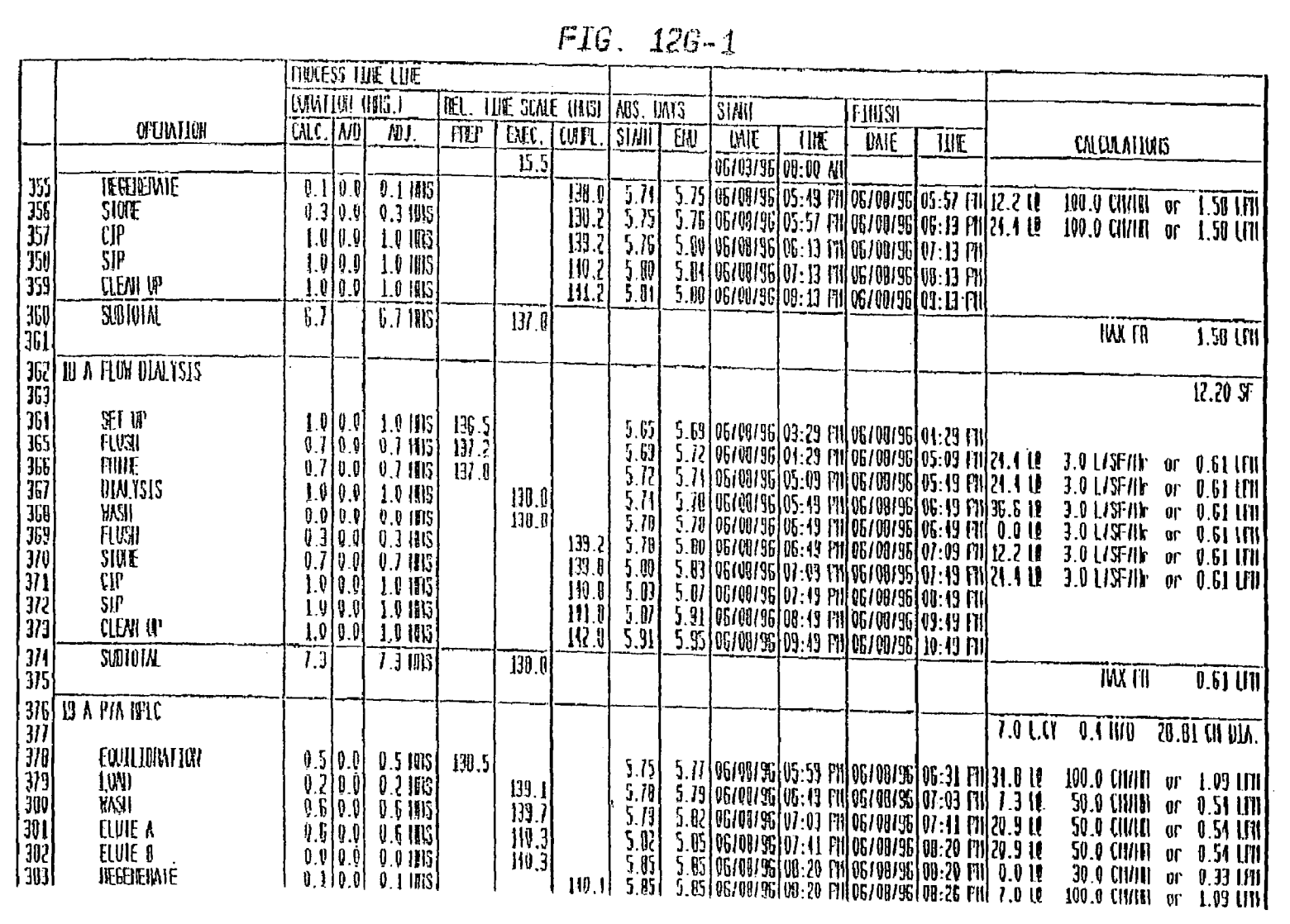

| | OPERATION | PROCESS TIME LINE | | | | | | | | | | | | |
|---|---|---|---|---|---|---|---|---|---|---|---|---|---|---|
| | | DURATION (HRS.) | | | REL. TIME SCALE (HRS) | | | ABS. DAYS | | START | | FINISH | | |
| | | CALC. | A/D | ADJ. | PREP | EXEC. | COMPL. | START | END | DATE | TIME | DATE | TIME | CALCULATIONS |
| | | | | | | 15.5 | | | | 06/03/96 | 08:00 AM | | | |
| 355 | REGENERATE | 0.1 | 0.0 | 0.1 HRS | | | 138.0 | 5.74 | 5.75 | 06/08/96 | 05:49 PM | 06/08/96 | 05:57 PM | 12.2 L 100.0 CM/HR or 1.50 LPM |
| 356 | STORE | 0.3 | 0.0 | 0.3 HRS | | | 138.2 | 5.75 | 5.76 | 06/08/96 | 05:57 PM | 06/08/96 | 06:13 PM | 24.4 L 100.0 CM/HR or 1.50 LPM |
| 357 | CIP | 1.0 | 0.0 | 1.0 HRS | | | 139.2 | 5.76 | 5.80 | 06/08/96 | 06:13 PM | 06/08/96 | 07:13 PM | |
| 358 | SIP | 1.0 | 0.0 | 1.0 HRS | | | 140.2 | 5.80 | 5.84 | 06/08/96 | 07:13 PM | 06/08/96 | 08:13 PM | |
| 359 | CLEAN UP | 1.0 | 0.0 | 1.0 HRS | | | 141.2 | 5.81 | 5.88 | 06/08/96 | 09:13 PM | 06/08/96 | 09:13 PM | |
| 360 | SUBTOTAL | 6.7 | | 6.7 HRS | | 137.0 | | | | | | | | |
| 361 | | | | | | | | | | | | | | MAX FR 1.50 LPM |
| 362 | 10 A FLOW DIALYSIS | | | | | | | | | | | | | |
| 363 | | | | | | | | | | | | | | 12.20 SF |
| 364 | SET UP | 1.0 | 0.0 | 1.0 HRS | 136.5 | | | 5.65 | 5.69 | 06/08/96 | 03:29 PM | 06/08/96 | 04:29 PM | |
| 365 | FLUSH | 0.7 | 0.0 | 0.7 HRS | 137.2 | | | 5.69 | 5.72 | 06/08/96 | 04:29 PM | 06/08/96 | 05:09 PM | 24.4 L 3.0 L/SF/hr or 0.61 LPM |
| 366 | PRIME | 0.7 | 0.0 | 0.7 HRS | 137.8 | | | 5.72 | 5.74 | 06/08/96 | 05:09 PM | 06/08/96 | 05:49 PM | 24.4 L 3.0 L/SF/hr or 0.61 LPM |
| 367 | DIALYSIS | 1.0 | 0.0 | 1.0 HRS | | 138.0 | | 5.74 | 5.78 | 06/08/96 | 05:49 PM | 06/08/96 | 06:49 PM | 36.6 L 3.0 L/SF/hr or 0.61 LPM |
| 368 | WASH | 0.0 | 0.0 | 0.0 HRS | | 138.0 | | 5.78 | 5.78 | 06/08/96 | 06:49 PM | 06/08/96 | 06:49 PM | 0.0 L 3.0 L/SF/hr or 0.61 LPM |
| 369 | FLUSH | 0.3 | 0.0 | 0.3 HRS | | | 139.2 | 5.78 | 5.80 | 06/08/96 | 06:49 PM | 06/08/96 | 07:09 PM | 12.2 L 3.0 L/SF/hr or 0.61 LPM |
| 370 | STORE | 0.7 | 0.0 | 0.7 HRS | | | 139.8 | 5.80 | 5.83 | 06/08/96 | 07:09 PM | 06/08/96 | 07:49 PM | 24.4 L 3.0 L/SF/hr or 0.61 LPM |
| 371 | CIP | 1.0 | 0.0 | 1.0 HRS | | | 140.8 | 5.83 | 5.87 | 06/08/96 | 07:49 PM | 06/08/96 | 08:49 PM | |
| 372 | SIP | 1.0 | 0.0 | 1.0 HRS | | | 141.8 | 5.87 | 5.91 | 06/08/96 | 08:49 PM | 06/08/96 | 09:49 PM | |
| 373 | CLEAN UP | 1.0 | 0.0 | 1.0 HRS | | | 142.8 | 5.91 | 5.95 | 06/08/96 | 09:49 PM | 06/08/96 | 10:49 PM | |
| 374 | SUBTOTAL | 7.3 | | 7.3 HRS | | 138.0 | | | | | | | | |
| 375 | | | | | | | | | | | | | | MAX FR 0.61 LPM |
| 376 | 10 A P/A HPLC | | | | | | | | | | | | | |
| 377 | | | | | | | | | | | | | | 7.0 L CV 0.4 M/D 28.81 CM DIA. |
| 378 | EQUILIBRATION | 0.5 | 0.0 | 0.5 HRS | 138.5 | | | 5.75 | 5.77 | 06/08/96 | 05:59 PM | 06/08/96 | 06:31 PM | 31.8 L 100.0 CM/HR or 1.09 LPM |
| 379 | LOAD | 0.2 | 0.0 | 0.2 HRS | | 139.1 | | 5.78 | 5.79 | 06/08/96 | 06:43 PM | 06/08/96 | 07:03 PM | 7.3 L 50.0 CM/HR or 0.54 LPM |
| 380 | WASH | 0.6 | 0.0 | 0.6 HRS | | 139.7 | | 5.79 | 5.82 | 06/08/96 | 07:03 PM | 06/08/96 | 07:41 PM | 20.9 L 50.0 CM/HR or 0.54 LPM |
| 381 | ELUTE A | 0.6 | 0.0 | 0.6 HRS | | 140.3 | | 5.82 | 5.85 | 06/08/96 | 07:41 PM | 06/08/96 | 08:20 PM | 20.9 L 50.0 CM/HR or 0.54 LPM |
| 382 | ELUTE B | 0.0 | 0.0 | 0.0 HRS | | 140.3 | | 5.85 | 5.85 | 06/08/96 | 08:20 PM | 06/08/96 | 08:20 PM | 0.0 L 30.0 CM/HR or 0.33 LPM |
| 383 | REGENERATE | 0.1 | 0.0 | 0.1 HRS | | | 140.1 | 5.85 | 5.85 | 06/08/96 | 08:20 PM | 06/08/96 | 08:26 PM | 7.0 L 100.0 CM/HR or 1.09 LPM |

| | PROCESS TIME LINE | | | REL. TIME SCALE (HRS) | | | ABS. DAYS | | START | | FINISH | | CALCULATIONS |
|---|---|---|---|---|---|---|---|---|---|---|---|---|---|
| OPERATION | DURATION (HRS) | | | PREP | EXEC | COMPL | START | END | DATE | TIME | DATE | TIME | |
| | CALC. A/D | ADJ. | | | | | | | | | | | |
| 415 CLEAN UP | 1.0 0.0 | 1.0 HRS | | | 15.5 | | 6.00 | 6.01 | 05/09/96 | 08:00 AM | 06/09/96 | 12:51 AM | |
| 416 SUBTOTAL | 2.1 | 2.1 HRS | | | 10.9 | 111.9 | 6.00 | 6.01 | 05/09/96 | 11:51 PM | 06/09/96 | | MAX FIT 0.91 L/M |
| 417 | | | | | | | | | | | | | |
| 418 22 A STERILE FILTRATION | | | | | | | | | | | | | 0.09 SF |
| 419 | | | | | | | | | | | | | |
| 420 SET UP | 0.5 0.0 | 0.5 HRS | 152.6 | | | | 5.98 | 6.00 | 06/08/96 | 09:46 AM | 06/09/96 | 06:36 AM | |
| 421 FILTRATION | 0.5 0.0 | 0.5 HRS | | 111.1 | | 111.6 | 6.00 | 6.03 | 06/09/96 | 11:36 AM | 06/09/96 | 12:06 AM | 2.2 L@ 50.0 L/SF/hr or 0.07 L/M |
| 422 STORAGE | 0.5 0.0 | 0.5 HRS | | | | 111.6 | 6.03 | 6.03 | 06/09/96 | 12:06 AM | 06/09/96 | 12:36 AM | |
| 423 CIP | 0.0 0.0 | 0.0 HRS | | | | 141.6 | 6.03 | 6.03 | 06/09/96 | 12:27 AM | 06/09/96 | 12:36 AM | |
| 424 S/F | 0.0 0.0 | 0.0 HRS | | | | 145.6 | 6.03 | 6.03 | 06/09/96 | 12:36 AM | 06/09/96 | 09:36 AM | |
| 425 CLEAN UP | 1.0 0.0 | 1.0 HRS | | | | | 6.03 | 6.07 | 06/09/96 | 12:36 AM | 06/09/96 | 01:36 AM | |
| 426 SUBTOTAL | 1.5 | 1.5 HRS | | 144.1 | | | | | | | | | MAX FIT 0.07 L/M |

FIG. 14A

| | | GROUP 1 | |
|---|---|---|---|
| | UNIT OPERATION TYPE | PARAMETER | SOLN. | |
| T1 | INNOCULUM PREP | NUMBER OF FLASKS<br>MEDIA VOLUME/FLASK | | 2<br>0.25 LITERS |
| T2 | FLASK GROWTH | SCALE UP RATIO<br>MEDIA VOLUME/FLASK | | 10 FOLD<br>1.25 L |
| T3 | FERMENTATION<br>PRODUCTION | SCALE UP RATIO<br>FERMENTOR WORKING VOLUME<br>ANTIFOAM A<br>ANTIFOAM B<br>BASE<br>ACID | S-101<br>S-102<br>S-103<br>S-104<br>S-105 | 10 FOLD<br>500 LITERS<br>1 ML/L<br>1 ML/L<br>5 ML/L<br>5 ML/L |
| T4 | INITIAL SEEDING | NUMBER OF AMPULES<br>VOLUME PER AMPULE<br>STARTING CELL DENSITY<br>AMPULE SPLIT RATIO<br>CULTURE VESSEL TYPE<br>FEED VOLUME | | 2<br>2 ML<br>300,000 CELLS/ML<br>1 VESSELS/AMPULE<br>ROLL. BOT.<br>100 ML |
| T5 | CULTURE VESSEL SPLIT | VESSEL SPLIT RATIO<br>NEW VESSEL TYPE<br>FEED VOLUME<br>SERUM CONTENT | | 2<br>RB<br>100 ML<br>2.0% FETAL BOVINE SERUM |
| T6 | SPINNER FLASK SEEDING | FLASK FEED VOLUME<br>VESSEL/FLASK RATIO<br>uCARRIER DENSITY<br>NUMBER OF PBS WASHES<br>NUMBER OF MEDIA WASHES<br>NO. OF MEDIA/SERUM WASHES | | 4 LITERS<br>0.1 L CELLS/L FLASK<br>5 Gm/LITER<br>2<br>1<br>2 FBS |
| T7 | BIOSYNTHESIS<br>BIOREACTOR PREPARATION<br>(STIRRED TANK REACTOR) | REACTOR FEED VOLUME<br>SPINNER/REACTOR RATIO<br>uCARRIER DENSITY<br>NUMBER OF PBS WASHES<br>NUMBER OF MEDIA WASHES<br>NO. OF MEDIA/SERUM WASHES | | 500 LITERS<br>0.3<br>5 Gm/LITER<br>2<br>1<br>2 |
| T8 | BIOSYNTHESIS<br>BIOREACTOR PREPARATION<br>(HOLLOW FIBER REACTOR) | REACTOR FEED VOLUME<br>NUMBER OF PBS WASHES<br>NUMBER OF MEDIA WASHES<br>NO. OF MEDIA/SERUM WASHES<br>SERUM CONTENT | | 100 LITERS<br>2<br>2<br>2<br>2.0% FETAL BOVINE SERUM |
| T9 | BIOSYNTHESIS<br>BIOREACTOR PREPARATION<br>(FLUIDIZED BED REACTOR) | REACTOR FEED VOLUME<br>uCARRIER DENSITY<br>NUMBER OF PBS WASHES<br>NUMBER OF MEDIA WASHES<br>NO. OF MEDIA/SERUM WASHES<br>SERUM CONTENT | | LITERS<br>Gm/L |
| T10 | INITIAL SEEDING | NUMBER OF AMPULES<br>VOLUME PER AMPULE<br>STARTING CELL DENSITY<br>AMPULE SPLIT RATIO | | 2<br>2 ML<br>300,000 CELLS/ML<br>1 VESSELS/AMPULE |

FIG. 14B

| GROUP 2 | | | GROUP 3 | |
|---|---|---|---|---|
| PARAMETER | SOLN. | | PARAMETER | SOLN. |
| TEMPERATURE<br>AGITATION<br>DURATION | | 37 C<br>200 RPM<br>18 HOURS | FINAL OD | 12 |
| TEMPERATURE<br>AGITATION<br>DURATION | | 37 C<br>200 HOURS<br>16 RPM | FINAL OD | 12 |
| GROWTH TEMPERATURE<br>AGITATION<br>SPARGE RATE<br>BACK PRESSURE<br>TOTAL DURATION | | 37 HOURS<br>1 HP/100L<br>1.5 VVM<br>5 PSIG<br>21 HRS | FINAL OD<br>DRY CELL MASS<br>PRODUCT CONCENTRATION<br>CIP | 12<br>9.55 Gms TDCM/L<br>0.3 Gms PRODUCT/L<br>Y |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | 100% |
| FEED RATE<br><br>DAYS TO CONFLUENCE | | 1 FEED PER VESSEL PER<br>2 DAYS<br>2 DAYS | AMPLIFICATION FACTOR | 100% |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | 100% |
| SERUM CONTENT<br>FEED RATE<br><br>DAYS TO CONFLUENCE<br>SERUM FREE MEDIA WASHES | | 2.0% FETAL BOVINE SERUM<br>1 FEED PER VESSEL PER<br>2 DAYS<br>10 DAYS<br>2 | PRODUCT CONCENTRATION<br>TOTAL PROTEIN CONCEN. | 2500% Kg PROD/L<br>0.125 Kg TP/ML |
| NUMBER OF REACTORS<br>FEED RATE<br><br>DAYS TO CONFLUENCE | | 1<br>1 FEED PER VESSEL PER<br>1 DAYS<br>10 DAYS | HARVEST VOLUME<br>PRODUCT CONCENTRATION<br>TOTAL PROTEIN CONCEN. | 500% LITERS<br>25 Kg PROD/L<br>0.125 Kg TP/ML |
| NUMBER OF REACTORS<br>FEED RATE<br><br>DAYS TO CONFLUENCE | | 1<br>1 FEED PER VESSEL PER<br>1 DAYS<br>10 DAYS | PRODUCT CONCENTRATION<br>TOTAL PROTEIN CONCEN. | 2500% Kg PROD/L<br>0.125 Kg TP/ML |
| SERUM CONTENT<br>FEED RATE<br><br>DAYS TO CONFLUENCE | | 2.0% FETAL BOVINE SERUM<br>1 FEED PER VESSEL PER<br>2 DAYS<br>2 DAYS | AMPLIFICATION FACTOR | 100% |

FIG. 15A

| UNIT OPERATION TYPE | PARAMETER | SOLN. | GROUP 1 | |
|---|---|---|---|---|
| | CULTURE VESSEL TYPE | | ROLL. BOT. | |
| | FEED VOLUME | | 100 | ml |
| T11 CULTURE VESSEL SPLIT | VESSEL SPLIT RATIO | | 2 | |
| | NEW VESSEL TYPE | RB | | |
| | FEED VOLUME | | 100 | ml |
| | SERUM CONTENT | | 2.0% | FETAL BOVINE SERUM |
| T12 SPINNER FLASK SPLIT | FLASK FEED VOLUME | | 4 | LITERS |
| | VESSEL/FLASK RATIO | | 0.1 | L CELLS/L FLASK |
| | uCARRIER DENSITY | | 5 | Gm/LITER |
| | NUMBER OF PBS WASHES | | 2 | |
| | NUMBER OF MEDIA WASHES | | 1 | |
| | NO. OF MEDIA/SERUM WASHES | | 2 | |
| T13 BIOSYNTHESIS BIOREACTOR PREPARATION (STIRRED TANK REACTOR) | REACTOR FEED VOLUME | | 500 | LITERS |
| | SPINNER/REACTOR RATIO | | 0.3 | |
| | uCARRIER DENSITY | | 5 | Gm/LITER |
| | NUMBER OF PBS WASHES | | 2 | |
| | NUMBER OF MEDIA WASHES | | 1 | |
| | NO. OF MEDIA/SERUM WASHES | | 2 | |
| T14 BIOSYNTHESIS BIOREACTOR PREPARATION (FLUIDIZED BED REACTOR) | REACTOR FEED VOLUME | | | LITERS |
| | uCARRIER DENSITY | | | Gm/L |
| | NUMBER OF PBS WASHES | | | |
| | NUMBER OF MEDIA WASHES | | | |
| | NO. OF MEDIA/SERUM WASHES | | | |
| | SERUM CONTENT | | | |
| T15 INITIAL COUPLING | FLASK FEED VOLUME | | 4 | LITERS |
| | VESSEL/FLASK RATIO | | 0.1 | L CELLS/L FLASK |
| | uCARRIER DENSITY | | 5 | Gm/LITER |
| | NUMBER OF PBS WASHES | | 2 | |
| | NUMBER OF MEDIA WASHES | | 1 | |
| | NO. OF MEDIA/SERUM WASHES | | 2 | FBS |
| T16 ADDITIONAL COUPLINGS | REACTOR FEED VOLUME | | 500 | LITERS |
| | SPINNER/REACTOR RATIO | | 0.3 | |
| | uCARRIER DENSITY | | 5 | Gm/LITER |
| | NUMBER OF PBS WASHES | | 2 | |
| | NUMBER OF MEDIA WASHES | | 1 | |
| | NO. OF MEDIA/SERUM WASHES | | 2 | |
| T17 PEPTIDE CLEAVAGE | REACTOR FEED VOLUME | | 100 | LITERS |
| | NUMBER OF PBS WASHES | | 2 | |
| | NUMBER OF MEDIA WASHES | | 2 | |
| | NO. OF MEDIA/SERUM WASHES | | 2 | |
| | SERUM CONTENT | | 2.0% | FETAL BOVINE SERUM |
| T18 TISSUE THAWING | CRUDE PRODUCT YIELD | | 25 | Gm CRUDE PROD./Kg TISSUE |
| | ENVIRONMENTAL TEMPERATURE | | 25 | C |
| | THAW DURATION | | 16 | HOURS |
| T19 HOMOGENIZATION | CRUDE PRODUCT YIELD | | 25 | Gm CRUDE PROD./Kg TISSUE |
| | LIQUID/SOLID RATIO | | 10 | L SOLUTION/Kg TISSUE |
| | HOMOGENIZATION TEMP. | | 4 | C |
| | HOMOGENIZER TYPE | | RS | |
| | ENERGY INPUT | | 200 | HP/100L/HR |
| | DURATION | | 4 | HOURS |
| T20 LIQUID THAWING | | | | |

FIG. 15B

| GROUP 2 | | GROUP 3 | |
|---|---|---|---|
| PARAMETER | SOLN. | PARAMETER | SOLN. |
| PBS WASHES | 200 ml | | |
| TRYPSIN WASH | 100 ml | | |
| FEED RATE | 1 FEED PER VESSEL PER 2 DAYS | AMPLIFICATION FACTOR | 100% |
| DAYS TO CONFLUENCE | 2 DAYS | | |
| PBS WASHES | 200 ml | | |
| TRYPSIN WASH | 100 ml | | |
| SERUM CONTENT | 2.0% FETAL BOVINE SERUM | AMPLIFICATION FACTOR | 100% |
| FEED RATE | 1 FEED PER VESSEL PER 2 DAYS | | |
| DAYS TO CONFLUENCE | 2 DAYS | | |
| SERUM CONTENT | 2.0% FETAL BOVINE SERUM | PRODUCT CONCENTRATION | 2500% kg PROD/L |
| FEED RATE | 1 FEED PER VESSEL PER 2 DAYS | TOTAL PROTEIN CONCEN. | 0.125 kg TP/ml |
| DAYS TO CONFLUENCE | 10 DAYS | | |
| SERUM FREE MEDIA WASHES | 2 | | |
| NUMBER OF REACTORS | 1 | PRODUCT CONCENTRATION | 2500% kg PROD/L |
| FEED RATE | 1 FEED PER VESSEL PER 1 DAYS | TOTAL PROTEIN CONCEN. | 0.125 kg TP/ml |
| DAYS TO CONFLUENCE | 10 DAYS | | |
| SERUM CONTENT | 2.0% FETAL BOVINE SERUM | AMPLIFICATION FACTOR | 100% |
| FEED RATE | 1 FEED PER VESSEL PER 2 DAYS | | |
| DAYS TO CONFLUENCE | 2 DAYS | | |
| SERUM CONTENT | 2.0% FETAL BOVINE SERUM | PRODUCT CONCENTRATION | 2500% kg PROD/L |
| FEED RATE | 1 FEED PER VESSEL PER 2 DAYS | TOTAL PROTEIN CONCEN. | 0.125 kg TP/ml |
| DAYS TO CONFLUENCE | 10 DAYS | | |
| SERUM FREE MEDIA WASHES | 2 | | |
| NUMBER OF REACTORS | 1 | HARVEST VOLUME | 500% LITERS |
| FEED RATE | 1 FEED PER VESSEL PER 1 DAYS | PRODUCT CONCENTRATION | 25 kg PROD/L |
| DAYS TO CONFLUENCE | 10 DAYS | TOTAL PROTEIN CONCEN. | 0.125 kg TP/ml |
| CONTAMINANT PROTEIN CONC. | 100 Gm/L | TEMPERATURE REGULATION | Y |
| | | CIP | Y |
| | | SIP | Y |
| CONTAMINANT PROTEIN CONC. | 100 Gm/L | TEMPERATURE REGULATION | Y |
| | | CIP | Y |
| | | SIP | Y |
| | | AMPLIFICATION FACTOR | 100% |

FIG. 16A

| UNIT OPERATION TYPE | GROUP 1 | |
|---|---|---|
| | PARAMETER | SOLN. |
| T21 PRODUCT Ppt BY SOLIDS | REAGENT CONCENTRATION | 1 M |
| T22 PRODUCT Ppt BY LIQUIDS | REAGENT CONCENTRATION | 1 M |
| T23 CONTAINMENT Ppt BY SOLIDS | REAGENT CONCENTRATION | 1 M |
| T24 CONTAINMENT Ppt BY LIQUIDS | REAGENT CONCENTRATION | 1 M |
| T25 SOLIDS HARVEST TANGENTIAL FLOW KF | POROSITY<br>AVERAGE FLUX RATE<br><br>TOTAL THROUGHPUT<br>FILTRATION TIME | 0.2 MICRON<br>- 1 L/SF/HR AT<br>40 PSIG AT<br>4 C<br>400 LITERS/SF<br>1 HR |
| T26 CONTINUOUS CENTRIFUGATION SOLIDS HARVEST | SYSTEM VOID VOLUME | 5 LITERS |
| T27 CONTINUOUS CENTRIFUGATION SUPERNATANT HARVEST | SYSTEM VOID VOLUME | 6 LITERS |
| T28 DILUTION | SYSTEM VOID VOLUME | 6 LITERS |
| T29 BATCH CENTRIFUGATION SOLIDS HARVEST | SYSTEM VOID VOLUME | 6 LITERS |

FIG. 16B

| GROUP 2 | | GROUP 3 | |
|---|---|---|---|
| PARAMETER | SOLN. | PARAMETER | SOLN. |
| Kgms OF REAGENT/LITERS PRODUCT<br>TEMPERATURE<br>ADDITION TIME<br>ADDITIONAL MIX TIME | 0.25 Kg/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| LITERS REAGENT/LITERS PRODUCT<br>TEMPERATURE<br>ADDITION TIME<br>ADDITIONAL MIX TIME | 0.25 L/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| Kgms OF REAGENT/LITERS PRODUCT<br>TEMPERATURE<br>ADDITION TIME<br>ADDITIONAL MIX TIME | 0.25 Kg/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| LITERS REAGENT/LITERS PRODUCT<br>TEMPERATURE<br>ADDITION TIME<br>ADDITIONAL MIX TIME | 0.25 L/L<br>4 C<br>0.5 HOURS<br>2 HOURS | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| FLUSH<br>PRIME<br>CONCENTRATION FACTOR<br>WASH<br>REGENERATE<br>STORE | 2 L/SF<br>2 L/SF<br>10 FOLD<br>0.5 L/SF<br>1 L/SF<br>2 L/SF | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| RCF<br>TIME<br>VOLUME REDUCTION<br>WASH VOLUME | 10,000 X 6<br>60 MINUTES<br>30 X VOL. REDUCTION<br>0.2 X SYSTEM VOID VOLUME | STEP RECOVERY OF PRODUCT<br>STEP RECOVERY OF T.P.<br><br>TEMPERATURE REGULATION<br>CIP<br>SIP | 95%<br>95%<br><br>Y<br>Y<br>Y |
| RCF<br>TIME<br>VOLUME REDUCTION<br>WASH VOLUME | 10,000 X 6<br>30 MINUTES<br>0.662 VOL. REDUCTION<br>1.5 X SYSTEM VOID VOLUME | STEP RECOVERY OF PRODUCT<br>STEP RECOVERY OF T.P.<br><br>TEMPERATURE REGULATION<br>CIP<br>SIP | 85%<br>0.3<br><br>Y<br>Y<br>Y |
| RCF<br>TIME<br>VOLUME REDUCTION<br>WASH VOLUME | 10,000 X 6<br>30 MINUTES<br>15 X VOL. REDUCTION<br>1.5 X SYSTEM VOID VOLUME | STEP RECOVERY OF PRODUCT<br>STEP RECOVERY OF T.P.<br><br>TEMPERATURE REGULATION<br>CIP<br>SIP | 95%<br>0.95<br><br>Y<br>Y<br>Y |
| RCF<br>TIME | 10,000 X 6<br>30 MINUTES | STEP RECOVERY OF PRODUCT<br>STEP RECOVERY OF T.P. | 95%<br>0.95 |

FIG. 17A

| UNIT OPERATION TYPE | GROUP 1 | | |
|---|---|---|---|
| | PARAMETER | SOL'N. | |
| T30 BATCH CENTRIFUGATION SUPERNATANT HARVEST | SYSTEM VOID VOLUME | | 6 LITERS |
| T31 CELL DISRUPTION HIGH PRESS. HOMOGEN. | PRODUCT TEMPERATURE UTILITY TEMPERATURE VOID VOLUME | | 8 C 2 C 5 LITERS |
| T32 CELL DISRUPTION BEAD MILL | NUMBER OF PASSES BEAD SIZE VOID VOLUME FLOW RATE | | 2 0.5 LPH |
| T33 CELL DISRUPTION CHEMICAL LYSIS | REAGENT TEMPERATURE EXPOSURE TIME | | 0.5 N NaOH 4 C 2 HOURS |
| T34 MICROFILTRATION TANGENTIAL FLOW | POROSITY AVERAGE FLUX RATE TOTAL THROUGHPUT FILTRATION TIME | | 0.2 MICRON 50 L/SF/HR AT 40 PSIG AT 4 C 400 LITERS/SF 2 HR |
| T35 MICROFILTRATION DEAD END | POROSITY AVERAGE FLUX RATE TOTAL THROUGHPUT FILTRATION TIME | | 0.2 MICRON 50 L/SF/HR AT 40 PSIG AT 4 C 400 LITERS/SF 0.5 HR |
| T36 ULTRAFILTRATION CONCENTRATION/DILUTION | POROSITY AVERAGE FLUX RATE CONCENTRATION TIME | | 60 K NMWL 3 L/SF/HR AT 40 PSIG AT 4 C 2 HR. |
| T37 ULTRAFILTRATION FLOW DIALYSIS | POROSITY AVERAGE FLUX RATE | | 60 K NMWL 3 L/SF/HR AT 40 PSIG AT 4 C |

FIG. 17B

| GROUP 2 | | GROUP 3 | |
|---|---|---|---|
| PARAMETER | SOL.N. | PARAMETER | SOL.N. |
| VOLUME REDUCTION | | 16 X VOL. REDUCTION | |
| WASH VOLUME | | 1.5 X SYSTEM VOID VOLUME | TEMPERATURE REGULATION | Y |
| | | | CIP | Y |
| | | | SIP | Y |
| RCF | | 10000 X G | STEP RECOVERY OF PRODUCT | 95% |
| TIME | | 30 MINUTES | STEP RECOVERY OF T.P. | 0.95 |
| VOLUME REDUCTION | | 16 X VOL. REDUCTION | | |
| WASH VOLUME | | 1.5 X SYSTEM VOID VOLUME | TEMPERATURE REGULATION | Y |
| | | | CIP | Y |
| | | | SIP | Y |
| NUMBER OF PASSES | | 6 TIMES | RINSE | 500% VOID VOLUMES |
| PRESSURE | | 12,000 PSI | STEP RECOVERY OF PRODUCT | 95% |
| FLOW RATE | | 5 LPM | STEP RECOVERY OF T.P. | 95% |
| TEMPERATURE INCREASE | | 1.8 DEGREES C/1,000 PSI | TEMPERATURE REGULATION | Y |
| | | | CIP | Y |
| | | | SIP | Y |
| | | | STEP RECOVERY OF PRODUCT | 95% |
| | | | STEP RECOVERY OF T.P. | |
| | | | TEMPERATURE REGULATION | Y |
| | | | CIP | Y |
| | | | SIP | Y |
| LITERS REAGENT/Gm PRODUCT | | 0.4 L/Gm | STEP RECOVERY OF PRODUCT | 95% |
| TITRATION | | 0 NI/LITER | STEP RECOVERY OF T.P. | |
| | | | TEMPERATURE REGULATION | Y |
| | | | CIP | Y |
| | | | SIP | Y |
| FLUSH | | 2.00 L/SF | STEP RECOVERY OF PRODUCT | 95% |
| PRIME | | 2.00 L/SF | STEP RECOVERY OF T.P. | 95% |
| WASH | | 0.50 L/SF | | |
| SOLIDS | | 0.30% OF PRODUCT SOLUTION | TEMPERATURE REGULATION | Y |
| REGENERATE | | 1.00 L/SF | CIP | Y |
| STORE | | 2.00 L/SF | SIP | Y |
| FLUSH | | 0 L/SF | STEP RECOVERY OF PRODUCT | 95% |
| PRIME | | 0 L/SF | STEP RECOVERY OF T.P. | 0.95 |
| WASH | | 0.5 L/SF | | |
| SOLIDS | | 0.003 OF PRODUCT SOLUTION | TEMPERATURE REGULATION | N |
| REGENERATE | | 1 L/SF | CIP | N |
| STORE | | 2 L/SF | SIP | N |
| FLUSH | | 2.00 L/SF | STORE | 2.00 L/SF |
| PRIME | | 2.00 L/SF | STEP RECOVERY OF PRODUCT | 95% |
| WASH | | 0.50 L/SF | STEP RECOVERY OF T.P. | 95% |
| DILUTE CONCENTRATE | | 10.0 FOLD | TEMPERATURE REGULATION | Y |
| SOLIDS | | 0.30% OF PRODUCT SOLUTION | CIP | Y |
| REGENERATE | | 1.00 L/SF | SIP | Y |
| FLUSH | | 2 L/SF | STORE | 200% L/SF |
| PRIME | | 2.00 L/SF | STEP RECOVERY OF PRODUCT | 95% |
| DIALYSIS BUFFER | | 5.0 X FEED STREAM VOLUME | STEP RECOVERY OF T.P. | 95% |
| WASH | | 0.50 L/SF | TEMPERATURE REGULATION | Y |

FIG. 18A

| | UNIT OPERATION TYPE | PARAMETER | GROUP 1 | |
|---|---|---|---|---|
| | | | SOLN. | |
| | | DIALYSIS TIME | | 2 HR |
| T38 | PROD. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 10 Kg PROD./MI OF PACKING<br>1.5 FOLD<br>0.37 H/D<br>100 Cm/HR AT<br>45 PSIG AND<br>4 C |
| T39 | PROD. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 10 Kg PROD./MI OF PACKING<br>1.5 FOLD<br>0.37 H/D<br>100 Cm/HR AT<br>45 PSIG AND<br>4 C |
| T40 | PROD. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10 Kg PROD./MI OF PACKING<br>1.5 FOLD<br>0.37 H/D<br>100 Cm/HR AT<br>45 PSIG AND<br>4 C |
| T41 | CONT. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 30 Kg CONT./MI OF PACKING<br>1.5 FOLD<br>0.37 H/D<br>100 Cm/HR AT<br>45 PSIG AND<br>4 C |
| T42 | CONT. ADS. CHROMATOGRAPHY HPLC | COLUMN CAPACITY<br>COLUMN OVERSIZE FACTOR<br>COLUMN ASPECT RATIO<br>MAX. LINEAR VELOCITY | | 10 Kg CONT./MI OF PACKING<br>1.5 FOLD<br>0.37 H/D<br>100 Cm/HR AT<br>45 PSIG AND<br>400% C |
| T43 | CONT. ADS. CHROMATOGRAPHY LPLC | COLUMN CAPACITY<br>COLUMN OVERSIZE FACTOR<br>COLUMN ASPECT RATIO<br>MAX. LINEAR VELOCITY | | 10 Kg CONT./MI OF PACKING<br>1.5 FOLD<br>0.37 H/D<br>100 Cm/HR AT<br>45 PSIG AND<br>4 C |
| T44 | SIZE EXCL. CHROMATOGRAPHY HPLC | LOAD CAPACITY<br>LENGTH<br>MAX. LINEAR VELOCITY<br><br>VOID VOLUME | | 5% OF TOTAL COLUMN VOLUME<br>100 Cm<br>100 Cm/HR AT<br>45 PSIG AND<br>4 C<br>25% COLUMN VOLUME |
| T45 | SIZE EXCL. CHROMATOGRAPHY HPLC | LOAD CAPACITY<br>LENGTH<br>MAX. LINEAR VELOCITY<br><br>VOID VOLUME | | 5% OF TOTAL COLUMN VOLUME<br>100 Cm<br>100 Cm/HR AT<br>45 PSIG AND<br>4 C<br>25% COLUMN VOLUME |

FIG. 18B

| GROUP 2 | | | GROUP 3 | |
|---|---|---|---|---|
| PARAMETER | SOL.N. | | PARAMETER | SOL.N. |
| SOLIDS | | 0.30% OF PRODUCT SOLUTION | CIP | Y |
| REGENERATE | | 1.00 L/SF | SIP | Y |
| COLUMN EQUILIBRATION | | 5 COLUMN VOLUMES | PROD. ELUTION VOLUME | 80% |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 0 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 5 COLUMN VOLUMES | PROD. ELUTION VOLUME | 80% |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 0 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 5 COLUMN VOLUMES | PROD. ELUTION VOLUME | 42% |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 2 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 5 COLUMN VOLUMES | PROD. ELUTION VOLUME | 42% |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 2 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 5 COLUMN VOLUMES | PROD. ELUTION VOLUME | 42% |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 2 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 5 COLUMN VOLUMES | PROD. ELUTION VOLUME | 42% COLUMNS VOLUMES |
| COLUMN WASH | | 3 COLUMN VOLUMES | STEP RECOVERY OF PRODUCT | 95% |
| COLUMN ELUTE A | | 3 COLUMN VOLUMES | STEP RECOVERY OF T.P. | 95% |
| COLUMN ELUTE B | | 2 COLUMN VOLUMES | TEMPERATURE REGULATION | N |
| COLUMN REGENERATE | | 1 COLUMN VOLUMES | CIP | Y |
| COLUMN STORE | | 2 COLUMN VOLUMES | SIP | Y |
| COLUMN EQUILIBRATION | | 4 COLUMN VOLUMES | PROD. ELUTION VOLUME | 42% COLUMNS VOLUMES |
| COLUMN WASH | | 1 COLUMN VOLUMES | STEP RECOVERY OF PRODUCT | 95% |
| COLUMN REGENERATE | | 1 COLUMN VOLUMES | STEP RECOVERY OF T.P. | 95% |
| COLUMN STORE | | 2 COLUMN VOLUMES | TEMPERATURE REGULATION | N |
| | | | CIP | Y |
| | | | SIP | Y |
| COLUMN EQUILIBRATION | | 4 COLUMN VOLUMES | PROD. ELUTION VOLUME | 42% COLUMNS VOLUMES |
| COLUMN WASH | | 1 COLUMN VOLUMES | STEP RECOVERY OF PRODUCT | 95% |
| COLUMN REGENERATE | | 1 COLUMN VOLUMES | STEP RECOVERY OF T.P. | 95% |
| COLUMN STORE | | 2 COLUMN VOLUMES | TEMPERATURE REGULATION | N |
| | | | CIP | Y |
| | | | SIP | Y |

FIG. 19A

| | | GROUP 1 | |
|---|---|---|---|
| UNIT OPERATION TYPE | PARAMETER | SOLN. | |
| T46 SIZE EXCL. CHROMATOGRAPHY LPLC | LOAD CAPACITY<br>LENGTH<br>MAX. LINEAR VELOCITY<br><br>VOID VOLUME | | 5 % OF TOTAL COLUMN VOLUME<br>100 Cm<br>100 Cm/HR AT<br>45 PSIG AND<br>4 C<br>25 % COLUMN VOLUME |
| T47 DILUTION | DILUTION FACTOR | | 3 LITERS/LITER |
| T48 RESOLUBILIZATION | REGEANT/PRODUCT RATIO<br><br>DISSOLUTION TIME<br>ADDITIONAL MIX TIME | | 0 L/Kg PRODUCT<br><br>0.50 HOURS<br>0.50 HOURS |
| T49 ENZYMATIC MODIFICATION | ENZYME TO PRODUCT RATIO<br><br>ENZYME CONCENTRATION<br>REACTION TEMP<br>REACTION DURATION | | 0.084 LITERS OF ENZYME STOCK PER LITER OF START. PROC. VOL.<br>2 Mg/Ml<br>37 DEGREES C<br>30 MINUTES<br>100% |
| T50 LYOPHILIZATION | PRODUCT CAPACITY/LOAD<br>PRODUCT UNIT SIZE | | 8 UNITS<br>100 GRAMS/UNIT |
| T51 HEAT EXCHANGE | PROCESS INITIAL TEMP<br>PROCESS FINAL TEMP<br>UTILITY INITIAL TEMP<br>UTILITY FINAL TEMP<br>PROCESS SPECIFIC HEAT<br>DESIGN TYPE (P,T,C) | | 98.6 DEGREES C<br>39.2 DEGREES C<br>34 DEGREES C<br>5 DEGREES C<br>38.6 K BTU/HR<br>P |
| T52 STORAGE | | | |
| T53 FERMENTATION SEED | SCALE UP RATIO<br>FERMENTOR WORKING VOLUME<br>ANTIFOAM A<br>ANTIFOAM B<br>BASE<br>ACID | | 10 FOLD<br>50 LITERS<br>1 Ml/L<br>1 Ml/L<br>5 Ml/L<br>5 Ml/L |
| T54 INITIAL SEEDING | FLASK FEED VOLUME<br>SPINNER SPLIT RATIO | | 12 LITERS<br>4 |

FIG. 19B

| GROUP 2 | | | GROUP 3 | | |
|---|---|---|---|---|---|
| PARAMETER | SOLN. | | PARAMETER | SOLN. | |
| COLUMN EQUILIBRATION | | 4 COLUMN VOLUMES | PROD. ELUTION VOLUME | | 42% COLUMN VOLUMES |
| COLUMN WASH | | 1 COLUMN VOLUMES | STEP RECOVERY OF PRODUCT | | 95% |
| COLUMN REGENERATE | | 1 COLUMN VOLUMES | STEP RECOVERY OF T.P. | | 95% |
| COLUMN STORE | | 2 COLUMN VOLUMES | TEMPERATURE REGULATION | | N |
| | | | CIP | | Y |
| | | | SIP | | Y |
| DILUTION TIME | | 0.5 HOURS | STEP RECOVERY OF PRODUCT | | 95% |
| ADDITIONAL MIX TIME | | 1 HOURS | STEP RECOVERY OF T.P. | | 95% |
| | | | TEMPERATURE REGULATION | | Y |
| | | | CIP | | Y |
| | | | SIP | | Y |
| REAGENT 1 | | WATER | STEP RECOVERY OF PRODUCT | | 95% |
| CONCENTRATION | | DIST. | STEP RECOVERY OF T.P. | | 95% |
| | | | TEMPERATURE REGULATION | | Y |
| | | | CIP | | Y |
| | | | SIP | | Y |
| TITRATION SOLUTION-1 | | 0.067 L/L PROCESS | STEP RECOVERY OF PRODUCT | | 95% |
| TITRATION SOLUTION-2 | | 0.02 L/L PROCESS | STEP RECOVERY OF T.P. | | 95% |
| NEUTRALIZATION | | 0.57 L/L PROCESS | | | |
| | | | TEMPERATURE REGULATION | | Y |
| | | | CIP | | Y |
| | | | SIP | | Y |
| LYOPHILIZATION TIME | | 18 HOURS | STEP RECOVERY OF PRODUCT | | 95% |
| PRODUCT WEIGHT REDUCTION | | 0.95 | STEP RECOVERY OF T.P. | | 95% |
| | | | CIP | | Y |
| | | | SIP | | Y |
| EXPOSURE TIME | | 1 HOURS | STEP RECOVERY OF PRODUCT | | 100% |
| | | | STEP RECOVERY OF T.P. | | 100% |
| | | | TEMPERATURE REGULATION | | Y |
| | | | CIP | | Y |
| | | | SIP | | Y |
| | | | STEP RECOVERY OF PRODUCT | | 95% |
| | | | STEP RECOVERY OF T.P. | | 95% |
| | | | TEMPERATURE REGULATION | | Y |
| | | | CIP | | Y |
| | | | SIP | | Y |
| GROWTH TEMPERATURE | | 37 HOURS | FINAL OD | | 12 |
| AGITATION | | 1 HP/100L | CIP | | |
| SPARGE RATE | | 1.5 VVM | | | |
| BACK PRESSURE | | 5 PSIG | | | Y |
| TOTAL DURATION | | 21 HRS | | | |
| SERUM CONTENT | | 2% FBS | AMPLIFICATION FACTOR | | 1 |
| FEED RATE | | 1 FEED PER VESSEL PER | | | |

FIG. 20A

| | | | GROUP 1 | |
|---|---|---|---|---|
| | UNIT OPERATION TYPE | PARAMETER | SOLN. | |
| | | uCARRIER DENSITY | | 5 Gm/LITER |
| | | NUMBER OF PBS WASHES | | 2 |
| | | NUMBER OF MEDIA WASHES | | 1 |
| | | NO. OF MEDIA/SERUM WASHES | | 2 FBS |
| T55 | CULTURE VESSEL SPLIT | FLASK FEED VOLUME | | 12 LITERS |
| | | SPINNER SPLIT RATIO | | 4 |
| | | uCARRIER DENSITY | | 5 Gm/LITER |
| | | NUMBER OF PBS WASHES | | 2 |
| | | NUMBER OF MEDIA WASHES | | 1 |
| | | NO. OF MEDIA/SERUM WASHES | | 2 FBS |
| T56 | CULTURE FLASK SPLIT | | | |
| T57 | STIRRED TANK REACTOR | | | |
| T58 | FLUIDIZED BED REACTOR | PROCESS INITIAL TEMP | | 37 DEGREES C |
| | | PROCESS FINAL TEMP | | 4 DEGREES C |
| | | UTILITY INITIAL TEMP | | 2 DEGREES C |
| | | UTILITY FINAL TEMP | | 5 DEGREES C |
| | | PROCESS SPECIFIC HEAT | | 12 K BTU/HR |
| | | DESIGN TYPE (P,T,C) | | P |
| T59 | LIQUID/LIQUID EXTRACTION | LIQUID/LIQUID RATIO | | 1 L EXTRACTION/L PRODUCT |
| | | EXTRACTION TEMPERATURE | | 4 C |
| | | ADDITION DURATION | | 0.5 HOURS |
| | | ADDITIONAL MIX. DURATION | | 4 HOURS |
| | | MIX ENERGY | | 0.3 HP/100L |
| T60 | SOLID/LIQUID EXTRACTION | LIQUID/LIQUID RATIO | | 1 L EXTRACTION/L PRODUCT |
| | | EXTRACTION TEMPERATURE | | 4 C |
| | | DURATION | | 4 HOURS |
| | | MIX ENERGY | | 0.3 HP/100 L |

FIG. 20B

| GROUP 2 | | | GROUP 3 | |
|---|---|---|---|---|
| PARAMETER | SOLN. | | PARAMETER | SOLN. |
| DAYS TO CONFLUENCE | | 2 DAYS<br>2 DAYS | | |
| SERUM CONTENT<br>FEED RATE<br>DAYS TO CONFLUENCE | | 2% FBS<br>1 FEED PER VESSEL PER<br>2 DAYS<br>2 DAYS | AMPLIFICATION FACTOR | 1 |
| | | | STEP RECOVERY OF PRODUCT<br>STEP RECOVERY OF T.P.<br><br>CIP<br>SIP | 0.95<br>95%<br><br>Y<br>Y<br>Y |
| EXPOSURE TIME | | 50% HOURS | STEP RECOVERY OF PRODUCT<br>STEP RECOVERY OF T.P.<br><br>TEMPERATURE REGULATION<br>CIP<br>SIP | 0.95<br>100%<br><br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br><br>TEMPERATURE REGULATION<br>CIP<br>SIP | 0.9<br>50%<br><br>Y<br>Y<br>Y |
| PHASE SEPARATION TIME<br>PRODUCT PHASE (TOP/BOTTOM)<br>HARVEST TIME | | 1600% HOURS<br>TOP<br>0.5 HOURS | STEP RECOVERY OF PRODUCT<br>STEP RECOVERY OF T.P.<br><br>TEMPERATURE REGULATION<br>CIP<br>SIP | 0.9<br>50%<br><br>Y<br>Y<br>Y |

| UOP Seq. No. | Code | Unit Operation Type | Process Design Cycles ||||||||||
| | | | Unit Op ||| Unit Op Cluster |||| Batch |||
| | | | Offset (Hrs) | | | UnOp Start | UnOp End | Offset (Hrs) | | UnOp Start | UnOp End | Offset (Hrs) |
| 1 | 68 | STR-Suspension Production | 0 | 1 | | | | | 1 | | | 0 |
| 2 | 74 | Harvest/Feed-Suspension Production | 24 | 1 | | | | 0 | 20 | 2 | 4 | 72 |
| 3 | 34 | Tangential Flow-Clarification | 0 | 1 | | | | 0 | 20 | 2 | 4 | 72 |
| 4 | 47 | Dilution | 0 | 1 | | | | 0 | 20 | 2 | 4 | 72 |
| 5 | 99 | End | | | | | | | | | | |

| | | | Process Design Cycles | | | | | | | |
|---|---|---|---|---|---|---|---|---|---|---|
| | | | | Unit Op | | Unit Op Cluster | | | Batch | | |
| UOP Seq. No. | Code | Unit Operation Type | | Offset (Hrs) | | UnOp Start | UnOp End | Offset (Hrs) | | UnOp Start | UnOp End | Offset (Hrs) |
| 10301 | 87 | Pool | 1 | | 1 | | | | 1 | | | |
| 10302 | 51 | Heat Exchange | 1 | | 1 | | | | 1 | | | |
| 10303 | 26 | Cont. Centrifugation - Solids Harvest | 1 | | 1 | | | | 1 | | | |
| 10304 | 48 | Resolubilization | 1 | | 1 | | | | 1 | | | |
| 10305 | 61 | Inlet Heat Exchange | 1 | | 3 | 5 | 7 | | 1 | | | |
| 10306 | 31 | High Pressure Homogenization | 1 | | 3 | 5 | 7 | 5 | 1 | | | |
| 10307 | 51 | Outlet Heat Exchange | 1 | | 3 | 5 | 7 | 5 | 1 | | | |
| 10308 | 29 | Batch Centrifugation - Solids Harvest | 1 | | 1 | | | | 1 | | | |
| 10309 | 29 | Dilution - IB Wash | 1 | | 2 | 9 | 10 | | 1 | | | |
| 10310 | 29 | Batch Centrifugation - Solids Harvest | 1 | | 2 | 9 | 10 | | 1 | | | |
| 10311 | 63 | Storage | 1 | | 1 | | | | 1 | | | |
| 10312 | 99 | End | 1 | | 1 | | | | 1 | | | |

FIG. 22

| OPERATION | CALCULATIONS |
|---|---|
| 1.1.1.1 T76 MULTI-STAGE POOL<br>  SET UP<br>  INPUT 1<br>  INPUT 2<br>  INPUT 3<br>  INPUT 4<br>  INPUT 5<br>  INPUT 6<br>  POOL INPUTS<br>  SUB TOTAL | LINK<br>SOURCE<br>PE-0102e    20272.98 LITERS @   104.00 HOURS, TRANSFER IN   0.0 HOURS=   0.0 LPM<br>              0 LITERS @   0.00 HOURS, TRANSFER IN   0.0 HOURS=   0.0 LPM<br>              0 LITERS @   0.00 HOURS, TRANSFER IN   0.0 HOURS=   0.0 LPM<br>              0 LITERS @   0.00 HOURS, TRANSFER IN   0.0 HOURS=   0.0 LPM<br>              0 LITERS @   0.00 HOURS, TRANSFER IN   0.0 HOURS=   0.0 LPM<br>              0 LITERS @   0.00 HOURS, TRANSFER IN   0.0 HOURS=   0.0 LPM<br>         20272.98 LITERS IN   0.00 HOURS, TRANSFER IN   0.0 HOURS=   0.0 LPM<br>                                104.00 TOTAL TRANSFER   0 HOURS   LPM MISC. |
| 2.1.1.1 51 OUTLET HEAT EXCHANGE<br>  SET UP<br>  TRANSFER<br>  WASH<br>  CIP<br>  SIP<br>  CLEAN UP<br>  SUB TOTAL | <br><br>20,273.0 L IN    2.50 HRS   =   135.2 LPM<br><br><br><br><br>                    135.2 |
| 3.1.1.1 26 CONT. CENT/SOLIDS<br>  SET UP<br>  CENTRIFUGATION<br>  WASH<br>  CIP<br>  SIP<br>  CLEAN UP<br>  SUB TOTAL | <br><br>20,273.0 L IN    5.00 HRS   =   56.3 LPM<br>30.0 L IN       0.01 HRS   =   56.3 LPM<br><br><br><br>                    56.3 LPM |
| 4.1.1.1 48 RESOLUBILIZATION<br>  SET UP<br>  DILUTION<br>  UO<br>  CIP<br>  SIP<br>  CLEAN UP<br>  SUB TOTAL | <br><br>6,476.0 L IN    3.0 HOURS   36.0 LPM<br>                0.0 HOURS<br><br><br><br>                    36.0 |
| 5.1.1.1 61 INLET HEAT EXCHANGE<br>  SET UP<br>  TRANSFER<br>  WASH | <br><br>8,634.7 L IN    2.5 HRS   =   57.56 LPM<br>0.0 L IN        0.0 HRS   =   0.0 LPM |

| PROCESS TIME LINE | | | | | | | | | | | | | |
|---|---|---|---|---|---|---|---|---|---|---|---|---|---|
| DURATION (HRS) | | | REL. TIME SCALE (HRS) | | | ABS. HOURS | | ABS. DAYS | | START | | FINISH | |
| CALC. | LOG | ADJ | PREP | EXEC. | COMPL. | START | END | START | END | DATE | TIME | DATE | TIME |
| 0.0 | 0.0 | 0.0 HRS | 104.0 | | | 104.0 | 104.0 | 4.33 | 4.33 | 01/08/99 | 06:00 AM | 01/08/99 | 06:00 AM |
| 0.0 | 0.0 | 0.0 HRS | | 104.0 | | 104.0 | 104.0 | 4.33 | 4.33 | 01/08/99 | 06:00 AM | 01/08/99 | 06:00 AM |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | | | 0.0 | 0.0 | 0.00 | 0.00 | | | | |
| 0.0 | 0.0 | 0.0 HRS | | 104.0 | | 104.0 | 104.0 | 4.33 | 4.33 | 01/08/99 | 06:00 AM | 01/08/99 | 06:00 AM |
| 0.0 | | 0.0 HRS | | 104.0 | | | 0.0 | | | 01/08/99 | 06:00 AM | 01/08/99 | 06:00 AM |
| | | | | | | | | | | HRS/CY | 0.0 | | |
| 1.0 | 0.0 | 1.0 HRS | 104.0 | | | 103.0 | 104.0 | 4.28 | 4.33 | 01/08/99 | 07:00 AM | 01/08/99 | 08:00 AM |
| 2.50 | 0.0 | 2.5 HRS | | 106.5 | | 104.0 | 106.5 | 4.33 | 4.44 | 01/08/99 | 08:00 AM | 01/08/99 | 10:30 AM |
| 0.63 | 0.0 | 0.5 HRS | | 107.1 | | 106.5 | 107.1 | 4.44 | 4.46 | 01/08/99 | 10:30 AM | 01/08/99 | 11:07 AM |
| 0.0 | 0.0 | 0.0 HRS | | | 107.1 | 107.1 | 107.1 | 4.46 | 4.46 | 01/08/99 | 11:07 AM | 01/08/99 | 11:07 AM |
| 0.0 | 0.0 | 0.0 HRS | | | 107.1 | 107.1 | 107.1 | 4.46 | 4.46 | 01/08/99 | 11:07 AM | 01/08/99 | 11:07 AM |
| 2.0 | 0.0 | 2.0 HRS | | | 109.1 | 107.1 | 109.1 | 4.46 | 4.55 | 01/08/99 | 11:07 AM | 01/08/99 | 01:07 PM |
| 5.1 | | 5.1 HRS | 106.5 | | | | | | | 01/08/99 | 07:00 AM | 01/08/99 | 01:07 PM |
| | | | | | | | | | | HRS/CY | 5.1 | | |
| 1.0 | 0.0 | 1.0 HRS | 105.6 | | | 105.6 | 106.5 | 4.40 | 4.44 | 01/08/99 | 09:30 AM | 01/08/99 | 10:30 AM |
| 6.0 | 0.0 | 6.0 HRS | | 112.5 | | 106.5 | 112.5 | 4.44 | 4.64 | 01/08/99 | 10:30 AM | 01/08/99 | 04:30 PM |
| 0.0 | 0.0 | 0.0 HRS | | 112.5 | | 112.5 | 112.5 | 4.68 | 4.68 | 01/08/99 | 04:10 PM | 01/08/99 | 04:30 PM |
| 0.0 | 0.0 | 0.0 HRS | | | 112.5 | 112.5 | 112.5 | 4.68 | 4.68 | 01/08/99 | 04:30 PM | 01/08/99 | 04:30 PM |
| 0.0 | 0.0 | 0.0 HRS | | | 112.5 | 112.5 | 112.5 | 4.68 | 4.68 | 01/08/99 | 04:30 PM | 01/08/99 | 04:30 PM |
| 0.0 | 0.0 | 0.0 HRS | | | 112.5 | 112.5 | 112.5 | 4.68 | 4.68 | 01/08/99 | 04:30 PM | 01/08/99 | 04:30 PM |
| 7.0 | | 7.0 HRS | 112.5 | | | | 112.5 | | | 01/08/99 | 09:30 AM | 01/08/99 | 04:30 PM |
| | | | | | | | | | | HRS/CY | 7.0 | | |
| 1.0 | 0.0 | 1.0 HRS | 112.5 | | | 111.0 | 112.0 | 4.65 | 4.68 | 01/08/99 | 03:30 PM | 01/08/99 | 04:30 PM |
| 3.00 | 0.0 | 3.0 HRS | | 115.5 | | 112.5 | 115.5 | 4.68 | 4.81 | 01/08/99 | 04:30 PM | 01/08/99 | 07:30 PM |
| 0.00 | 0.0 | 0.0 HRS | | 115.5 | | 115.5 | 115.5 | 4.81 | 4.81 | 01/08/99 | 07:30 PM | 01/08/99 | 07:30 PM |
| 0.0 | 0.0 | 0.0 HRS | | | 115.5 | 115.5 | 115.5 | 4.81 | 4.81 | 01/08/99 | 07:30 PM | 01/08/99 | 07:30 PM |
| 0.00 | 0.0 | 0.0 HRS | | | 115.5 | 115.5 | 115.5 | 4.81 | 4.81 | 01/08/99 | 07:30 PM | 01/08/99 | 07:30 PM |
| 1.00 | 0.0 | 1.0 HRS | | | 116.5 | 115.5 | 116.5 | 4.81 | 4.85 | 01/08/99 | 07:30 PM | 01/08/99 | 08:30 PM |
| 5.00 | | 5.00 HRS | 115.5 | | | | | | | 01/08/99 | 03:30 PM | 01/08/99 | 08:30 PM |
| | | | | | | | | | | HRS/CY | 5.0 | | |
| 1.0 | 0.0 | 1.0 HRS | 115.5 | | | 114.5 | 115.5 | 4.77 | 4.81 | 01/08/99 | 06:30 PM | 01/08/99 | 07:30 PM |
| 2.50 | 0.0 | 2.5 HRS | | 118.0 | | 115.5 | 118.0 | 4.81 | 4.92 | 01/08/99 | 07:30 PM | 01/08/99 | 10:00 PM |
| 0.00 | 0.0 | 0.0 HRS | | 118.0 | | 118.0 | 118.0 | 4.92 | 4.92 | 01/08/99 | 10:00 PM | 01/08/99 | 10:00 PM |

| OPERATION | CALCULATIONS |
|---|---|
| CIP<br>SIP<br>CLEAN UP | |
| SUB TOTAL | 57.6 |
| 6.1.1.1 31 HOMOGENIZATION<br>  SET UP<br>  LYOS<br>  WASH<br>  CIP<br>  SIP<br>  CLEAN UP | <br><br>8634.7 L IN    2.5 HRS = 57.6 LPM<br>0.0 L IN    0.0 HRS = 0.0 LPM |
| SUB TOTAL | 57.56434 |
| 7.1.1.1 51 OUTLET HEAT EXCHANGE<br>  SET UP<br>  TRANSFER<br>  WASH<br>  CIP<br>  SIP<br>  CLEAN UP | <br><br>8543.7 L IN    2.5 HRS = 57.56 LPM<br>0.0 L IN    0.0 HRS = 0.0 LPM |
| SUB TOTAL | 57.56 |
| 5.1.2.1 61 INLET HEAT EXCHANGE<br>  SET UP<br>  TRANSFER<br>  WASH<br>  CIP<br>  SIP<br>  CLEAN UP | <br><br>8634.7 L IN    2.5 HRS = 57.56 LPM<br>0.0 L IN    0.0 HRS = 0.0 LPM |
| SUB TOTAL | |
| 6.1.2.1 31 HOMOGENIZATION<br>  SET UP<br>  DILUTION<br>  WO<br>  CIP<br>  SIP<br>  CLEAN UP | <br><br>8634.7 L IN    2.5 HRS = 57.6 LPM<br>0.0 L IN    0.0 HRS = 0.0 LPM |
| SUB TOTAL | 57.56 |
| 7.1.2.1 51 OUTLET HEAT EXCHANGE | |

| OPERATION | CALCULATIONS | | | | |
|---|---|---|---|---|---|
| SET UP | | | | | |
| TRANSFER | 8643.7 L IN | | 2.5 HRS | = | 57.56 LPM |
| WASH | 0.0 L IN | | 0.0 HRS | = | 0.0 LPM |
| CIP | | | | | |
| SIP | | | | | |
| CLEAN UP | | | | | |
| SUB TOTAL | | | | | |
| 5.1.3.1 51 INLET HEAT EXCHANGE | | | | | |
| SET UP | | | | | |
| TRANSFER | 8634.7 L IN | | 2.5 HRS | = | 57.58 LPM |
| WASH | 9.0 L IN | | 0.0 HRS | = | 57.6 LPM |
| CIP | | | | | |
| SIP | | | | | |
| CLEAN UP | | | | | |
| SUB TOTAL | | | | | |
| 6.1.3.1 31 HOMOGENIZATION | | | | | |
| SET UP | | | | | |
| LYCIS | 8634.7 L IN | | 2.5 HRS | = | 57.6 LPM |
| WASH | 9.0 L IN | | 0.0 HRS | = | 57.6 LPM |
| CIP | | | | | |
| SIP | | | | | |
| CLEAN UP | | | | | |
| SUB TOTAL | | | | | 57.56 LPM |
| 7.1.3.1 51 OUTLET HEAT EXCHANGE | | | | | |
| SET UP | | | | | |
| TRANSFER | 8643.7 L IN | | 2.5 HRS | = | 57.58 LPM |
| WASH | 9.0 L IN | | 0.0 HRS | = | 57.6 LPM |
| CIP | | | | | |
| SIP | | | | | |
| CLEAN UP | | | | | |
| SUB TOTAL | | | | | |

FIG.23C-1

| PROCESS TIME LINE | | | | | | | | | | | | | |
|---|---|---|---|---|---|---|---|---|---|---|---|---|---|
| DURATION (HRS) | | | REL. TIME SCALE (HRS) | | | ABS. HOURS | | ABS. DAYS | | START | | FINISH | |
| CALC. | LOG | ADJ. | PREP | EXEC. | COMPL. | START | END | START | END | DATE | TIME | DATE | TIME |
| 0.0 | 0.0 | 0.0 HRS | 123.0 | | | 123.0 | 123.0 | 5.13 | 5.13 | 01/08/99 | 03:00 AM | 01/08/99 | 03:00 AM |
| 2.50 | 0.0 | 2.5 HRS | | 125.5 | | 123.0 | 125.5 | 5.13 | 5.23 | 01/08/99 | 03:00 AM | 01/08/99 | 05:30 AM |
| 0.00 | 0.0 | 0.0 HRS | | 125.5 | | 125.5 | 125.5 | 5.23 | 5.23 | 01/08/99 | 05:30 AM | 01/08/99 | 05:30 AM |
| 0.0 | 0.0 | 0.0 HRS | | | 125.5 | 125.5 | 125.5 | 5.23 | 5.23 | 01/08/99 | 05:30 AM | 01/08/99 | 05:30 AM |
| 0.0 | 0.0 | 0.0 HRS | | | | 125.5 | 125.5 | 5.23 | 5.23 | 01/08/99 | 05:30 AM | 01/08/99 | 05:30 AM |
| 0.0 | 0.0 | 0.0 HRS | | | | 125.5 | 125.5 | 5.23 | 5.23 | 01/08/99 | 05:30 AM | 01/08/99 | 05:30 AM |
| 2.5 | | 2.5 HRS | | 125.5 | | | | | | 01/08/99 | 03:00 AM | 01/08/99 | 05:30 AM |
| | | | | | | | | | | HRS/CY | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.50 | 0.0 | 2.5 HRS | | 128.0 | | 125.5 | 128.0 | 5.23 | 5.33 | 01/08/99 | 05:30 AM | 01/08/99 | 08:00 AM |
| 0.0 | 0.0 | 0.0 HRS | | 128.0 | | 128.0 | 128.0 | 5.33 | 5.33 | 01/08/99 | 08:00 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 2.5 | | 2.5 HRS | | 128.0 | | | | | | 01/08/99 | 05:30 AM | 01/08/99 | 08:01 AM |
| | | | | | | | | | | HRS/CY | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.5 | 0.0 | 2.5 HRS | | 128.0 | | 125.5 | 128.0 | 5.23 | 5.33 | 01/08/99 | 05:30 AM | 01/08/99 | 08:00 AM |
| 0.0 | 0.0 | 0.0 HRS | | 128.0 | | 128.0 | 128.0 | 5.33 | 5.33 | 01/08/99 | 08:00 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 2.5 | | 2.5 HRS | | 128.0 | | 128.0 | | | | 01/08/99 | 05:30 AM | 01/08/99 | 08:01 AM |
| | | | | | | | | | | HRS/CY | 2.5 | | |
| | | | | | | | | | | OK | | | |
| 0.0 | 0.0 | 0.0 HRS | 125.5 | | | 125.5 | 125.5 | 5.23 | 5.23 | 01/08/99 | 05:30 AM | 01/08/99 | 05:30 AM |
| 2.50 | 0.0 | 2.5 HRS | | 128.0 | | 125.5 | 128.0 | 5.23 | 5.33 | 01/08/99 | 05:30 AM | 01/08/99 | 08:01 AM |
| 0.0 | 0.0 | 0.0 HRS | | 128.0 | | 128.0 | 128.0 | 5.33 | 5.33 | 01/08/99 | 08:01 AM | 01/08/99 | 08:01 AM |
| 0.0 | 0.0 | 0.0 HRS | | | 128.0 | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 0.0 | 0.0 | 0.0 HRS | | | | 128.0 | 128.0 | 5.33 | 5.33 | 01/08/99 | 08:01 AM | 01/08/99 | 08:01 AM |
| 2.5 | | 2.5 HRS | | 128.0 | | 128.0 | | | | 01/08/99 | 05:30 AM | 01/08/99 | 08:01 AM |
| | | | | | | | | | | HRS/CY | 2.5 | | |
| | | | | | | | | | | OK | | | |

FIG.23C-2

| | FIRST SHIFT | | | | SECOND SHIFT | | | |
|---|---|---|---|---|---|---|---|---|
| | START | 07:00 AM | FINISH | 03:00 PM | START | 03:00 PM | FINISH | 11:00 PM |
| OPERATION | DATE | TIME | DATE | TIME | DATE | TIME | DATE | TIME |
| 1.1.1 T76 MULTI-STAGE POOL | 01/08/99 | 08:00 AM | 01/08/99 | 08:00 AM | | | | |
| | 01/08/99 | 08:00 AM | 01/08/99 | 08:00 AM | | | | |
| SET UP | | | | | | | | |
| INPUT 1 | | | | | | | | |
| INPUT 2 | | | | | | | | |
| INPUT 3 | | | | | | | | |
| INPUT 4 | | | | | | | | |
| INPUT 5 | | | | | | | | |
| INPUT 6 | | | | | | | | |
| POOL INPUTS | 01/08/99 | 08:00 AM | 01/08/99 | 08:00 AM | | | | |
| SUB TOTAL | | | | | | | | |
| 2.1.1.1 51 OUTLET HEAT EXCHANGE | | | 01/08/99 | 08:00 AM | | | | |
| SET UP | | | | | | | | |
| TRANSFER | 01/08/99 | 08:00 AM | 01/08/99 | 10:30 AM | | | | |
| WASH | 01/08/99 | 10:30 AM | 01/08/99 | 11:07 AM | | | | |
| CIP | 01/08/99 | 11:07 AM | 01/08/99 | 11:07 AM | | | | |
| SIP | 01/08/99 | 11:07 AM | 01/08/99 | 11:07 AM | | | | |
| CLEAN UP | 01/08/99 | 11:07 AM | 01/08/99 | 01:07 PM | | | | |
| SUB TOTAL | | | | | | | | |
| 3.1.1.1 26 CONT. CERT/SOLIDS | | | | | | | | |
| SET UP | 01/08/99 | 08:30 AM | 01/08/99 | 10:30 AM | | | 01/08/99 | 04:30 PM |
| CENTRIFUGATION | 01/08/99 | 10:30 AM | | | 01/08/99 | 04:30 PM | 01/08/99 | 04:30 PM |
| WASH | | | | | 01/08/99 | 04:30 PM | 01/08/99 | 04:30 PM |
| CIP | | | | | 01/08/99 | 04:30 PM | 01/08/99 | 04:30 PM |
| SIP | | | | | 01/08/99 | 04:30 PM | 01/08/99 | 04:30 PM |
| CLEAN UP | | | | | 01/08/99 | 04:30 PM | 01/08/99 | 04:30 PM |
| SUB TOTAL | | | | | | | | |
| 4.1.1.1 40 RESOLUBILIZATION | | | | | | | | |
| SET UP | | | | | 01/08/99 | 03:30 PM | 01/08/99 | 04:30 PM |
| DILUTION | | | | | 01/08/99 | 04:30 PM | 01/08/99 | 07:30 PM |
| MO | | | | | 01/08/99 | 07:30 PM | 01/08/99 | 07:30 PM |
| CIP | | | | | 01/08/99 | 07:30 PM | 01/08/99 | 07:30 PM |
| SIP | | | | | 01/08/99 | 07:30 PM | 01/08/99 | 07:30 PM |
| CLEAN UP | | | | | 01/08/99 | 07:30 PM | 01/08/99 | 08:30 PM |
| SUB TOTAL | | | | | | | | |
| 5.1.1.1 61 INLET HEAT EXCHANGE | | | | | | | | |
| SET UP | | | | | 01/08/99 | 06:30 PM | 01/08/99 | 07:30 PM |
| TRANSFER | | | | | 01/08/99 | 07:30 PM | 01/08/99 | 10:00 PM |
| WASH | | | | | 01/08/99 | 10:00 PM | 01/08/99 | 10:00 PM |

FIG.23D-1

| THIRD SHIFT | | | |
|---|---|---|---|
| START | 11:04 PM | FINISH | 04:07 AM |
| DATE | TIME | DATE | TIME |
| | | | |
| | | | |
| 01/08/99 | 07:00 AM | | |
| | | | |
| | | | |
| | | | |

FIG.23D-2

| OPERATION | FIRST SHIFT | | | | SECOND SHIFT | | | |
|---|---|---|---|---|---|---|---|---|
| | START 07:00 AM | | FINISH 03:00 PM | | START 01:00 PM | | FINISH 11:00 PM | |
| | DATE | TIME | DATE | TIME | DATE | TIME | DATE | TIME |
| CIP | | | | | 01/08/99 | 10:00 PM | 01/08/99 | 10:00 PM |
| SIP | | | | | 01/08/99 | 10:00 PM | 01/08/99 | 10:00 PM |
| CLEAN UP | | | | | 01/08/99 | 10:00 PM | 01/08/99 | 10:00 PM |
| SUB TOTAL | | | | | | | | |
| 6.1.1.1 31 HOMOGENIZATION | | | | | | | | |
| SET UP | | | | | 01/08/99 | 09:00 PM | 01/08/99 | 10:00 PM |
| LYOS | | | | | 01/08/99 | 10:00 PM | | |
| WASH | | | | | | | | |
| CIP | | | | | | | | |
| SIP | | | | | | | | |
| CLEAN UP | | | | | | | | |
| SUB TOTAL | | | | | | | | |
| 7.1.1.1 51 OUTLET HEAT EXCHANGE | | | | | | | | |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 5.1.2.1 61 INLET HEAT EXCHANGE | | | | | | | | |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 6.1.2.1 31 HOMOGENIZATION | | | | | | | | |
| SET UP | | | | | | | | |
| LYOS | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 7.1.2.1 51 OUTLET HEAT EXCHANGE | | | | | | | | |

FIG. 23E-1

| THIRD SHIFT | | | |
|---|---|---|---|
| START | 11:00 PM | FINISH | 08:00 AM |
| DATE | TIME | DATE | TIME |
|  |  |  |  |
|  |  |  |  |
|  |  |  |  |
| 01/08/99 | 12:30 AM | 01/08/99 | 12:30 AM |
|  |  | 01/08/99 | 12:30 AM |
| 01/08/99 | 12:30 AM | 01/08/99 | 12:30 AM |
|  |  |  |  |
| 01/08/99 | 11:30 PM | 01/08/99 | 12:30 AM |
| 01/08/99 | 12:30 AM | 01/08/99 | 03:00 AM |
| 01/08/99 | 03:00 AM | 01/08/99 | 03:00 AM |
| 01/08/99 | 03:00 AM | 01/08/99 | 03:00 AM |
| 01/08/99 | 03:00 AM | 01/08/99 | 03:00 AM |
| 01/08/99 | 03:00 AM | 01/08/99 | 03:00 AM |
|  |  |  |  |
| 01/08/99 | 03:00 AM | 01/08/99 | 03:00 AM |
| 01/08/99 | 03:00 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
|  |  |  |  |
| 01/08/99 | 03:00 AM | 01/08/99 | 03:00 AM |
| 01/08/99 | 03:00 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
|  |  |  |  |
|  |  |  |  |

FIG. 23E-2

| OPERATION | FIRST SHIFT | | | | SECOND SHIFT | | | |
|---|---|---|---|---|---|---|---|---|
| | START 07:00 AM | | FINISH 03:00 PM | | START 03:00 PM | | FINISH 11:00 PM | |
| | DATE | TIME | DATE | TIME | DATE | TIME | DATE | TIME |
| SET UP | | | | | | | | |
| TRANSFER | | | | | | | | |
| WASH | | | | | | | | |
| CIP | | | | | | | | |
| SIP | | | | | | | | |
| CLEAN UP | | | | | | | | |
| SUB TOTAL | | | | | | | | |
| 5.1.3.1 61 INLET HEAT EXCHANGE | | | | | | | | |
| SET UP | | | | | | | | |
| TRANSFER | | | 01/08/99 | 08:00 AM | | | | |
| WASH | 01/08/99 | 08:00 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |
| 6.1.3.1 31 HOMOGENIZATION | | | | | | | | |
| SET UP | | | | | | | | |
| LYCIS | | | 01/08/99 | 08:00 AM | | | | |
| WASH | 01/08/99 | 08:00 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |
| 7.1.3.1 51 OUTLET HEAT EXCHANGE | | | | | | | | |
| SET UP | | | | | | | | |
| TRANSFER | | | 01/08/99 | 08:01 AM | | | | |
| WASH | 01/08/99 | 08:01 AM | 01/08/99 | 08:01 AM | | | | |
| CIP | 01/08/99 | 08:01 AM | 01/08/99 | 08:01 AM | | | | |
| SIP | 01/08/99 | 08:01 AM | 01/08/99 | 08:01 AM | | | | |
| CLEAN UP | 01/08/99 | 08:01 AM | 01/08/99 | 08:01 AM | | | | |
| SUB TOTAL | | | | | | | | |

FIG. 23F-1

| THIRD SHIFT | | | |
|---|---|---|---|
| START | 11:00 PM | FINISH | 05:30 AM |
| DATE | TIME | DATE | TIME |
| 01/08/99 | 03:00 AM | 01/08/99 | 05:00 AM |
| 01/08/99 | 03:00 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| 01/08/99 | 05:30 AM | 01/08/99 | 05:30 AM |
| | | | |
| 01/08/99 | 05:30 AM | 01/08/99 | 05:30 AM |
| 01/08/99 | 05:30 AM | | |
| | | | |
| 01/08/99 | 05:30 AM | 01/08/99 | 05:30 AM |
| 01/08/99 | 05:30 AM | | |
| | | | |
| 01/08/99 | 05:30 AM | 01/08/99 | 05:30 AM |
| 01/08/99 | 05:30 AM | | |
| | | | |

FIG. 23F-2

| | | | | | | | Batch Cycles/Process Cycle | | | | Lot Cycles/Process Cycle | | | |
|---|---|---|---|---|---|---|---|---|---|---|---|---|---|---|
| | Unit Operation (APT) Notes | Description Notes | Code Notes | Stage ID Notes | Stage Inputs Notes | Tag Notes | Iters. Notes | UnOp Start Notes | UnOp End Notes | Offset (Hrs) Notes | Iters. Notes | UnOp Start Notes | UnOp End Notes | Offset (Hrs) Notes |
| Stage 1 | | | | | | | | | | | | | | |
| 1 | Culture Vessel Seeding - Microcarrier Culture | Initial Seeding | | 1 | | 10101 | 1 | | | | 1 | | | |
| 2 | Spinner Flask Split - Microcarrier Culture | Spinner Flask Split | | 1 | | 10102 | 1 | | | | 1 | | | |
| 3 | Spinner Flask Split - Microcarrier Culture | Spinner Flask Split | | 1 | | 10103 | 1 | | | | 1 | | | |
| 4 | Spinner Flask Split - Microcarrier Culture | Spinner Flask Split | | 1 | | 10104 | 1 | | | | 1 | | | |
| 5 | Stirred Tank Reactor - Microcarrier Seed | 20 L Seed Reactor | | 1 | | 10105 | 1 | | | | 1 | | | |
| 6 | Stirred Tank Reactor - Microcarrier Seed | 60 L Seed Reactor | | 1 | | 10106 | 1 | | | | 1 | | | |
| 7 | Stirred Tank Reactor - Microcarrier Seed | 840 L Seed Reactor | | 1 | | 10107 | 1 | | | | 1 | | | |
| 8 | Stirred Tank Reactor - Microcarrier Seed | 4,000 L Seed Reactor | | 1 | | 10108 | 1 | | | | 1 | | | |
| Stage 2 | | | | | | | | | | | | | | |
| 9 | Up Stream Multi-Stage Input | | | 2 | 1 | 10201 | 1 | | | | 1 | | | |
| 10 | Stirred Tank Reactor - Microcarrier Preparation | Production Reactor 1 | | 2 | | 10202 | 1 | | | | 1 | | | |
| 11 | Stirred Tank Reactor - Microcarrier Production | Production Reactor 1 | | 2 | | 10203 | 1 | | | | 1 | | | |
| 12 | Harvest/Feed - Microcarrier Production | | | 2 | | 10204 | 20 | 10204 | 10315 | 72 | 10 | 10204 | 10315 | 144 |
| Stage 3 | | | | | | | | | | | | | | |
| 13 | Down Stream Multi-Stage Input | | | 3 | 2 | 10301 | 20 | 10301 | 10315 | 72 | 10 | 10301 | 10315 | 144 |
| 14 | Outlet Heat Exchange | Harvest Cooling to 25 C | | 3 | | 10302 | 20 | 10301 | 10315 | 72 | 10 | 10301 | 10315 | 144 |
| 15 | Cont. Centrifugation - Light Phase Harvest | | | 3 | | 10303 | 20 | 10301 | 10315 | 72 | 10 | 10301 | 10315 | 144 |
| 16 | Tangential Flow - Solids Removal | | | 3 | | 10304 | 20 | 10301 | 10315 | 72 | 10 | 10301 | 10315 | 144 |
| 17 | Prod. Ads. Chromatography - MPLC | Protein A Column | | 3 | | 10305 | 20 | 10301 | 10315 | 72 | 10 | 10301 | 10315 | 144 |
| 18 | Dilution 1 (LD/LP) - Batch | Viral Inactivation with HOAc | | 3 | | 10306 | 20 | 10301 | 10315 | 72 | 10 | 10301 | 10315 | 144 |
| 19 | Dilution 1 (LD/LP) - Batch | Adjustment to pH 8.0 | | 3 | | 10307 | 20 | 10301 | 10315 | 72 | 10 | 10301 | 10315 | 144 |
| 20 | Microfiltration - Dead End - Solids Removal | 0.45 u | | 3 | | 10308 | 20 | 10301 | 10315 | 72 | 10 | 10301 | 10315 | 144 |
| 21 | Microfiltration - Dead End - Solids Removal | 0.2 u | | 3 | | 10309 | 20 | 10301 | 10315 | 72 | 10 | 10301 | 10315 | 144 |
| 22 | Cont. Ads. Chromatography - MPLC | Anion Exchange Column | | 3 | | 10310 | 20 | 10301 | 10315 | 72 | 10 | 10301 | 10315 | 144 |
| 23 | Ultrafiltration - Concentration/Flow Dialysis | Concentration/Buffer Exchange | | 3 | | 10311 | 20 | 10301 | 10315 | 72 | 10 | 10301 | 10315 | 144 |
| 24 | Microfiltration - Dead End - Solids Removal | Nanofiltration | | 3 | | 10312 | 20 | 10301 | 10315 | 72 | 10 | 10301 | 10315 | 144 |
| 25 | Prod. Ads. Chromatography - MPLC | Cation Exchange Column | | 3 | | 10313 | 20 | 10301 | 10315 | 72 | 10 | 10301 | 10315 | 144 |
| 26 | Microfiltration - Dead End - Solids Removal | 0.2 u Filtration | | 3 | | 10314 | 20 | 10301 | 10315 | 72 | 10 | 10301 | 10315 | 144 |
| 27 | Liquid Storage | | | 3 | | 10315 | 20 | 10301 | 10315 | 72 | 10 | 10301 | 10315 | 144 |

FIG. 47

| | Unit Operation (APT) | Description | Code | Stage ID | Stage Inputs | Tag | Process Design Cycles | | | | | |
|---|---|---|---|---|---|---|---|---|---|---|---|---|
| | | | | | | | Unit Operation Cycles/Cluster Level 1 Cycle | | | | | |
| | | | | | | | Main Cycles | | Sub Cycles | | Offset (Hrs) | |
| | | | | | | | Iters. | Offset (Hrs) | Iters. | | | |
| Stage 1 | | | | | | | | | | | | |
| 1 | Plant Material Milling/Grinding | Grinding of Plant Material | | 1 | 1 | 10101 | | | | | | |
| Stage 2 | | | | | | | | | | | | |
| 2 | DS Multi-Stage Input | | | 2 | | 10201 | 1 | | | | | |
| 3 | Solid/Liquid Extraction | Aqueous Extraction | | 2 | | 10202 | 1 | | 1 | | | |
| 4 | Dilution | Absorbant Addition | | 2 | | 10203 | 1 | | 1 | | | |
| 5 | Microfiltration - Dead End - Solids Recovery | Absorbed Product Recovery | | 2 | | 10204 | 1 | | 1 | | | |
| 6 | Resuspension | Dissociation of Absorbed Product | | 2 | | 10205 | 1 | | 1 | | | |
| 7 | Vacuum Drying - Rotary | Vacuum Dry | | 2 | | 10206 | 1 | | 1 | | | |
| Stage 3 | | | | | | | | | | | | |
| 11 | DS Multi-Stage Input | | | 3 | 2 | 10301 | 1 | | | | | |
| 12 | Microfiltration - Dead End | Filter Press | | 3 | | 10302 | 1 | | 2 | | | |
| 13 | Ultrafiltration - Concentration | Product Concentration | | 3 | | 10303 | 1 | | 2 | | | |
| 14 | Microfiltration - Dead End - Solids Removal | Product Clarification | | 3 | | 10304 | 1 | | 2 | | | |
| Stage 4 | | | | | | | | | | | | |
| 15 | DS Multi-Stage Input | | | 4 | 4 | 10401 | 1 | | | | | |
| 16 | Prod. Ads. Chromatography - MPLC | Chromatography 1 | | 4 | | 10402 | 1 | | 1 | | | |
| 17 | Prod. Ads. Chromatography - MPLC | Chromatography 2 | | 4 | | 10403 | 1 | | 1 | | | |
| 18 | Ultrafiltration - Concentration/Flow Dialysis | Buffer Exchange | | 4 | | 10404 | 1 | | 1 | | | |
| 19 | Prod. Ads. Chromatography - MPLC | Chromatography 3 | | 4 | | 10405 | 1 | | 1 | | | |
| 20 | Microfiltration - Dead End | Sterile Filtration | | 4 | | 10406 | 1 | | 1 | | | |
| 21 | Ultrafiltration - Concentration | Product Concentration | | 4 | | 10407 | 1 | | 1 | | | |
| 22 | Lyophilization | Freeze Dry | | 4 | | 10408 | 1 | | 1 | | | |

| Unit Operation (APT) | Unit Operation Cluster Level 1 Cycle/Cluster Level 2 Cycle | | | | | | | | | Unit Operation Cluster Level 2 Cycles/Cluster Level 3 Cycle | | | | | | | |
|---|---|---|---|---|---|---|---|---|---|---|---|---|---|---|---|---|---|
| | Iters. | Main Cycles | | Offset (Hrs) | Iters. | Sub Cycles | | Offset (Hrs) | | Iters. | Main Cycles | | Offset (Hrs) | Iters. | Sub Cycles | | Offset (Hrs) |
| | | UnOp Start | UnOp End | | | UnOp Start | UnOp End | | | | UnOp Start | UnOp End | | | UnOp Start | UnOp End | |
| Stage 1 | | | | | | | | | | | | | | | | | |
| 1  Plant Material Milling/Grinding | 1 | | | | | | | | | 3 | 10101 | 10304 | 24 | 1 | | | |
| Stage 2 | | | | | | | | | | | | | | | | | |
| 2  DS Multi-Stage Input | 2 | 10201 | 10302 | 12 | 1 | | | | | 3 | 10101 | 10304 | 24 | 1 | | | |
| 3  Solid/Liquid Extraction | 2 | 10201 | 10302 | 12 | 1 | | | | | 3 | 10101 | 10304 | 24 | 1 | | | |
| 4  Dilution | 2 | 10201 | 10302 | 12 | 1 | | | | | 3 | 10101 | 10304 | 24 | 1 | | | |
| 5  Microfiltration - Dead End - Solids Recovery | 2 | 10201 | 10302 | 12 | 1 | | | | | 3 | 10101 | 10304 | 24 | 1 | | | |
| 6  Resuspension | 2 | 10201 | 10302 | 12 | 1 | | | | | 3 | 10101 | 10304 | 24 | 1 | | | |
| 7  Vacuum Drying - Rotary | 2 | 10201 | 10302 | 12 | 1 | | | | | 3 | 10101 | 10304 | 24 | 1 | | | |
| Stage 3 | | | | | | | | | | | | | | | | | |
| 11  DS Multi-Stage Input | 2 | 10201 | 10302 | 12 | 1 | | | | | 3 | 10101 | 10304 | 24 | 1 | | | |
| 12  Microfiltration - Dead End | 2 | 10201 | 10302 | 12 | 1 | | | | | 3 | 10101 | 10304 | 24 | 1 | | | |
| 13  Ultrafiltration - Concentration | | | | | | | | | | 3 | 10101 | 10304 | 24 | 1 | | | |
| 14  Microfiltration - Dead End - Solids Removal | | | | | | | | | | 3 | 10101 | 10304 | 24 | 1 | | | |
| Stage 4 | | | | | | | | | | | | | | | | | |
| 15  DS Multi-Stage Input | 1 | | | | | | | | | 1 | | | | 1 | | | |
| 16  Prod. Ads. Chromatography - MPLC | 1 | | | | | | | | | 1 | | | | 1 | | | |
| 17  Prod. Ads. Chromatography - MPLC | 1 | | | | | | | | | 1 | | | | 1 | | | |
| 18  Ultrafiltration - Concentration/Flow Dialysis | 1 | | | | | | | | | 1 | | | | 1 | | | |
| 19  Prod. Ads. Chromatography - MPLC | 1 | | | | | | | | | 1 | | | | 1 | | | |
| 20  Microfiltration - Dead End | 1 | | | | | | | | | 1 | | | | 1 | | | |
| 21  Ultrafiltration - Concentration | 1 | | | | | | | | | 1 | | | | 1 | | | |
| 22  Lyophilization | 1 | | | | | | | | | 1 | | | | 1 | | | |

FIG 48C

| | Unit Operation (APT) | Unit Operation Cluster Level 3 Cycles/Batch Cycle | | | | | | | Batch Cycles/Process Cycle | | | | | Lot Cycles/Process Cycle | | | |
|---|---|---|---|---|---|---|---|---|---|---|---|---|---|---|---|---|---|
| | | Main Cycles | | | Sub Cycles | | | | | | | | | | | | |
| | | Iters. | UnOp Start | UnOp End | Offset (Hrs) | Iters. | UnOp Start | UnOp End | Offset (Hrs) | Iters. | UnOp Start | UnOp End | Offset (Hrs) | Iters. | UnOp Start | UnOp End | Offset (Hrs) |
| | Stage 1 | | | | | | | | | | | | | | | | |
| 1 | Plant Material Milling/Grinding | 2 | 10101 | 10405 | 72 | 1 | | | | 1 | | | | 1 | | | |
| | Stage 2 | | | | | | | | | | | | | | | | |
| 2 | DS Multi-Stage Input | 2 | 10101 | 10405 | 72 | 1 | | | | 1 | | | | 1 | | | |
| 3 | Solid/Liquid Extraction | 2 | 10101 | 10405 | 72 | 1 | | | | 1 | | | | 1 | | | |
| 4 | Dilution | 2 | 10101 | 10405 | 72 | 1 | | | | 1 | | | | 1 | | | |
| 5 | Microfiltration - Dead End - Solids Recovery | 2 | 10101 | 10405 | 72 | 1 | | | | 1 | | | | 1 | | | |
| 6 | Resuspension | 2 | 10101 | 10405 | 72 | 1 | | | | 1 | | | | 1 | | | |
| 7 | Vacuum Drying - Rotary | 2 | 10101 | 10405 | 72 | 1 | | | | 1 | | | | 1 | | | |
| | Stage 3 | | | | | | | | | | | | | | | | |
| 11 | DS Multi-Stage Input | 2 | 10101 | 10405 | 72 | 1 | | | | 1 | | | | 1 | | | |
| 12 | Microfiltration - Dead End | 2 | 10101 | 10405 | 72 | 1 | | | | 1 | | | | 1 | | | |
| 13 | Ultrafiltration - Concentration | 2 | 10101 | 10405 | 72 | 1 | | | | 1 | | | | 1 | | | |
| 14 | Microfiltration - Dead End - Solids Removal | 2 | 10101 | 10405 | 72 | 1 | | | | 1 | | | | 1 | | | |
| | Stage 4 | | | | | | | | | | | | | | | | |
| 15 | DS Multi-Stage Input | 2 | 10101 | 10405 | 72 | 1 | | | | 1 | | | | 1 | | | |
| 16 | Prod. Ads. Chromatography - MPLC | 2 | 10101 | 10405 | 72 | 1 | | | | 1 | | | | 1 | | | |
| 17 | Prod. Ads. Chromatography - MPLC | 2 | 10101 | 10405 | 72 | 1 | | | | 1 | | | | 1 | | | |
| 18 | Ultrafiltration - Concentration/Flow Dialysis | 2 | 10101 | 10405 | 72 | 1 | | | | 1 | | | | 1 | | | |
| 19 | Prod. Ads. Chromatography - MPLC | 2 | 10101 | 10405 | 72 | 1 | | | | 1 | | | | 1 | | | |
| 20 | Microfiltration - Dead End | 1 | 10101 | | | | | | | | | | | | | | |
| 21 | Ultrafiltration - Concentration | 1 | 10101 | | | | | | | | | | | | | | |
| 22 | Lyophilization | | | | | | | | | | | | | | | | |

FIG 49

| | | 5003 | | | 5004 | | | | | | Unit Operation Cycles/Cluster Level 1 Cycle | | | | |
|---|---|---|---|---|---|---|---|---|---|---|---|---|---|---|---|
| 5001 | 5002 | | | | | | | | | | | | | 5011 | 5012 |
| | | | | | Duration (Hrs.) | | | Main Cycles | | | | Sub Cycles | | | |
| | Operation | Calculations | | | Calc. | | Iters. | Offset (Hrs) | TC Status | TC/ UC | Iters. | Offset (Hrs) | TC Status | TC | TC/ MC |
| 10305 Prod. Ads. Chromatography - MPLC | | | | | | | 1 | 0 | | | 3 | 0 | | | |
| Protein A Column | | 80.0 CM Dia | | | | | | | | | | | | | |
| | | 100.0 Mx. CM/Hr | | | | | | | | | | | | | |
| | Set Up | | | | 1.0 | | | | | | | | | | 1 |
| | Equilibration 1 | 729.8 L @ | 100.00% x Max. CM/Hr = | 100 CM/Hr = | 8.37 LPM | 1.5 | | | | | | | | First Iter. | 3 |
| | Equilibration 2 | 0.0 L @ | 100.00% x Max. CM/Hr = | 100 CM/Hr = | 8.37 LPM | 0.0 | | | | | | | | Each Iter. | 3 |
| | Equilibration 3 | 0.0 L @ | 100.00% x Max. CM/Hr = | 100 CM/Hr = | 8.37 LPM | 0.0 | | | | | | | | Each Iter. | 3 |
| | Load | 4,132.3 L @ | 100.00% x Max. CM/Hr = | 100 CM/Hr = | 8.37 LPM | 8.2 | | | | 3 | | | | Each Iter. | 3 |
| | Wash 1 | 729.8 L @ | 100.00% x Max. CM/Hr = | 100 CM/Hr = | 8.37 LPM | 1.5 | | | | 3 | | | | Each Iter. | 3 |
| | Wash 2 | 0.0 L @ | 100.00% x Max. CM/Hr = | 100 CM/Hr = | 8.37 LPM | 0.0 | | | | 3 | | | | Each Iter. | 3 |
| | Elute 1 | 291.9 L @ | 100.00% x Max. CM/Hr = | 100 CM/Hr = | 8.37 LPM | 0.6 | | | | 3 | | | | Each Iter. | 3 |
| | Elute 2 | 0.0 L @ | 100.00% x Max. CM/Hr = | 100 CM/Hr = | 8.37 LPM | 0.0 | | | | 3 | | | | Each Iter. | 3 |
| | Regenerate 1 | 437.9 L @ | 100.00% x Max. CM/Hr = | 100 CM/Hr = | 8.37 LPM | 0.9 | | | | 3 | | | | Each Iter. | 3 |
| | Regenerate 2 | 437.9 L @ | 100.00% x Max. CM/Hr = | 100 CM/Hr = | 8.37 LPM | 0.9 | | | | 1 | | | | Last Iter. | 1 |
| | Regenerate 3 | 0.0 L @ | 100.00% x Max. CM/Hr = | 100 CM/Hr = | 8.37 LPM | 0.0 | | | | 1 | | | | Last Iter. | 1 |
| | Regenerate 4 | 0.0 L @ | 100.00% x Max. CM/Hr = | 100 CM/Hr = | 8.37 LPM | 0.0 | | | | 1 | | | | Last Iter. | 1 |
| | Store | 437.9 L @ | 100.00% x Max. CM/Hr = | 100 CM/Hr = | 8.37 LPM | 0.9 | | | | 1 | | | | Last Iter. | 1 |
| | CIP | | | | 5.0 | | | | | 1 | | | | Last Iter. | 1 |
| | SIP | | | | 1.0 | | | | | 1 | | | | Last Iter. | 1 |
| | Clean Up | | | | 1.0 | | | | | 1 | | | | Last Iter. | 1 |
| | Sub Total | | | 8.37 LPM Max. | 14.3 | | | | | | | | | | |
| | | | | 8.37 LPM Min. | | | | | | | | | | | |

| | Main Cycles | | | Unit Operation Cluster Level 3 Cycles/Batch Cycle | | | | Sub Cycles | | | | Batch Cycles/Process Cycle | | | | | Lot Cycles/Process Cycles | | | | | UOC or TC /Batch |
|---|---|---|---|---|---|---|---|---|---|---|---|---|---|---|---|---|---|---|---|---|---|---|
| UnOp Start 5038 | UnOp End 5039 | Offset (Hrs) 5040 | TC Status 5041 | TC/UC 5042 | Iters. 5043 | UnOp Start 5044 | UnOp End 5045 | Offset (Hrs) 5046 | TC Status 5047 | TC/UC 5048 | Iters. 5049 | UnOp Start 5050 | UnOp End 5051 | Offset (Hrs) 5052 | TC Status 5053 | TC/UC 5054 | Iters. 5055 | UnOp Start 5056 | UnOp End 5057 | Offset (Hrs) 5058 | TC Status 5059 | TC/UC 5060 | 5001 |
| 0 | 0 | 0 | | 0 | 1 | 0 | 0 | 0 | | 0 | 20 | 10301 | 10315 | 72 | | 0 | 10 | 10301 | 10315 | 144 | | 0 | 1.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | | 0 | | | | | | 0 | 3.0 |
| | | | | 0 | | | | | | 0 | | | | | Last Iter. | 0.9 | | | | | | 0 | 3.0 |
| | | | | 0 | | | | | | 0 | | | | | | 0 | | | | | | 0 | 0.3 |
| | | | | 0 | | | | | | 0 | | | | | | 0 | | | | | | 0 | 1.0 |
| | | | | 0 | | | | | | 0 | | | | | | 0 | | | | | | 0 | 1.0 |
| | | | | 0 | | | | | | 0 | | | | | | 0 | | | | | | 0 | 1.0 |
| | | | | 0 | | | | | | 0 | | | | | | 0 | | | | | | 0 | 1.0 |
| | | | | 0 | | | | | | 0 | | | | | | 0 | | | | | | 0 | 1.0 |

| | | 5402 | 5404 | 5406 | 5408 | 5410 | 5412 | 5414 | 5416 | 5426 | 5428 | 5430 | 5432 |
|---|---|---|---|---|---|---|---|---|---|---|---|---|---|
| | | | | Process Time Line | | | | | | | | | |
| | | | | Duration (Hrs.) | | | Rel. Time Scale (Hrs) | | | Start | | Finish | |
| | | | Operation | Calc. | Lag | Adj. | Prep | Exec. | Compl. | Date | Time | Date | Time |
| 10305.1.2.1.1.1.1.1.1.1.1 | Prod. Ads. Chromatography - MPLC | | | | | | | | | | | | |
| | Protein A Column | | | | | | | | | | | | |
| | Set Up | | | 1.0 | 0.0 | 1.0 Hrs | 1933.0 | | | 3/27/2003 | 6:59 PM | 3/27/2003 | 7:59 PM |
| | Equilibration 1 | | | 1.5 | 0.0 | 1.5 Hrs | 1934.5 | | | 3/27/2003 | 7:59 PM | 3/27/2003 | 9:27 PM |
| | Equilibration 2 | | | 0.0 | 0.0 | 0.0 Hrs | 1934.5 | | | 3/27/2003 | 9:27 PM | 3/27/2003 | 9:27 PM |
| | Equilibration 3 | | | 0.0 | 0.0 | 0.0 Hrs | 1934.5 | | | 3/27/2003 | 9:27 PM | 3/27/2003 | 9:27 PM |
| | Load | | | 8.2 | 0.0 | 8.2 Hrs | | 1942.7 | | 3/27/2003 | 9:27 PM | 3/28/2003 | 5:40 AM |
| | Wash 1 | | | 1.5 | 0.0 | 1.5 Hrs | | 1944.1 | | 3/28/2003 | 5:40 AM | 3/28/2003 | 7:07 AM |
| | Wash 2 | | | 0.0 | 0.0 | 0.0 Hrs | | 1944.1 | | 3/28/2003 | 7:07 AM | 3/28/2003 | 7:07 AM |
| | Elute 1 | | | 0.6 | 0.0 | 0.6 Hrs | | 1944.7 | | 3/28/2003 | 7:07 AM | 3/28/2003 | 7:42 AM |
| | Elute 2 | | | 0.0 | 0.0 | 0.0 Hrs | | 1944.7 | | 3/28/2003 | 7:42 AM | 3/28/2003 | 7:42 AM |
| | Regenerate 1 | | | 0.9 | 0.0 | 0.9 Hrs | | | 1945.6 | 3/28/2003 | 7:42 AM | 3/28/2003 | 8:34 AM |
| | Regenerate 2 | | | 0.0 | 0.0 | 0.0 Hrs | | | 1945.6 | 3/28/2003 | 8:34 AM | 3/28/2003 | 8:34 AM |
| | Regenerate 3 | | | 0.0 | 0.0 | 0.0 Hrs | | | 1945.6 | 3/28/2003 | 8:34 AM | 3/28/2003 | 8:34 AM |
| | Regenerate 4 | | | 0.0 | 0.0 | 0.0 Hrs | | | 1945.6 | 3/28/2003 | 8:34 AM | 3/28/2003 | 8:34 AM |
| | Store | | | 0.0 | 0.0 | 0.0 Hrs | | | 1945.6 | 3/28/2003 | 8:34 AM | 3/28/2003 | 8:34 AM |
| | CIP | | | 0.0 | 0.0 | 0.0 Hrs | | | 1945.6 | 3/28/2003 | 8:34 AM | 3/28/2003 | 8:34 AM |
| | SIP | | | 0.0 | 0.0 | 0.0 Hrs | | | 1945.6 | 3/28/2003 | 8:34 AM | 3/28/2003 | 8:34 AM |
| | Clean Up | | | 0.0 | 0.0 | 0.0 Hrs | | | 1945.6 | 3/28/2003 | 8:34 AM | 3/28/2003 | 8:34 AM |
| | Sub Total | | | 13.6 | | 13.6 Hrs | | 1944.7 | | 3/27/2003 | 6:59 PM | 3/28/2003 | 8:34 AM |
| | | | | Hrs/Cy | | 13.58 / 1 | | | | | | | |
| | | | | Check | | | | | | | | | |
| 10305.1.2.1.1.1.1.1.1.1.2 | Prod. Ads. Chromatography - MPLC | | | | | | | | | | | | |
| | Protein A Column | | | | | | | | | | | | |
| | Set Up | | | 0.0 | 0.0 | 0.0 Hrs | 1943.3 | | | 3/28/2003 | 6:15 AM | 3/28/2003 | 6:15 AM |
| | Equilibration 1 | | | 1.5 | 0.0 | 1.5 Hrs | 1944.7 | | | 3/28/2003 | 6:15 AM | 3/28/2003 | 7:42 AM |
| | Equilibration 2 | | | 0.0 | 0.0 | 0.0 Hrs | 1944.7 | | | 3/28/2003 | 7:42 AM | 3/28/2003 | 7:42 AM |
| | Equilibration 3 | | | 0.0 | 0.0 | 0.0 Hrs | 1944.7 | | | 3/28/2003 | 7:42 AM | 3/28/2003 | 7:42 AM |
| | Load | | | 8.2 | 0.0 | 8.2 Hrs | | 1952.9 | | 3/28/2003 | 7:42 AM | 3/28/2003 | 3:58 PM |
| | Wash 1 | | | 1.5 | 0.0 | 1.5 Hrs | | 1954.4 | | 3/28/2003 | 3:58 PM | 3/28/2003 | 5:23 PM |
| | Wash 2 | | | 0.0 | 0.0 | 0.0 Hrs | | 1954.4 | | 3/28/2003 | 5:23 PM | 3/28/2003 | 5:23 PM |
| | Elute 1 | | | 0.6 | 0.0 | 0.6 Hrs | | 1955.0 | | 3/28/2003 | 5:23 PM | 3/28/2003 | 5:58 PM |
| | Elute 2 | | | 0.0 | 0.0 | 0.0 Hrs | | 1955.0 | | 3/28/2003 | 5:58 PM | 3/28/2003 | 5:58 PM |
| | Regenerate 1 | | | 0.9 | 0.0 | 0.9 Hrs | | | 1955.8 | 3/28/2003 | 5:58 PM | 3/28/2003 | 6:50 PM |
| | Regenerate 2 | | | 0.0 | 0.0 | 0.0 Hrs | | | 1955.8 | 3/28/2003 | 6:50 PM | 3/28/2003 | 6:50 PM |
| | Regenerate 3 | | | 0.0 | 0.0 | 0.0 Hrs | | | 1955.8 | 3/28/2003 | 6:50 PM | 3/28/2003 | 6:50 PM |
| | Regenerate 4 | | | 0.0 | 0.0 | 0.0 Hrs | | | 1955.8 | 3/28/2003 | 6:50 PM | 3/28/2003 | 6:50 PM |
| | Store | | | 0.0 | 0.0 | 0.0 Hrs | | | 1955.8 | 3/28/2003 | 6:50 PM | 3/28/2003 | 6:50 PM |
| | CIP | | | 0.0 | 0.0 | 0.0 Hrs | | | 1955.8 | 3/28/2003 | 6:50 PM | 3/28/2003 | 6:50 PM |
| | SIP | | | 0.0 | 0.0 | 0.0 Hrs | | | 1955.8 | 3/28/2003 | 6:50 PM | 3/28/2003 | 6:50 PM |
| | Clean Up | | | 0.0 | 0.0 | 0.0 Hrs | | | 1955.8 | 3/28/2003 | 6:50 PM | 3/28/2003 | 6:50 PM |
| | Sub Total | | | 12.6 | | 12.6 Hrs | | 1955.0 | | 3/28/2003 | 6:15 AM | 3/28/2003 | 6:50 PM |
| | | | | Hrs/Cy | | 12.58 / 1 | | | | | | | |
| | | | | Check | | | | | | | | | |
| 10305.1.2.1.1.1.1.1.1.1.3 | Prod. Ads. Chromatography - MPLC | | | | | | | | | | | | |
| | Protein A Column | | | | | | | | | | | | |
| | Set Up | | | 0.0 | 0.0 | 0.0 Hrs | 1953.5 | | | 3/28/2003 | 4:30 PM | 3/28/2003 | 4:30 PM |
| | Equilibration 1 | | | 1.5 | 0.0 | 1.5 Hrs | 1955.0 | | | 3/28/2003 | 4:30 PM | 3/28/2003 | 5:58 PM |
| | Equilibration 2 | | | 0.0 | 0.0 | 0.0 Hrs | 1955.0 | | | 3/28/2003 | 5:58 PM | 3/28/2003 | 5:58 PM |
| | Equilibration 3 | | | 0.0 | 0.0 | 0.0 Hrs | 1955.0 | | | 3/28/2003 | 5:58 PM | 3/28/2003 | 5:58 PM |
| | Load | | | 8.2 | 0.0 | 8.2 Hrs | | 1963.2 | | 3/28/2003 | 5:58 PM | 3/29/2003 | 2:11 AM |
| | Wash 1 | | | 1.5 | 0.0 | 1.5 Hrs | | 1964.6 | | 3/29/2003 | 2:11 AM | 3/29/2003 | 3:38 AM |
| | Wash 2 | | | 0.0 | 0.0 | 0.0 Hrs | | 1964.6 | | 3/29/2003 | 3:38 AM | 3/29/2003 | 3:38 AM |
| | Elute 1 | | | 0.6 | 0.0 | 0.6 Hrs | | 1965.2 | | 3/29/2003 | 3:38 AM | 3/29/2003 | 4:13 AM |
| | Elute 2 | | | 0.0 | 0.0 | 0.0 Hrs | | 1965.2 | | 3/29/2003 | 4:13 AM | 3/29/2003 | 4:13 AM |
| | Regenerate 1 | | | 0.9 | 0.0 | 0.9 Hrs | | | 1966.1 | 3/29/2003 | 4:13 AM | 3/29/2003 | 5:05 AM |
| | Regenerate 2 | | | 0.9 | 0.0 | 0.9 Hrs | | | 1967.0 | 3/29/2003 | 5:05 AM | 3/29/2003 | 5:58 AM |
| | Regenerate 3 | | | 0.0 | 0.0 | 0.0 Hrs | | | 1967.0 | 3/29/2003 | 5:58 AM | 3/29/2003 | 5:58 AM |
| | Regenerate 4 | | | 0.0 | 0.0 | 0.0 Hrs | | | 1967.0 | 3/29/2003 | 5:58 AM | 3/29/2003 | 5:58 AM |
| | Store | | | 0.9 | 0.0 | 0.9 Hrs | | | 1967.8 | 3/29/2003 | 5:58 AM | 3/29/2003 | 6:50 AM |
| | CIP | | | 5.0 | 0.0 | 5.0 Hrs | | | 1972.8 | 3/29/2003 | 6:50 AM | 3/29/2003 | 11:50 AM |
| | SIP | | | 1.0 | 0.0 | 1.0 Hrs | | | 1973.8 | 3/29/2003 | 11:50 AM | 3/29/2003 | 12:50 PM |
| | Clean Up | | | 1.0 | 0.0 | 1.0 Hrs | | | 1974.8 | 3/29/2003 | 12:50 PM | 3/29/2003 | 1:50 PM |
| | Sub Total | | | 21.3 | | 21.3 Hrs | | 1965.2 | | 3/28/2003 | 4:30 PM | 3/29/2003 | 1:50 PM |
| | | | | Hrs/Cy | | 21.33 / 1 | | | | | | | |
| | | | | Check | | | | | | | | | |

FIG. 54

METHOD AND SYSTEM FOR SIMULATING AND MODELING A BATCH MANUFACTURING FACILITY

RELATED APPLICATIONS

This application claims the benefit of U.S. Provisional Application No. 60/572,305, filed on May 17, 2004, and U.S. Provisional Application No. 60/573,033, filed on May 19, 2004. This application is also related to U.S. patent application Ser. No. 10/822,229, filed Apr. 9, 2004, which claims the benefit of U.S. Provisional Patent Application No. 60/461,387, filed on Apr. 9, 2003.

This patent application is also related to U.S. patent application Ser. No. 10/700,234, filed on Nov. 4, 2003, which is a continuation of U.S. patent application Ser. No. 09/373,794, filed on Aug. 13, 1999, now U.S. Pat. No. 6,662,061, issued on Dec. 9, 2003, which is a continuation-in-part of U.S. patent application Ser. No. 09/019,777, filed on Feb. 6, 1998, now U.S. Pat. No. 6,311,095, issued on Oct. 30, 2001, which claims the benefit of U.S. Provisional Patent Application No. 60/037,387, filed on Feb. 7, 1997; and is also related to U.S. patent application Ser. No. 10/152,348, filed on May 22, 2002, which claims the benefit of U.S. Provisional Patent Application No. 60/292,342, filed on May 22, 2001.

This patent application is also related to U.S. patent application Ser. No. 09/100,028, filed on Jun. 19, 1998, now U.S. Pat. No. 6,311,093, issued on Oct. 30, 2001, which claims the benefit of U.S. Provisional Patent Application No. 60/050,290, filed on Jun. 20, 1997; U.S. patent application Ser. No. 09/100,232, filed on Jun. 19, 1998, which claims the benefit of U.S. Provisional Patent Application No. 60/050,285, filed on Jun. 20, 1997; U.S. patent application Ser. No. 09/100,088, filed on Jun. 19, 1998, which claims the benefit of U.S. Provisional Patent Application No. 60/050,294, filed on Jun. 20, 1997; and U.S. patent application Ser. No. 09/737,793, filed on Aug. 13, 1999, which is a continuation-in-part of U.S. patent application Ser. No. 09/100,024, filed on Jun. 19, 1998, which claims the benefit of U.S. Provisional Patent Application No. 60/050,299, filed on Jun. 20, 1997.

The entire teachings of the above patents and patent applications are incorporated herein by reference.

BACKGROUND OF THE INVENTION

Biopharmaceutical plants produce biopharmaceutical products through biological methods. Typical biopharmaceutical synthesis methods are mammalian cell culture, microbial fermentation and insect cell culture. Occasionally, biopharmaceutical products are produced from natural animal or plant sources or by a synthetic technique called solid phase synthesis. Mammalian cell culture, microbial fermentation and insect cell culture involve the growth of living cells and the extraction of biopharmaceutical products from the cells or the medium surrounding the cells. Solid phase synthesis and crude tissue extraction are processes by which biopharmaceuticals are synthesized from chemicals or extracted from natural plant or animal tissues, respectively.

The process for producing biopharmaceuticals is complex. In addition to basic synthesis, additional processing steps of separation, purification, conditioning and formulation are required to produce the end product biopharmaceutical. Each of these processing steps includes additional unit operations. For example, the step of purification may include the step of Product Adsorption Chromatography, which may further include the unit operations of High Pressure Liquid Chromatography (HPLC), Medium Pressure Liquid Chromatography (MPLC), Low Pressure Liquid Chromatography (LPLC), etc. The production of biopharmaceuticals is complex because of the number, complexity and combinations of synthesis methods and processing steps possible. Consequently, the design of a biopharmaceutical plant is expensive.

Tens of millions of dollars can be misspent during the design and construction phases of biopharmaceutical plants due to inadequacies in the design process. Errors and inefficiencies are introduced in the initial design of the biopharmaceutical production process because no effective tools for modeling and simulating a biopharmaceutical production process exists. The inadequacies in the initial process design carry through to all phases of the biopharmaceutical plant design and construction. Errors in the basic production process design propagate through all of the design and construction phases, resulting in increased cost due to change orders late in the facility development project. For example, detailed piping and instrumentation diagrams (P&IDs) normally cost thousands of dollars per diagram. Problems in the biopharmaceutical production process design frequently necessitate the re-working of these detailed P&IDs. This adds substantially to the overall cost of design and construction of a biopharmaceutical plant.

There are generally three phases of biopharmaceutical plants which coincide with the different levels of drug approval by the FDA. A Clinical Phase I/II biopharmaceutical plant produces enough biopharmaceutical product to support both phase I and phase II clinical testing of the product which may involve up to a few hundred patients. A Clinical Phase III biopharmaceutical plant produces enough biopharmaceutical product to support two to three-thousand patients during phase III clinical testing. A Clinical Phase III plant will also produce enough of the biopharmaceutical drug to support an initial commercial offering upon the licensing of the drug by the FDA for commercial sale. The successive phases represent successively larger biopharmaceutical facilities to support full scale commercial production after product licensing. Often the production process design is repeated for each phase, resulting in increased costs to each phase of plant development.

The design, architecture and engineering of biopharmaceutical plants is a several hundred million dollars per year industry because of the complex nature of biopharmaceutical production. Design of biopharmaceutical plants occurs in discrete phases. The first phase is the conceptual design phase. The first step in the conceptual design phase is identifying the high-level steps of the process that will produce the desired biopharmaceutical. Examples of high-level steps are synthesis, separation, purification and conditioning. After the high-level process steps have been identified, the unit operations associated with each of the high-level steps are identified. Unit operations are discrete process steps that make up the high-level process steps. In a microbial fermentation process, for example, the high-level step of synthesis may include the unit operations of inoculum preparation, flask growth, seed fermentation and production fermentation.

The unit operation level production process is typically designed by hand and is prone to errors and inefficiencies. Often, in the conceptual design phase, the specifications for the final production process are not complete. Therefore some of the equipment design parameters, unit operation yields and actual production rates for the various unit operations must be estimated. These factors introduce errors into the initial design base of the production process. Additionally, since the production process is designed by hand, attempting to optimize the process for efficiency and production of biopharmaceutical products is impractically time consuming.

Scale calculations for each of the unit operations are performed to determine the size and capacity of the equipment necessary to produce the desired amount of product per batch. Included in the scale calculations is the number of batches per year needed to produce the required amount of biopharmaceutical product. A batch is a single run of the biopharmaceutical process that produces the product. Increasing the size and capacity of the equipment increases the amount of product produced per batch. The batch cycle time is the amount of time required to produce one batch of product. The amount of product produced in a given amount of time, therefore, is dependent upon the amount produced per batch, and the batch cycle time. The scale calculations are usually executed by hand to determine the size and capacity of the equipment that will be required in each of the unit operations. Since the scale calculations are developed from the original conceptual design parameters, they are also subject to the same errors inherent in the initial conceptual design base.

Typically a process flow diagram is generated after the scale calculations for the unit operations have been performed. The process flow diagram graphically illustrates the process equipment such as tanks and pumps necessary to accommodate the process for a given batch scale. The process flow diagram illustrates the different streams of product and materials through the different unit operations. Generally associated with the process flow diagram is a material balance table which shows the quantities of materials consumed and produced in each step of the biopharmaceutical production process. The material balance table typically includes rate information of consumption of raw materials and production of product. The process flow diagram and material balance table provides much of the information necessary to develop a preliminary equipment list. The preliminary equipment list shows the equipment necessary to carry out all of the unit operations in the manufacturing procedure. Since the process flow diagram, material balance table and preliminary equipment list are determined from the original conceptual design parameters, they are subject to the same errors inherent in the initial conceptual design base.

A preliminary facility layout for the plant is developed from the process flow diagram, material balance table and preliminary equipment list. The preliminary facility layout usually begins with a bubble or block diagram of the plant that illustrates the adjacencies of rooms housing different high-level steps, as well as a space program which dimensions out the space and square footage of the building. From this information a preliminary equipment layout for the plant is prepared. The preliminary equipment layout attempts to show all the rooms in the plant, including corridors, staircases, etc. Mechanical, electrical and plumbing engineers estimate the mechanical, electrical and plumbing needs, respectively, of the facility based on the facility design layout and the utility requirements of the manufacturing equipment. Since the preliminary facility layout is developed from the original conceptual design parameters, they are subject to the same errors inherent in the initial conceptual design base.

Typically the next phase of biopharmaceutical plant design is preliminary piping and instrumentation diagram (P&ID) design. Preliminary P&IDs are based on the process flow diagram from the conceptual design phase. Often the calculations on the process design are re-run and incorporated into the preliminary P&ID. The preliminary P&IDs incorporate the information from the material balance table with the preliminary equipment list to show the basic piping and instrumentation required to run the manufacturing process.

Detailed design is the next phase of biopharmaceutical plant design. Plans and specifications which allow vendors and contractors to bid on portions of the biopharmaceutical plant are developed during the detailed design. Detailed P&IDs are developed which schematically represent every detail of the process systems for the biopharmaceutical plant. The detailed P&IDs include for example, the size and components of process piping, mechanical, electrical and plumbing systems; all tanks, instrumentation, controls and hardware. A bill of materials and detailed specification sheets on all of the equipment and systems are developed from the P&IDs. Detailed facility architecture diagrams are developed that coincide with the detailed P&IDs and equipment specifications. The detailed P&IDs and facility construction diagrams allow builders and engineering companies to bid on the biopharmaceutical plant project. Since the preliminary and detailed P&IDs are developed from the original conceptual design parameters, they are subject to the same errors inherent in the initial conceptual design base. Reworking the preliminary and detailed P&IDs due to errors in the conceptual design phase can cost thousands of dollars per diagram.

The inability to accurately model and simulate the biopharmaceutical production process drives inaccurate initial design. Often, these inaccuracies result in changes to the design and construction diagrams at the plant construction site, or repair and reconstruction of the plant during the construction phase resulting in millions of dollars in additional cost.

What is needed, therefore, is a system and method for accurately simulating and modeling a biopharmaceutical production process. A method and system for simulating and modeling biopharmaceutical production process would allow designers to reduce the number of errors introduced into plant design at the earliest stages. Such a system and method would allow an engineer to validate the production process design and maximize the efficiency of the plant by finding the optimum equipment configurations. Such a system and method would generate detailed specifications for the equipment and process steps that would smooth the transition throughout all of the design phases and fix the cost of design and construction of a biopharmaceutical facility. The present invention can also be used for determining the cost of goods for a product.

SUMMARY OF THE INVENTION

The present invention satisfies the above-stated needs by providing a method and system for simulating and modeling of batch process manufacturing facilities using sub (partial) cycles, nested cluster cycles and lot cycles to generate process time lines. The method includes the steps of identifying a production process sequence, the production process sequence including a plurality of subprocesses. At least one of the plurality of subprocesses includes a plurality of batch cycles, each of which includes a plurality of unit operations. Each of the unit operations is identified by unit operation identifiers. Next, the system and method retrieves the process parameter information from a master list for each of the unit operation identifiers in the process sequence.

The process parameter information includes information on discrete tasks associated with each unit operation. After the steps of identifying and retrieving, the system and method generates a process schedule that identifies initiation and completion times for each of the discrete tasks in the process sequence. Next, a process time line using the operational parameters, the block flow diagram, the set of scheduling cycles for each of the sequence of unit operations is generated. The process time line is used as a tool for batch processing and facility design.

In one embodiment of the present invention, execution options for unit operation tasks (e.g., Unit Operation Set Up, Unit Operation Execution, and Unit Operation Clean Up tasks) can be defined for each iteration of a respective design cycle. Examples of execution options include: (1) tasks that execute only during the first iteration of a respective design cycle, (2) tasks that execute during each iteration of a respective design cycle, (3) tasks that execute only during intermediate iterations (excluding first and last iterations) of a respective design cycle, and (4) tasks that execute only during the last iteration of a respective design cycle.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 2 illustrates a flow diagram of the process for determining the necessary reactor volume according to the present invention.

FIG. 3 illustrates a unit operation list for a microbial fermentation process.

FIG. 4 illustrates a unit operation list for a mammalian cell culture process.

FIGS. 6A–6B illustrate an exemplary process parameters table.

FIG. 8 illustrates an exemplary block flow diagram according to the present invention.

FIGS. 10–11 illustrate a high-level process time line according to the present invention.

Figure 12A-2:
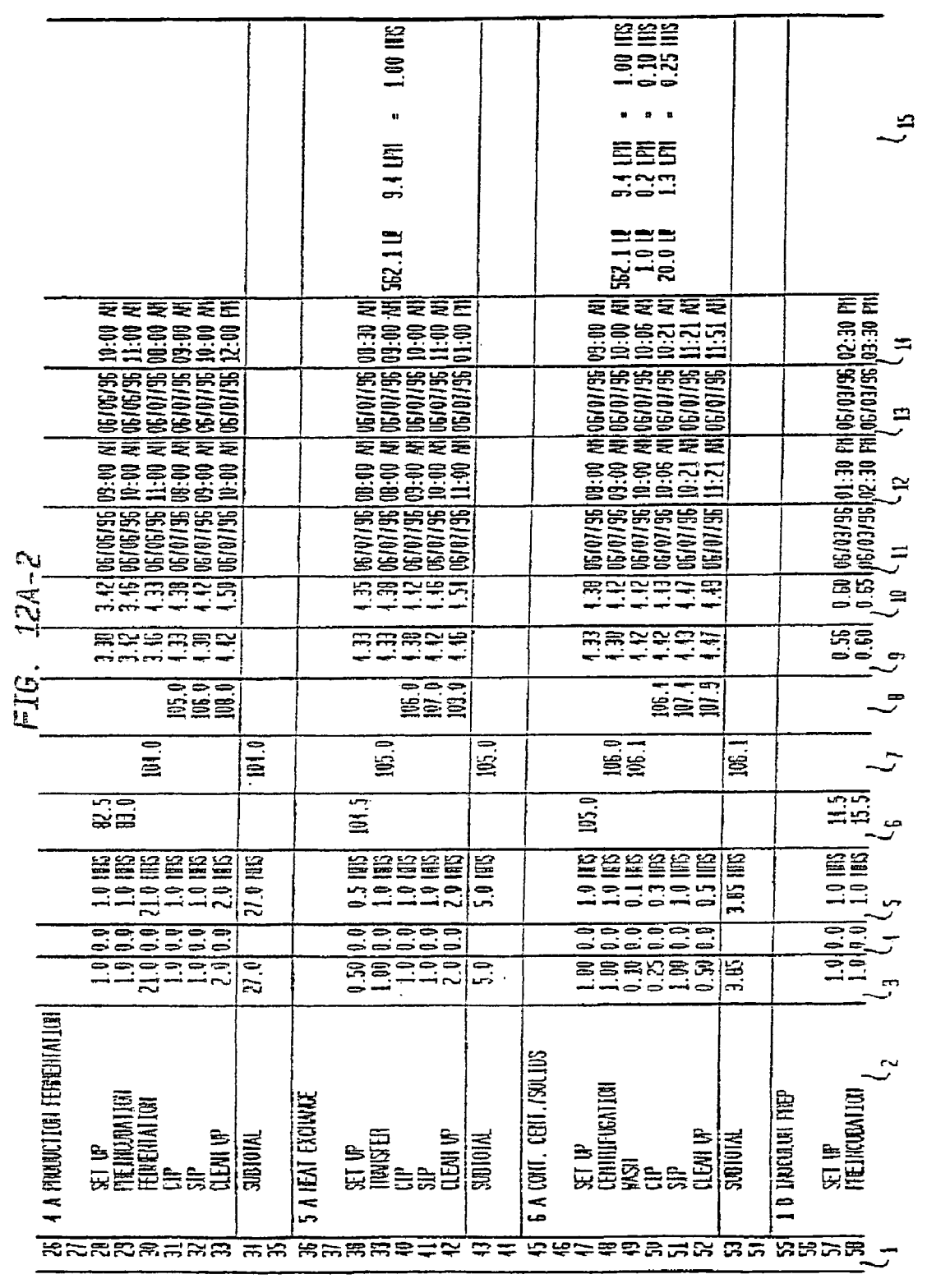
Figure 12F-1:
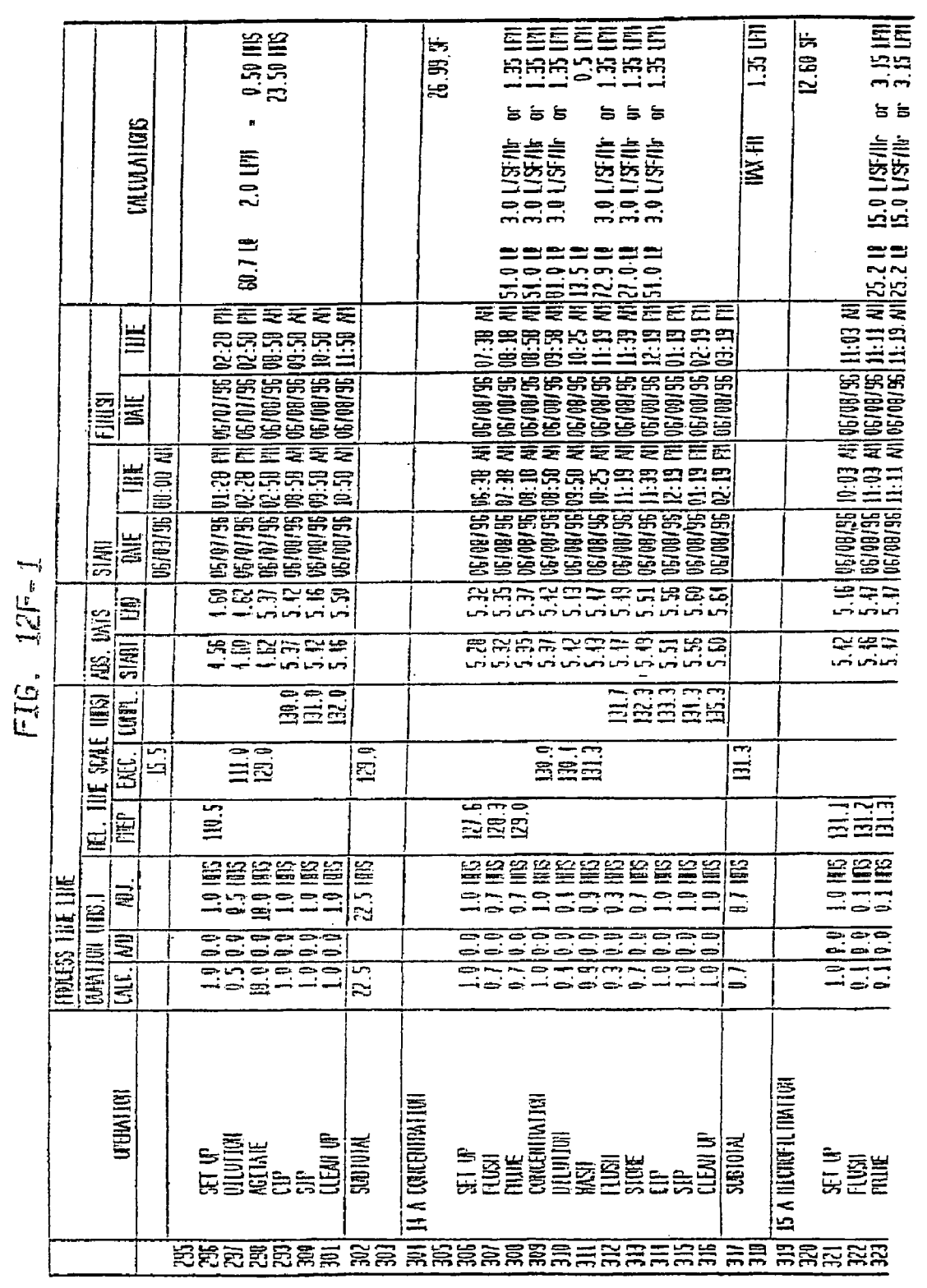
Figure 12F-2:
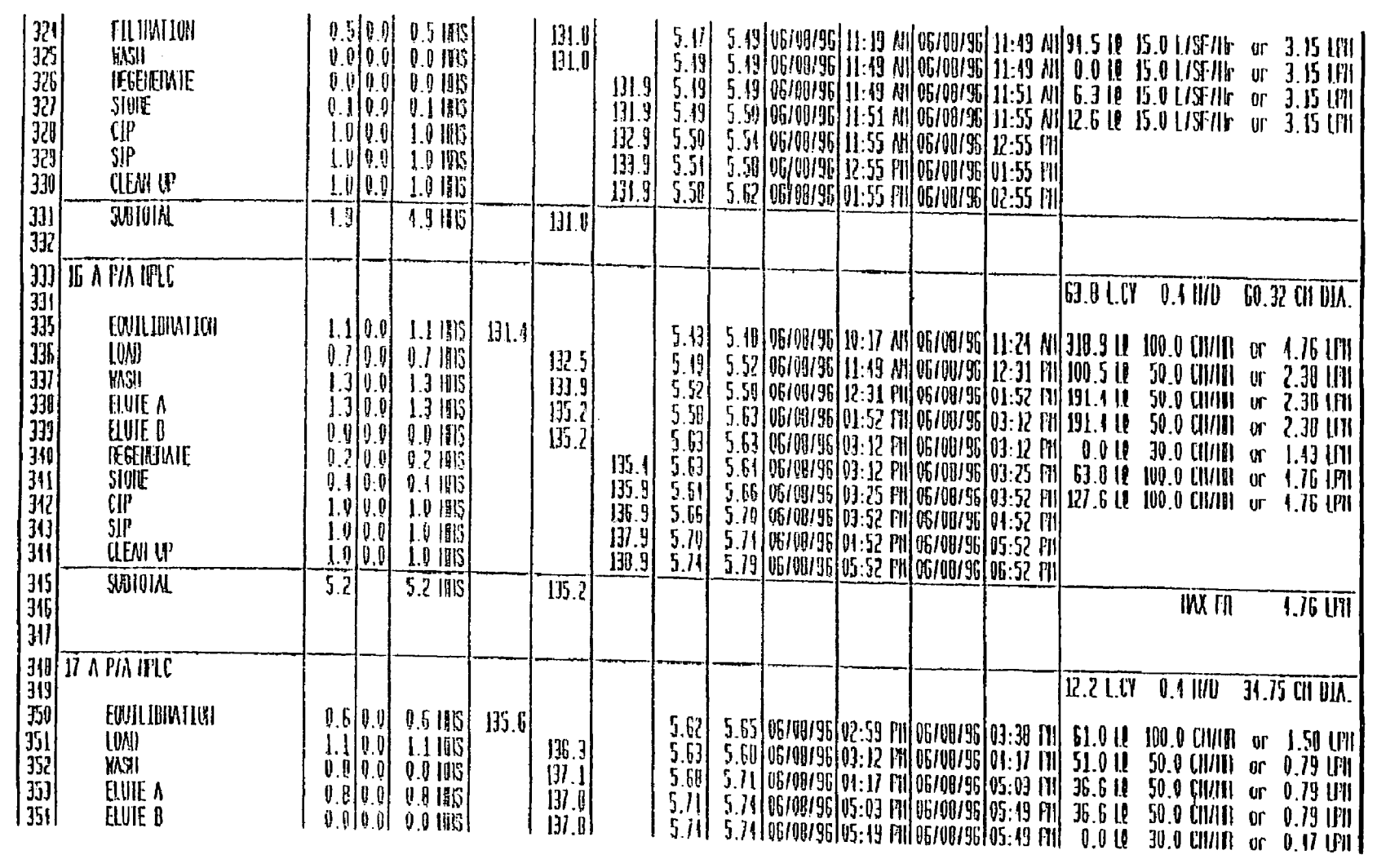
Figure 12G-2:
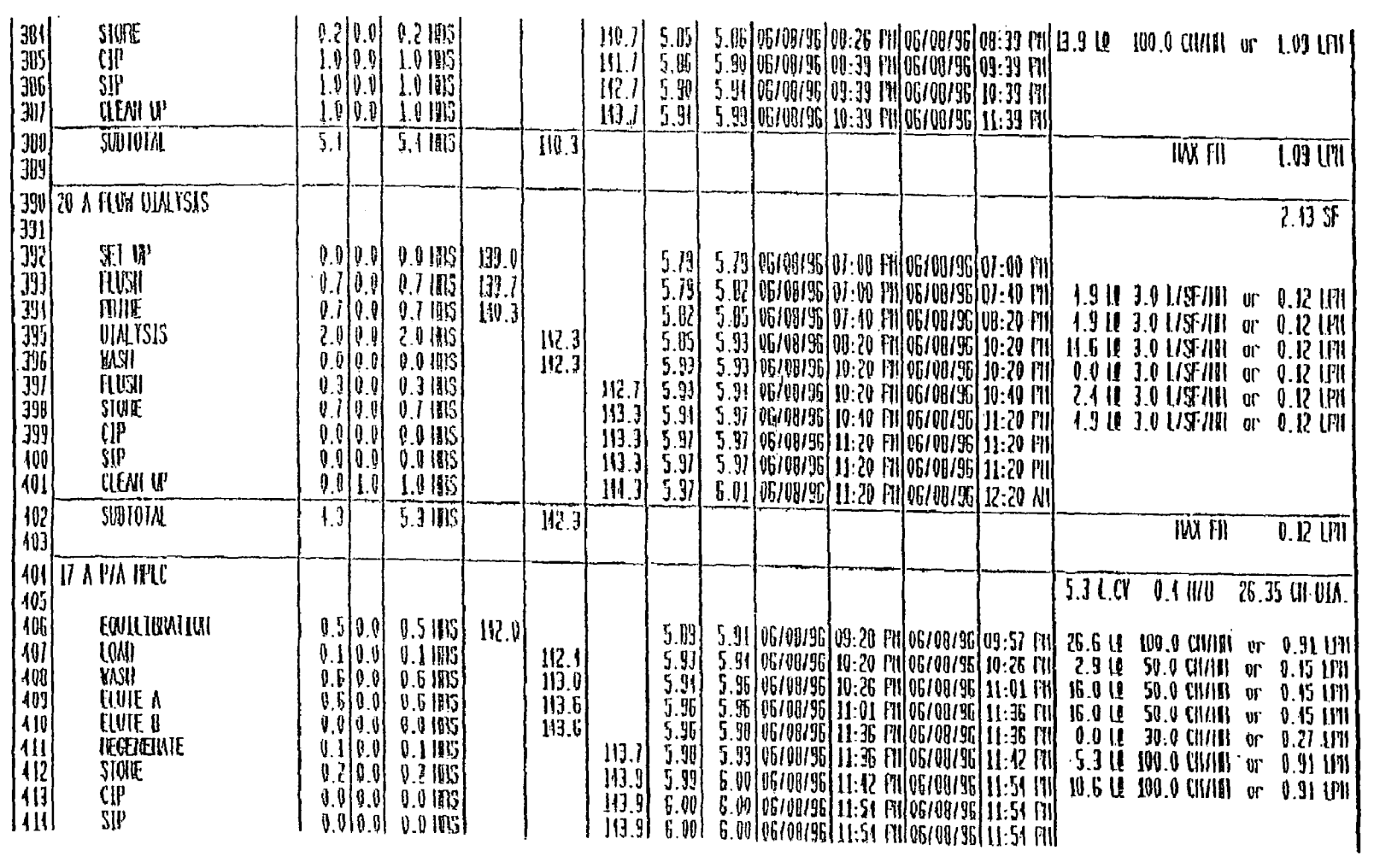

FIGS. 12A–12H illustrate a detailed process time line according to the present invention.

FIGS. 14A and B to 20A and B are detailed examples of a process parameters table showing a list of unit operations and their associated parameters.

FIG. 21 illustrates a refined unit operation list for a mammalian cell culture process according to an embodiment of the present invention.

FIG. 22 illustrates a refined unit operation list for a microbial fermentation process according to an embodiment of the present invention.

Figure 23B-2:
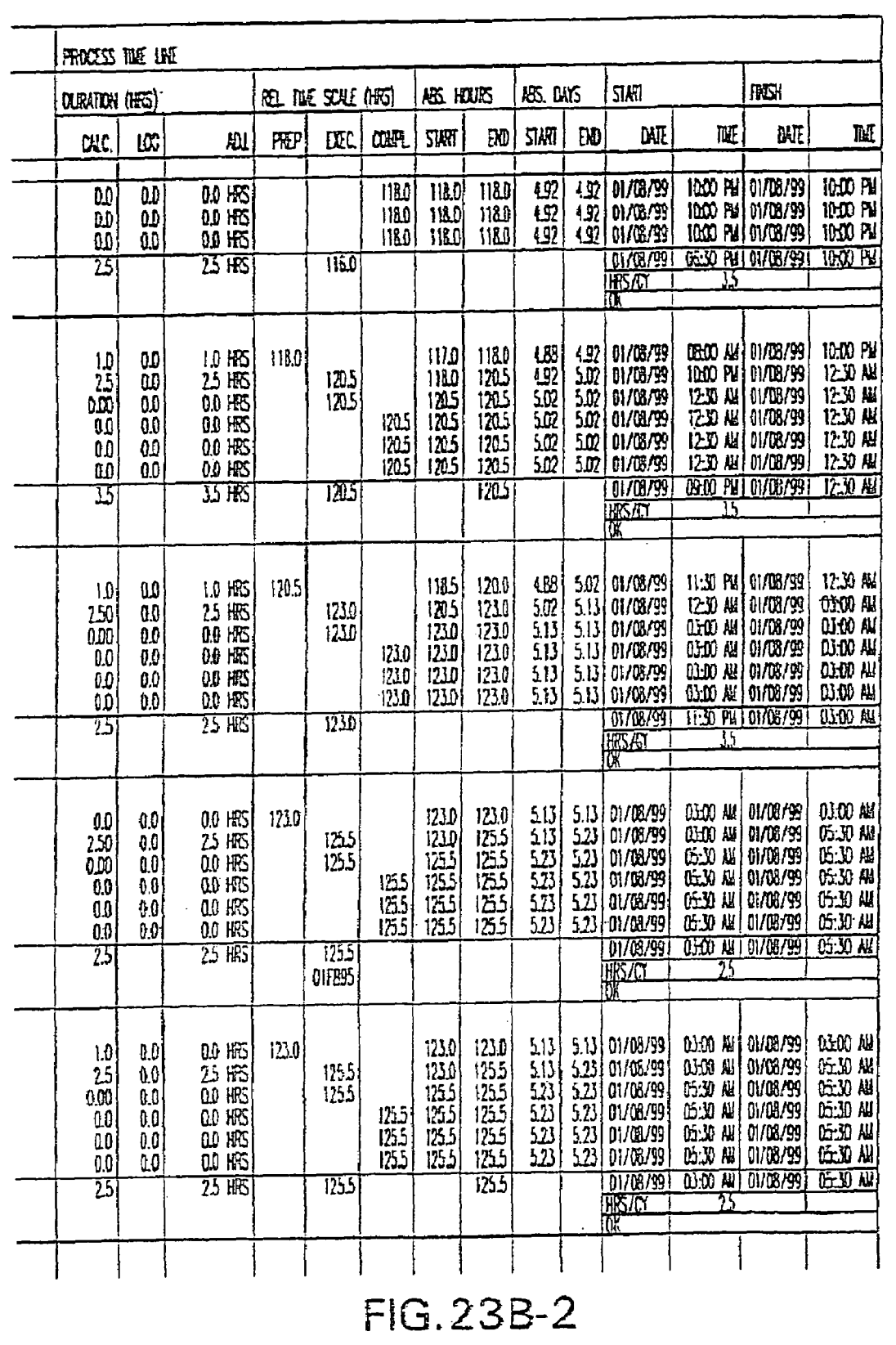

FIGS. 23A–23F illustrate a refined process time line for a mammalian cell culture process according an embodiment of the present invention.

FIG. 47 is a unit operation list for a Mammalian Cell Culture Process that illustrates the use of lot cycles and unit operation—sub cycles.

FIGS. 48A–48C are a unit operation list for a Transgenic Plant Process that illustrates the use of unit operation cluster—main cycles.

FIG. 49 is a unit operation list for a Microbial Fermentation Process that illustrates the use of unit operation cluster—sub cycles.

FIGS. 50A–50C are a table illustrating the definition of Task Execution Parameters at multiple design cycle levels.

FIG. 54 is a table that illustrates the application of the Design Cycle Iteration Test Results for Task Execution Parameters to the generation of a Process Time Line in a Biopharmaceutical Batch Manufacturing Process.

DETAILED DESCRIPTION OF THE INVENTION

A description of preferred embodiments of the invention follows.

A system and method for the simulation and modeling of biopharmaceutical batch process manufacturing facilities using process time lines is described herein. The system employs an eleven-field delimited string code which specifies the unit identifier code and the iteration value for each of the ten levels of nested scheduling cycles—"Unit Operation Cycle-Sub Cycles," "Unit Operation Cycles—Main Cycle," "Unit Operation Cluster Cycle—Level 1—Sub Cycles," "Unit Operation Cluster Cycle—Level 1—Main Cycle," "Unit Operation Cluster Cycle—Level 2—Sub Cycle," "Unit Operation Cluster Cycle—Level 2—Main Cycle," "Unit Operation Cluster Cycle—Level 3—Sub Cycle," "Unit Operation Cluster Cycle—Level 3—Main Cycle," and "Batch Cycles" and "Lot Cycles"—of the biopharmaceutical drug production process being modeled. The method includes the step of selecting a sequence of unit operations wherein each of the sequence of unit operations has an identifier code. Next, a set of scheduling cycles is selected for each of the sequence of unit operations. A master table is then referenced, using the identifier code, to obtain operational parameters for each of the sequence of unit operations. A block flow diagram is then generated using the sequence of unit operations and the operational parameters. The method further includes generating a process time line using the operational parameters, the block flow diagram, and the set of scheduling cycles for each of the sequence of unit operations. The process time line—a time line for the beginning and ending times of each unit operation and its associated tasks for the entire biopharmaceutical drug production process—is used as a tool for batch processing and facility design.

The preferred embodiment of the present invention is a computer based system and method for the simulation and modeling of batch process manufacturing facilities. The preferred embodiment is based on a method for generating scheduling information which accurately defines the complex manufacturing operations of batch manufacturing processes. This scheduling capability system allows the definition of manufacturing costs in a more detailed and accurate manner than previously possible. As a result, this invention allows the rapid and accurate evaluation of numerous batch manufacturing alternatives in order to arrive at an optimal process design early in a facility development project. In so doing the invention minimizes project cost over runs which result from inaccuracies that can carry forward from the early stages of design into construction. The invention also defines operations scheduling in a manner that improves the accuracy of material resource planning, and preventative maintenance programs for operating manufacturing plants. The invention can also be used for planning the retrofit of operating manufacturing facilities to accommodate new processes.

Figure 1:
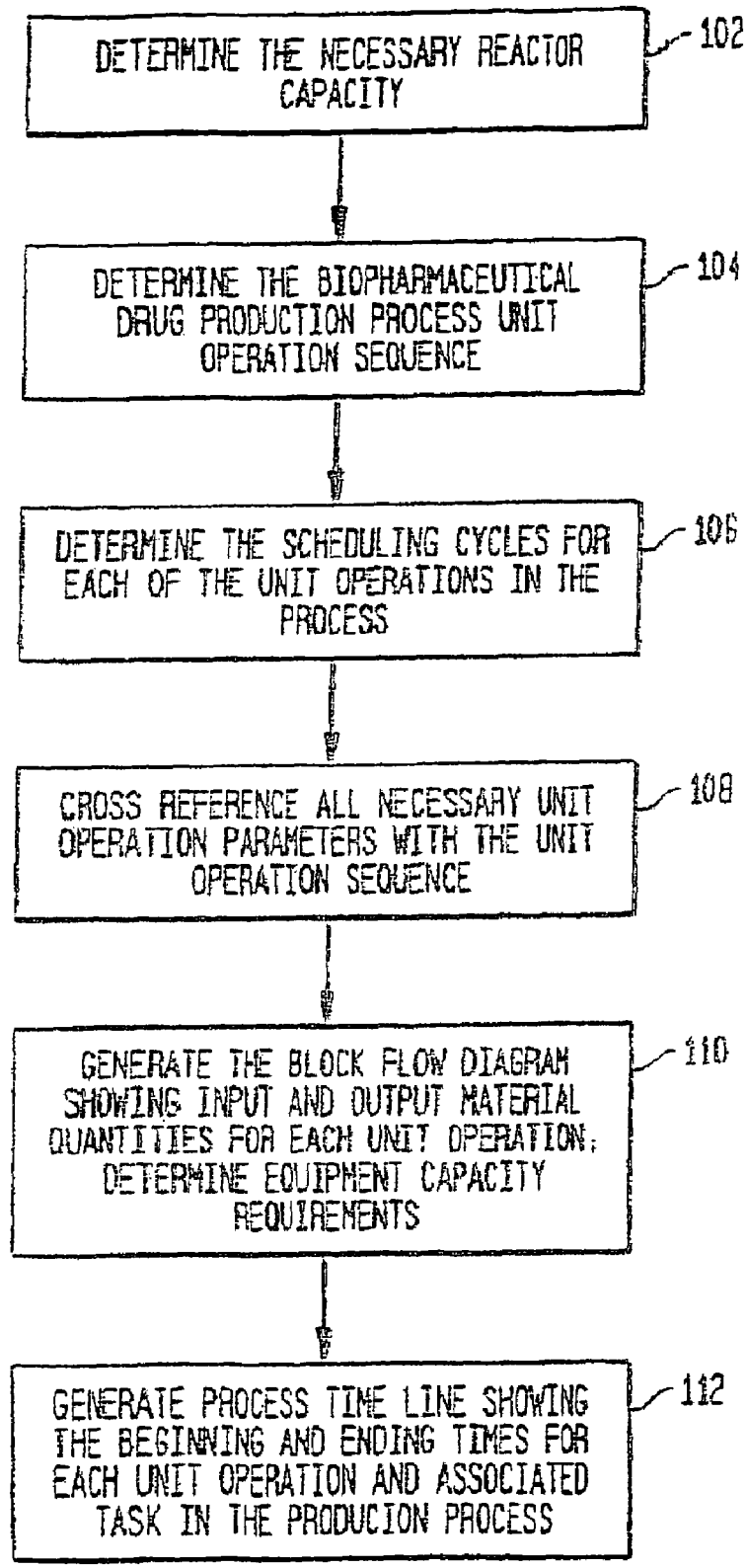
FIG. 1 illustrates a flow diagram of the process to generate a block flow diagram and a process time line according to the present invention.

FIG. 1 illustrates a high-level flow diagram of the preferred embodiment. The process begins by determining the necessary reactor vessel capacity at step 102. The reactor vessel is the container in which the crude product is first synthesized. For example, in mammalian cell culture processes, the reactor vessel houses the mammalian cells suspended in growth media. Next, the unit operation sequence for production of the biopharmaceutical product is determined at step 104. The unit operation sequence is the series of unit operations that are required to produce the biopharmaceutical product. Each unit operation is an individual step in the biopharmaceutical manufacturing process with an associated set of manufacturing equipment. The unit operation list is the list of unit operations that make up the unit operation sequence and their associated sequence information. The unit operation sequence information is the information that defines the scheduling cycles for each of the unit operations in the unit operation list. Scheduling cycles are iterations of unit operations in the unit operation sequence. Together, the unit operation list and the unit operation sequence information define the unit operation sequence. The desired biopharmaceutical product dictates the particular unit operations and their order in the biopharmaceutical production process. Some examples of unit operations are: inoculum preparation, initial seeding of the reactor vessel, solids harvest by centrifugation, high-pressure homogenization, dilution, etc.

Scheduling cycles and cycle offset duration for each of the unit operations in the biopharmaceutical production process are determined at step 106. Scheduling cycles are iterations of unit operations (a default being one (1)) in the unit operation sequence, and occur in three levels. Additionally, each level of scheduling cycle has an associated offset duration that dictates the time period between the beginnings of successive scheduling cycles.

"Cycles per Unit Operation" or preferably, "Unit Operation Cycles" (UC) is the first level of scheduling cycles. Unit Operation Cycles are defined as the number of iterations a unit operation is repeated in a process by itself before proceeding to the next unit operation. For example, the harvest and feed unit operation in a mammalian cell culture process has multiple Unit Operation Cycles. Product-rich media is drawn from the reactor vessel and nutrient-rich media is fed into the reactor vessel multiple times during one harvest and feed unit operation. The multiple draws of product-rich reactor media are pooled for processing in the next unit operation.

The second level of scheduling cycles is "Cycles per Batch" or preferably, "Unit Operation Cluster Cycles" (CC). Unit Operation Cluster Cycles are defined as the number of iterations a set of consecutive unit operations are repeated as a group before proceeding to the next unit operation after the set of consecutive unit operations. The set of consecutive unit operations repeated as a group are also referred to as a subprocess. For example, the set of unit operations including inoculum preparation, flask growth, seed fermentation, production fermentation, heat exchange, and continuous centrifugation/whole-cell harvest in a microbial fermentation process are often cycled together. Running through each of the six steps results in a single harvest from the microbial fermentation reactor vessel. Multiple harvests from a reactor vessel may be needed to achieve a batch of sufficient quantity. Each additional harvest is pooled with the previous harvest, resulting in a single batch of cell culture for the process.

The third level of scheduling cycles is "Cycles per Process" or preferably, "Batch Cycles" (BC). Batch Cycles are defined as the number of iterations a batch cycle is repeated for a process that employs continuous or semi-continuous product synthesis. In such a case, a single biopharmaceutical production process may result in multiple batches of product. For example, in a mammalian cell-culture process a single cell culture is typically in continuous production for 60–90 days. During this period multiple harvests of crude product are collected and pooled on a batch basis to be processed into the end product biopharmaceutical. The pooling of multiple harvests into a batch of material will occur several times during the cell culture period resulting in multiple Batch Cycles.

In step 108, a process parameters table master list is referenced to obtain all operational parameters for each unit operation in the unit operation list. The process parameters table contains a list of all unit operations and operational parameters necessary to simulate a particular unit operation. Examples of operational parameters are the solutions involved in a particular unit operation, temperature, pressure, duration, agitation, scaling volume, etc. Additionally, the process parameters table supplies all of the individual tasks and task durations involved in a particular unit operation. For example, the unit operation of inoculum preparation includes the individual tasks of setup, preincubation, incubation, and cleanup. Examples of unit operations for biopharmaceutical manufacturing and their associated operational parameters are shown in FIGS. 14A and B to 20A and B.

A block flow diagram is generated at step 110 after unit operation list has obtained the operational parameters from the process parameters table at step 108. The block flow diagram illustrates each unit operation in the manufacturing process as a block with inputs for both incoming product and new material, as well as outputs for both processed product and waste. The block flow diagram is a simple yet convenient tool for quantifying material flows through the process in a way that allows the sizing of many key pieces of equipment relative to a given process scale.

The information in each block of the block flow diagram is generated from the parameters and sizing ratios from the process parameters table in the unit operation list, and block flow diagram calculation sets. A calculation set is a set of algebraic equations. The parameters and calculation sets are used to calculate the quantities of material inputs, product and waste outputs required for that unit operation based on the quantity of product material being received from the previous unit operation. Likewise, a given block flow diagram block calculates the quantity of product to be transferred to the next unit operation block in the manufacturing procedure. These calculations take into account the unit operation scheduling cycles identified at step 106, as further explained below.

A process time line is generated at step 112 after the block flow diagram is generated at step 110. The process time line is a very useful feature of the present invention. The process time line is generated from the unit operation list, the tasks associated with each of the unit operations, the scheduling cycles for each of the unit operations in the process, the process parameters from the master process parameters table and the volume of the material as calculated from the block flow diagram. The process time line is a relative time line in hours and minutes from the start date of the production process. The relative time is converted into days and hours to provide a time line for the beginning and ending times of each unit operation and its associated tasks for the entire biopharmaceutical drug production process.

The process time line is a very powerful tool for process design. The process time line can be used to accurately size manufacturing equipment such as pumps, filters and heat exchangers used in unit operations, by calculating the flow rate from the known transfer time and the volume of the material to be transferred, filtered or cooled, etc. The process time line accurately predicts loads for labor, solution preparation, equipment cleaning, reagent, process utilities, preventative maintenance, quality control testing, etc.

FIG. 2 further illustrates step 102 of determining the necessary reactor vessel capacity. The amount of biopharmaceutical product to be produced in a given amount of time is determined in step 202. Normally, the amount of biopharmaceutical product required is expressed in terms of mass produced per year. The number of reactor vessel runs for a particular biopharmaceutical product per year is determined at step 204. Factors considered when determining the number of reactor vessel cycles for a particular biopharmaceutical product are, for example, the number of biopharmaceutical products produced in the reactor vessel (e.g., the reactor vessel is shared to produce different products), the reaction time for each cycle of the reactor vessel and the percentage of up-time for the reactor vessel over the year.

The yield of each batch or reactor cycle is calculated at step 206. The yield from each batch or a reactor cycle is process-dependent and is usually expressed in grams of crude product per liter of broth. Given the required amount of biopharmaceutical product per year from step 202, the number of reactor cycles available to produce the required biopharmaceutical product from step 204, and the yield of each reactor cycle from step 206, the necessary reactor volume to produce the required amount of biopharmaceutical product is calculated at step 208.

FIG. 3 illustrates a unit operation list for an exemplary microbial fermentation biopharmaceutical production process. The far left-hand column, column 302, lists the unit operation sequence numbers for each of the unit operations in the process. The exemplary microbial fermentation unit operation list includes 23 unit operations. The unit operation sequence number defines the order in which the unit operations occur. For example, unit operation sequence number 1, inoculum preparation, occurs first, before unit operation sequence number 2, flask growth. Column 304 shows the unit operation identifier codes associated with each of the unit operations in the unit operation list (see step 108). The unit operation identifier codes are used to bring operational parameters from the process parameters table into the unit operation list. For example, heat exchange, unit operation list numbers 5, 8 and 10, has a unit operation identifier code 51.

As described above with reference to FIG. 1, after the unit operation sequence for a particular biopharmaceutical production process has been determined at step 104, the scheduling cycles associated with each unit operation is determined at step 106. Columns 306, 310 and 318 list the number of scheduling cycles for the microbial fermentation process of FIG. 3. Scheduling cycles are iterations of unit operations in the unit operation sequence, and occur in three levels. Additionally, each level of scheduling cycle has an associated offset duration that dictates the time period between the beginnings of successive scheduling cycles, shown in columns 308, 316 and 324. The latter two levels of scheduling cycles have an associated unit operation starting point and unit operation end point. That is, columns 312 and 314 specify the start and end unit operations, respectively, for Unit Operation Cluster Cycles, and columns 320 and 322 specify the start and end unit operations, respectively, for Batch Cycles.

Column 306 lists the number of Unit Operation Cycles for each of the unit operations in the microbial fermentation unit operation sequence. In the exemplary microbial fermentation unit operation sequence, each of the unit operations has only one cycle per unit operation. Again, Unit Operation Cycles define the number of iterations a unit operation is repeated in a process by itself before proceeding to the next unit operation.

Column 308 lists the cycle-offset duration in hours for the Unit Operation Cycles. Since each of the unit operations in the microbial fermentation example of FIG. 3 has only one cycle per unit operation, there is no cycle-offset duration for any of the unit operations. Cycle offset duration defines the time period between the beginnings of successive scheduling cycles at a respective cycle level.

Column 310 lists the Unit Operation Cluster Cycles for each of the unit operations in the microbial fermentation unit operation sequence. Unit operation sequence numbers 1–6 are defined as having three Unit Operation Cluster Cycles. Unit Operation Cluster Cycles defines the number of iterations a set of consecutive unit operations are repeated as a group before proceeding to the next unit operation. In FIG. 3, for example, the set of unit operations 1–6, as defined in unit operation start column 312 and unit operation end column 314, cycle together as a group (e.g., the sequence of unit operations for the exemplary microbial fermentation process is 1, 2, 3, 4, 5, 6, 1, 2, 3, 4, 5, 6, 1, 2, 3, 4, 5, 6 and 7). Unit operations 1–6 cycle together as a group three times before the process continues to unit operation 7, as defined in column 310.

After unit operation sequence numbers 1–6 have cycled consecutively three times, the microbial fermentation production process continues at unit operation sequence number 7, resuspension of cell paste. After unit operation sequence number 7, the process continues with three Unit Operation Cluster Cycles of unit operation sequence numbers 8–10. The unit operations of heat exchange, cell disruption, and heat exchange are cycled consecutively three times, as defined in columns 310, 312 and 314. After unit operation sequence numbers 8–10 have cycled three times, the microbial fermentation production process continues at resuspension/surfactant, unit operation sequence number 11.

Unit operation sequence numbers 11 and 12 cycle together two times, as defined by columns 310, 312 and 314. After unit operation sequence numbers 11 and 12 have been cycled two times, the microbial fermentation production process continues without cycling from unit operation sequence number 13 through unit operation sequence number 23 to conclude the microbial fermentation production process.

Columns 326–332 of FIG. 3 represent the step wise recover (SWR) and overall recovery (OAR) percentages of the product and total proteins. SWR is the recovery of protein for the individual unit operation for which it is listed. OAR is the recovery of protein for the overall process up to and including the unit operation for which it is listed. The product recovery columns represent the recovery of the desired product protein from the solution in the process. The protein recovery columns represent the recovery of contaminant proteins from the solution that result in higher purity of the product solution.

FIG. 4 illustrates a unit operation list for an exemplary mammalian cell culture production process. Column 402 lists unit operation sequence numbers 1–19. Unit operation sequence numbers 1–19 define the order in which the unit operations of the mammalian cell culture production process occur. The most notable differences between the microbial fermentation process of FIG. 3 and the mammalian cell culture process of FIG. 4 are the multiple Unit Operation Cycles of unit operation sequence number 8 and the multiple Batch Cycles of unit operation sequence numbers 8–18.

Unit operation sequence number 8 of FIG. 4 illustrates the concept of multiple Unit Operation Cycles. Unit operation sequence number 8 is the unit operation of harvesting product rich growth media from and feeding fresh growth media into the mammalian cell reactor vessel. In most mammalian cell culture processes, the product is secreted by the cells into the surrounding growth media in the reactor vessel. To harvest the product, some of the product rich growth media is harvested from the reactor vessel to be processed to remove the product, and an equal amount of fresh growth media is fed into the reactor vessel to sustain production in the reactor vessel. The process of harvesting and feeding the reactor vessel can continue for many weeks for a single biopharmaceutical production process. Unit operation sequence number 8 is repeated seven times, or 7 Unit Operation Cycles (e.g., the unit operation sequence is 7, 8, 8, 8, 8, 8, 8, 8, 9). Note that the offset duration for unit operation sequence number 8 is 24 hours. The offset duration defines the time period between the Unit Operation Cycles. In the example of FIG. 4, unit operation sequence number 8 is repeated 7 times (7 Unit Operation Cycles) and each cycle is separated from the next by 24 hours, or one day. This corresponds to unit operation sequence number 8 having a duration of one week, with a harvest/feed step occurring each day.

FIG. 4 also illustrates the feature of multiple Batch Cycles. Batch Cycles is defined as the number of iterations a batch cycle is repeated in a given process that employs continuous or semi-continuous product synthesis. Each batch cycle results in a batch of product. A single biopharmaceutical production process, therefore, may result in multiple batches of product. In the mammalian cell culture process example of FIG. 4, unit operation sequence numbers 8–18 are repeated together as a group eight times (column 418). Each of these cycles of unit operation sequence numbers 8–18 produce one batch of product (columns 420–422). The offset between each cycle of unit operation sequence numbers 8–18 is 168 hours, or one week (column 424).

In the example of FIG. 4, unit operation sequence numbers 8–18 proceed as follows: the reactor vessel is harvested and fed once each day for seven days; the results of the harvest/feed operation are pooled in unit operation sequence number 9 at the end of the seven days; unit operations 9–18 are then executed to process the pooled harvested growth media from unit operation sequence number 8. Unit operation sequence numbers 8–18 are cycled sequentially once each week to process an additional seven day batch of harvested growth media from unit operation sequence number 8. At the end of eight weeks, the mammalian cell culture process is completed.

Figure 5:
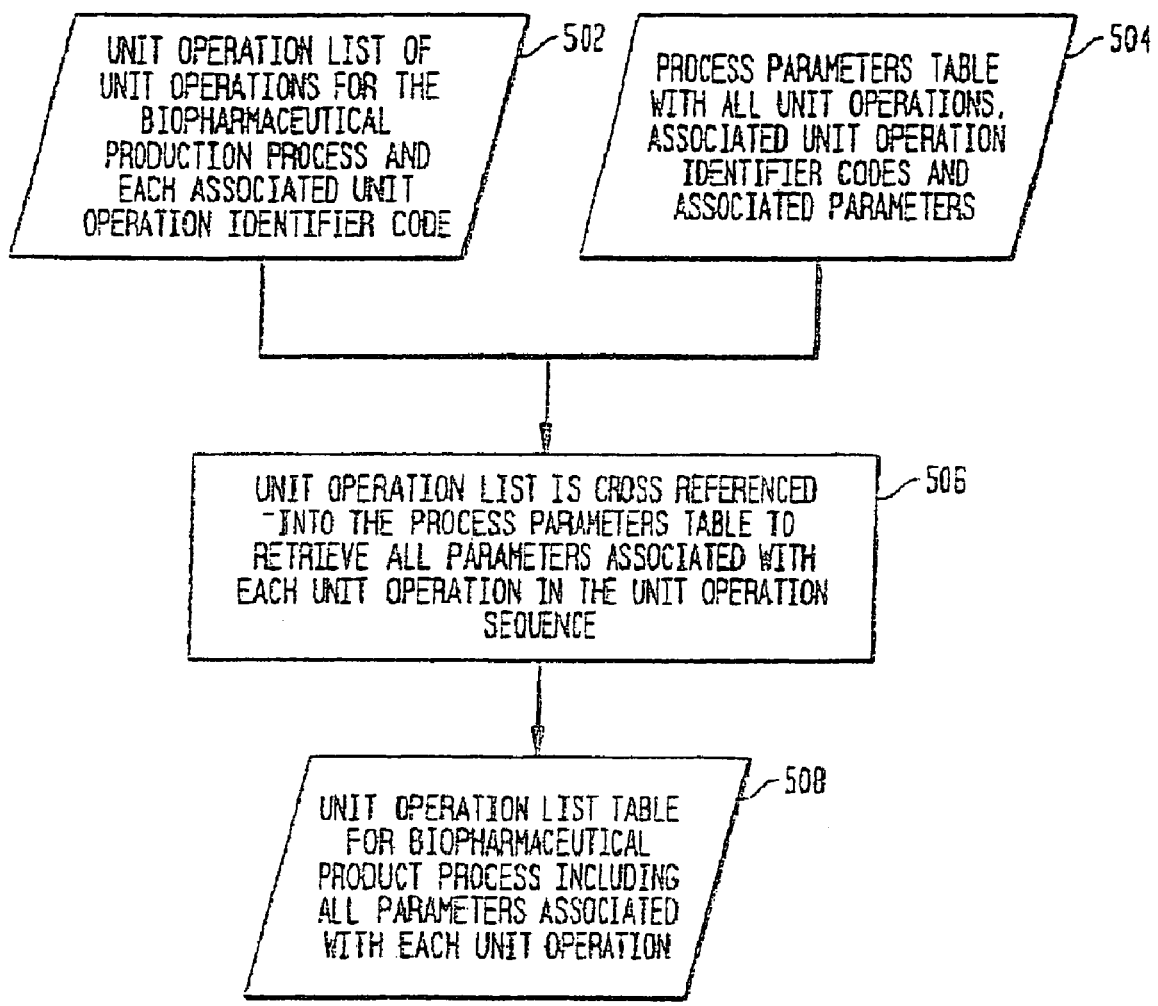
FIG. 5 illustrates a file and process flow diagram for cross-referencing a unit operation list with a process parameters table according to the present invention.

FIG. 5 further illustrates step 108, cross-referencing the unit operation sequence with the master process parameters table. The operational parameters in the process parameters table are those parameters necessary to simulate a particular unit operation. The parameters from the process parameters table define the key operational parameters and equipment sizing ratios for each unit operation in the unit operation sequence. The values for these parameters and ratios are variables which can be easily manipulated and ordered to model and evaluate alternative design scenarios for a given process scale. Examples of the process parameters associated with each unit operation are shown in FIGS. 14A and B to 20A and B. It should be noted, however, that the list of unit operations, parameters, values, and scaling ratios is not exhaustive. One, of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes.

FIG. 5 illustrates the files necessary to cross-reference the unit operation list with the process parameters table in step 108. Exemplary unit operation list 502 for the biopharmaceutical production process and process parameters table 504 are input into processing step 506. Step 506 cross-references the unit operation list and process parameters table based on unit operation identification code (see FIG. 3). The parameters are copied from the process parameters table 504 into the unit operation list 502 to generate unit operation list 508.

FIGS. 6A–B further illustrate exemplary process parameters table, 504. The operational parameters in the process parameters table are those parameters necessary to simulate a particular unit operation. The unit operation identification codes of process parameters table 504 are used in the cross-reference step 506 to assign the parameters from the process parameters table 504 to the unit operation list 502. Examples of operational parameters are the solutions involved in a particular unit operation, temperature, pressure, duration, agitation, scaling volume, etc. Additionally, the process parameters table defines all of the individual tasks and task durations involved in each unit operation. It should be noted, however, one of ordinary skill in the art could expand the process parameters table to encompass additional unit operations and production processes for other batch process industries such as chemical pharmaceutical, specialty chemical, food, beverage, and cosmetics. Such expansion would allow the present invention to simulate and schedule additional batch production processes for other such batch processes.

Figure 7:
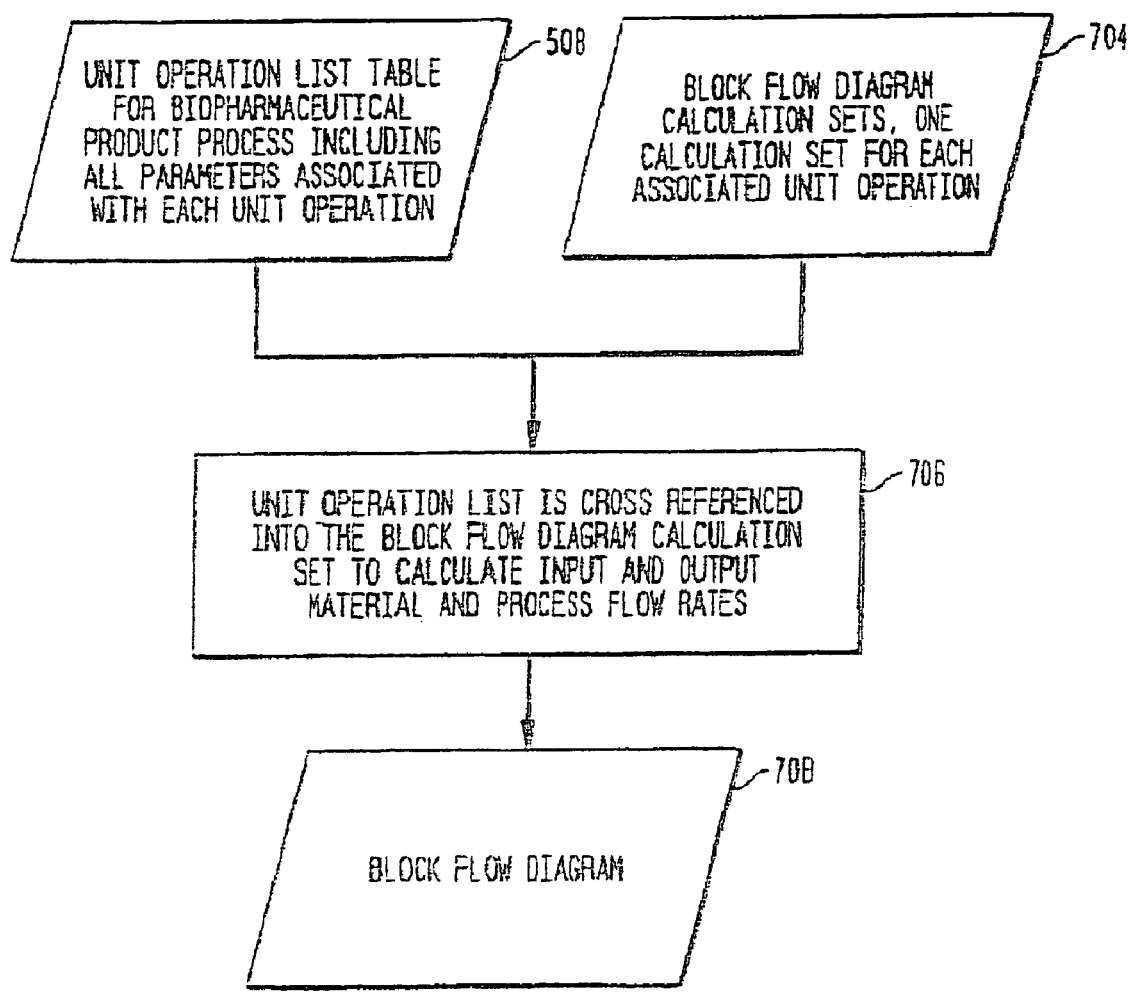
FIG. 7 illustrates the process for generating a block flow diagram according to the present invention.

FIG. 7 further illustrates step 110, generating a block flow diagram. A block flow diagram depicts each unit operation in the biopharmaceutical production process as a block with inputs for both incoming product and new material, as well as outputs for both processed product and waste. The material that flows through each of the unit operation blocks is quantified by calculation sets in each of the block flow diagram blocks. A unit operation block in a block flow diagram is a graphical representation of a unit operation. A calculation set is a set of algebraic equations describing a unit operation. Some examples of outputs of the calculation sets are: required process materials for that unit operation, equipment performance specifications and process data outputs to be used for the next unit operation. Some examples of inputs to the calculation sets are: product quantity (mass) or volume (liters) from a previous unit operation, other parameters and/or multipliers derived from the process parameters table, as well as the design cycles defined in the unit operation list.

Block flow diagram 708 is generated from unit operation list 508 and block flow diagram calculation set 704. Block flow diagram calculation set 704 is an exhaustive list of unit operation identifier codes and the calculation sets associated with each unit operation identifier. Unit operation list 508 and block flow diagram calculation set 704 are linked together based on unit operation identifier code.

Step 706 calculates the block flow diagram material flow requirements and basic equipment sizing requirements from unit operation list 508, which includes all of the associated operational parameters from the process parameters table, and the block flow diagram calculation set 704. Block flow diagram 708 allows the sizing of many key pieces of equipment relative to a given process scale. Since the material flow quantities into and out of each unit operation is determined at step 706, the capacity of many equipment items involved in each unit operation can be determined. The block flow diagram also manages important information in the unit operation list 502 such as the percent recovery, percent purity and purification factor of the product in each unit operation. This information helps identify the steps in the process that may need optimization.

The following is an example calculation set for a tangential flow micro-filtration (TFMF) system unit operation. Tangential flow micro-filtration is an important process technology in biopharmaceutical manufacturing. This technology significantly extends the life of the filtration media and reduces the replacement cost of expensive filters.

TFMF generically requires the same steps to prepare the membrane for each use as well as for storage after use. The design parameters for each unit operation such as TFMF have been developed around these generic design requirements.

Generic Parameters (Variables) from the Process Parameters Table

| | |
|---|---|
| Equipment Design Type | Plate & Frame |
| Membrane Porosity | 0.2 micron |
| Membrane Flux rate | 125 Liters/square meter/hour |
| Process Time | 2 Hours |
| Retentate/Filtrate Rate | 20 to 1 |
| Flush Volume | 21.5 Liters/square meter |
| Prime Volume | 21.5 Liters/square meter |
| Wash Volume | 0.5% of Process Volume |
| Regenerate Volume | 10.8 Liters/square meter |
| Storage Volume | 21.5 Liters/square meter |
| % Recovery of Product | 95% |
| % Recovery of Total Protein | 80% |
| Clean In Place (CIP) | Yes |
| Steam In Place (CIP) | Yes |
| Input Values from Previous Unit Operation | |
| Product Volume | 1,000 Liters |
| Product Quantity | 1.5 Kg |
| Total Protein Quantity | 3.0 Kg |

The calculation set for this unit operation first takes the incoming process volume and uses it as a basis of sizing the filtration membrane for the filtration system based on the above flux rate and required processing time:

1,000 Liters/125 L/SM/Hr/2 Hours=4.0 SM of 0.2 micron membrane

After calculating the square meter (SM) of membrane required by this unit operation, the volumes of each of the support solutions can be calculated based on the above volume ratios:

Flush volume 21.5 Liters/SM×4.0 SM=86 Liters

Prime volume 21.5 Liters/SM×4.0 SM=86 Liters

Wash Volume 5% of 1,000 Liters=50 Liters

Regenerate 21.5 Liters/SM×4.0 SM=86 Liters

Storage 10.8 Liters/SM×4.0 SM=42 Liters

The flow rate of the filtrate is calculated from the volume to be filtered and the required process time:

1,000 liters/2 hours=8.3 liters/minute

The flow rate of the retentate is calculated based on the above retentate/filtrate ratio:

8.3 liters/minute×20=167 liters/minute

Based on the input of the process volume to this unit operation and the above parameters, the equipment size, the filtration apparatus, the retentate pump, the support linkage and associated systems can be designed.

In addition, the input values for the quantity of product and contaminant protein received from the previous unit operation together with the recovery factors listed in the parameters allow the calculation of the cumulative recovery of product through this step, as well the percent purity of the product and the product purification factor for this step. This information is helpful for identifying steps in the manufacturing process that require optimization.

FIG. 8 illustrates an exemplary block flow diagram for the first five unit operations of the microbial fermentation process unit operation list of FIG. 3. Unit operations 1 through 5 are shown as blocks 802, 804, 806, 808 and 810. The input solutions to each of the steps are shown as arrows tagged with solution identifier information from the unit operation list 508. The process streams to which these solutions are added at each unit operation are also shown as arrows tagged with process stream identifier information. Working from the initial process stream characteristics (P-101) in unit operation 1, inoculum prep, the volumes of input materials (solutions) and subsequent process streams in each of the unit operations is determined using scale-up ratios which are included in the information from the unit operation list 508 for each respective unit operation. For example, the volume of solutions and process streams flowing into and out of each of unit operation blocks 802–810 in FIG. 8 is determined by the initial starting characteristics of the process stream P-101 and the volume of its associated input material S-101 in the first unit operation, block 802 and the scale up ratio in each of the successive unit operations, blocks 804–810. The solutions involved in each of unit operation blocks 802–810 are likewise part of the information for each respective unit operation in the unit operation list 508.

Figure 9:
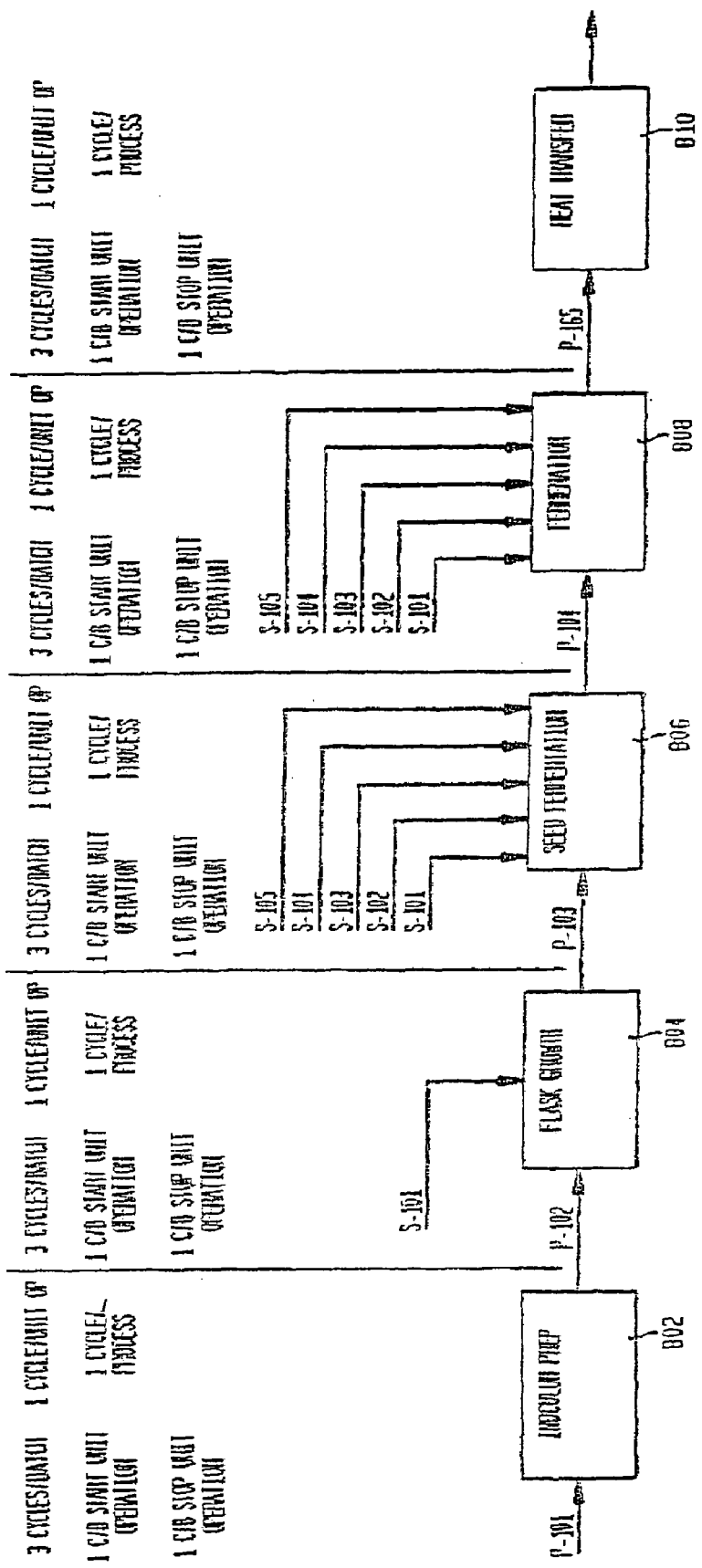
FIG. 9 illustrates a block flow diagram for the process of generating a process time line according to the present invention.
Figure 9:
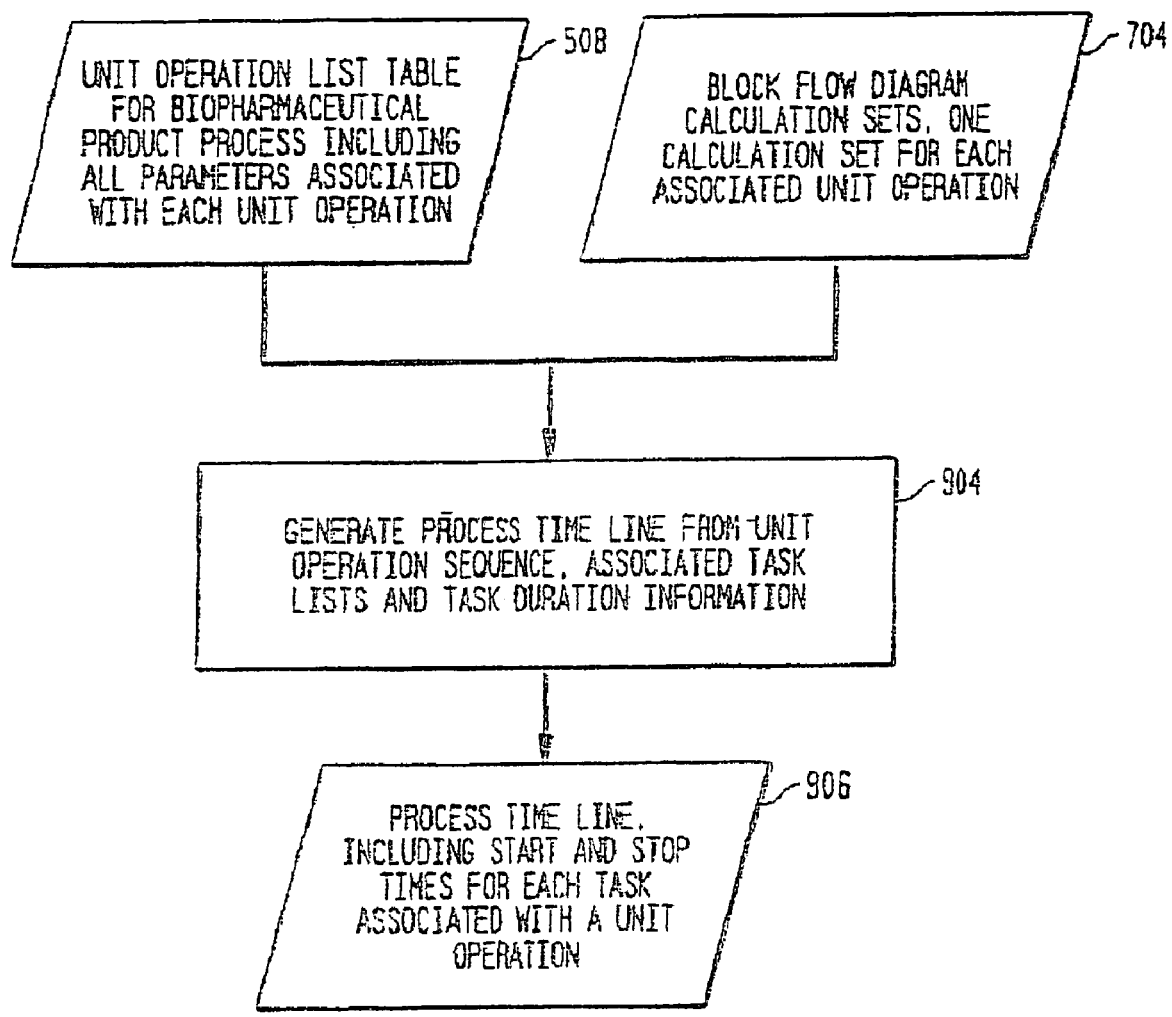

FIG. 9 further illustrates step 112, generating the process time line. The process time line is generated (steps 904 and 906) from unit operation list 508 and block flow diagram calculation set 704. Unit operation list 508 contains enough input information to generate a detailed process time line that includes the start and stop times for most of the tasks associated with each unit operation. The durations of some unit operation tasks are not scale dependent. The durations of other unit operation tasks are, however, scale dependent. In the latter case, as a process is scaled up, the amount of time required to complete a unit operation task increases. In such cases, where duration of a unit operation task is scale dependent, block flow diagram calculation set 704 is required to calculate the quantity of material handled by the unit operation task. After the quantity of material handled by a unit operation task is determined, its duration can be determined. Examples of scale dependent task durations are the time required to pump solutions from one storage tank to another, the amount of time required to heat or cool solutions in a heat exchanger, and the amount of time required to filter product or contaminants from solution.

FIG. 10 is an example of a high-level process time line for a microbial fermentation process. The unit operation sequence of the process time line of FIG. 10 corresponds to the unit operation list of FIG. 3. The high-level process time line shown in FIG. 10 illustrates two Process Cycles of the microbial fermentation unit operation sequence, labeled "First Process Cycle" and "Second Process Cycle." A "Process Cycle" (PC) is a complete run of the biopharmaceutical production process, as defined by the unit operation sequence for the process.

The first two columns of the process time line of FIG. 10 identify the unit operation sequence number and unit operation description of the unit operation being performed, respectively. The first three sets of unit operations correspond to the three Unit Operation Cluster Cycles of unit operation sequence numbers 1–6 of FIG. 3. Three cycles of unit operations 1–6 are performed and the results are pooled into unit operation 7, pool harvests. The two columns to the right of the duration column identify the week and day that the particular unit operation is occurring in the first Process Cycle.

The day and the week each unit operation is performed is calculated from the start time of the process, as well as the cumulative duration of each of the previous unit operations. In the example of FIG. 10, Sunday is defined as the first day of the week. In the example of FIG. 10, the process sequence begins at unit operation 1, inoculum prep, on Friday of the first week. After unit operation 1 has completed (24 hours later, since unit operation 1 has a 24 hour duration) unit operation 2 is performed on Saturday. The begin and end times for each successive unit operation are calculated from the duration of the unit operation and end time of the previous unit operation. Note that FIG. 10 is calculated to the day and week only for the purposes of explanation. Usually the process time line is determined for each of the tasks associated with a unit operation to the minute.

As illustrated in FIG. 10, unit operation 7 occurs on Monday of the third week in the first Process Cycle. The third column from the left is the duration of each of the unit operations. After the three cycles of unit operations 1 through 6 have been pooled in unit operation 7, the process continues at unit operations 8 through 10, heat exchange, cell disruption and heat exchange. Each of unit operations 8 through 10 are cycled three times and the associated scheduling information is contained in column to the right of the unit operation duration. Since each cycle of unit operations 8 through 10 have a duration of 0.5 hours, as shown in column 3, each cycle occurs on Monday of the third week in the process.

FIG. 11 illustrates the final unit operations of the process time line for the microbial fermentation process. After 3 cycles of unit operations 8 through 10 have been completed, unit operation sequence numbers 11 and 12 cycle together two times on Monday, week 3 of the first Process Cycle. After unit operation sequence numbers 11 and 12 have been cycled twice, the microbial fermentation production process continues without cycling from unit operation sequence number 13 through unit operation sequence number 22 to conclude the microbial fermentation production process. The durations and associated start times are listed for each of the unit operations 13–22.

FIGS. 12A–12H illustrate the preferred embodiment of a detailed process time line. The unit operation sequence of the process time line of FIGS. 12A–12H correspond to the unit operation list of FIG. 3. The process time line of FIGS. 12A–12H illustrates a single Process Cycle of the microbial fermentation unit operation sequence. The individual tasks associated with each unit operation are included after the unit operation. For example, in FIG. 12A, unit operation 1A, inoculum prep, consists of the individual tasks of set up, preincubation, incubation, and clean up. Columns 11–14 show the start date and time and finish date and time for each of the tasks in each unit operation. Since setup and clean up are not part of the critical path of the process, they do not directly affect the start and end times of following unit operations. The start and finish date and times for the set up and clean up operations of each of the unit operations are valuable because they ensure that the equipment will be available for each unit operation if the process time line is followed.

The process time line of FIGS. 12A–12H includes examples of unit operation task duration calculations. Row 20, column 15 of FIG. 12A, which corresponds to the harvest task of unit operation 3A, seed fermentation, is an example of a duration calculation. As stated above, the duration of some unit operations is process scale dependent (e.g., the duration is dependent upon the volume processed). The harvest task in the seed fermentation unit operation is an example of a task whose duration is process scale dependent. In column 15, the calculations column, information listed for the harvest task is 50 liters, 1.7 liters/minute (LPM), and 0.5 hours. Fifty liters represents the volume of material that is harvested during a harvest task. 1.7 liters/minute represents the rate at which the solution is harvested. Given the volume to be harvested and the flow rate of the harvest, the duration of the harvest task is calculated to be 0.5 hours. Each task in a unit operation that is volume dependent has its duration calculated in order to generate the process time line of FIGS. 12A–12H.

The process time line of FIGS. 12A–12H can be resolved to minutes and seconds, if necessary. The accuracy of the process time line allows the precise planning and scheduling of many aspects of the batch manufacturing process. The process time line scheduling information can be used to schedule manufacturing resources such as labor, reagents, reusables, disposables, etc., required directly by the manufacturing process for new or existing manufacturing facilities. Pre-process support activities such as solution preparation, and equipment prep and sterilization, required to support the core process, including the labor, reagents, etc. can be scheduled, cost forecasted and provided for. Post-process support activities such as product formulation, aseptic fill, freeze drying, vial capping, vial labeling and packaging required to ship the purified product in a form ready for use may be added to the process time line and managed. Based on the process time line, labor, reagents, etc., required to support these post-process support functions can be acquired and managed. One of the most important aspects of the present invention is the determination of process utility loads such as USP Purified Water, Water For Injection, Pure Steam, etc., for all of the manufacturing equipment. The process time line can be used to determine the peak utility loading, and utility requirements for the facility. Building utility loads such as building steam, heating, ventilation, air conditioning, plumbing, etc., for all manufacturing equipment, process areas and facility equipment can be determined based on the process time line and the equipment associated with each of the unit operations. The process time line can be used to measure the time that the equipment has been in service to schedule preventative maintenance of all plant equipment, Quality Assurance activities including instrument calibration, automated batch documentation, etc. and Quality Control activities including process system maintenance, raw material testing, in process testing and final product testing, etc.

In an alternative embodiment of the present invention, a refinement can be made to the generation of a process time line (PTL), as shown in FIG. 9 (step 112 of FIG. 1), based on the three levels of scheduling cycles—"Unit Operation Cycles," "Unit Operation Cluster Cycles," and "Batch Cycles"—discussed above.

The refinement focuses on how to apply the offsets associated with each design cycle to the PTL. In cases where the offset for any of the levels of scheduling cycles is equal to zero, as soon as the cycle is completed it immediately begins the next cycle at that same cycle level, assuming another cycle has been specified. Otherwise, the scheduling mechanism passes to the next unit operation specified and its respective set of cycle conditions. The refinement clarifies the impact an offset of greater than zero for any of the scheduling cycle levels has on the PTL.

To implement the refinement, a unit operation tagging convention based on a four-field delimited string is used to identify each cycle iteration of a unit operation module in a PTL (PTML) by its respective cycle level and cycle count. A PTML is a section of the PTL having a set of tasks with respective scheduling calculations that are associated with a given unit operation. The above delimited fields are defined as follows:

| DELIMITED FIELD | VALUE |
| --- | --- |
| Field 1 | Unit Operation Sequence Number |
| Field 2 | Batch Cycle Iteration |
| Field 3 | Cluster Cycle Iteration |
| Field 4 | Unit Operation Cycle Iteration |

Together, the four-fields of the delimited string makes up a Delimited String Code (DSC) (e.g., "3.2.1.1") that provides a unique identifier for each PTLM in the PTL. The DSCs are based upon the above-described sequence and design cycle information for each design cycle iteration for each unit operation in the PTL.

As discussed above, a PTL consists of unit operations decomposed into unit operation tasks that are required to complete a unit operation procedure. These tasks can be divided in to three basic categories: Unit Operation Set Up (e.g., equipment preparation), Unit Operation Execution (e.g., equipment usage), and Unit Operation Clean Up (e.g., equipment clean up). Tasks associated with Unit Operation Execution can be said to be on the critical path of the PTL and usually involve manipulation of the product in preparation for the next unit operation in the process procedure.

Unit Operation Set Up Tasks (SUTs) are performed before Unit Operation Execution Tasks in order to prepare equipment for the Unit Operation Tasks that are on the critical path of the PTL. Generally, SUTs can be performed any time before the first Unit Operation Execution task is scheduled to be started based on the availability of the product from the previous unit operation. However, typically, SUTs cannot be back scheduled to the extent that they interfere with completion of the previous usage cycle for the respective set of equipment or compromise the integrity of the process or product in any way. Unit Operation Clean Up Tasks (CUTs) are typically needed in order to clean and prepare equipment for its next use. The above definitions of the three basic tasks are important relevant to accurately defining the impact of the above design cycles and their associated offsets on task scheduling in the PTL.

An application of the offset refinement can be explained, for example, with reference to mammalian cell culture production process (see FIG. 4 described above) and microbial fermentation process (See FIG. 5 described above). Referring to FIG. 21, an example showing the harvest and initial purification steps associated with a mammalian cell culture process is presented. A mammalian cell culture process provides a good example of the use of Batch Cycles as well as Unit Operation Cycles and their respective offsets. It is based on a batch process that involves continuous or semi-continuous product synthesis with batch purification of the crude product produced by the cell culture reactor.

Because a mammalian cell culture reactor may be in production for 60–90 days, the product enriched media that the cells grow in is typically harvested either continuously or in batch harvest cycles every 1, 2 or 3 days. In each harvest cycle a fresh supply of media is fed to the reactors as the product enriched media is harvested. Thus, the mammalian cell process illustrated in FIG. 21 demonstrates how Batch Cycles and their offsets impact the generation of a consecutive PTL together with the Unit Operation Cycles and their offsets.

Referring to FIG. 22 an example showing the initial purification steps associated with a microbial fermentation process is presented. A microbial fermentation process provides a good example of the use of two types of Cluster Cycles and their respective offsets and how they and their offsets impact the generation of a consecutive PTL.

Referring again to FIG. 21, where media is batch harvested every 24 hours for 3 UC's (Unit Operation 1) and these daily harvests are pooled every 72 hours to be batch purified (Unit Operations 2–4), a base model which demonstrates the use of offsets for Batch Cycles (BC) as well as Unit Operation Cycles is present. In this case a BC is defined by unit operations 2–4 as a subset of the process cycle defined by unit operations 1–4. The Batch Cycle Offset (BCO) in this case is 72 (3 days). Every 3 days a new batch of material is begun. In a PTL for this example, if one were to demonstrate a consecutive time line with iterative Batch Cycles, the start of the First Critical Path Task (FCPT) would have to be offset from the beginning of the FCPT from the previous BC.

Referring again to FIG. 22, where a cluster of three concurrent unit operations is cycled 3 times in order to "disrupt" the cells harvested from a fermentor, a concurrent or simultaneous cluster cycle is presented (Unit Operations 10305–10307). In a simultaneous cluster cycle all the unit operations in a given cluster cycle operate simultaneously versus sequentially during each cluster cycle. In this case the inlet heat exchanger, cell disruption and outlet heat exchanger all operate simultaneously to each other during each Cluster Cycle. In Unit Operations 10309–10310, a sequential cluster cycle is presented where the first unit operation in the cluster completes is unit operation cycle before the next unit operation in the cluster cycle begins and so on during each cluster cycle.

Referring to FIGS. 23A–F, a PTL generated based on the design cycles defined in the Unit Operation List in FIG. 21 is shown. In this PTL, there is a PTL Module (PTLM) for each unit operation cycle required to generate a consecutive time line based on the design cycle patterns defined in the Unit Operation List. Column 2302 lists the DSC for each PTLM in the sample PTL. Column 2304 lists calculations required to determine the duration of each of the calculated tasks associated with a unit operation. Column 2306 lists the duration of each task as determined by either calculation or manual entry. Column 2308 lists schedule adjustment factors (SAF) to forward schedule or back schedule a task duration. Column 2310 lists the adjusted duration of a task based on the calculated duration in column 2306 and the adjustment factor in column 2308.

Column 2312 lists the finish times, in hours, for each of the SUTs. These finish times are back calculated from the FCPS time based on the task duration and SAF for each SUT (as further explained below). Column 2314 lists the finish times for each of the Critical Path Tasks (CPT) associated with a unit operation. The finish times are forward calculated from the First Critical Path Task End Time (FCTPE) based on the task duration and SAF for each respective CPT (further explained below). Column 2316 lists the finish times for the CUTs associated with a unit operation. Finish times for these CUTs are calculated from the finish time of the Critical Path End Time for the Current Unit Operation (CCPE) and the adjusted durations for each of the subsequent CUTs. Column 2318 lists the calculated start time for each task in the PTL based upon the end time for the respective task in columns 2312, 2314, or 2316, and their respective task duration and SAFs from columns 2306 and 2308, respectively. Column 2320 lists the calculated end time for each task in the PTL based on the end times determined in columns 2312, 2314 or 2316.

Figure 24:
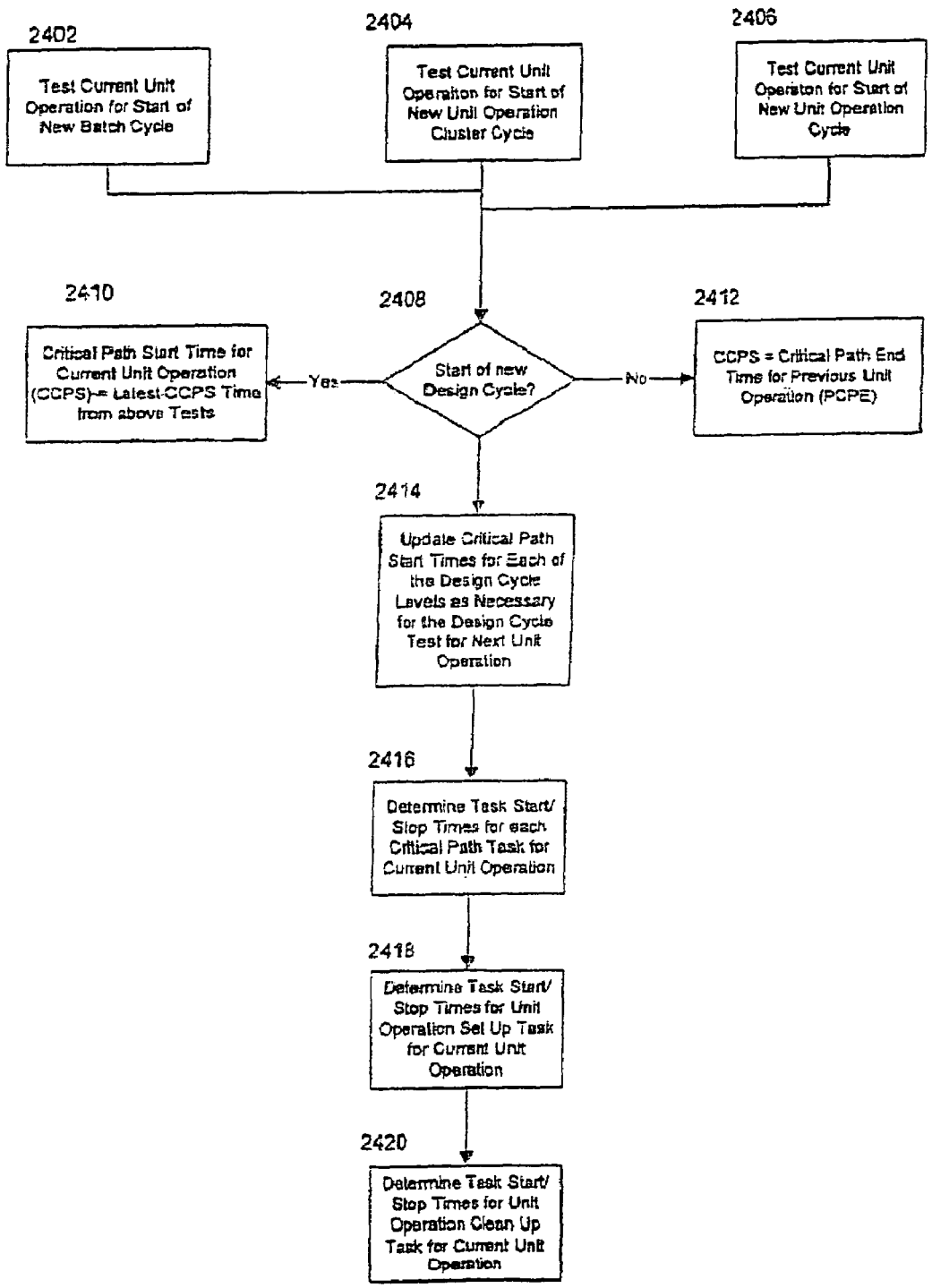
FIG. 24 is a flow chart that illustrates the method for determining the impact of design cycle offsets on the current critical path start time for a respective unit operation cycle.

Referring to FIG. 24, a high level flow chart that illustrates the method for determining the impact of design cycle offsets on the Current Critical Path Start Time (CCPS) for a respective Unit Operation Cycle in the PTL is shown. In Step 2402, the Batch Cycle Iteration Field (BCIF) for the PTLM (DCS Field 2) is evaluated to determine if the current unit operation sequence number is the start unit operation for a Batch Cycle Iteration as defined in column 2120 in FIG. 21. If it is, the CCPS time for the new Batch Cycle Iteration is calculated from the start time from the previous BC plus the BCO. If not, the BC test is ended and the cluster cycle conditions for the current unit operation are then evaluated in Step 2404.

Figure 25:
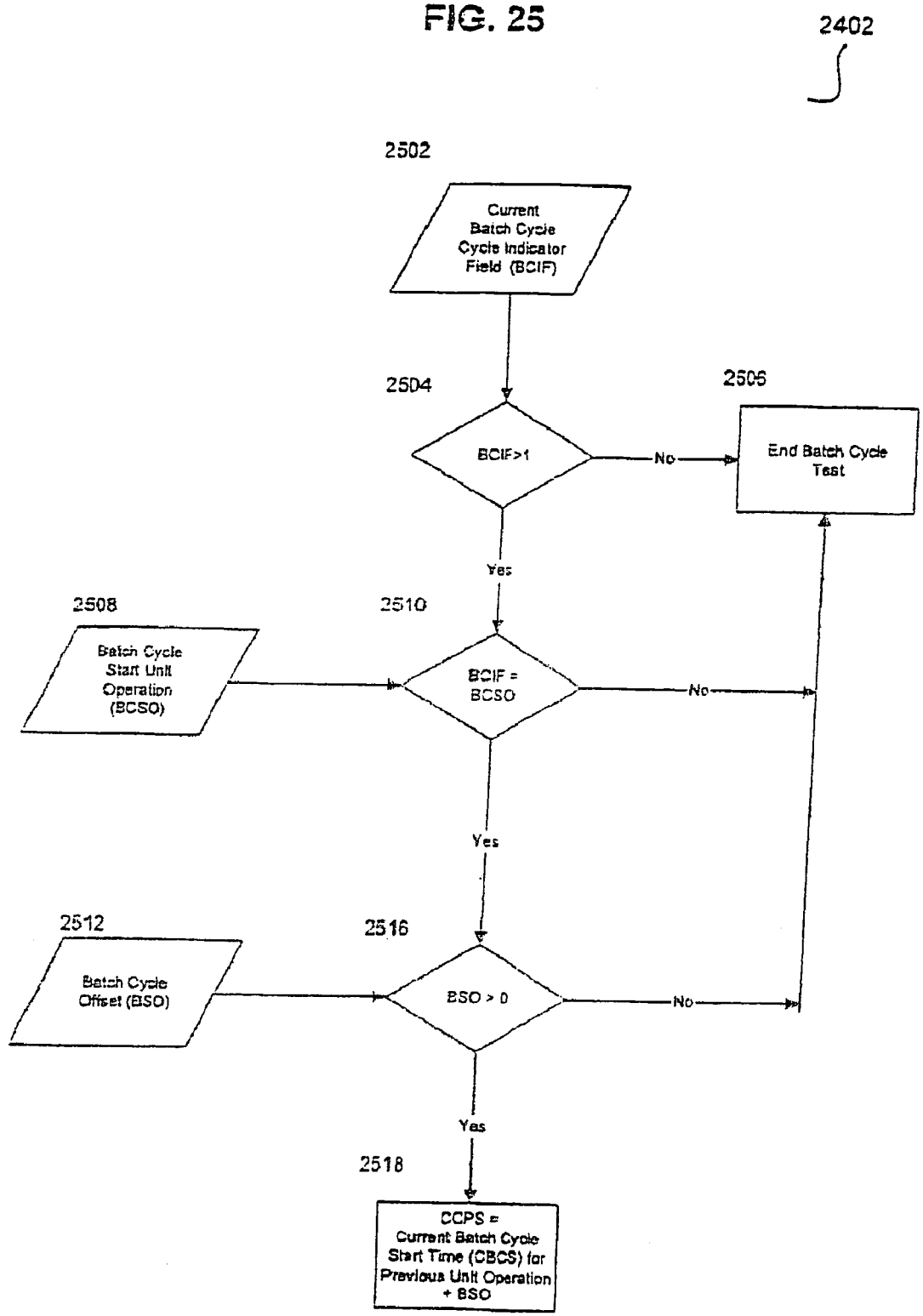
FIG. 25 is a flow chart that illustrates the test for a new batch cycle according to an embodiment of the present invention.

Referring to FIG. 25, the evaluation in step 2402 is further illustrated. The BCIF for the Current Unit Operation in Step 2502 is evaluated in step 2504. If the BCIF for the Current Unit Operation is not greater than one, the BC test is ended (Step 2506) and the Cluster Cycle Test is performed. If the BCIF is greater than one, the Batch Cycle Start Unit Operation (BCSO) is obtained from column 2122 from FIG. 21 (Step 2508). The BCIF is evaluated in Step 2510 to determine if it is equal to the BCSO. If the BCIF is not equal to the BCSO, the Batch Cycle Test is ended in Step 2506 and the Cluster Cycle Test is performed. If the BCIF is equal to the BCSO, then the BCO is obtained from Column 2126 in FIG. 21 (Step 2512). In Step 2516, the BSO is evaluated to determine if it is greater than zero. If the BCO for the Current Unit Operation is not greater than zero, the Batch Cycle Test is ended in Step 2506 and the Cluster Cycle Test is Performed. Otherwise, the CCPS is set equal to the PCPS plus the BCO (Step 2518). The resulting value from FIG. 25 is then stored for further evaluation in Step 2408.

A Cluster Cycle occurs when a set of two or more Unit Operations cycle together prior to the next steps in the manufacturing procedure within a BC. In some cases the Unit Operations in the Cluster Cycle follow each other sequentially where the CCPS of a subsequent Unit Operation in a CC follows the End Time for the Last Critical Path Task of the previous Unit Operation (PCPE) in the UC. An example of this type of CC is found in FIG. 22 in a sample case of the initial purification stage of a Microbial Fermentation Process. In this sample case, the Inclusion Body Wash steps in Unit Operations 10309–10310 are repeated twice before continuing with Unit Operation 10311. The Dilution Step is competed before the Centrifugation Step is started. After Unit Operation 10310 is completed Unit Operations 10309–10310 are repeated a second time in the same sequential manner before continuing with the next unit operation 10311, thus completing the second cluster cycle. In other CC cases the Unit Operations subsequent to the first Unit Operation in a CC occur concurrently to the first Unit Operation in the CC. In this latter case the CCPS of each Unit Operation in the CC that is subsequent to the first Unit Operation in the CC is set equal to the Critical Path Start Time of the First Unit Operation in the CC. An example of this type of CC is also found in FIG. 22. More specifically, the Cell Disruption Steps in Unit Operations 10305–10307 are repeated three times before continuing with Unit Operation 10308. In this case Unit Operations 10306 and 10307 each occur simultaneously to the first (10305). In other words, all three Unit Operations in the Cluster Cycle share the same CCPS.

Step 2404 of FIG. 24 illustrates a CC test being performed to determine if the current Unit Operation in the PTL is the start of a new CC. In Step 2404, the Cluster Cycle Iteration Field (CCIF) for the current unit operation (DCS Field 3) is evaluated to determine if the Current Unit Operation sequence number in column 2202 is the start unit operation for a Cluster Cycle Iteration as defined in column 2214 in FIG. 22. If it is, the CCPS time for the new Cluster Cycle Iteration is calculated from the start time from the previous CC plus the Cluster Cycle Offset (CCO) from column 2218 as further explained below.

Figure 26:
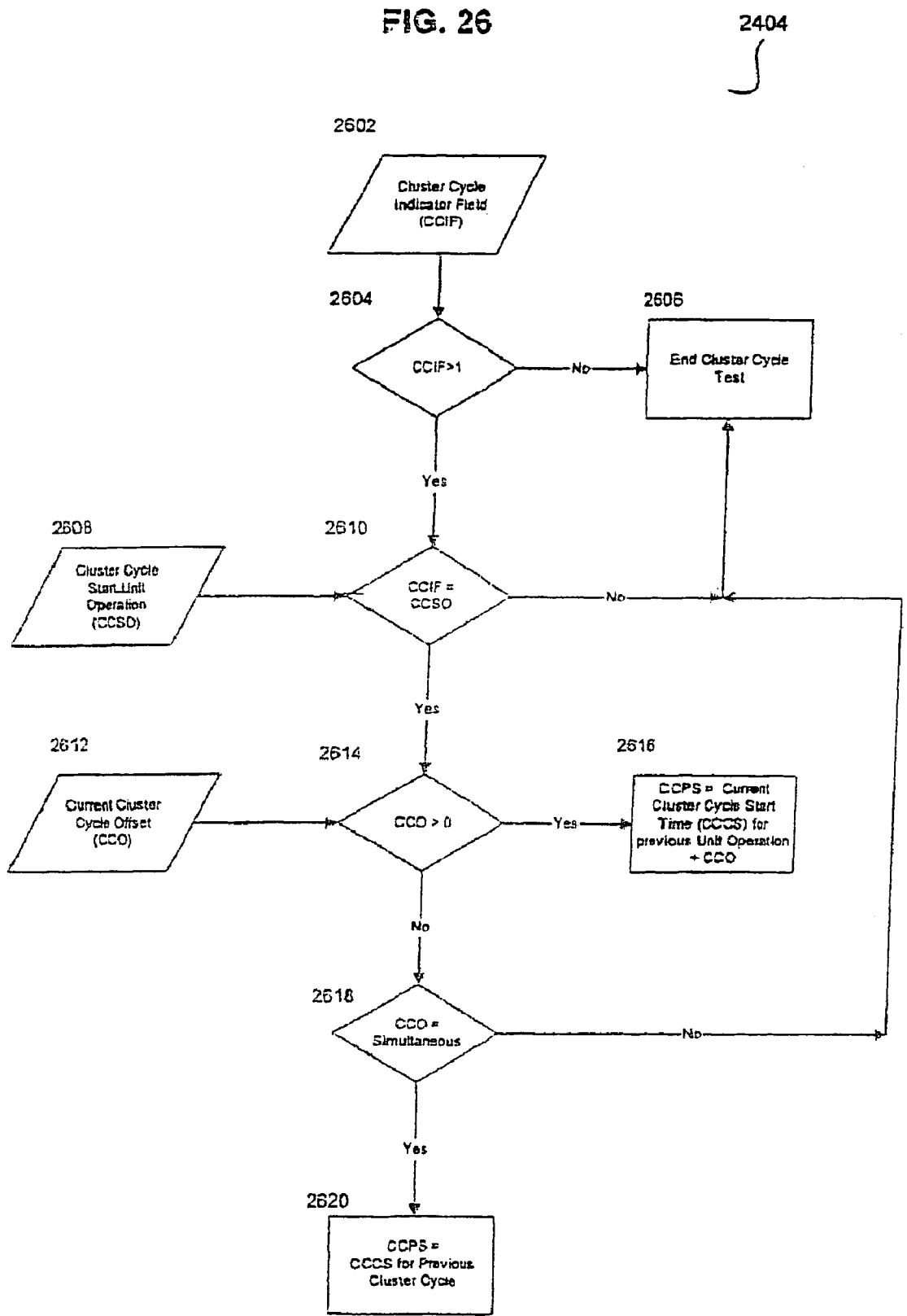
FIG. 26 is a flow chart that illustrates the test for a new unit operation cluster cycle according to an embodiment of the present invention.

Referring to FIG. 26, the CC test in step 2404 is further illustrated. The CCIF for the current Unit Operation in Step 2602 is evaluated in Step 2604. If the CCIF is not greater than one, the CC test is ended in step 2606 and the Unit Operation Cycle Test is performed as in Step 2406. If the CCIF is greater than one, the Cluster Cycle Start Unit Operation (CCSO) is obtained from column 2214 in FIG. 22 (Step 2608). In Step 2610, the CCIF is evaluated to determine if it is equal to the CCSO. If the CCIF is not equal to the CSCO the CC test is ended in Step 2606 and the Unit Operation Cycle Test is performed. If the CCIF is equal to the CSCO, then CCO for the Current Unit Operation is obtained from column 2218 (Step 2612). In step 2614 the CCO is evaluated to determine if it is greater than zero.

If the CCO is greater than zero, CCPS is set equal to Critical Path Start for the Previous Cluster Cycle plus the CCO (Step 2616). If the CCO is not greater than zero, the CCO is evaluated in Step 2618 to determine if it is equal to "S" meaning that the current Unit Operation is to start simultaneously (concurrently) to the first Unit Operation in the current Cluster Cycle. If the CCO is not equal to "S", the CC test is ended in Step 2606 and Unit Operation Cycle Test is performed. Otherwise, the CCPS is set equal to the Critical Path Start for the Previous Cluster Cycle (Step 2620). The resulting value from FIG. 26 is stored for further evaluation in Step 2408.

Step 2406 of FIG. 24 illustrates a UC test being performed after a CC test. In Step 2406, the Unit Operation Cycle Iteration Field (UCIF) for the current unit operation (DCS Field 4) is evaluated to determine if it is greater than one. If it is not, the Unit Operation Cycle Test ends. If it is, the CCPS time for the new Unit Operation Cycle Iteration is calculated from the start time from the previous UC plus the Unit Operation Cycle Offset (UCO) as further defined below. Otherwise the CCPS time for the current Unit Operation continues from the PCPE of the previous Unit Operation.

Figure 27:
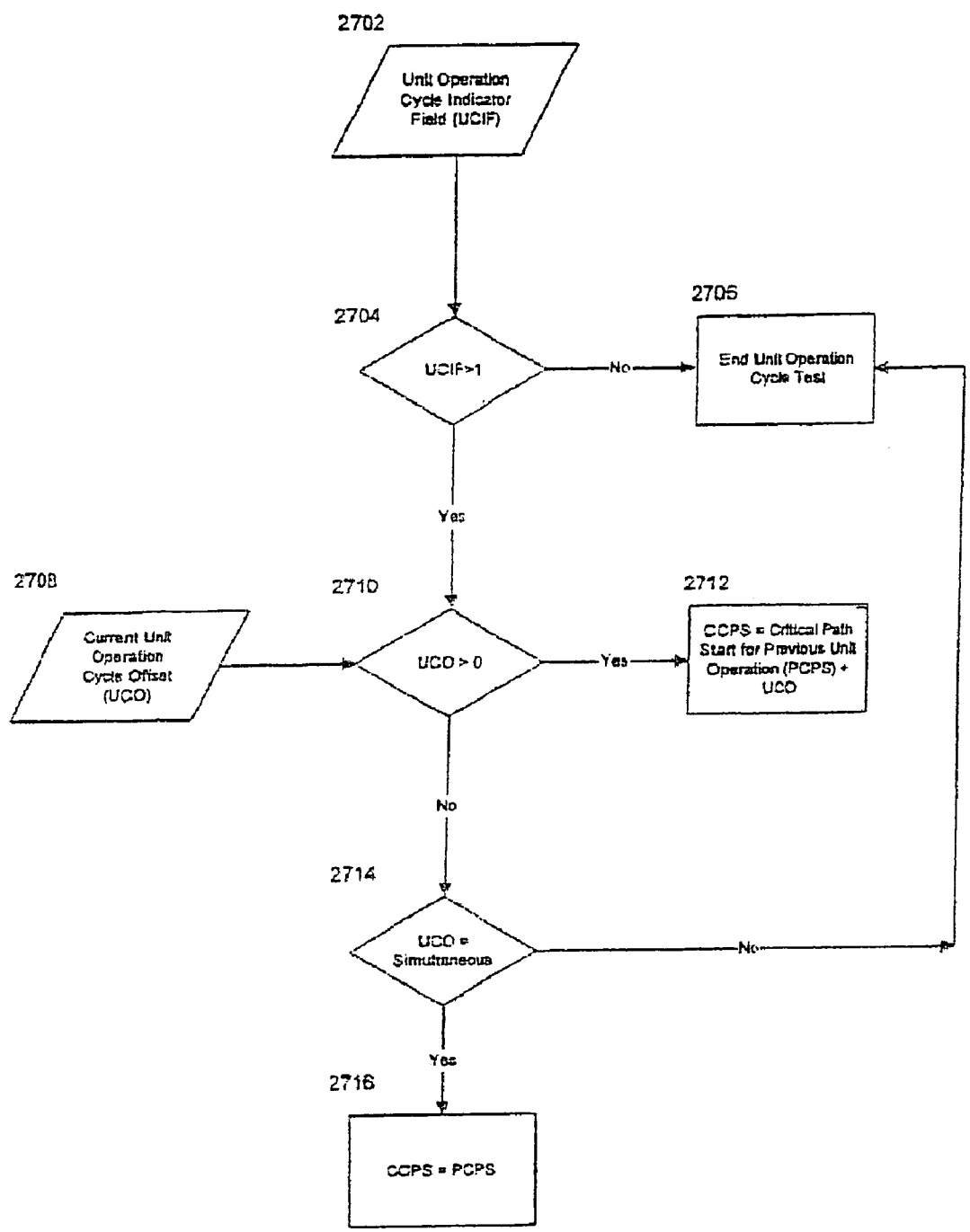
FIG. 27 is a flow chart that illustrates the test for a new unit operation cycle according to an embodiment of the present invention.

Referring to FIG. 27, the evaluation in step 2406 is further illustrated. In Step 2702, the UCIF for the current Unit Operation is obtained. In Step 2704 it is evaluated to determine if it is greater than one. If the UCIF is not greater than one, the Cycle Offset Test ends as indicated by Step 2706. If the UCIF is greater than one, then the UCO for the Current Unit Operation in column 2107 is obtained (step 2708). In step 2710, the UCO is evaluated to determine if it is greater than zero. If the UCO is greater than zero, CCPS is set equal to Critical Path Start for the Previous Unit Operation Cycle plus the UCO (Step 2712). If the UCO is not greater than zero, the UCO is evaluated in Step 2714 to determine if it is equal to "S" meaning that the current Unit Operation is to start simultaneously (concurrently) to the previous Unit Operation. If UCO is not equal to "S", the Unit Operation Cycle Test is ended (Step 2706). Otherwise, the CCPS is set equal to PCPS (Step 2716). The resulting value from FIG. 27 is stored for further evaluation in Step 2408.

Step 2408 of FIG. 24 evaluates the results of the above three Cycle Offset Tests do see if there is a positive result from any of them, indicating that the current unit operation is the beginning of an iteration of one of the three levels of design cycles to which a design cycle offset applies. If there is not a positive result, CCPS is set equal to PCPE (Step 2410). If it there is a positive result CCPS is set equal to the latest start time produced by the three tests (Step 2412).

Figure 28:
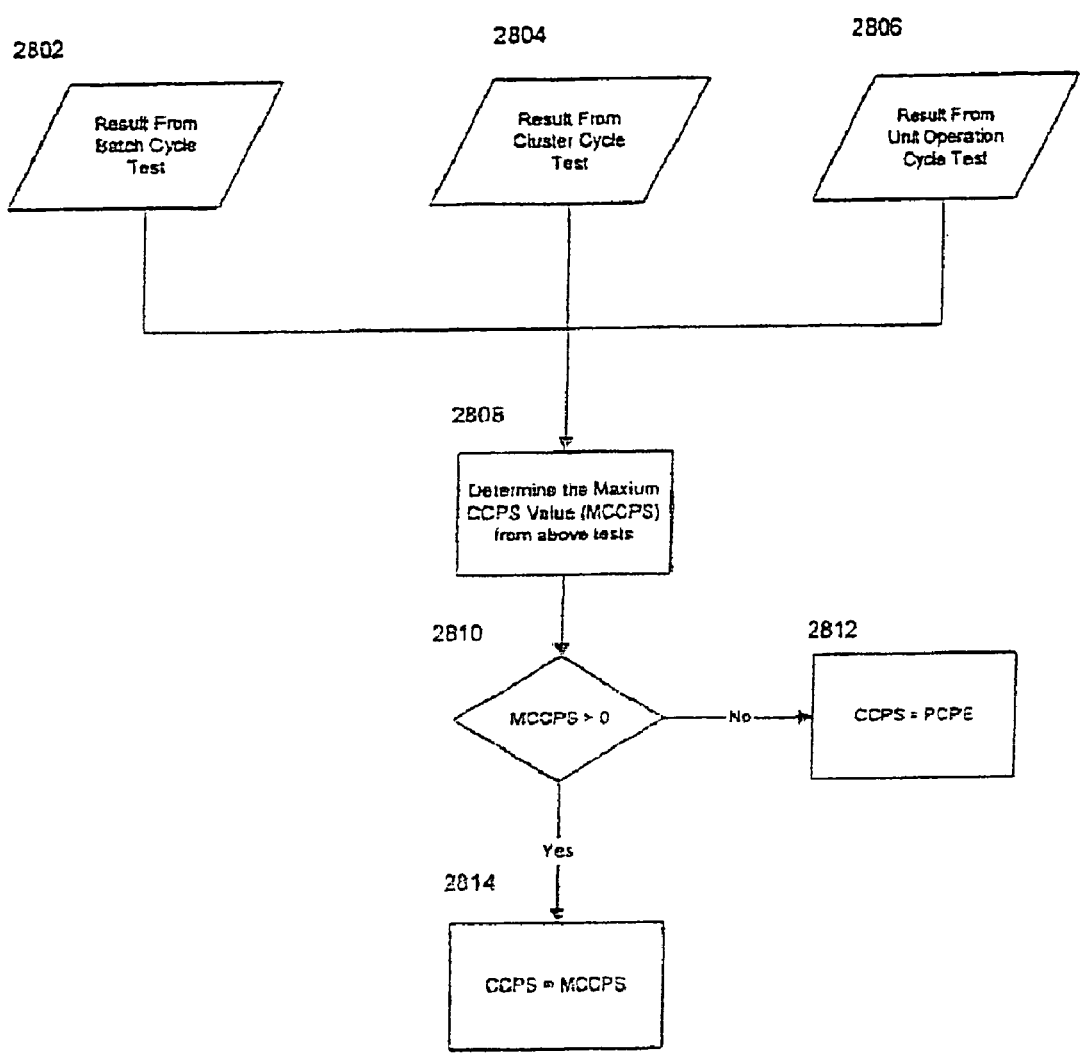
FIGS. 28–34 are a flow chart that illustrates the determination of start/stop times for various cycles according to an embodiment of the present invention.

FIG. 28 further illustrates Steps 2408–2412 of FIG. 24. In Steps 2802, 2804 and 2806 the Design Cycle Test Results from the Batch Cycle Test, Cluster Cycle Test and Unit Operation Cycle Test are obtained, respectively. In Step 2808, these obtained values are evaluated to find the maximum CCPS value (MCCPS). In step 2810, the MCCPS value is evaluated to determine if it is greater than zero. A MCCPS value equal to zero in Step 2808 indicates that the current unit operation is not a start unit operation for any design cycle iteration to which a design cycle offset applies. Therefore the CCPS time for the current unit operation in this case is PCPE (Step 2812). A MCCPS value greater than zero indicates that the current unit operation is the start unit operation for at least one design cycle iteration to which an offset greater than zero applies at the respective design cycle level. Therefore the CCPS time for the current unit operation in this case is equal to MCCPS from Step 2808. Note that the Design Cycle Tests illustrated in FIGS. 24–31 only impact the PTL if the Current Unit Operation (CUO) is the Start Unit Operation (SUO) for an iteration of at least one of the above design cycles and the offset of that design cycle is greater than zero or equal to "S." Otherwise the CCPS starts at PCPE even if the CUO is the SUO for a given Design Cycle.

Once the accurate CCPS has been determined via the above procedure, the CCPS times for each of the Design Cycle levels needs to be updated to be referenced by the Design Cycle Check mechanism for the next PTLM in the PTL as shown in Step 2414 of FIG. 24. This update mechanism is dependent on the current PTLM being the SUO of a respective Design Cycle set and the number of cycles for a respective Design Cycle level being greater than one. This update mechanism does not depend on there being an Offset Value greater than zero associated with the respective Design Cycle, as does the above Design Cycle Check mechanism.

Figure 29:
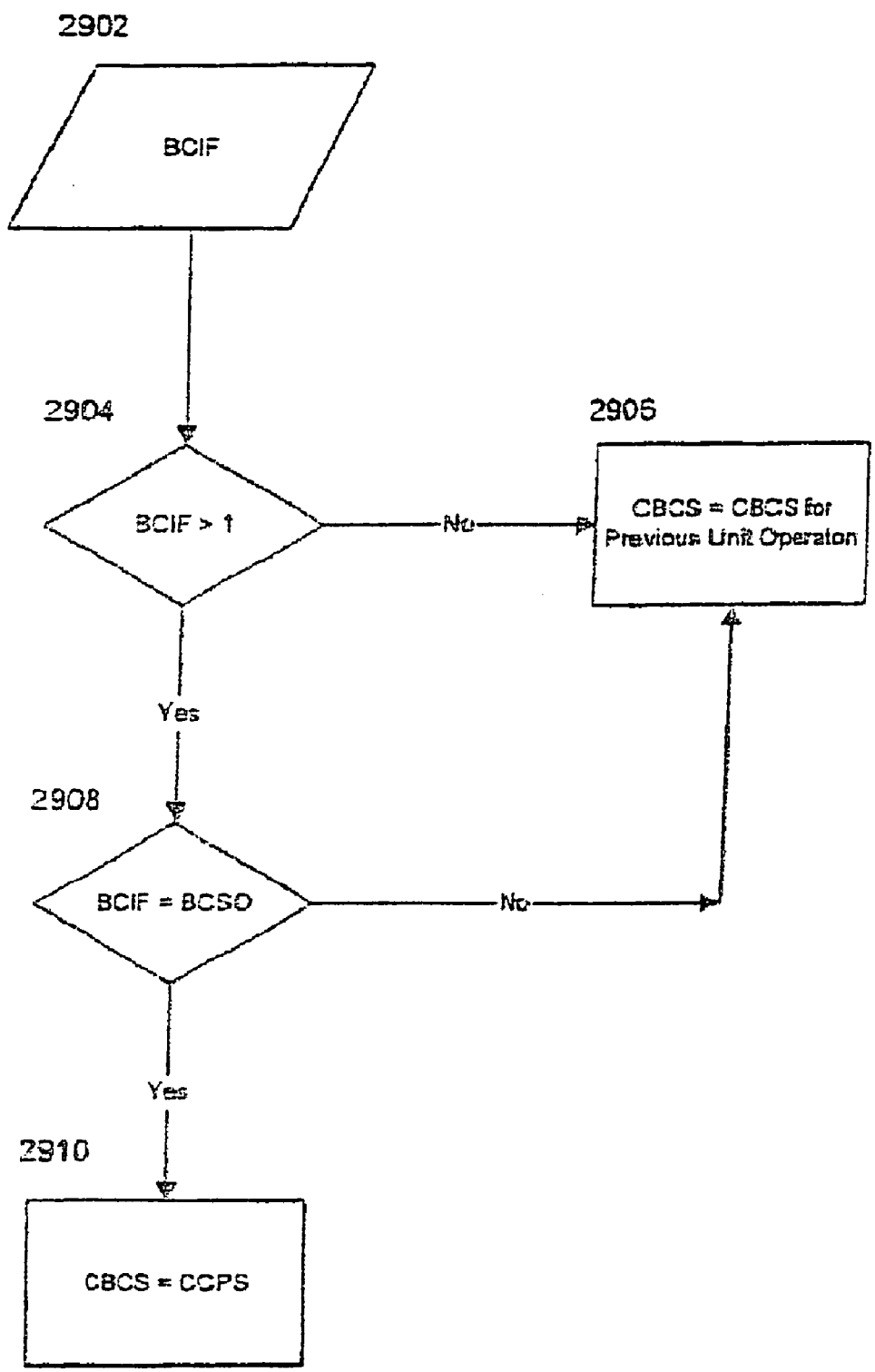

FIG. 29 further illustrates the procedure for updating the CCPS for the current Batch Cycle for the current PTLM. The BCIF is obtained in Step 2902 and evaluated in Step 2904. If the BCIF is not greater than one, the current PTLM is not the start of a new Batch Cycle because there are no reiterating Batch Cycles defined for the current PTL in the Unit Operations List (FIG. 21, Column 2120). Therefore, the Start Time for the CCPS for the current Batch Cycle (CBCS) is set equal to the CBCS for the previous Unit Operation (Step 2906). If BCIF is greater than one, the BCIF is further evaluated in Step 2908 to determine if it is equal to the BCSO. If the BCIF is not equal to the BCSO, the current Unit Operation is not the Start Unit Operation for a new iteration of a Batch Cycle. Therefore, the CBCS is set equal to CBCS for the Previous Unit Operation (Step 2906). If the BCIPF is equal to the BCSO, the current Unit Operation is the Start Unit Operation for a new iteration of a Batch Cycle and CBCS is set equal to the CCPS for the Current PTLM as determined by the procedures illustrated in FIGS. 25–28.

Figure 30:
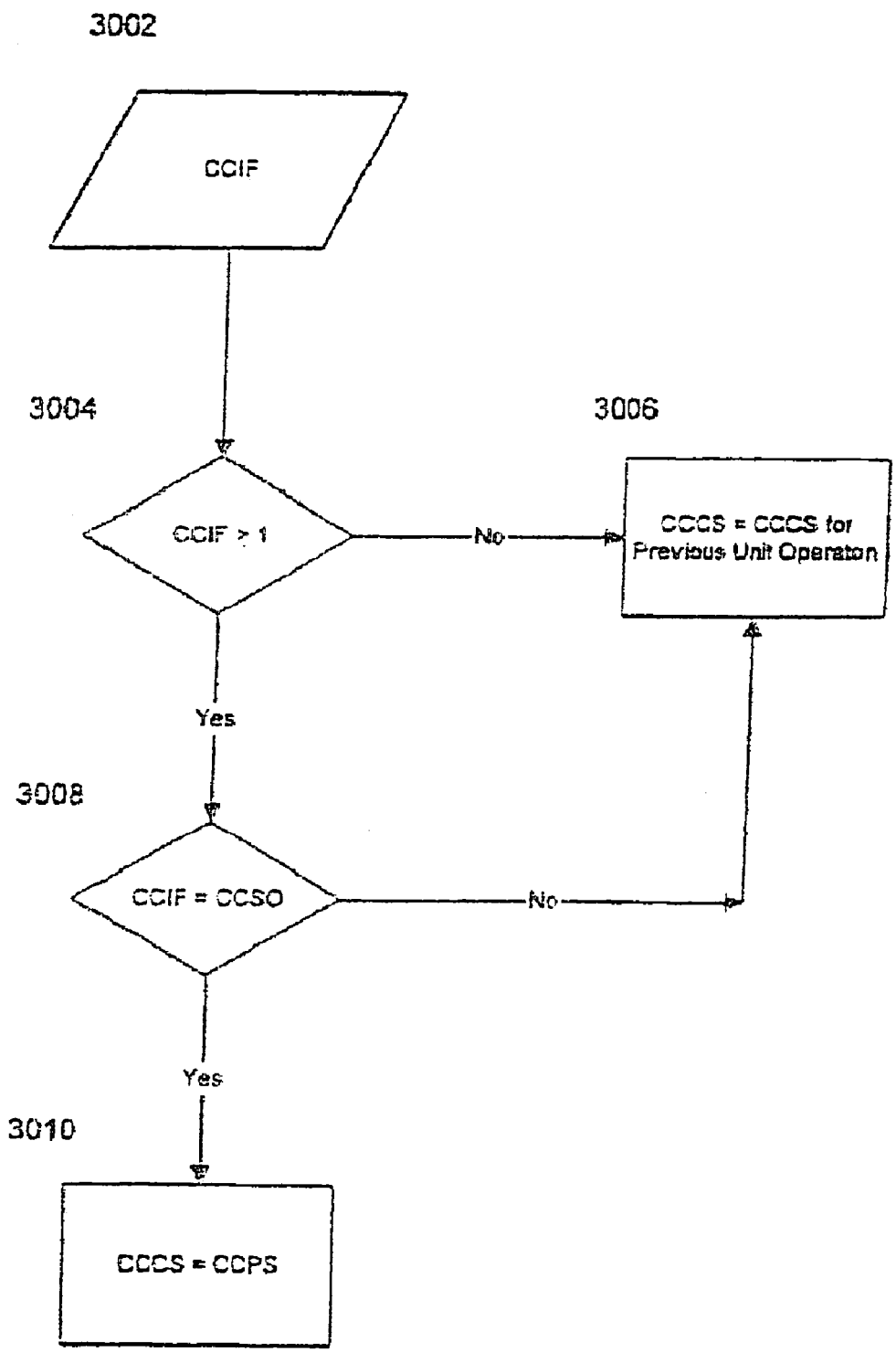

FIG. 30 further illustrates the procedure for updating the CCPS for the current Cluster Cycle for the current PTLM. The CCIF is obtained in Step 3002 and evaluated in Step 3004. If the CCIF is not greater than one, the current PTLM is not the start of a new Cluster Cycle iteration because there are no reiterating Cluster Cycles defined for the current PTL in the Unit Operations List (FIG. 21, Column 2112). Therefore, the Start Time for the CCPS for the current Cluster Cycle (CCCS) is set equal to the CCCS for the previous Unit Operation (Step 3006). If CCIF is greater than one, the CCIF is further evaluated in Step 3008 to determine if it is equal to the CCSO. If the CCIF is not equal to the CCSO, the current Unit Operation is not the Start Unit Operation for a new iteration of a Cluster Cycle. Therefore, the CCCS is set equal to CCCS for the Previous Unit Operation (Step 3006). If the BCIPF is equal to the CCSO, the current Unit Operation is the Start Unit Operation for a new iteration of a Cluster Cycle and CCCS is set equal to the CCPS for the Current PTLM as determined by the procedures illustrated in FIGS. 25–28.

Figure 31:
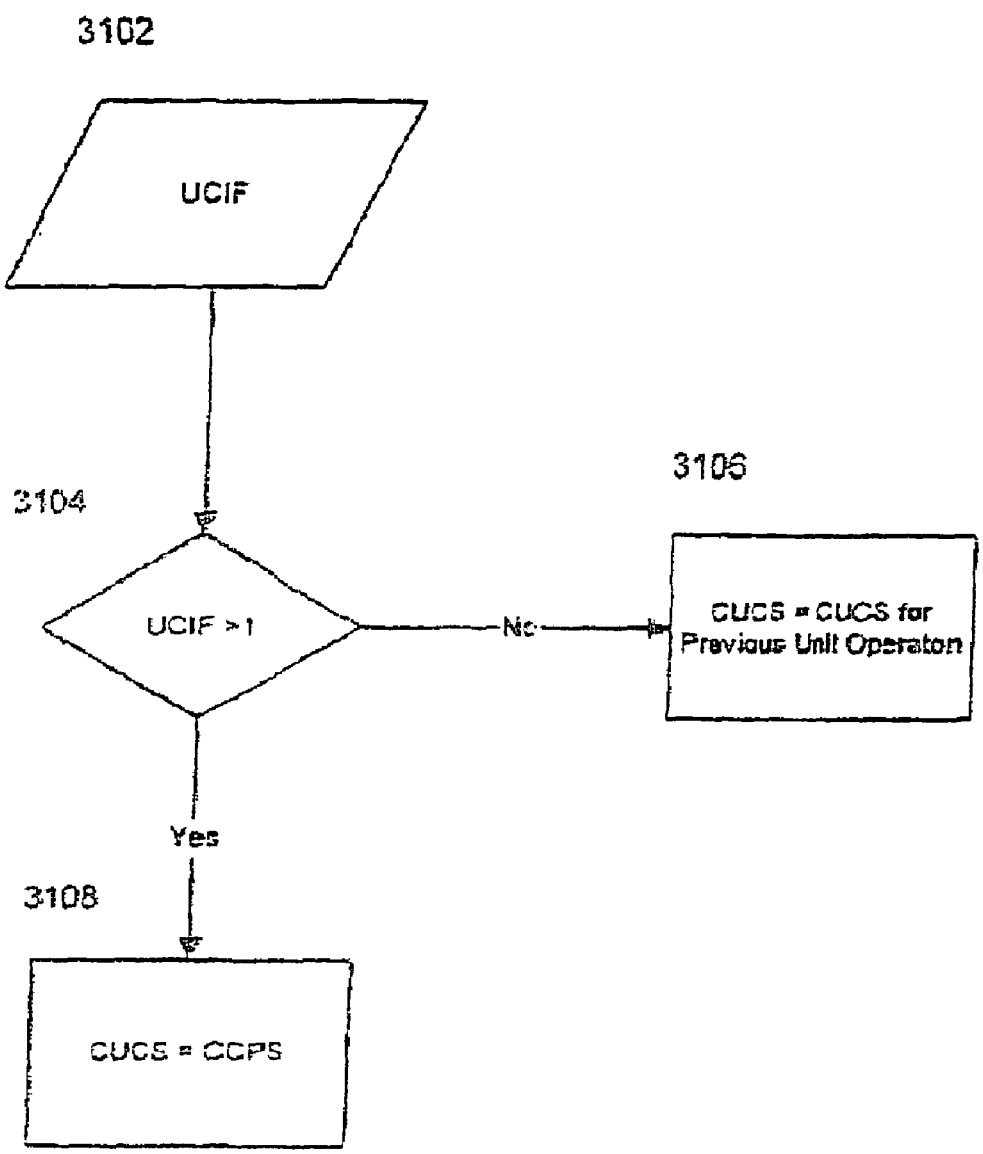

FIG. 31 further illustrates the procedure for updating the CCPS for the current Unit Operation Cycle for the current PTLM. The UCIF is obtained in Step 3102 and evaluated in Step 3104. If the UCIF is not greater than one, the current PTLM is not the start of a new Unit Operations Cycle iteration because there are no reiterating Unit Operations Cycles defined for the current PTL in the Unit Operations List (FIG. 21, Column 2112). Therefore, the Start Time for the CCPS for the current Unit Operations Cycle (UCCS) is set equal to the UCCS for the previous Unit Operation (Step 3106). If UCIF is greater than one, the CCCS is set equal to the CCPS for the Current PTLM as determined by the procedures illustrated in FIGS. 25–28.

Figure 32:
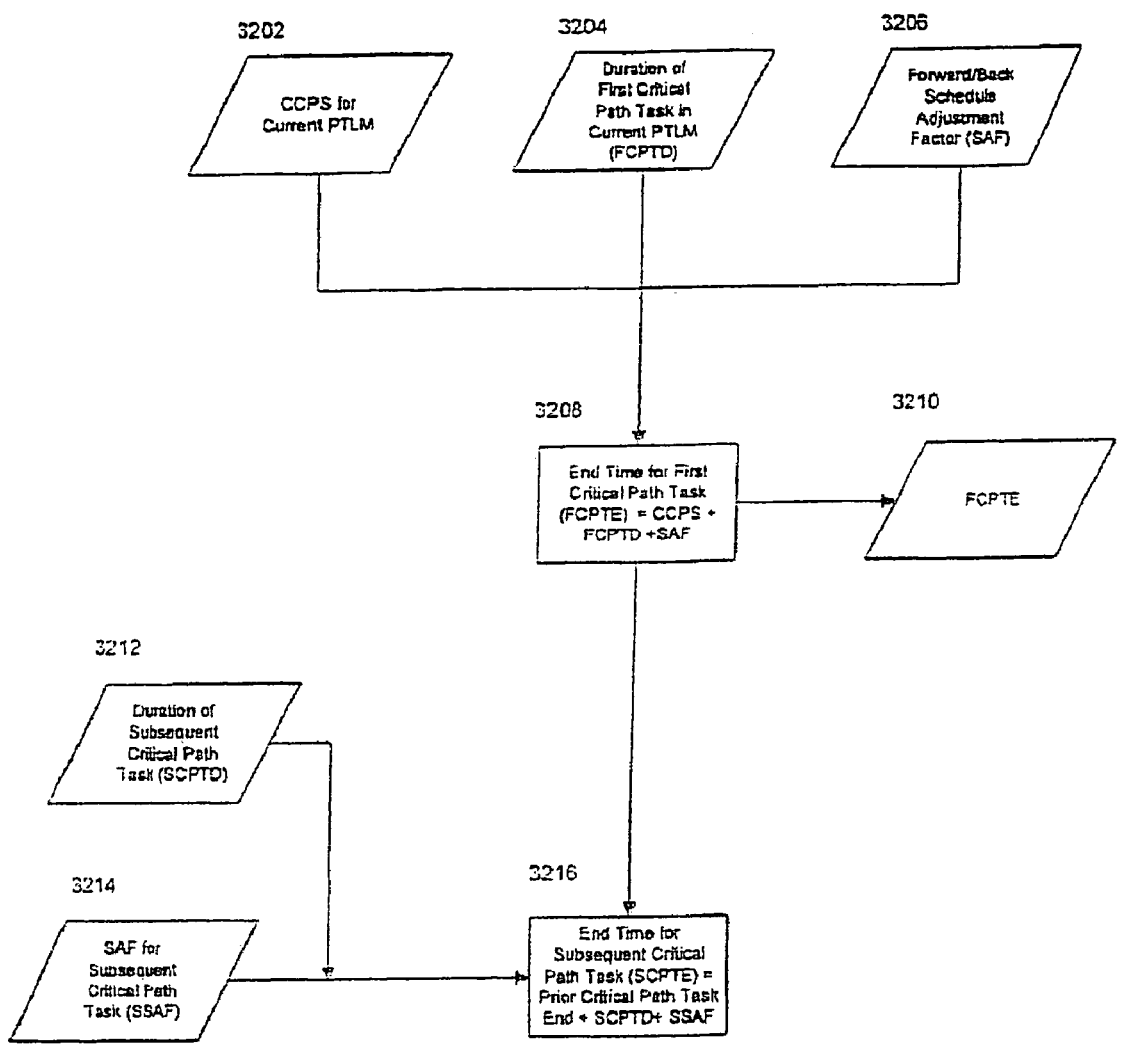

After the accurate CCPS has been determined for a PTLM and the CCPS for each of the Design Cycle Levels has been updated, the Task Start/Stop Times for each Critical Path Task (CPT) for the Current Unit Operation is calculated as illustrated in Step 2416. FIG. 32 further illustrates the procedure for determining the Task Start/Stop Times for each CPT for the Current Unit Operation. In Step 3202 the CCPS is obtained for the current PTLM via the procedure illustrated in Steps 2402–2412. In Step 3204 the duration of the First CPT (FCPT) is obtained from the calculations illustrated in FIG. 23, Column 2304. In Step 3206 the SAF is entered manually by the user to provide the user a means of delaying (or starting earlier) the start of a CPT. The SAF can be used to manually adjust the PTL in order to start and end tasks at more favorable times with respect to shift scheduling of labor resources and equipment utilization. For example, if a task is scheduled by automatic PTL calculation to end during a night shift when no staffing is present, and staffing is required to end the task and/or start the following task on the PTL, the SAF can be used to delay the start of a Critical Path Task such that the end of the task occurs when staffing will be present as required. The use of the SAF, as well as its limits of use, is further discussed below.

In step 3208 the CCPS for the current PTLM is added to the duration and the SAF of the FCPT to determine the end time of the FCPT (FCPTE). The present embodiment focuses on the determination of task end times from which the start time is back calculated. Alternatively, the FCPT Start time can be determined first by adding the SAF to the CCPS for the current PTL. In this latter case the FCPTE is calculated by adding the duration for the FCPT to this start time. The former method was chosen for this example because the end time of a CPT task is generally the focus of attention when optimizing a PTL. Generally, the SAF for all Critical Path Tasks is usually greater than or equal to zero. If the SAF for a CPT is less than zero, the start time for the CPT may conflict with the end time for the previous CPT.

For example, if the transfer of a product from a "product hold vessel" to a "product mix vessel" is defined as CPT 1, and the mixing of the product in the mix vessel is defined as CPT 2, the start/end times for CPT 2 cannot be back scheduled such that the start time for CPT 2 begins before the transfer of the product from CPT 1 is complete. However, there may be instances when it is preferable for the start time for CPT2 to begin before CPT 1 is completed. Such an example may involve the cooling or heating of product in a product mix vessel associated with CPT 2. If the start of the cooling or heating cycle for the product is associated with CPT 2, the heating or cooling cycle may need to be started after the product transfer has started and before the product transfer is complete. In this case the SAF can be a negative value. However, in general, the SAF is used to delay the start/end of a CPT from the completion time of the previous CPT, provided the delay does not conflict with use of the unit operation resources for another scheduled event or comprise the process or product in any other way.

Returning to FIG. 32, in Step 3214, the end time for a subsequent CPT is similarly determined by adding the duration (Step 3210) and SAF (Step 3212) for the subsequent CPT to the end time from the previous CPT for a given PTLM. The start time for the subsequent CPT can then be back calculated from the end time by subtracting the sum of the duration and SAF for the given subsequent task. As in the case of the FCPT, the start time for the subsequent CPT can be alternatively calculated first by adding the SAF to the end time for the previous CPT within the PTLM. In this case, the end time for the subsequent CPT is then calculated by adding the duration for the subsequent CPT to this sum. The procedure for determining the Start/Stop time for a subsequent CPT in Steps 3210 to 3214 is repeated for each subsequent CPTs associated with a given PTLM, thereby generating a critical path time line for the current PTLM.

Figure 33:
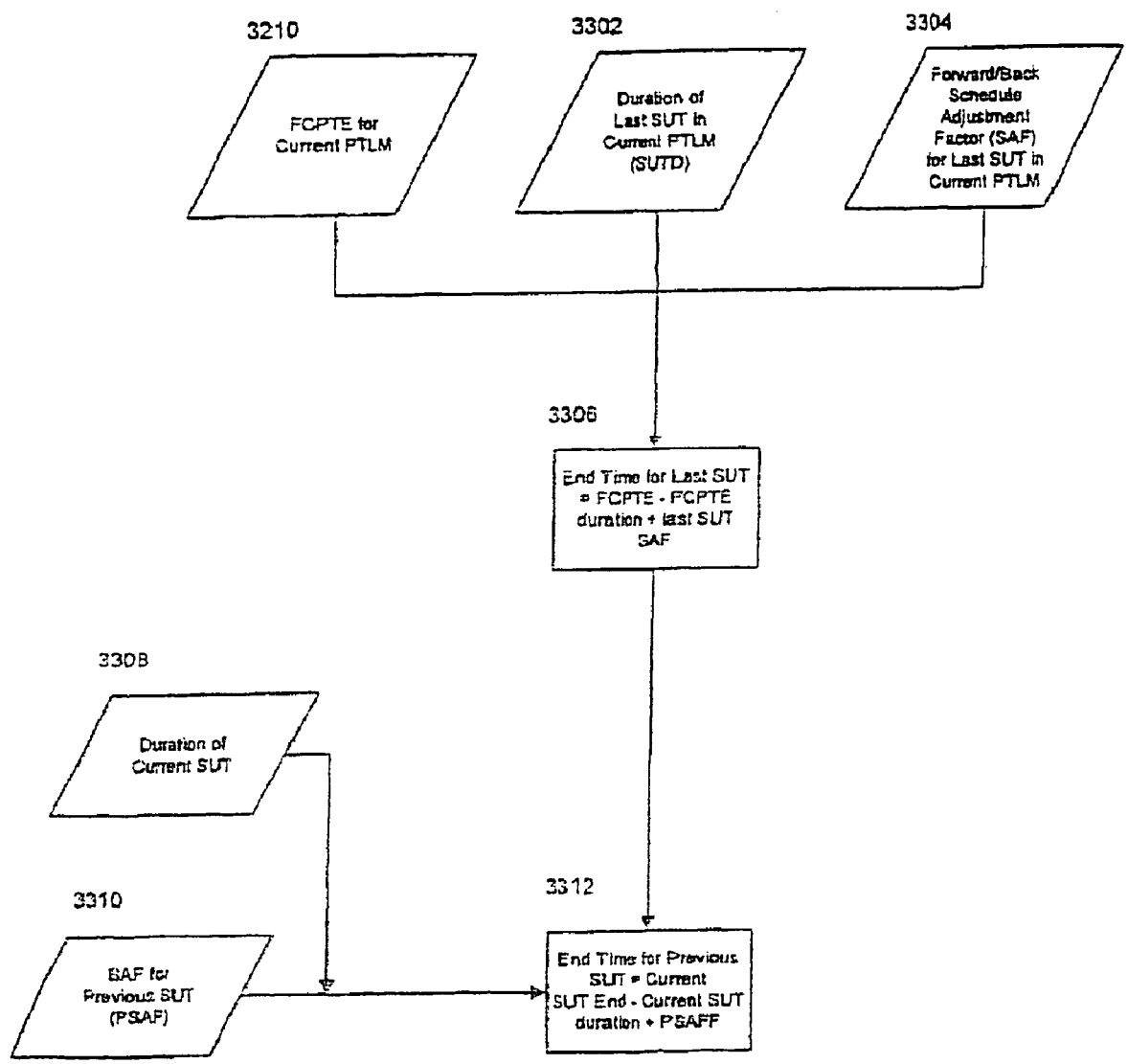

Referring to FIG. 33, the procedure for determining the Task Start/Stop Times for each SUT for the Current Unit Operation is further illustrated. The FCPTE for the Current PTLM is obtained from Step 3210 for the current PTLM. In Step 3302, the duration of the Last SUT (SUTL) is obtained from the calculations illustrated in FIG. 23, Column 2304. In some cases, the duration of SUTL will be entered manually by the user rather than calculated. In Step 3304, the Forward/Batch Schedule Adjustment Factor (SAF) for the SUTL is entered manually to provide the user a means of starting the SUT earlier. In most cases the SAF for all SUTs will be less than or equal to zero, implying that the SUT will start in time to be completed before the next task in the PTL begins or will start earlier than the minimum start time. If the SAF for a CPT greater than zero, the start time for the CPT may conflict with the end time for the previous CPT.

In step 3306, the duration of the FCPTE for the current PTLM is subtracted from the FCPTE and added to the SAF for the SUTL to determine the end time of the SUTL. As previously stated, the present embodiment focuses on the determination of task end times from which the start time is back calculated. Alternatively, the SUTL Start Time can be determined by subtracting the duration of the FCPTE and SUTL from the FCPTE and adding the SAF to the result. In this latter case, the end time for the SUTL is calculated by adding the duration for the SUTL and SAF to its start time. The former method was chosen for this example because the end time of a SUT task is generally the focus of attention when optimizing a PTL.

In Step 3312, the end time for a previous SUT is similarly determined by subtracting the duration of the current SUT from (Step 3308) from the end time for the current SUT and adding the result to the SAF (Step 3310) for the previous SUT. The start time for the previous SUT can then be back calculated from its end time by subtracting its duration from its end time. As in the case of the SUTL, the start time for the previous SUT can be alternatively calculated first by subtracting the duration of the current SUT and previous SUT from the end time of the current SUT and adding the SAF for the previous SUT to the result. In this case, the end time for the previous SUT is then calculated by adding the duration for the previous SUT to this sum. The procedure for determining the Start/Stop time for a previous SUT in Steps 3308 to 3312 is repeated for each previous SUT associated with a given PTLM, thereby generating a critical path time line for the current PTLM.

Figure 34:
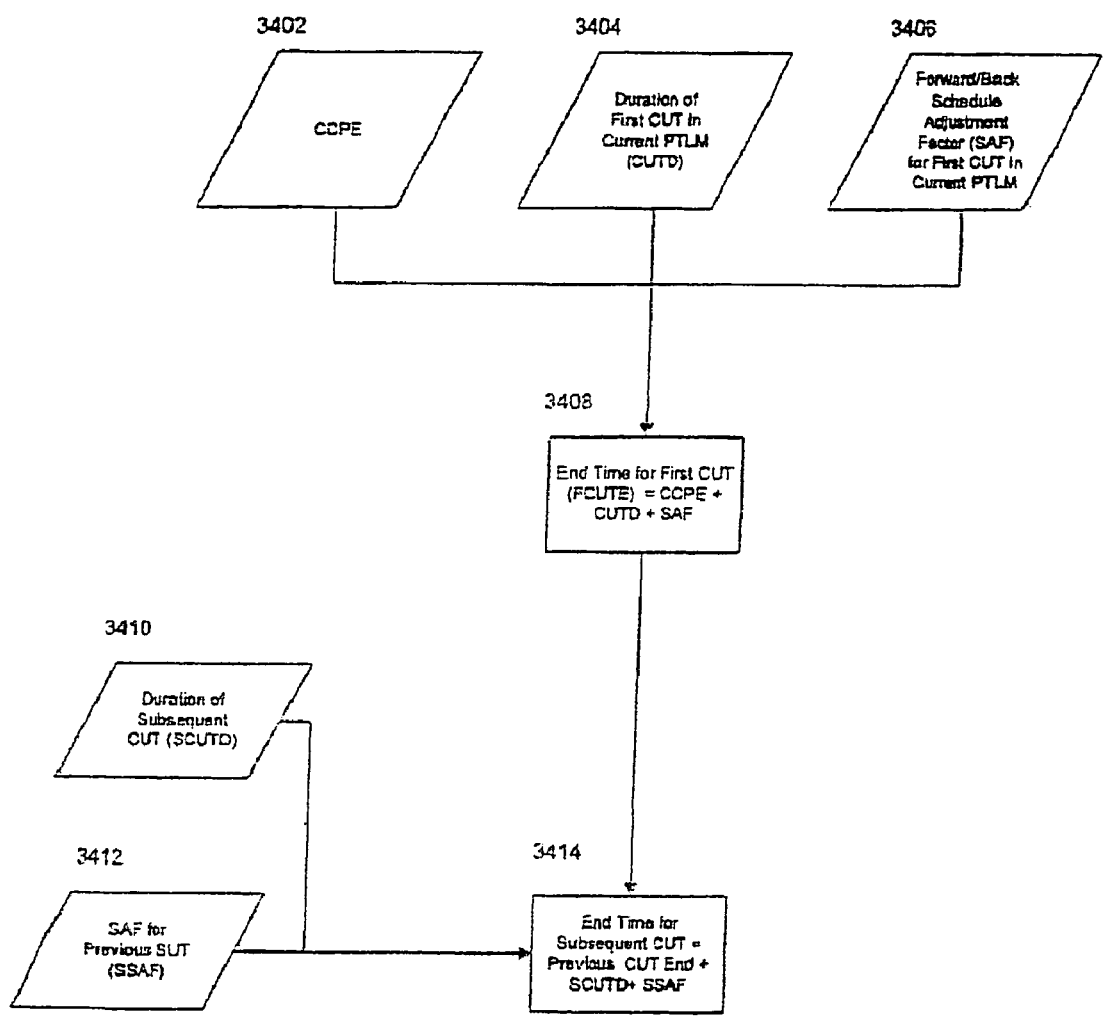

Referring to FIG. 34, the procedure for determining the Task Start/Stop Times for each CUT for the Current Unit Operation is further illustrated. The CCPE for the Current PTLM is obtained in Step 3402. In Step 3404, the duration of the First CUT (CUTF) is obtained from the calculations illustrated in FIG. 23, Column 2304. In some cases the duration of CUTF will be entered manually by the user rather than calculated. In Step 3406, the SAF for the CUTF can be altered manually from its default of zero to provide the user a means of delaying the start of the CUT. In most cases the SAF for all CUTs will be greater than or equal to zero. This implies that the CUT will start when the last CPT for a given PTLM is completed (SAF for CUT is set equal to zero) or sometime after CCPE (SAF for CUT is greater than zero) provided that all CUTs associated with a PTLM are completed before the next use cycle of the equipment and resources associated with the current PTLM. If the SAF for a CPT is less than zero, the start time for the CPT may conflict with the end time for the last CPT (or previous CUT). In step 3408, the CCPE for the current PTLM obtained in Step 3402 is added to the duration and SAF for the CUTF to determine the end time of the CUTF. As previously stated, the present embodiment focuses on the determination of task end times from which the start time is back calculated. Alternatively, the CUTF Start Time can be determined first by adding the SAF to the CCPE. In this latter case the end time for the CUTF is calculated by adding the duration for the CUTF to its calculated start time. The former method was chosen for this example because the end time of CUT task is generally the focus of attention when optimizing a PTL.

In Step 3414, the end time for a subsequent CUT (CUTS) is similarly determined by adding the duration (Step 3410) and SAF (Step 3412) for the CUTS to the end time from the current CUT for a given PTLM. The start time for the CUTS can then be back calculated from the end time by subtracting the duration of the CUTS from its end time. As in the case of the CUTL, the start time for the CUTS can be alternatively calculated first by adding the SAF to the end time for the current CUT within the PTLM. In this latter case, the end time for the CUTS is then calculated by adding the duration for the previous CUT to this sum. The procedure for determining the Start/Stop time for a CUTS in Steps 3408 to 3412 is repeated for each CUTS associated with a given PTLM, thereby generating a critical path time line for the current PTLM.

The Process Start Time (PST) for a PTL is entered manually by the user and provides the start point for all of the above time line calculations. The first PTLM in a PTL takes the PST as the CCPS to begin the PTL. Once the CCPS for the first PTLM has been entered, it is possible to calculate start and end times of all the CPTs, as well as the SUTs and CUTs associated with the first PTL. Subsequently, the start and end times of the CPTs, SUTs and CUTs for all subsequent PTLMs can be determined based on the above procedure.

Sub-cycles define the processing of partial quantities (volume or weight) of (input) material per manufacturing batch cycle instead of an entire batch quantity per batch cycle via "main cycles" and are applicable at the Unit Operation Cycle and Unit Operation Cluster Cycle levels as further defined above. Thus, while these sub-cycles are sometimes referred to as partial cycles, the operation is done completely, but for a part of the total desired input.

In addition, cluster cycles can be nested in multiple levels for certain projects instead of the single level of cluster cycles as illustrated supra and also described in U.S. Pat. No. 6,311,095. The sub-cycles at a unit operation cycle level and each of the possible cluster cycles levels can have their own number of iterations and respective offsets and can nest within the main cycles of a respective design cycle level as well.

Main cycles, as illustrated supra and also described in U.S. Pat. No. 6,311,095, can include the cycling of the entire input quantity of material to be processed with each cycle iteration, versus the processing of a partial quantity of material per cycle iteration implied by sub-cycles. The use of sub-cycles allows for further downsizing of the required equipment capacities for a given unit operation in a manner that is proportional to the number of sub-cycle iterations.

For example, if a 10,000 liter bioreactor of mammalian cell culture is being batch harvested every 10 days for downstream purification and the sub-cycle iterations for the unit operation cycles associated with a unit operation is set at 2 iterations with an offset of 0, this implies that ½ the input volume will be processed in each of 2 consecutive sub-cycle iterations with no delay or offset between each iteration. Conversely, if the main cycles for this step were set at 2 iterations with an offset of 0 and the respective sub-cycles iterations were set at 1 with an offset of 0 then the entire quantity of material per batch would be cycled through the unit operation with each iteration. If the main cycles for the unit operation were set at 2 iterations with an offset of 0 and the respective sub-cycles were set at 2 with an offset of 0 then ½ the quantity of input material would be processed in each of 2 sub-cycle iterations for the first main cycle iteration and then this sequence would be repeated again in the second main cycle iteration.

Because equipment associated with a unit operation is typically sized based on the quantity of input material to be processed per equipment cycle iteration, establishing 2 sub-cycle iterations implies that the equipment will be ½ the size that it would have been otherwise. More generically, if there are n sub-cycles, the size of the equipment and the material input to the equipment can be reduced by 1/n (n is a natural number). A desired value of n can be determined for each of the operations within a unit operation. In the incorporated documents, the use of sub-cycles affects the equipment sizing criteria calculations associated with the Block Flow Diagram supra and in U.S. Pat. No. 6,311,095 and the Material Consumption Table as identified in U.S. patent application Ser. No. 09/373,793.

An optimal number of sub-cycle iterations and hence an optimal sizing of the respective unit operation equipment can be estimated by a process comparable to dividing the batch cycle offset (BCO) (the time between the start of consecutive batch cycles) by the estimated duration of a given unit operation (see U.S. patent application Ser. No. 10/152,348) wherein the unit operation cycles described are functioning as sub-cycles (vs. main cycles). Since the duration of a given unit operation may change as the required capacity per batch cycle iteration changes, the optimal number of sub-cycle iterations may need to be finalized by means of an iterative evaluation, e.g., by setting a first estimated value, and stepping the number of sub-cycles and evaluating the results.

For example, if a unit operation takes one hour, but the batch cycle offset is four hours, there can be up to four sub-cycles of the unit operation to allow for smaller equipment to be used for more of the time. An example of this is for liquid chromatography (LC) equipment. The processing capability of an LC column is typically defined in liters of column volume as determined by the input quantity of product to be processed per batch, typically represented in grams, divided by the binding capacity of the column packing, typically represented in grams of product/liter of packing. By using sub-cycles, the total product input required per batch cycle can be divided between proportionately smaller quantities of product input per equipment cycle resulting in a LC column with a smaller capacity in liters of column volume, thereby saving on capital cost.

An example of the use of sub-cycles at the cluster cycles level can be illustrated by the use of a cell disruptor (high pressure homogenizer) used to break open bacterial cells to release genetically engineered product from the cell (cell lysis). In biopharmaceutical manufacturing multiple passes through a cell disrupter are typically required to achieve adequate bacterial cell lysis. Because a heat exchanger is typically required immediately upstream and downstream of a cell disruptor to provide adequate temperature regulation of the product, the combined sequence of heat exchanger, cell disruption, heat exchanger is usually modeled as a cluster cycle where the entire input quantity per batch cycle is cycled with multiple main cycles iterations through this set of 3 unit operations. If the main cycle iterations for this cluster were set at 3 and the sub-cycle iterations were set at 2, this would imply that for each of the 3 main cycles iterations, half of the required input quantity per batch would be processed with each sub-cycle iteration for a given unit of time, thereby halving the required throughput capacity of each of the equipment items associated with these three successive unit operations for the given unit of time.

As with the above unit operation cycles, the optimal equipment capacity could be estimated by dividing the BCO by the estimated duration of the given unit operation cluster in a given cluster cycle level, whether or not the individual unit operations in the given cluster are executed sequentially or concurrently. As discussed above, cluster cycles and their respective main cycles and sub-cycle iterations can be nested in multiple levels. While 3 nested cluster cycle levels are used as an example above, in theory there is no limit to the number of cluster cycles that could be nested.

In addition, a lot cycle level is defined. The lot cycle nests between batch cycles and process cycles. Lot cycles are often required when a biopharmaceutical firm desires to combine two or more purification batches of biopharmaceutical product into one lot in order to minimize the expense of quality control testing of the final product for release. A lot of material may be finalized as a "bulk" or "finished" product depending on the type of manufacturing process being applied. A bulk product is one that has been purified but has not been manufactured to its final "dosage form" whether it be a vial, syringe, pill, etc. Conversely, a finished product is one that has been manufactured to its final "dosage form." This distinction is made due to the structure of current regulatory requirements which encourage many biopharmaceutical manufacturing firms to produce the bulk purified product in one facility and transfer this bulk product to a separate facility for finishing. In some cases, such as in the chemical pharmaceutical industry, the bulk facilities are used to make "intermediate" compounds that will be used in a separate process to make a final product which, in turn, can be finished to a final dosage form.

The material supra and in International Patent Application No. PCT/US00/22104 addresses the application of main cycles levels and their respective offsets to generate a detailed time line that defines the stop and start times of each operational task associated with a given unit operation. The addition of lot cycles, nested cluster cycles, and sub-cycles to the pre-existing design cycles as defined above can be "plugged in" to the existing time line mechanisms covered by the published application. For example, the introduction of the cycle levels modifies the "delimited string" code from the original 4 fields defined in the published application (unit operation sequence number, batch cycle iteration, cluster cycle iteration, and unit operation cycle iteration) to the 11 fields set out below:

| Delimited Field | Value |
| --- | --- |
| Field 1 | Unit Operation Sequence Number |
| Field 2 | Lot Cycle Iteration |
| Field 3 | Batch Cycle Iteration |
| Field 4 | Cluster Level 3 - Main Cycle Iteration |
| Field 5 | Cluster Level 3 - Sub Cycle Iteration |
| Field 6 | Cluster Level 2 - Main Cycle Iteration |
| Field 7 | Cluster Level 2 - Sub Cycle Iteration |
| Field 8 | Cluster Level 1 - Main Cycle Iteration |
| Field 9 | Cluster Level 1 - Sub Cycle Iteration |
| Field 10 | Unit Operation - Main Cycle Iteration |
| Field 11 | Unit Operation - Sub Cycle Iteration |

These include the previous four fields in the form of batch cycles, cluster level 1—main cycles, unit operation main cycles, but also include 2 additional cluster levels with each cluster level having both main and sub-cycles; unit operation sub-cycles; and lot cycles.

Note that while only 3 Cluster Levels are illustrated above, there is no theoretical limit to the number of Cluster Levels that could be nested as required by a specific process.

Figure 35:
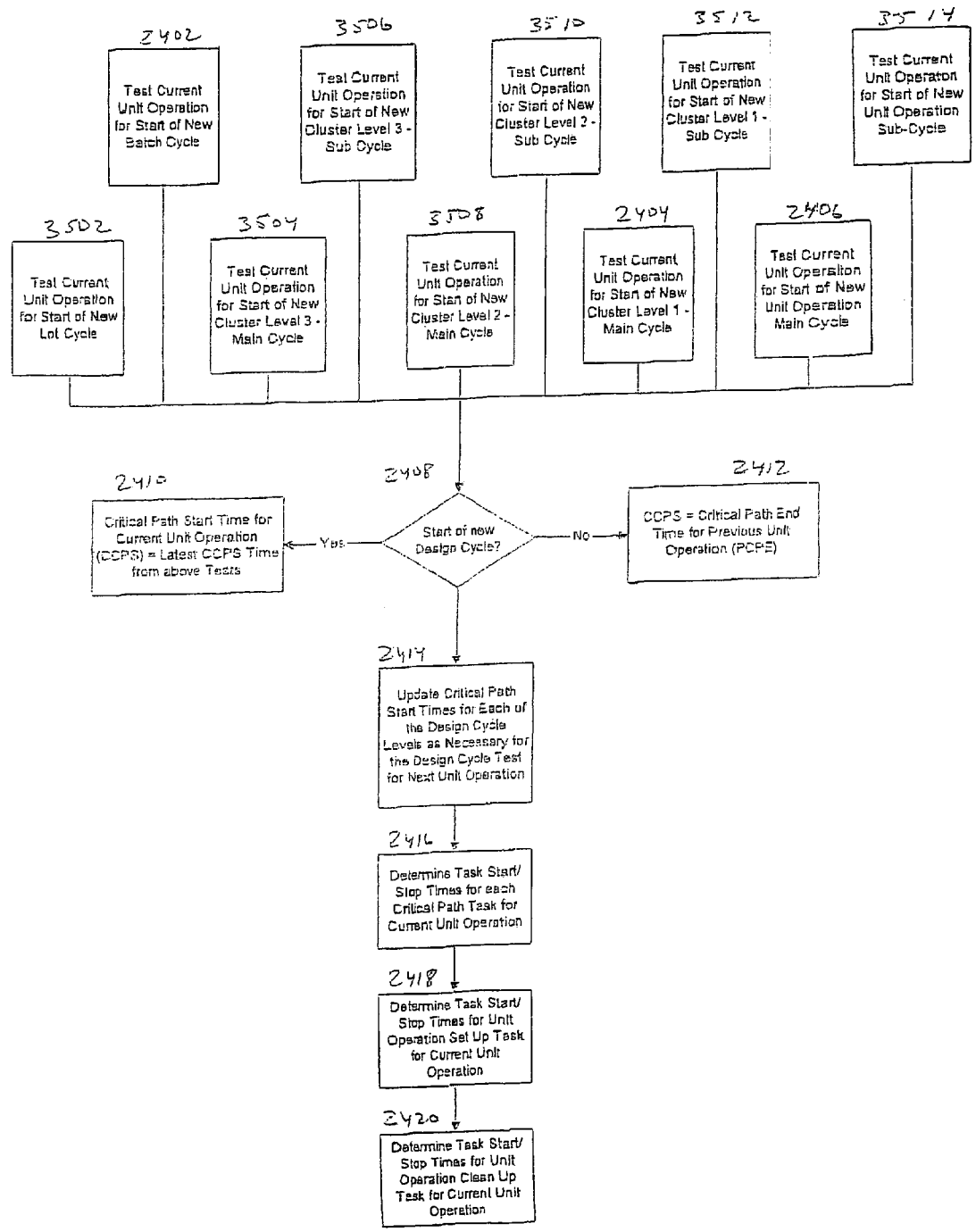
FIG. 35 is a flow chart that illustrates the method for determining the impact of design cycle offsets on the current critical path start time for a respective unit operation—main cycle and unit operation—sub cycle according to an embodiment of the present invention.

The existing mechanisms can be used to generate a detailed process time line (PTL) using cycle offsets covering all the new cycles listed above. Referring to FIGS. 24–34 and in International Patent Application No. PCT/US00/22104, the following modifications could be made to address the above new cycles as reflected in FIGS. 45–49:

FIG. 35 demonstrates that a test for each of the new design cycles identified above (Lot Cycle, Cluster Level 3-Sub-cycle, Cluster Level 2-Sub-Cycle, Cluster Level 1-Sub-Cycle, Unit Operation—Sub-Cycle) can be added to the top level of FIG. 24 at the same level as the other tests indicated at 2402, 2404 and 2406 (shown as main cycles). The revised list of tests can be entitled:

Test Current Unit Operation for Start of New Lot Cycle

Test Current Unit Operation for Start of New Batch Cycle (Formerly 2402)

Test Current Unit Operation for Start of New Unit Operation Cluster Level 3—Main Cycle Test Current Unit Operation for Start of New Unit Operation Cluster Level 3—Sub Cycle Test Current Unit Operation for Start of New Unit Operation Cluster Level 2—Main Cycle Test Current Unit Operation for Start of New Unit Operation Cluster Level 2—Sub Cycle Test Current Unit Operation for Start of New Unit Operation Cluster Level 1—Main Cycle (Formerly 2404)

Test Current Unit Operation for Start of New Unit Operation Cluster Level 1—Sub Cycle Test Current Unit Operation for Start of New Unit Operation—Main Cycle (Formerly 2406)

Test Current Unit Operation for Start of New Unit Operation—Sub Cycle

Figure 36:
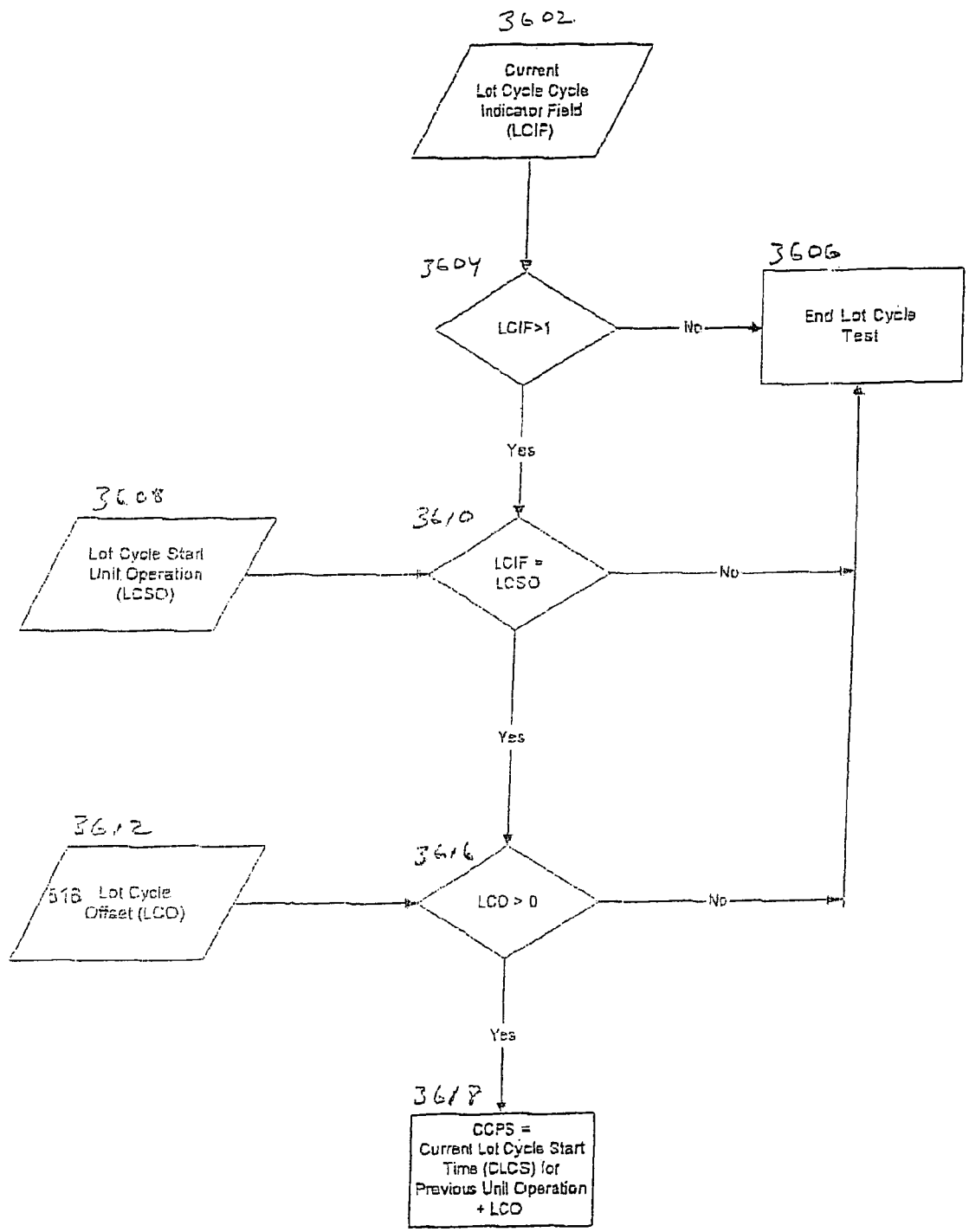
FIG. 36 is a flow chart that illustrates the test for a new lot cycle according to an embodiment of the present invention.
Figure 37:
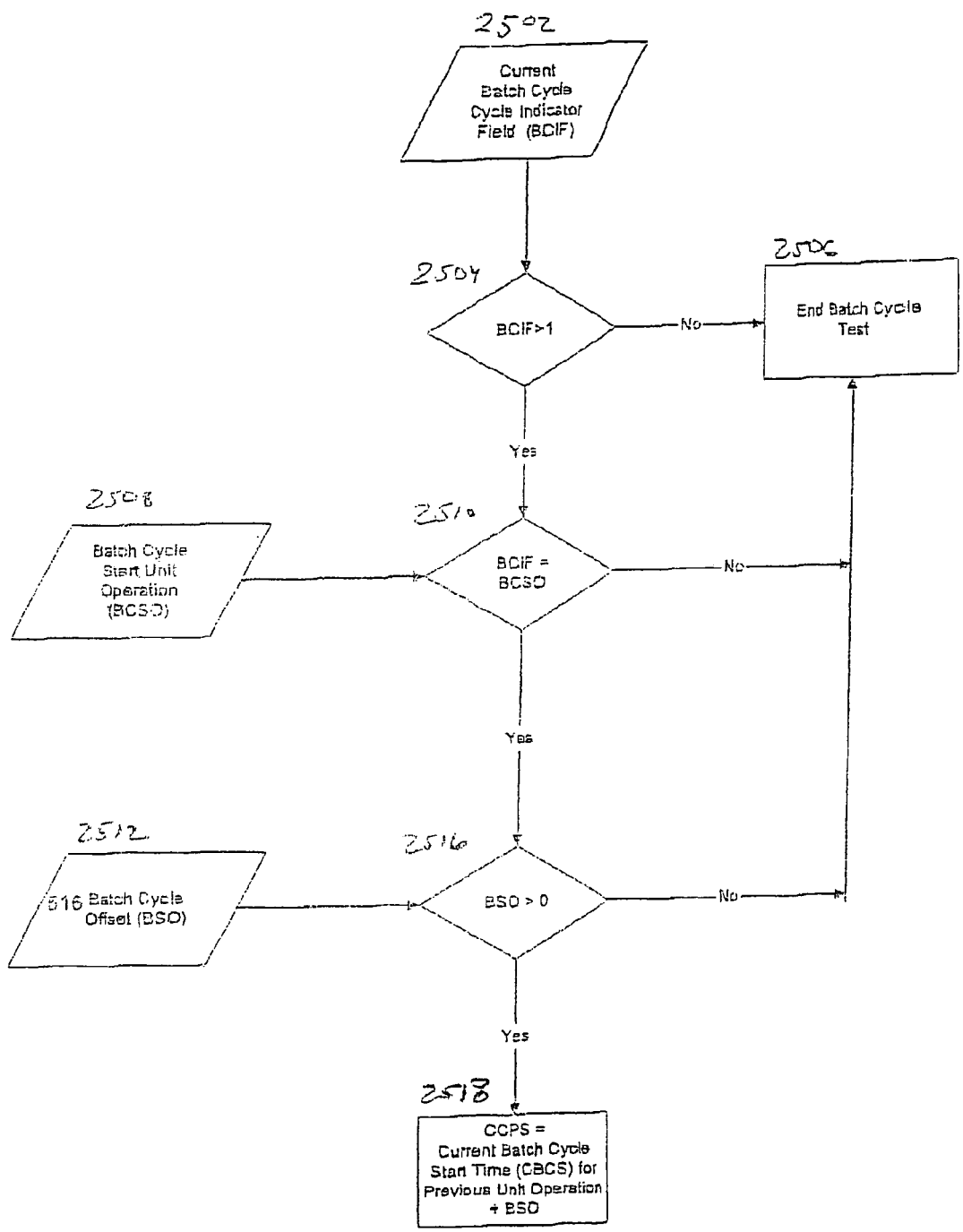
FIG. 37 is a flow chart that illustrates the test for a new batch cycle according to an embodiment of the present invention.

FIGS. 36–37 demonstrate that the mechanisms associated with FIG. 25 apply to Lot Cycles (with Lot Cycle Offsets) as well as Batch Cycles.

Figure 38:
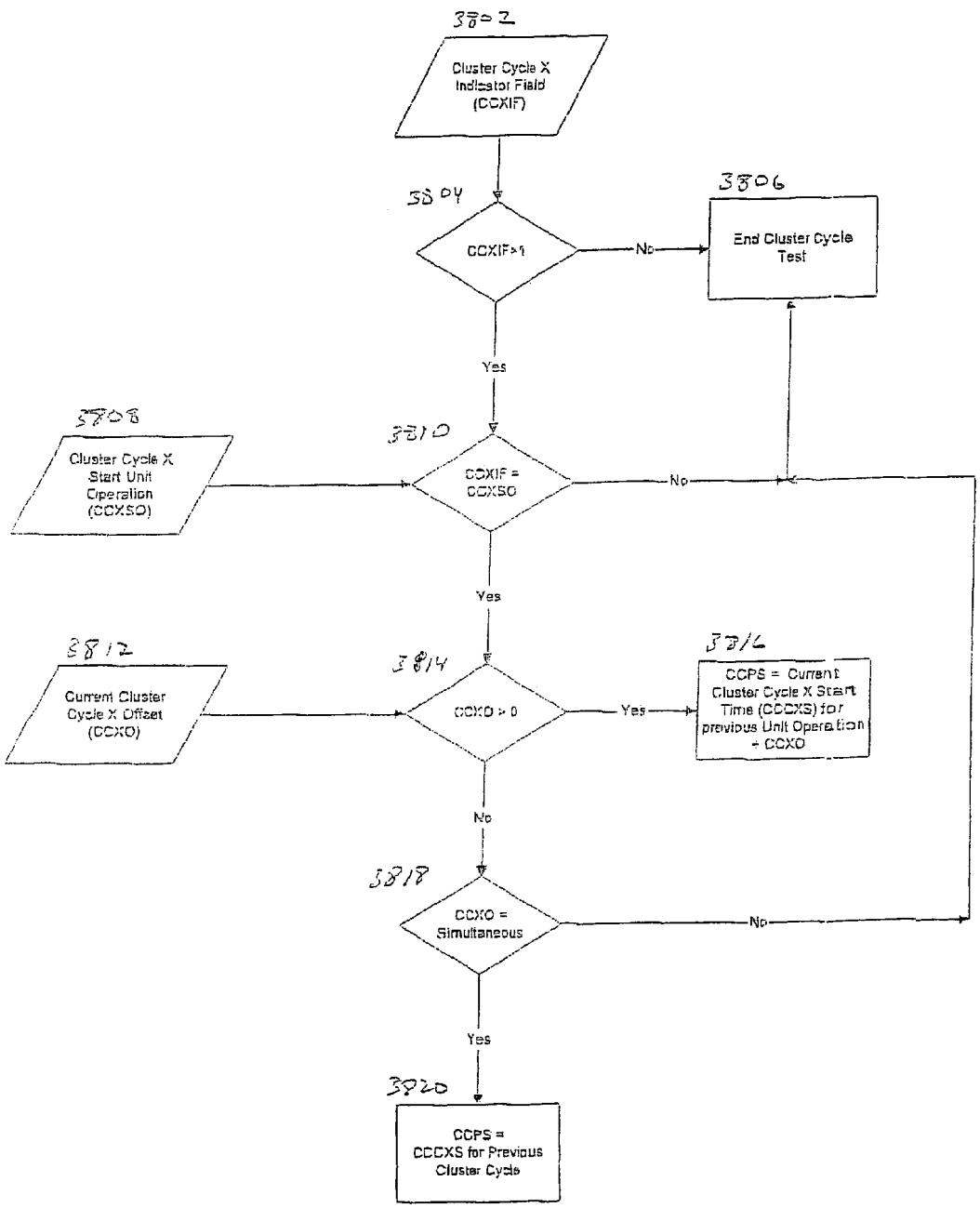
FIG. 38 is a flow chart that illustrates the test for a new unit operation cluster cycle as applied to respective main and sub cycles for multiple nested cluster cycle levels according to an embodiment of the present invention.

FIG. 38 demonstrates that the mechanism associated with FIG. 26 can apply to the Main and Sub-cycles for each of the above Cluster Cycle levels.

Figure 39:
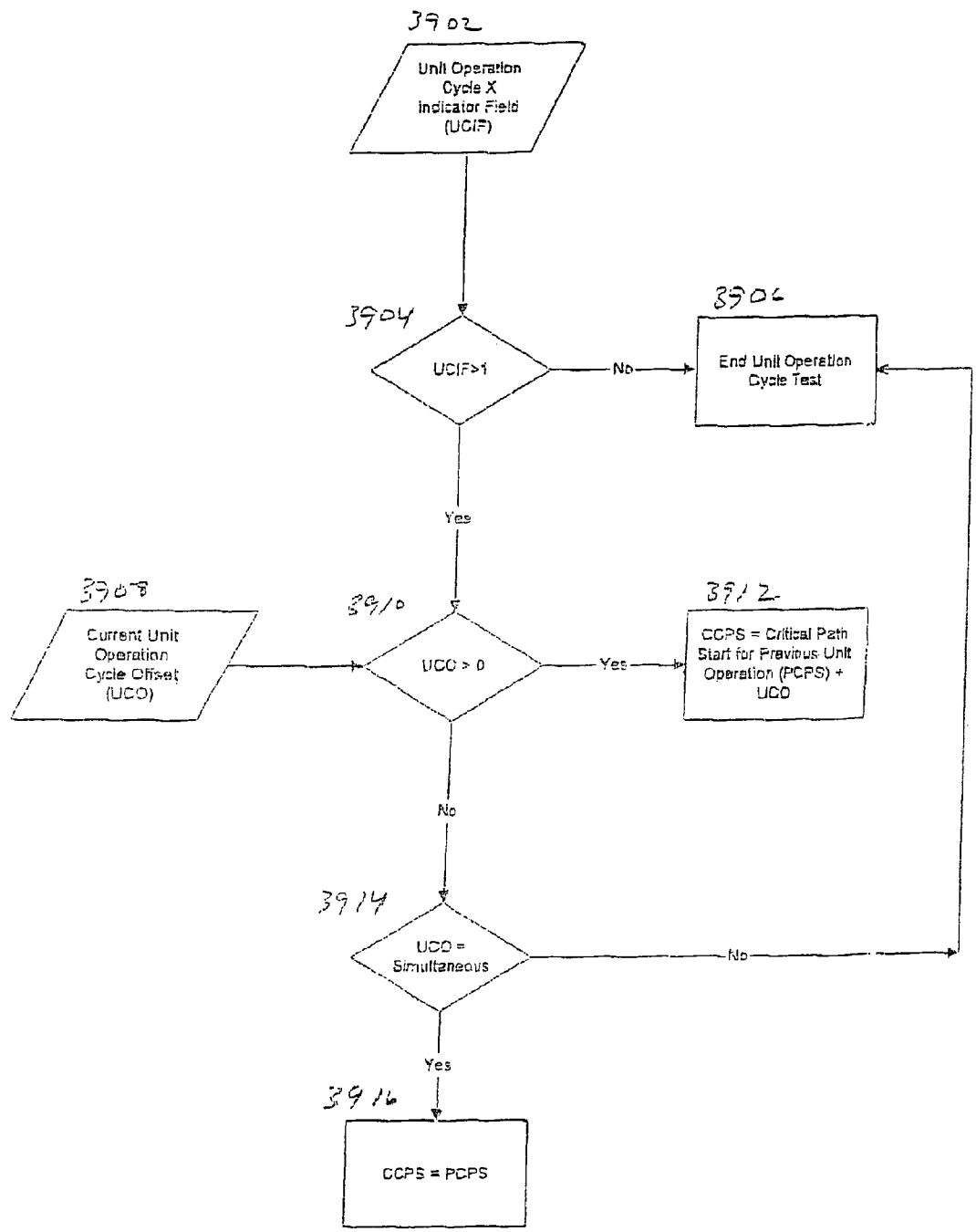
FIG. 39 is a flow chart that illustrates the test for a new unit operation cycle as applied to respective main and sub cycles according to an embodiment of the present invention.

FIG. 39 demonstrates that the mechanism associated with FIG. 27 can apply to the Main and Sub-cycles for the above Unit Operation Cycle.

Figure 40:
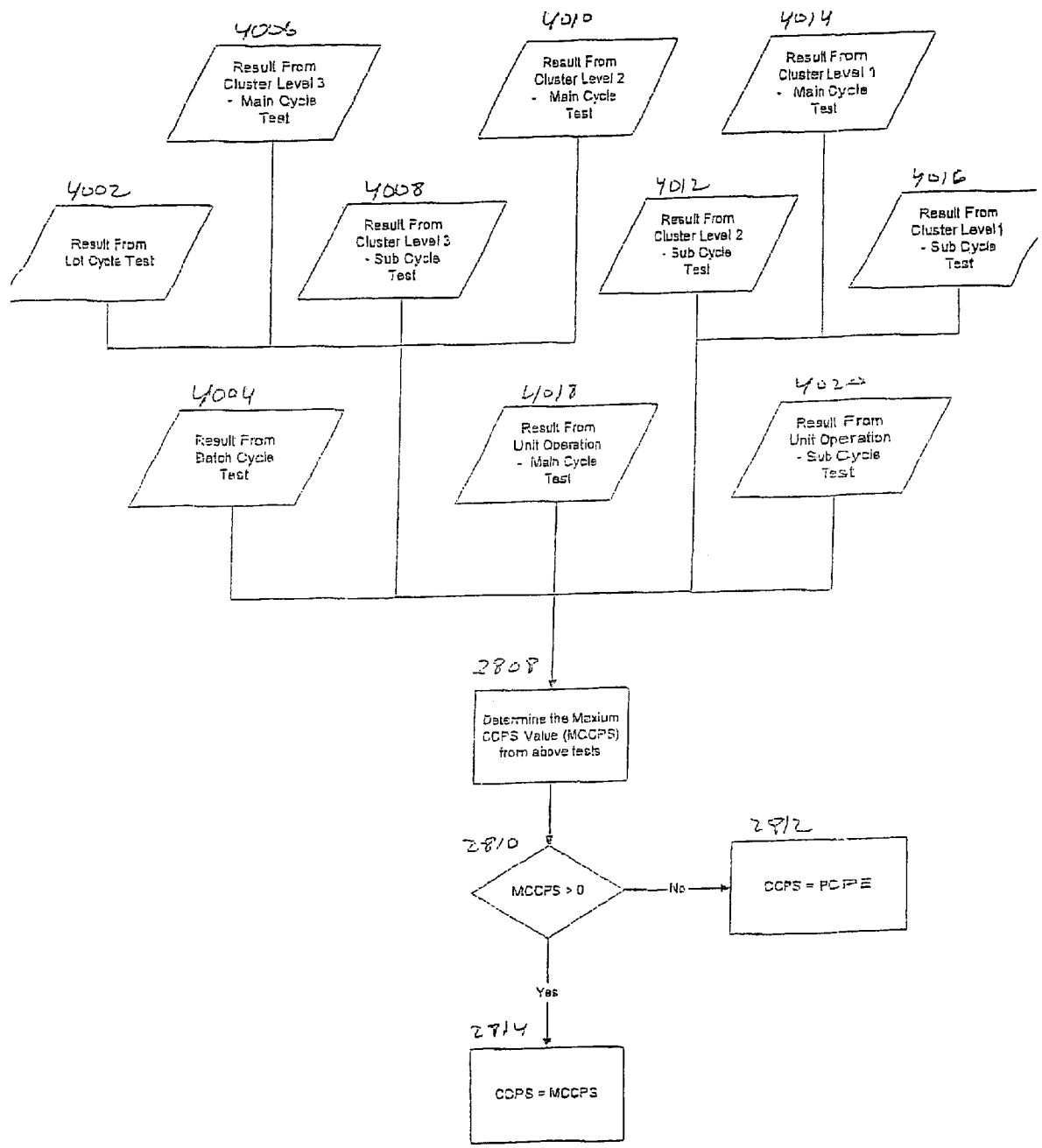
FIGS. 40–46 are a flow chart that illustrates the determination of start/stop times for various cycles with their respective main and sub cycles according to an embodiment of the present invention.

FIG. 40 demonstrates that the results from the above new cycles tests illustrated in FIGS. 35–38 need to replace the inputs 2802, 2804, 2806 in the top tier of FIG. 28. The remaining procedure in FIG. 28 is applicable.

Figure 41:
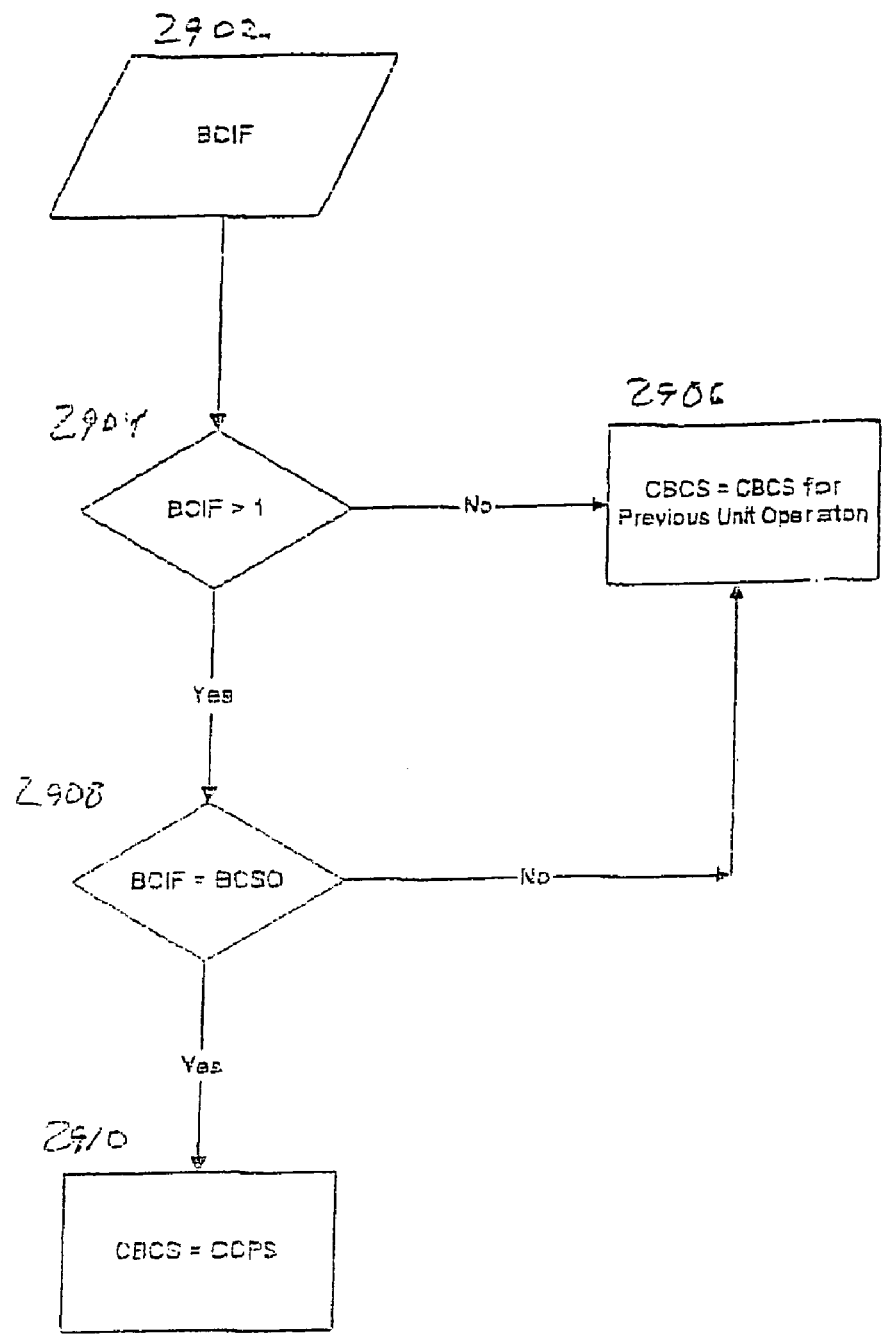

FIG. 41 demonstrates that the mechanism associated with FIG. 29 can be applicable to Lot Cycles, e.g., if a Lot Cycle Offset is established that is different than the Batch Cycle Offset.

Figure 42:
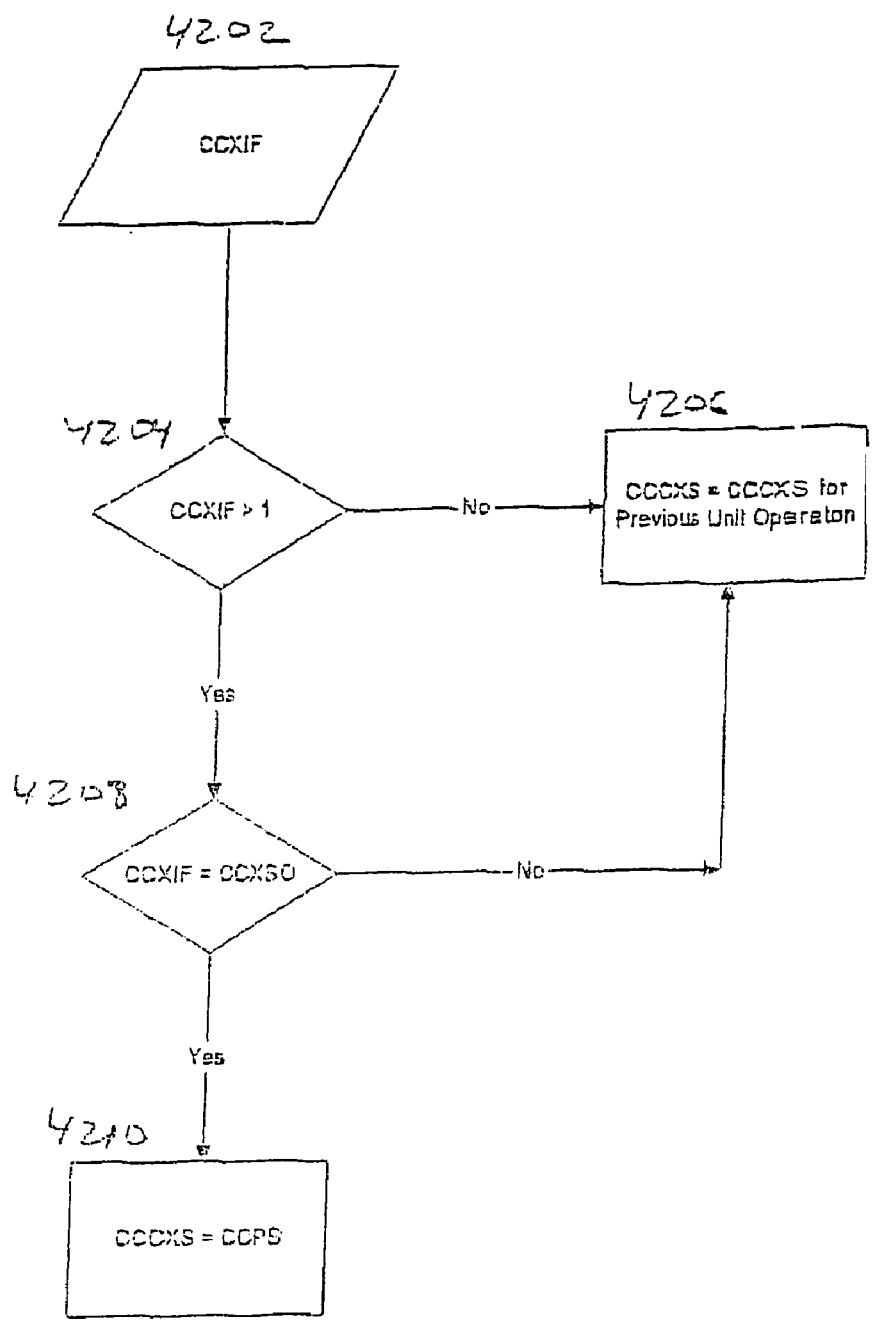

FIG. 42 demonstrates that the mechanisms associated with FIG. 30 can apply to the Main and Sub-cycles for each of the above CC levels.

Figure 43:
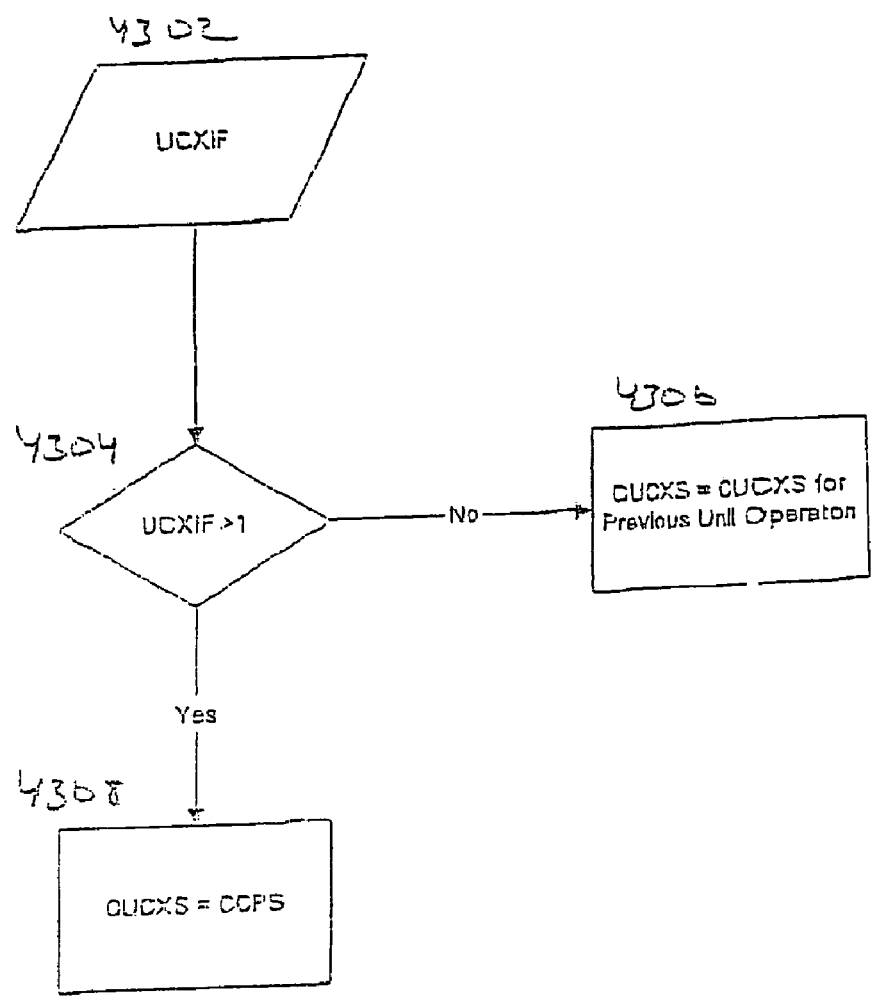

FIG. 43 demonstrates that the mechanisms associated with FIG. 31 can apply to the Main and Sub cycles for the above UC.

Figure 44:
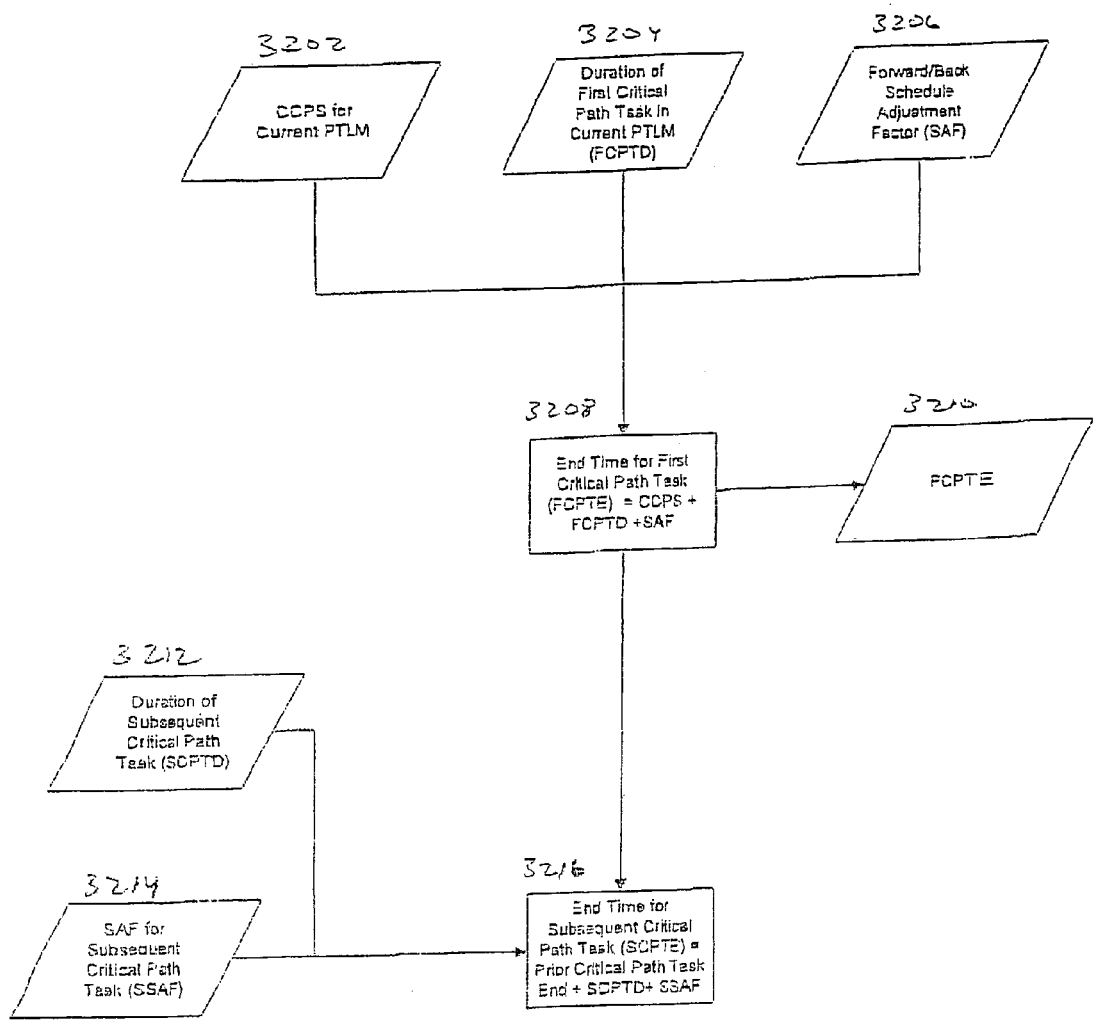
Figure 45:
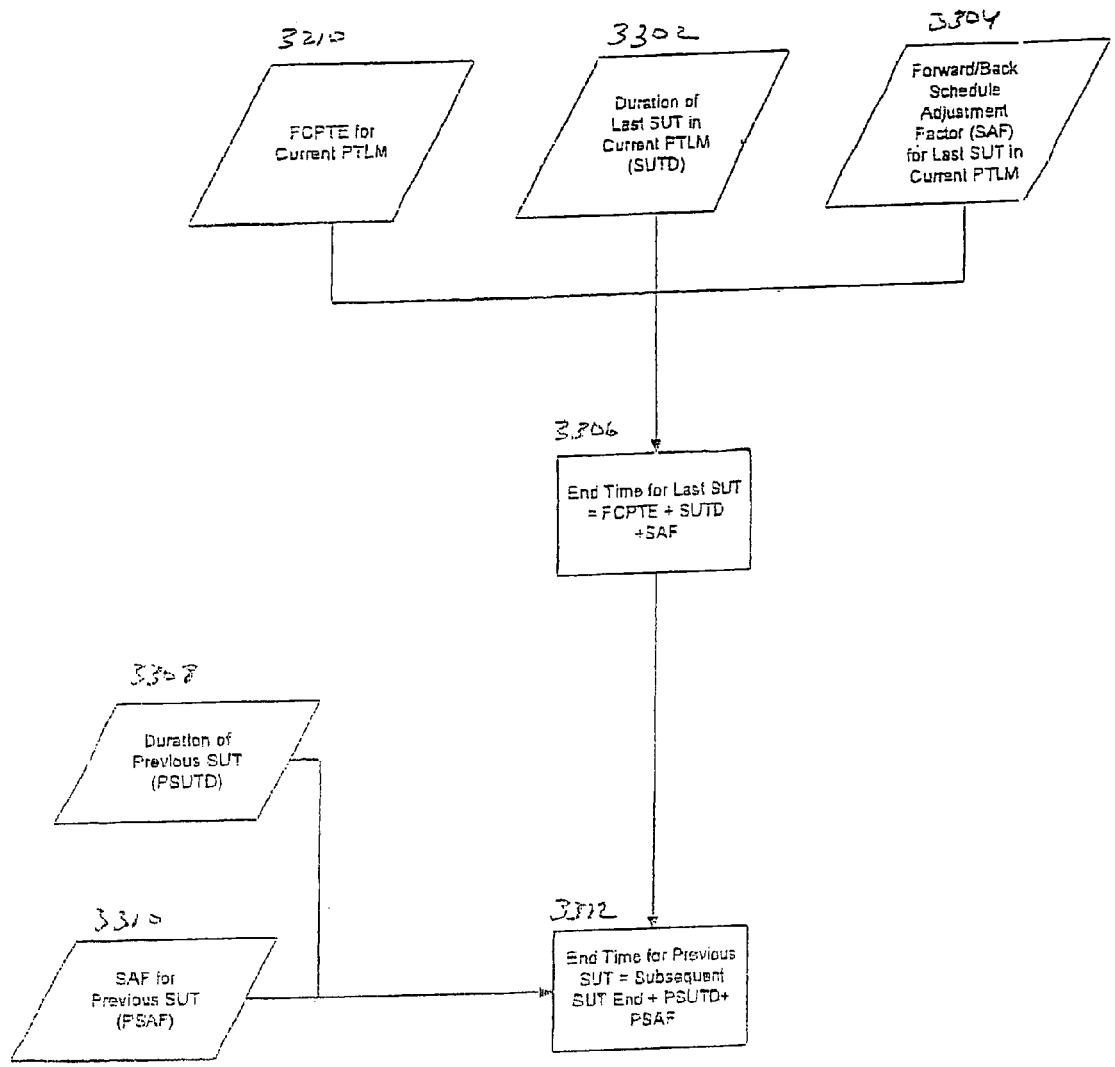
Figure 46:
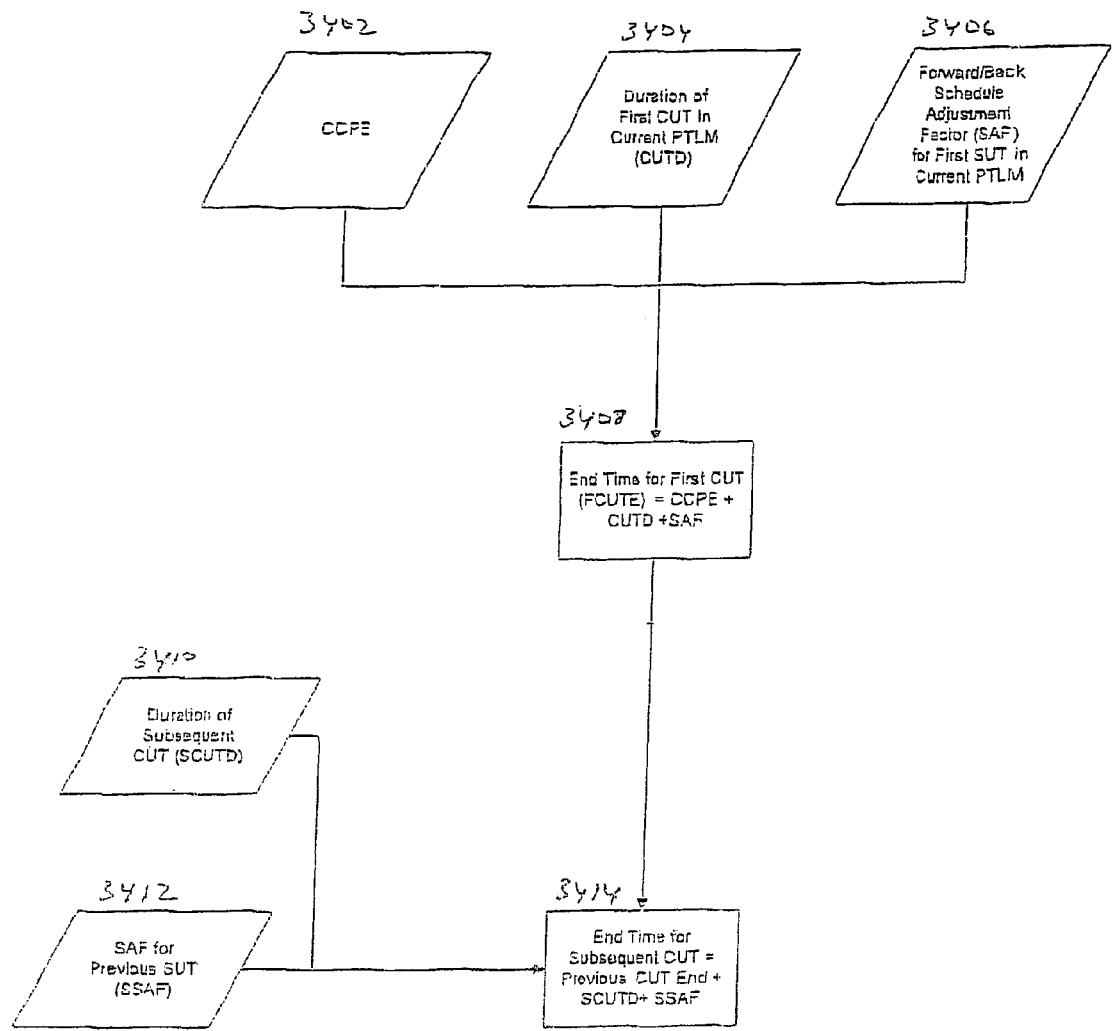

FIGS. 44–46 demonstrate that the mechanism associated with FIGS. 32-34 are applicable to the above new cycles as is.

Figure 49:
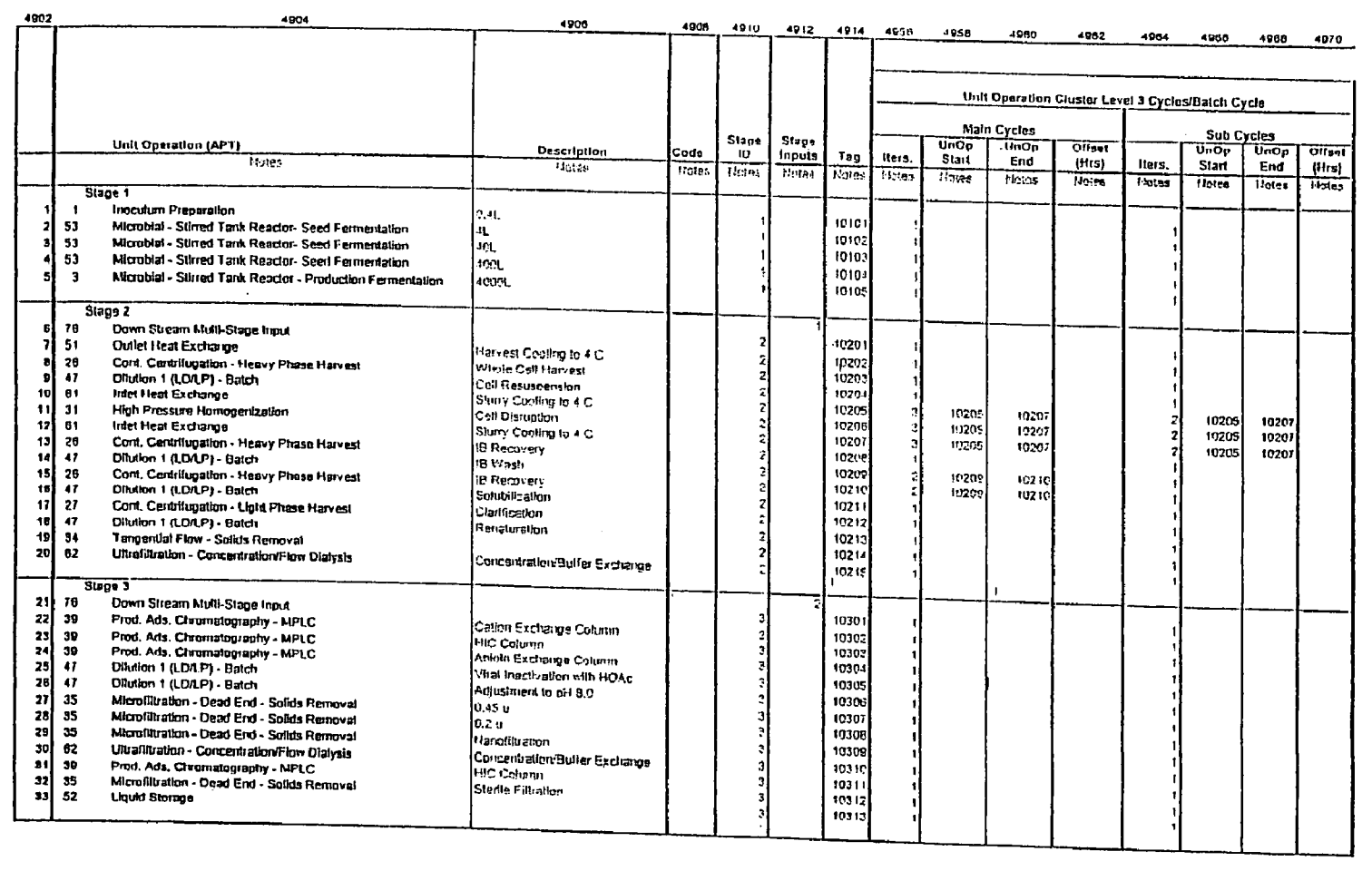

FIGS. 47–49 provide examples of each of the above new cycle types as applied to three types of biopharmaceutical manufacturing processes. In some cases, they have been truncated to show the part that shows the illustrated aspect.

In FIG. 47, a conventional mammalian cell culture (MCC) process is illustrated as having 3 process stages with several unit operations in each stage. As described in U.S. patent application Ser. No. 10/152,348, the use of process stages helps to define divergent (one-to-many) and convergent (many-to-one) scheduling relationships between groups of unit operations in a process. FIG. 47 illustrates the application of lot cycles and batch cycles relevant to higher level process cycles.

In the depicted MCC process, a semi-continuous bioreactor that contains genetically engineered mammalian cells grown in a "microcarrier" culture remains in production for 60 days once the culture has reached an appropriate cell density. If the product enriched media from the bioreactor is harvested every 24 hours and the resulting harvests are pooled every 3 days to be processed as a batch then there would be 20 batch cycles per 60-day cell culture period. As in U.S. Pat. No. 6,311,095, the 60-day cell culture period plus the last 3-day batch cycle can be considered a process cycle that supports twenty 3-day batch cycles. The Lot Cycles shown in columns 41–44 relevant to the batch cycles in columns 37–38 illustrate the combination of 2 batch cycles in a lot cycle by cycling the lot cycles half the number of iterations per process cycle as the batch cycles.

FIG. 47 also illustrates the application of unit operation sub-cycles to the 3 liquid chromatography steps at unit operations 10305, 10310, and 10315. In each of these cases the application of 3 sub-cycle iterations per unit operation main cycle implies that each liquid chromatography column is sized for ⅓ of the input quantity per batch cycle as would otherwise be required thereby providing proportionally smaller equipment sizing criteria and lower equipment cost.

FIGS. 48A–48C illustrate a transgenic plant process having 4 process stages with several unit operations in each stage. FIGS. 48A–48C illustrate the application of cluster cycles at 3 nested levels. In cluster level 3, unit operations 10101 through 10405 are cycled 2 main cycle iterations per batch cycle at a 72-hour offset between main cycle iterations. In cluster level 2, unit operations 10101 through 10304 are cycled 3 main cycle iterations (totaling 6 main cycles per batch cycle) at a 24-hour offset during each cluster level 3, main cycle iteration. In cluster level 1, unit operations 10201 through 10302 are cycled 2 main cycle iterations (totaling 12 main cycles per batch cycle) at a 12 hour offset, during each cluster level 2 main cycle iteration. This use of nested cluster cycling allows the generation of an accurate and detailed process time line using the mechanisms, described supra, and in International Application No. PCT/US00/22104, filed on Aug. 14, 2000, the entire contents of which are incorporated herein.

FIG. 49 illustrates a microbial fermentation process having 3 process stages with several unit operations in each stage. FIG. 49 illustrates the application of cluster sub-cycles. In cluster level 3, unit operations 10205 through 10207 are cycled 3 main cycle iterations per batch cycle. During each main cycle iteration there are 2 sub-cycle iterations resulting in a downsizing in the equipment capacity requirements per batch cycle as described in the above example of cell disruption.

Sub-cycles within unit operation main cycles and unit operation cluster main cycles can be defined and used to further optimize processing by reducing the size of equipment, thereby reducing capital costs. Using techniques similar to those described in the incorporated documents, a detailed time line can incorporate start and stop times of each of the sub-cycles. Other factors, including cleaning and maintenance, can also be taken into consideration.

In one embodiment of the present invention, execution options for each unit operation task (e.g., Unit Operation Set Up, Unit Operation Execution, and Unit Operation Clean Up tasks) can be defined for each iteration of a respective design cycle. Examples of execution options include: (1) tasks that execute only during the first iteration of a respective design cycle, (2) tasks that execute during each iteration of a respective design cycle, (3) tasks that execute only during intermediate iterations (excluding first and last iterations) of a respective design cycle, and (4) tasks that execute only during the last iteration of a respective design cycle.

Figure 50B:
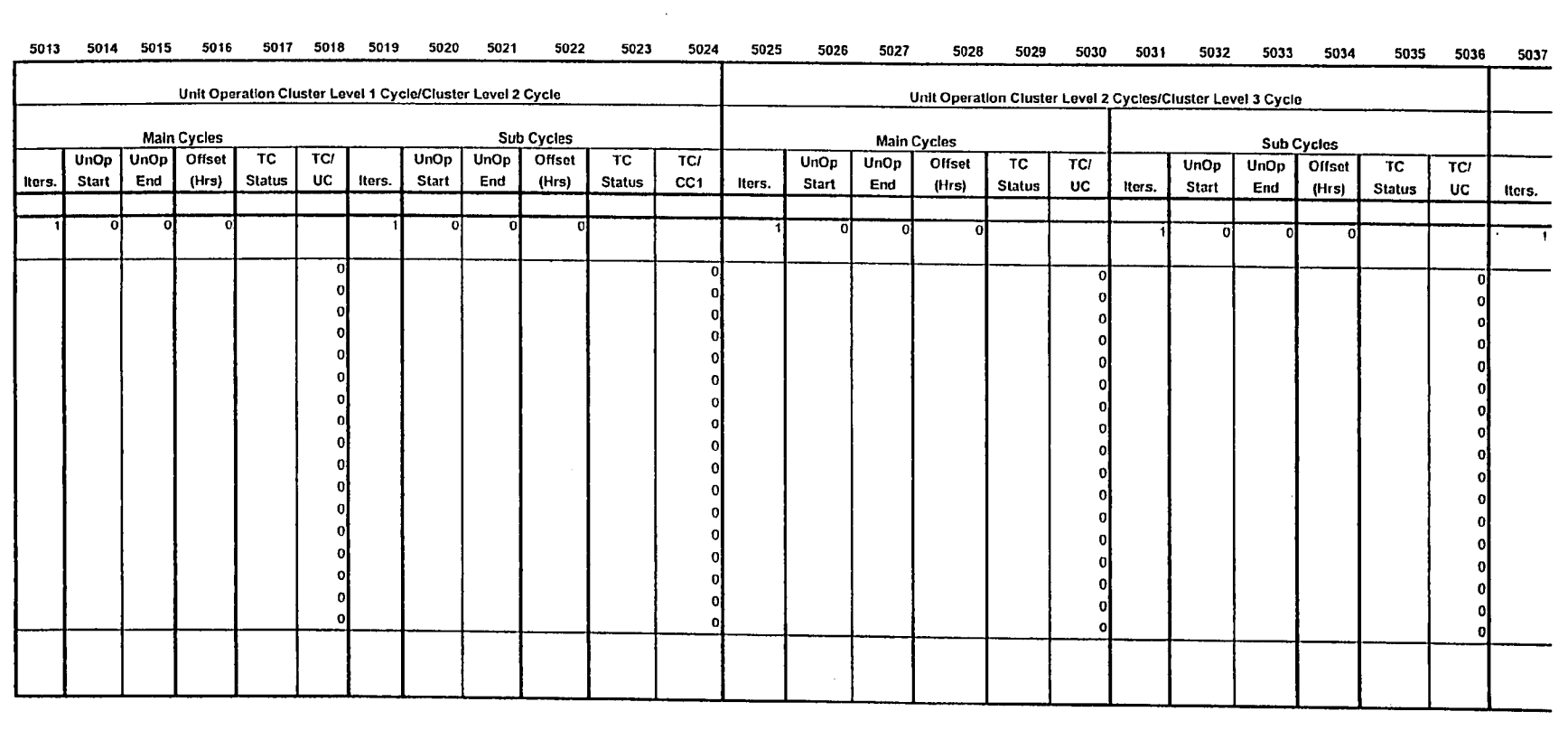

FIGS. 50A–50C illustrate how task execution parameters (TEP) can be defined at one of several of the nested design cycle levels previously defined (see columns 5007, 5011, 5017, 5023, 5029, 5035, 5041, 5047, 5053, 5059) based on the mammalian cell culture process illustrated in FIG. 47. The default definition of these TEP for each Unit Operation Task occurs at the Unit Operation Sub Cycle level (see Column 5011 of FIGS. 50A–50C). Further definition of these parameters can be hierarchically related; therefore changing the default TEP at any higher design cycle level can subordinate the execution of a TEP at a lower design cycle level according to the following priority:

> Lot Cycle
> Batch Cycle
> Cluster Level 3 - Main Cycle
> Cluster Level 3 - Sub Cycle
> Cluster Level 2 - Main Cycle
> Cluster Level 2 - Sub Cycle
> Cluster Level 1 - Main Cycle
> Cluster Level 1 - Sub Cycle
> Unit Operation - Main Cycle
> Unit Operation - Sub Cycle (Default Level)

For example, FIGS. 50A–50C illustrate that for Unit Operation 10305 (Product Adsorption Chromatography) in the sample biopharmaceutical process, the first task (Task 1), "Set Up" is configured in column 5011 to execute only during the first Unit Operation Sub Cycle iteration in a set of Unit Operation Sub Cycles. Tasks 2–10 are configured to execute during each Unit Operation Sub Cycle iteration in a set of Unit Operation Sub Cycles. The 11th task is configured to be executed during the last Unit Operation Sub Cycle iteration in a set of Unit Operation Sub Cycles. However, at a higher design cycle level (column 5053) this task is also defined to execute during the last ($2^{nd}$) Batch Cycle iteration in a Lot Cycle consisting of 2 Batch Cycles. This implies that this specific Unit Operation Task (UOT), "Regeneration 2," would subordinate its execution during the last Unit Operation Sub Cycle iteration in a set of Unit Operation Sub Cycles to only during the second of 2 Batch Cycles associated with each Lot Cycle. If the TEP in column 5053 were "First Iteration," then Regeneration 2 would subordinate its execution during the last Unit Operation Sub Cycle iteration in a set of Unit Operation Sub Cycles to only the first of 2 Batch Cycles associated with each Lot Cycle. Remaining tasks 12–17 are configured to execute only during the last Unit Operation Sub Cycle iteration in a set of Unit Operation Sub Cycles. The definition of respective design cycle iterations and their respective offsets is normally accomplished in an earlier process design step via a master unit operation list as previously illustrated in FIGS. 47–49. The above-described TEP mechanism could also be configured to add a 5th TEP category that allows the user to define the execution interval (or execution offset) for executing a periodic task (e.g., every 12th cycle). However, quality assurance/quality control departments that regulate Lot or Batch approval criteria for a biopharmaceutical process can prefer to define the scope of a Lot Cycle or Batch Cycle as the largest repeating set of parameters related to the purification of a biopharmaceutical product. Therefore, the user can relate periodic execution of respective tasks to higher-level design cycles, if needed. Based on the above example, one skilled in the art can relate different categories of TEPs in different design cycle levels in a hierarchical way to accurately schedule a biopharmaceutical manufacturing process, evaluate scheduling alternatives in order to achieve optimal sizing of manufacturing equipment for a new manufacturing facility or the optimal utilization of equipment for an existing manufacturing facility.

Column 5061 summarizes the calculated number of task cycles executed per batch cycle for each task. These values can be used to more accurately calculate the quantity and cost of resources such as reagents and labor associated with individual tasks per Batch Cycle.

Figure 51:
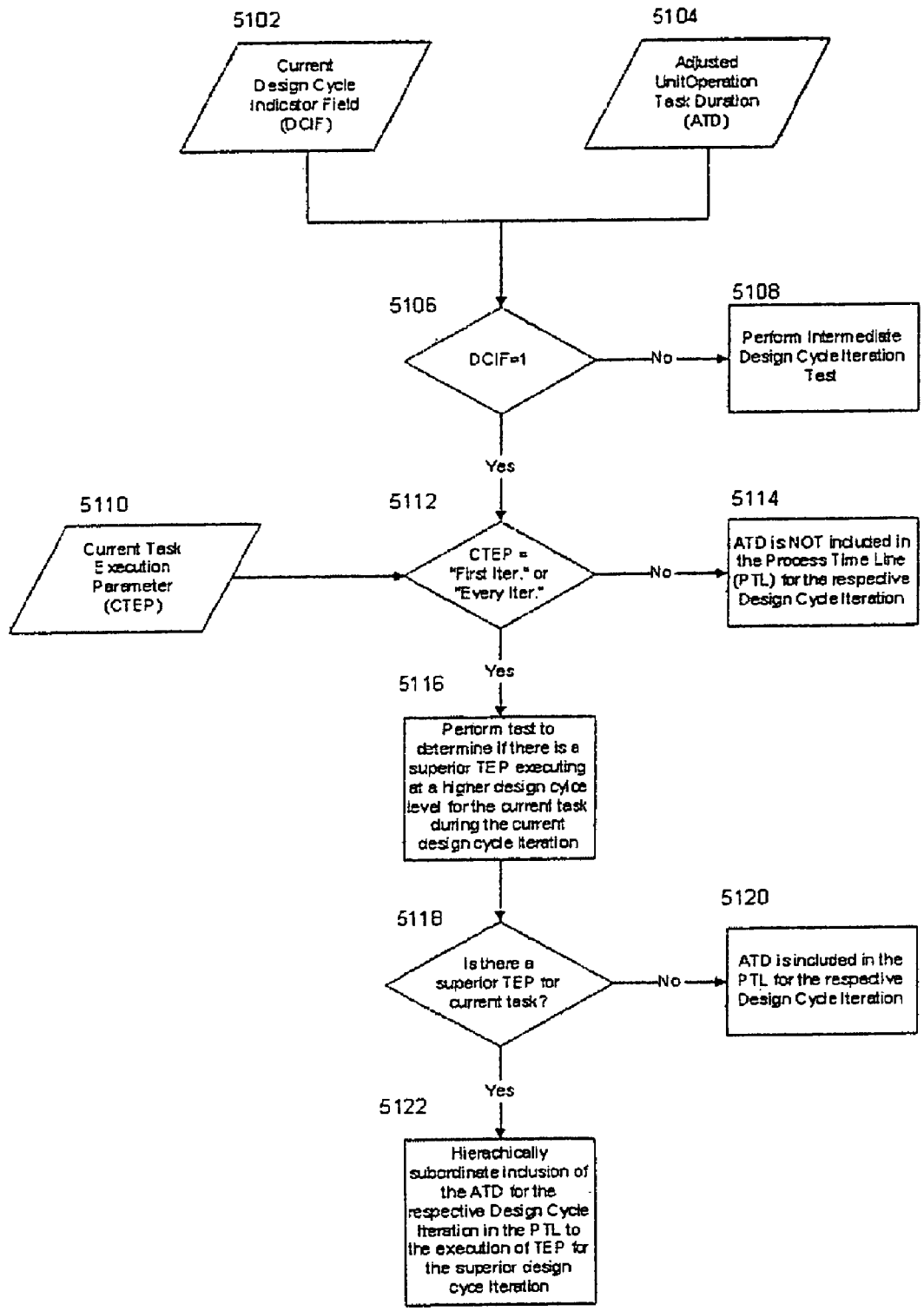
FIG. 51 is a flow chart that illustrates a test for an initial design cycle iteration test.

FIG. 51 illustrates a test executed to determine if the current design cycle iteration is the first iteration in a respective design cycle and how the test results are applied to the use of the adjusted task duration (ATD) for a given unit operation task in a respective PTL. In Step 5102 the Current Design Cycle Indicator Field (DCIF) of the DSC is obtained for the current design cycle iteration of a PTLM in a given PTL. In Step 5104 the Adjusted Unit Operation Task Duration (ATD) is obtained from column 2308 of FIG. 23. In Step 5106 the DCIF is evaluated to see if it is equal to 1 implying that the current design cycle iteration is the first iteration in a respective design cycle level. If DCIF is not equal to 1 then the Initial Design Cycle Iteration Test is ended and the Intermediate Design Cycle Iteration Test is performed in Step 5108, as further illustrated in FIG. 52, described below. If DCIF is equal to 1 then the Current Task Execution Parameter (CTEP) is obtained from the respective TEP column in FIGS. 50A–50C (see columns 5007, 5011, 5017, 5023, 5029, 5035, 5041, 5047, 5053, 5059) and evaluated to see if it is defined as either "First Iteration" or "Every Iteration." If neither of these cases is true then in Step 5114 the ATD is set equal to zero in the PTL for the respective design cycle iteration. If either of these cases is true then in Step 5116 each of the higher design cycle levels is evaluated in increasing hierarchical order to see if there is at least one superior TEP associated with the current UOT at a higher level. In Step 5118, if a superior TEP is not found at a higher design cycle level then in Step 5120 the ATD is included in the PTL for the respective design cycle iteration. If a superior TEP is found at a higher design cycle level, then in Step 5122, the execution of the TEP for the current design cycle level is subordinated to the TEP for a next highest hierarchical design cycle level. In this way the execution of TEP can be subordinated through many nested levels as previously illustrated with the example of FIGS. 50A–50C.

Figure 52:
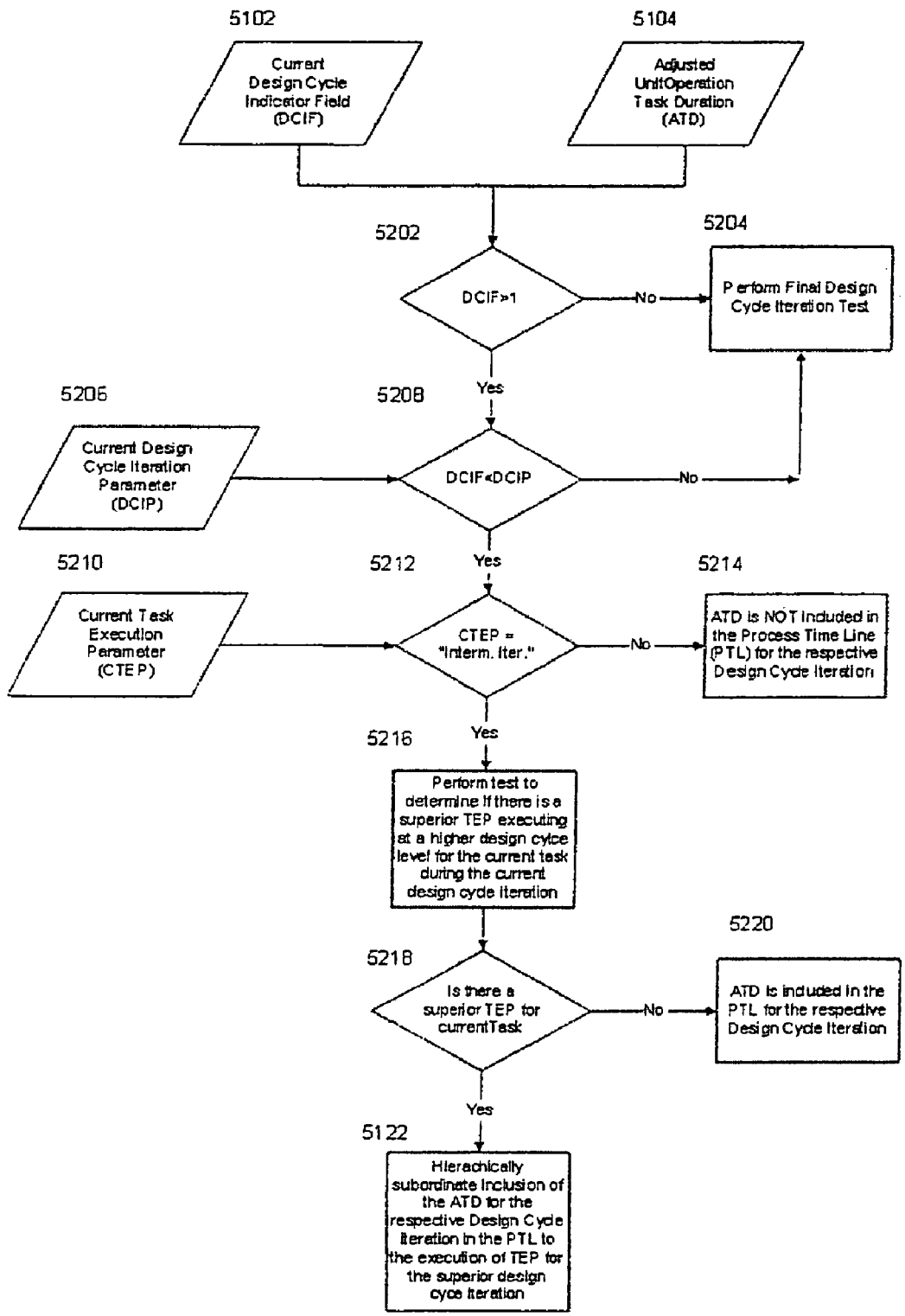
FIG. 52 is a flow chart that illustrates a test for an intermediate design cycle iteration test.

FIG. 52 illustrates the test executed to determine if the current design cycle iteration is an intermediate iteration in a respective design cycle and how the test results are applied to the use of the adjusted task duration (ATD) for a given unit operation task in a respective PTL. In Step 5102 the Current Design Cycle Indicator Field (DCIF) of the DSC is obtained for the current design cycle iteration of a PTLM in a given PTL. In Step 5104 the Adjusted Unit Operation Task Duration (ATD) is obtained from column 2308 of FIG. 23. In Step 5202 the DCIF is evaluated to see if it is greater than 1 implying that the current design cycle iteration is not the first iteration in a respective design cycle level. If DCIF is not greater than 1 then the Intermediate Design Cycle Iteration Test is ended and the Final Design Cycle Iteration Test is performed in Step 5204, as further illustrated in FIG. 53, described below. If DCIF is greater than 1 then the Current Design Cycle Iteration Parameter (DCIP) is obtained in Step 5206 and evaluated in Step 5208 to see if it greater than the DCIF for the current design cycle iteration. If DCIP is not greater than DCIF then the Intermediate Design Cycle Iteration Test is ended and the Final Design Cycle Iteration Test is performed in Step 5204, as further illustrated in FIG. 53 below. If DCIP is greater than DCIF then the Current Task Execution Parameter (CTEP) is obtained from the respective TEP column in FIGS. 50A–50C (see columns 5007, 5011, 5017, 5023, 5029, 5035, 5041, 5047, 5053, 5059) in Step 5210 and evaluated in Step 5212 to see if it is defined as "Intermediate Iteration." If this case is not true then in Step 5214 the ATD is set equal to zero in the PTL for the respective design cycle iteration. If this case is true then in Step 5216 each of the higher design cycle levels is evaluated in increasing hierarchical order to see if there is at least one superior TEP associated with the current UOT at a higher level. In Step 5218, if a superior TEP is not found at a higher design cycle level then in Step 5220, the ATD is included in the PTL for the respective design cycle iteration. If a superior TEP is found at a higher design cycle level, then in Step 5222, the execution of the TEP for the current design cycle level is subordinated to the TEP for a next highest hierarchical design cycle level. In this way the execution of TEP can be subordinated through many nested levels as previously illustrated with the example of FIGS. 50A–50C.

Figure 53:
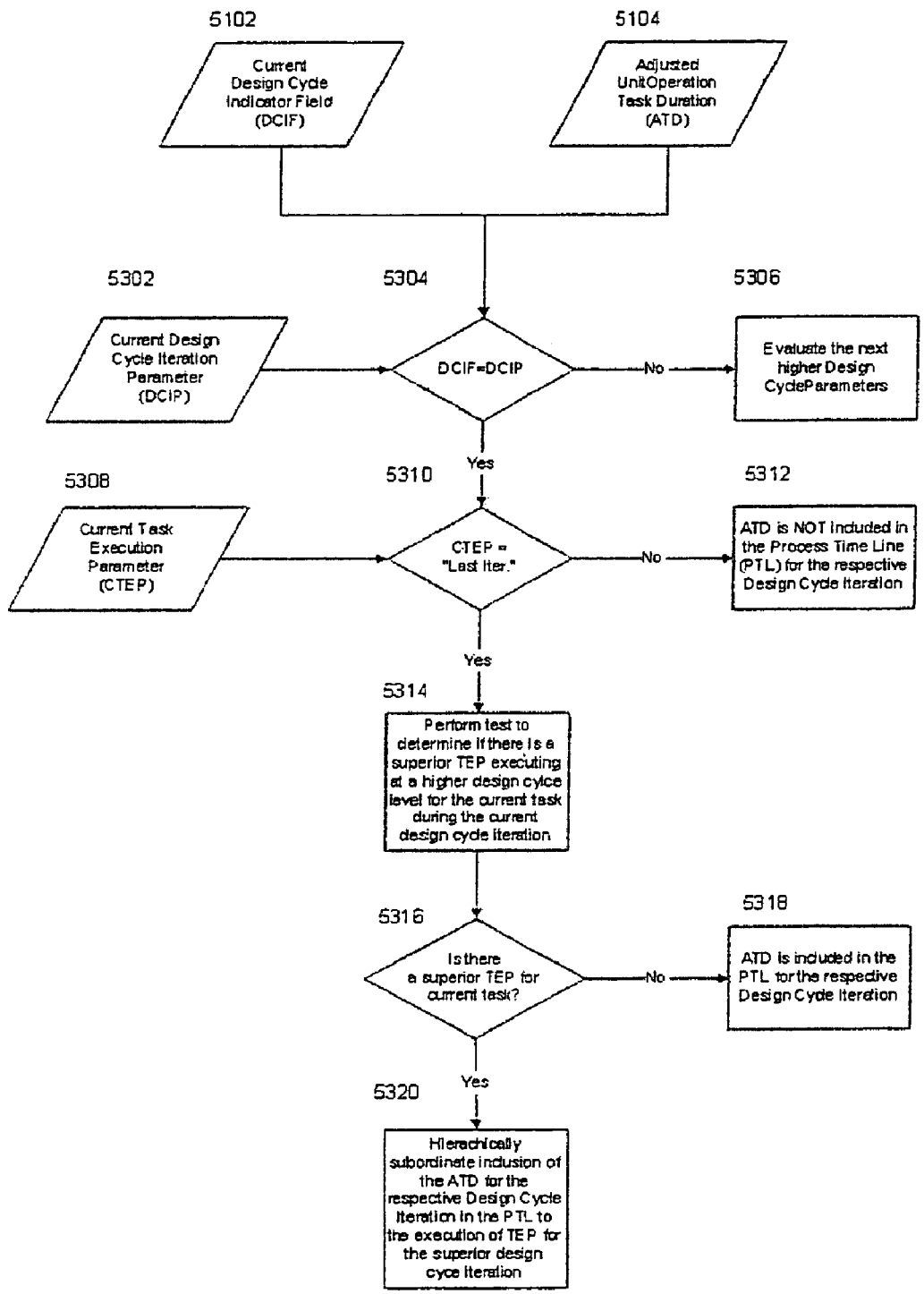
FIG. 53 is a flow chart that illustrates a test for a final design cycle iteration test.

FIG. 53 illustrates the test executed to determine if the current design cycle iteration is the last iteration in a respective design cycle and how the test results are applied to the use of the adjusted task duration (ATD) for a given unit operation task in a respective PTL. In Step 5102 the Current Design Cycle Indicator Field (DCIF) of the DSC is obtained for the current design cycle iteration of a PTLM in a given PTL. In Step 5104 the Adjusted Unit Operation Task Duration (ATD) is obtained from column 2308 of FIG. 23. In Step 5302 the DCIP is obtained and evaluated in Step 5304 to see if it is equal to DCIF implying that the current design cycle iteration is the last iteration in a respective design cycle level. If DCIF is not equal to DCIP then the Last Design Cycle Iteration Test is ended in Step 5306 and the First Design Iteration Test, Intermediate Design Iteration Test and Final Design Iteration Test is performed at the next higher Design Cycle Level according to the order of Design Cycle priority previous defined. If DCIF is equal to DCIP then the Current Task Execution Parameter (CTEP) is obtained from the respective TEP column in FIGS. 50A–50C (see columns 5007, 5011, 5017, 5023, 5029, 5035, 5041, 5047, 5053, 5059) in Step 5308 and evaluated in Step 5310 to see if it is defined as either "Last Iteration." If this case is not true then in Step 5312 the ATD is set equal to zero in the PTL for the respective design cycle iteration. If this case is true then in Step 5314 each of the higher design cycle levels is evaluated in increasing hierarchical order to see if there is at least one superior TEP associated with the current UOT at a higher level. In Step 5316, if a superior TEP is not found at a higher design cycle level then in Step 5318 the ATD is included in the PTL for the respective design cycle iteration. If a superior TEP is found at a higher design cycle level, then in Step 5320, the execution of the TEP for the current design cycle level is subordinated to the TEP for a next highest hierarchical design cycle level. In this way the execution of TEP can be subordinated through many nested levels as previously illustrated with the example of FIGS. 50A–50C.

FIG. 54 further illustrates the application of the supra cycle iteration test results from FIGS. 51–54 to the generation of a detailed PTL for the mammalian cell culture process represented in FIG. 47. In order to minimize the size of the table, the scope of the PTL illustrated in FIG. 54 has been reduced to only the last Batch Cycle Iteration for a given Lot Cycle for the sample unit operation 10305 where there is a PTLM for each of the 3 Unit Operation Sub Cycle Iterations illustrated in FIGS. 50A–50C. Column 5402 illustrates the DSC associated with unit operation 10305 as being for the $2^{nd}$ Batch Cycle and as representing Unit Operation Sub Cycles 1–3. According to the TEP configurations illustrated in FIGS. 50A–50C, the first UOT occurs only the first iteration of the 3 Sub Cycles indicated; therefore the respective ATD is included in the PTL in column 5410 for the first PTLM. UOT 2–10 occur "Every Iteration" of Unit Operation Sub Cycles for this Unit Operation, therefore the respective ATDs for these UOTs are also included in column 5410 for the first PTLM represented. In the second PTLM, the ATD for the first UOT is excluded from column 5410 while the ATDs for UOT 2–10 remain included since they execute with each cycle iteration. In the third PTLM the ATD for UOT 11–17 are included in Column 5410 together with the ATDs for UOT 2–10, while the ATDs for UOT 1 remain excluded. In a previous Batch Cycle iteration ($1^{st}$) the ATD for UOT 11 would be also excluded from column 5410 since it is only allowed to execute during the last Unit Operation Sub Cycle Iteration of the last Batch Cycle of a Lot Cycle according to the configuration specified in FIGS. 50A–50C.

As described supra, the resulting accuracy of the process time line allows the precise planning and scheduling of many aspects of the batch manufacturing process. The process time line scheduling information can be used to schedule manufacturing resources such as labor, reagents, reusables, disposables, etc., required directly by the manufacturing process for new or existing manufacturing facilities. Pre-process support activities such as solution preparation, and equipment prep and sterilization, required to support the core process, including the labor, reagents, etc. can be scheduled, cost forecasted and provided for. Post-process support activities such as product formulation, aseptic fill, freeze drying, vial capping, vial labeling and packaging required to ship the purified product in a form ready for use may be added to the process time line and managed. Based on the process time line, labor, reagents, etc., required to support these post-process support functions can be acquired and managed. One of the most important aspects of the present invention is the determination of process utility loads such as USP Purified Water, Water For Injection, Pure Steam, etc., for all of the manufacturing equipment. The process time line can be used to determine the peak utility loading, and utility requirements for the facility. Building utility loads such as building steam, heating, ventilation, air conditioning, plumbing, etc., for all manufacturing equipment, process areas and facility equipment can be determined based on the process time line and the equipment associated with each of the unit operations. The process time line can be used to measure the time that the equipment has been in service to schedule preventative maintenance of all plant equipment, Quality Assurance activities including instrument calibration, automated batch documentation, etc. and Quality Control activities including process system maintenance, raw material testing, in process testing and final product testing, etc.

Figure 13:
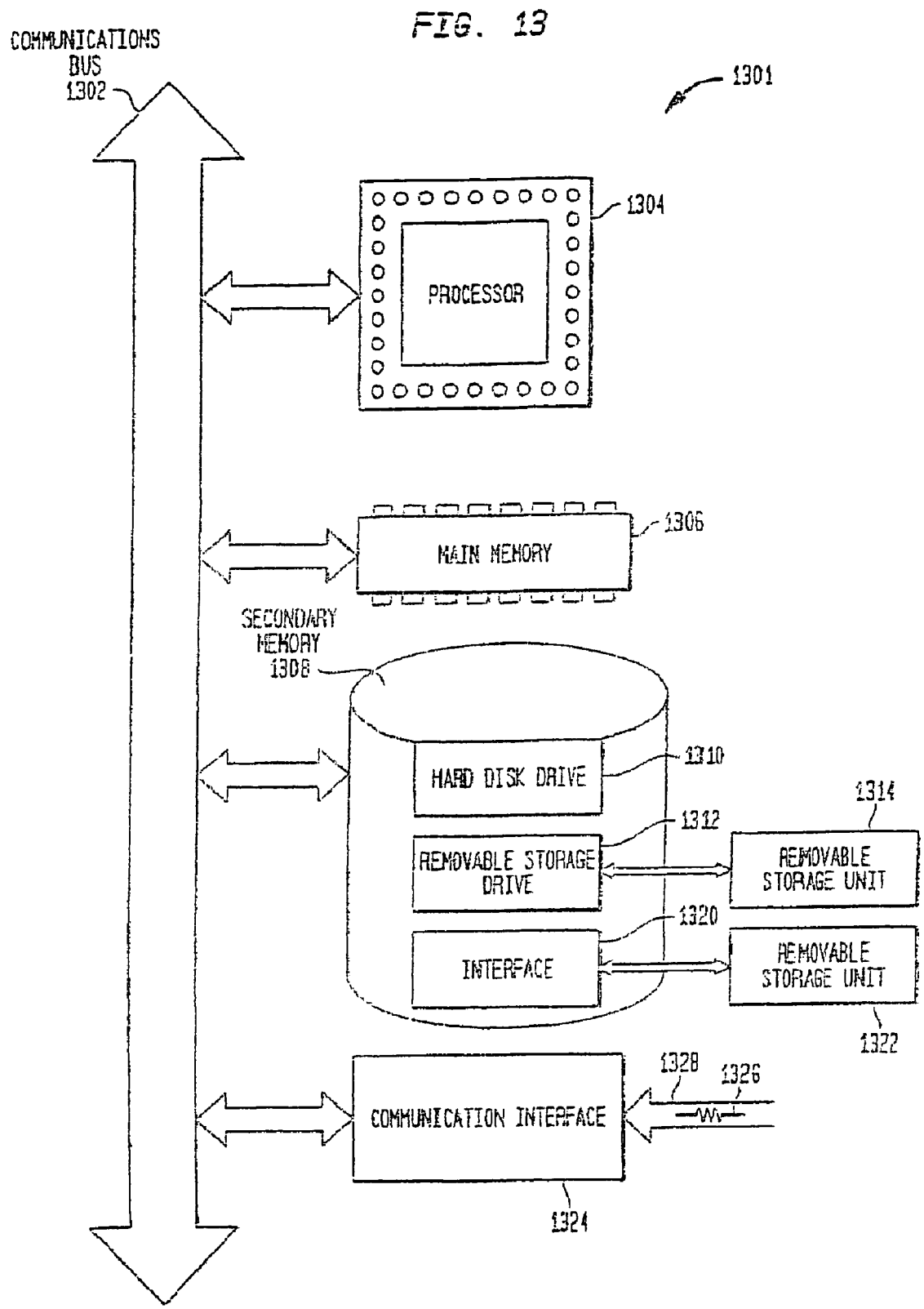
FIG. 13 illustrates an exemplary computer according to an embodiment of the present invention.

The present invention may be implemented using hardware, software or a combination thereof and may be implemented in a computer system or other processing system. In fact, in one embodiment, the invention is directed toward a computer system capable of carrying out the functionality described herein. An example computer system 1301 is shown in FIG. 13. The computer system 1301 includes one or more processors, such as processor 1304. The processor 1304 is connected to a communication bus 1302. Various software embodiments are described in terms of this example computer system. After reading this description, it will become apparent to a person skilled in the relevant art how to implement the invention using other computer systems and/or computer architectures.

Computer system 1302 also includes a main memory 1306, preferably random access memory (RAM), and can also include a secondary memory 1308. The secondary memory 1308 can include, for example, a hard disk drive 1310 and/or a removable storage drive 1312, representing a floppy disk drive, a magnetic tape drive, an optical disk drive, etc. The removable storage drive 1312 reads from and/or writes to a removable storage unit 1314 in a well known manner. Removable storage unit 1314, represents a floppy disk, magnetic tape, optical disk, etc. which is read by and written to by removable storage drive 1312. As will be appreciated, the removable storage unit 1314 includes a computer usable storage medium having stored therein computer software and/or data.

In alternative embodiments, secondary memory 1308 may include other similar means for allowing computer programs or other instructions to be loaded into computer system 1301. Such means can include, for example, a removable storage unit 1322 and an interface 1320. Examples of such can include a program cartridge and cartridge interface (such as that found in video game devices), a removable memory chip (such as an EPROM, or PROM) and associated socket, and other removable storage units 1322 and interfaces 1320 which allow software and data to be transferred from the removable storage unit 1322 to computer system 1301.

Computer system 1301 can also include a communications interface 1324. Communications interface 1324 allows software and data to be transferred between computer system 1301 and external devices. Examples of communications interface 1324 can include a modem, a network interface (such as an Ethernet card), a communications port, a PCMCIA slot and card, etc. Software and data transferred via communications interface 1324 are in the form of signals which can be electronic, electromagnetic, optical or other signals capable of being received by communications interface 1324. These signals 1326 are provided to communications interface via a channel 1328. This channel 1328 carries signals 1326 and can be implemented using wire or cable, fiber optics, a phone line, a cellular phone link, an RF link and other communications channels.

In this document, the terms "computer program medium" and "computer usable medium" are used to generally refer to media such as removable storage device 1312, a hard disk installed in hard disk drive 1310, and signals 1326. These computer program products are means for providing software to computer system 1301.

Computer programs (also called computer control logic) are stored in main memory and/or secondary memory 1308. Computer programs can also be received via communications interface 1324. Such computer programs, when executed, enable the computer system 1301 to perform the features of the present invention as discussed herein. In particular, the computer programs, when executed, enable the processor 1304 to perform the features of the present invention. Accordingly, such computer programs represent controllers of the computer system 1301.

In an embodiment where the invention is implemented using software, the software may be stored in a computer program product and loaded into computer system 1301 using removable storage drive 1312, hard drive 1310 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

While this invention has been particularly shown and described with references to preferred embodiments thereof, it will be understood by those skilled in the art that various changes in form and details may be made therein without departing from the scope of the invention.

What is claimed is:

1. A method for simulating and scheduling a batch process manufacturing facility, comprising the steps of:
    selecting a sequence of unit operations, wherein each of the sequence of unit operations has an identifier code;
    selecting a set of scheduling cycles for each of the sequence of unit operations;
    referencing a master table using the identifier code to obtain operational parameters for each of the sequence of unit operations;
    devising one or more discrete tasks for each of the sequence of unit operations;
    generating a block flow diagram using the sequence of unit operations and the operational parameters; and
    generating a process time line using the operational parameters, the discrete tasks, the block flow diagram, the set of scheduling cycles for each of the sequence of unit operations, wherein the process time line is used as a tool for batch processing and facility design,
    wherein devising one or more discrete tasks for each of the sequence of unit operational parameters includes:
    defining one or more design cycle levels that comprise one or more execution options, each of the design cycle levels are associated with one of the discrete tasks;
    testing the execution options with multiple iterations whether each of the execution cycles is executed (a) only during the first iteration of a design cycle level; (b) during each iteration of a design cycle level; (c) only during intermediate iterations of a design cycle level, excluding the first and last iterations; or (d) only during the last iteration of a design cycle level; and
    including or excluding an adjusted task duration for each the discrete tasks associated with each of the sequence of unit operations in the process time line depending on the results of testing the execution options.

2. The method of claim 1, wherein the batch process manufacturing facility is a biopharmaceutical batch processing facility.

3. A system for simulating and scheduling a batch process manufacturing facility, comprising:
    means for selecting a sequence of unit operations, wherein each of the sequence of unit operations has an identifier code;
    means for selecting a set of scheduling cycles for each of the sequence of unit operations;
    means for referencing a master table using the identifier code to obtain operational parameters for each of the sequence of unit operations;
    means for devising one or more discrete tasks for each of the sequence of unit operations;
    means for generating a block flow diagram using the sequence of unit operations and the operational parameters; and
    means for generating a process time line using the operational parameters, the discrete tasks, the block flow diagram, the set of scheduling cycles for each of the sequence of unit operations, wherein the process time line is used as a tool for batch processing and facility design, wherein the devising means includes:

means for defining one or more design cycle levels that comprise one or more execution options, each of the design cycle levels are associated with one of the discrete tasks;

means for testing the execution options with multiple iterations whether each of the execution cycles is executed (a) only during the first iteration of a design cycle level; (b) during each iteration of a design cycle level; (c) only during intermediate iterations of a design cycle level, excluding the first and last iterations; or (d) only during the last iteration of a design cycle level; and means for adjusting a task duration for each the discrete tasks associated with each of the sequence of unit operations in the process time line depending on the results of testing the execution options.

4. The system of claim 3, wherein the batch process manufacturing facility is a biopharmaceutical batch processing facility.

* * * * *